US008719256B2

(12) United States Patent
Jones et al.

(10) Patent No.: US 8,719,256 B2
(45) Date of Patent: May 6, 2014

(54) METHOD AND SYSTEM FOR IMPROVEMENT OF REQUEST PROCESSING

(75) Inventors: Scott A. Jones, Carmel, IN (US); Thomas E. Cooper, Indianapolis, IN (US); Mark Stephen Malseed, Alexandria, VA (US); Jeffrey Glen Jockisch, Westfield, IN (US); Mark Gamache, Zionsville, IN (US); Michael B. Burroughs, Indianapolis, IN (US)

(73) Assignee: ChaCha Search, Inc, Carmel, IN (US)

( * ) Notice: Subject to any disclaimer, the term of this patent is extended or adjusted under 35 U.S.C. 154(b) by 494 days.

(21) Appl. No.: 12/434,385

(22) Filed: May 1, 2009

(65) Prior Publication Data

US 2009/0276419 A1 Nov. 5, 2009

Related U.S. Application Data

(60) Provisional application No. 61/049,597, filed on May 1, 2008, provisional application No. 61/050,785, filed on May 6, 2008, provisional application No. 61/053,885, filed on May 16, 2008.

(51) Int. Cl.
    *G06F 17/30* (2006.01)
(52) U.S. Cl.
    CPC .................... *G06F 17/3064* (2013.01)
    USPC ...................................................... 707/718
(58) Field of Classification Search
    None
    See application file for complete search history.

(56) References Cited

U.S. PATENT DOCUMENTS

| | | | |
|---|---|---|---|
| 5,918,010 A | 6/1999 | Appleman | |
| 6,029,141 A | 2/2000 | Bezos | |
| 6,377,944 B1 | 4/2002 | Busey | |
| 6,411,950 B1 | 6/2002 | Moricz | |
| 6,434,549 B1 * | 8/2002 | Linetsky et al. | 707/719 |
| 6,505,166 B1 | 1/2003 | Stephanou | |

(Continued)

FOREIGN PATENT DOCUMENTS

| | | |
|---|---|---|
| WO | WO2007052285 | 10/2007 |
| WO | WO2007117513 | 10/2007 |
| WO | WO2007117973 | 10/2007 |

OTHER PUBLICATIONS

Ryen W. White, Ian Ruthven, Joemon M. Jose, C. J. Van Rijsbergen, Evaluating implicit feedback models using searcher simulations, ACM Transactions on Information Systems (TOIS), v.23 n.3, p. 325-361, Jul. 2005.*

(Continued)

*Primary Examiner* — Richard Bowen
(74) *Attorney, Agent, or Firm* — Staas & Halsey

(57) ABSTRACT

A system and method of processing a request including improving usage and/or performance of resources is disclosed. Information relating to a user request may be provided to one or more resources which process the information and provide a result. A result and/or other information may be provided to a human assistant or guide who may process information to produce a result and/or review a result(s). Information provided by a guide may be processed and provided to a resource, which may improve the performance of a resource. A resource(s) and/or a guide(s) may be selected and/or provided with activities based on ratings and/or rankings associated with a request, which may optimize usage of system resources. Information obtained may be provided for various purposes.

24 Claims, 63 Drawing Sheets

(56) References Cited

U.S. PATENT DOCUMENTS

| | | | |
|---|---|---|---|
| 6,594,799 B1 | 7/2003 | Robertson | |
| 6,675,159 B1* | 1/2004 | Lin et al. | 1/1 |
| 6,681,380 B1* | 1/2004 | Britton et al. | 717/115 |
| 6,732,088 B1 | 5/2004 | Glance | |
| 6,766,320 B1 | 7/2004 | Wang | |
| 6,968,513 B1 | 11/2005 | Rinebold | |
| 6,973,482 B2* | 12/2005 | Mohammed et al. | 709/208 |
| 7,014,469 B1* | 3/2006 | Nocera et al. | 434/236 |
| 7,080,071 B2 | 7/2006 | Henrion | |
| 7,249,064 B1 | 7/2007 | Carmen | |
| 7,287,021 B2* | 10/2007 | De Smet | 707/600 |
| 7,315,809 B2 | 1/2008 | Xun | |
| 7,444,323 B2* | 10/2008 | Martinez et al. | 1/1 |
| 7,539,733 B2* | 5/2009 | Mohammed et al. | 709/208 |
| 7,596,578 B1* | 9/2009 | Marks | 1/1 |
| 7,617,519 B2* | 11/2009 | Williams | 726/1 |
| 7,685,130 B2 | 3/2010 | Imielinski | |
| 7,769,774 B2* | 8/2010 | Martinez et al. | 707/769 |
| 7,797,261 B2* | 9/2010 | Yang | 706/45 |
| 7,853,602 B2* | 12/2010 | Gorti et al. | 707/753 |
| 7,899,694 B1* | 3/2011 | Marshall et al. | 705/7.11 |
| 2001/0054064 A1* | 12/2001 | Kannan | 709/203 |
| 2002/0082960 A1 | 6/2002 | Goedken | |
| 2002/0140715 A1 | 10/2002 | De Smet | |
| 2003/0014331 A1 | 1/2003 | Simons | |
| 2003/0050042 A1* | 3/2003 | Olah | 455/406 |
| 2003/0115187 A1 | 6/2003 | Bode | |
| 2003/0144895 A1 | 7/2003 | Aksu et al. | 705/9 |
| 2004/0028021 A1* | 2/2004 | Varshney et al. | 370/342 |
| 2004/0030541 A1* | 2/2004 | Chou et al. | 704/2 |
| 2004/0052342 A1* | 3/2004 | Jugovec et al. | 379/88.22 |
| 2004/0078386 A1* | 4/2004 | Moon et al. | 707/102 |
| 2004/0083195 A1 | 4/2004 | McCord | |
| 2004/0083211 A1 | 4/2004 | Bradford | |
| 2004/0153352 A1 | 8/2004 | Berns | |
| 2004/0199397 A1 | 10/2004 | Dresden | |
| 2005/0027691 A1 | 2/2005 | Brin | |
| 2005/0080771 A1 | 4/2005 | Fish | |
| 2005/0154717 A1 | 7/2005 | Watson | |
| 2005/0209992 A1 | 9/2005 | Kikinis | |
| 2005/0240580 A1* | 10/2005 | Zamir et al. | 707/4 |
| 2005/0283473 A1 | 12/2005 | Rousso | |
| 2006/0041476 A1 | 2/2006 | Zheng | |
| 2006/0057079 A1* | 3/2006 | Pickover | 424/50 |
| 2006/0059151 A1* | 3/2006 | Martinez et al. | 707/7 |
| 2006/0080107 A1* | 4/2006 | Hill et al. | 704/275 |
| 2006/0149719 A1* | 7/2006 | Harris | 707/3 |
| 2006/0173702 A1* | 8/2006 | Saxena et al. | 705/1 |
| 2006/0179074 A1 | 8/2006 | Martin | |
| 2006/0190436 A1 | 8/2006 | Richardson | |
| 2006/0294067 A1 | 12/2006 | Halcrow | |
| 2007/0003914 A1* | 1/2007 | Yang | 434/236 |
| 2007/0011151 A1 | 1/2007 | Hagar | |
| 2007/0043583 A1 | 2/2007 | Davulcu | |
| 2007/0053513 A1 | 3/2007 | Hoffberg | |
| 2007/0099636 A1* | 5/2007 | Roth | 455/466 |
| 2007/0127688 A1* | 6/2007 | Doulton | 379/265.01 |
| 2007/0156669 A1 | 7/2007 | Marchisio | |
| 2007/0156851 A1* | 7/2007 | Tasci | 709/219 |
| 2007/0163425 A1* | 7/2007 | Tsui et al. | 84/609 |
| 2007/0174273 A1 | 7/2007 | Jones | |
| 2007/0208570 A1 | 9/2007 | Bhardwaj | |
| 2007/0219978 A1* | 9/2007 | Myers | 707/5 |
| 2007/0260601 A1 | 11/2007 | Thompson | |
| 2007/0266019 A1 | 11/2007 | Lavi | |
| 2008/0028039 A1 | 1/2008 | Christopher | |
| 2008/0033770 A1 | 2/2008 | Barth | |
| 2008/0033823 A1 | 2/2008 | Monteverde | |
| 2008/0033959 A1* | 2/2008 | Jones | 707/9 |
| 2008/0045811 A1* | 2/2008 | Iliff | 600/300 |
| 2008/0092168 A1 | 4/2008 | Logan | |
| 2008/0133346 A1 | 6/2008 | Chow | |
| 2008/0165711 A1* | 7/2008 | Wyld | 370/310 |
| 2008/0172361 A1* | 7/2008 | Wong et al. | 707/3 |
| 2008/0177708 A1* | 7/2008 | Ayyar et al. | 707/3 |
| 2009/0150387 A1* | 6/2009 | Marchewitz | 707/5 |

OTHER PUBLICATIONS

Morris et al., "SearchTogether: An Interface for Collaborative Web Search," ACM, UIST'07, Oct. 7-10, 2007, Newport, Rhode Island, USA.*

Search Report for corresponding application PCT/US 09/ 42590 dated Jun. 30, 2009.

* cited by examiner

USER REQUEST RECORD
500

| | Description | Example Content |
|---|---|---|
| 505 | User request ID | 'User request1' |
| 510 | User request content | 'What is the best Thai restaurant in Indy?.mp3' |
| 515 | User request user ID | 'User1' |
| 520 | User request guide ID | 'Guide1';'Guide2' |
| 525 | User request category ID | 'Category1';'Category2' |
| 530 | User request profile ID | 'Profile1' |
| 535 | User request result ID | 'Result1.1';'Result1.2';'Result1.3' |
| 540 | User request result rank | '1';'3';'4' |
| 545 | User request advertisement ID | 'Advert1';'Advert4';'Advert2' |
| 550 | User request advertisement rank | '3';'1';'5' |
| 555 | User request system request ID | 'System request1.1';<br>'System request1.2';<br>'System request1.3' |

PROFILE RECORD

|  | Description | Example Content |
|---|---|---|
| 1005 | Profile ID | 'Profile1' |
| 1010 | Profile geographic info | 'Indiana' |
| 1015 | Profile demographic info | 'under30'AND'over20' |
| 1020 | Profile personality info | 'Foodie' |
| 1025 | Profile guide ID | 'Guide1';'Guide3';'Guide2';'Guide4';'Guide5' |
| 1030 | Profile guide rating | '2';'2';'1';'3';'3' |

CATEGORY RECORD

|  | Description | Example Content |
|---|---|---|
| 1105 | Category ID | 'Category5' |
| 1110 | Category description | 'Speech to text' |
| 1115 | Category guide ID | 'Guide1';'Guide2';'GuideN' |
| 1120 | Category guide rating | '10';'6';'2' |
| 1125 | Category resource ID | 'Resource1';'Resource2';'ResourceN' |
| 1130 | Category resource rating | '8';'8.5';'3' |

RESULT RECORD

|  | Description | Example Content |
|---|---|---|
| 1205 | Result ID | 'ResultSy1.1' |
| 1210 | Result guide ID | 'Guide1' |
| 1215 | Result content info | 'What is the best Thai restaurant in Indy?' |
| 1220 | Result resource ID | 'Resource2' |
| 1225 | Result review information | 'replace "vest" with "best"' |

FIG. 12

Table 1350a (Time = t1):

| Guide ID | Rank | Notification indicator | Availability indicator |
|---|---|---|---|
| Guide1 | 1 | No | No |
| Guide3 | 2 | No | Yes |
| Guide2 | 3 | No | Yes |
| Guide4 | 4 | No | No |
| . | . | , | . |
| GuideN | N | No | Yes |
| Notification table ID | | 'Review1Request2' | |

Table 1350a (Time = t2):

| Guide ID | Rank | Notification indicator | Availability indicator |
|---|---|---|---|
| Guide1 | 1 | No | No |
| Guide3 | 2 | Yes | Yes |
| Guide2 | 3 | Yes | Yes |
| Guide4 | 4 | No | No |
| . | . | , | . |
| GuideN | N | No | Yes |
| Notification table ID | | 'Review1Request2' | |

Table 1350a (Time = t3):

| Guide ID | Rank | Notification indicator | Availability indicator |
|---|---|---|---|
| Guide1 | 1 | Yes | Yes |
| Guide3 | 2 | Yes | Yes |
| Guide2 | 3 | Yes | No |
| Guide4 | 4 | No | No |
| . | . | , | . |
| GuideN | N | No | Yes |
| Notification table ID | | 'Review1Request2' | |

Table 1350a (Time = t4):

| Guide ID | Rank | Notification indicator | Availability indicator |
|---|---|---|---|
| Guide1 | 1 | Yes | Yes |
| Guide3 | 2 | Yes | Yes |
| Guide2 | 3 | Yes | No |
| Guide4 | 4 | No | No |
| . | . | , | . |
| GuideN | N | Yes | Yes |
| Notification table ID | | 'Review1Request2' | |

Table 1350b (Time = t5):

| Guide ID | Rank | Notification indicator | Availability indicator |
|---|---|---|---|
| Guide0 | 1 | No | Yes |
| Guide1 | 2 | Yes | Yes |
| Guide2 | 3 | Yes | Yes |
| Guide5 | 4 | No | Yes |
| Guide3 | 5 | Yes | Yes |
| Guide4 | 6 | No | Yes |
| . | . | . | . |
| . | . | . | . |
| . | . | . | . |
| GuideN | M | Yes | Yes |
| Notification table ID | | 'Review2Request2' | |

REQUEST RECORD

|  | Description | Example Content |
|---|---|---|
| 2705 | Request record ID | '502.331.2204,12.12.08, 13 October 2006' |
| 2710 | Request user ID | '502.331.2204 - 4772' |
| 2715 | Request guide ID | 'Bob Smith';'Don White' |
| 2720 | Request raw query ID | 'when do the Cards play this week' |
| 2725 | Request result ID | 'Cardinals vs LA Dodgers 7PM June 16 Busch Stadium' |
| 2730 | Request succinct query | 'what is the next scheduled game for the Saint Louis Cardinals baseball team' |
| 2735 | Request category ID | 'Sports>MLB';'Entertainment>Sports' |
| 2740 | Request type ID | 'voice' |
| 2745 | Request mode ID | 'user' |
| 2750 | Request profile ID | 'Saint Louis, MO resident';'baseball fan' |

STRUCTURED QUERY RECORD

|  | Description | Example Content |
|---|---|---|
| 2805 | Structured query ID | 'what is the next scheduled game for the Saint Louis Cardinals baseball team' |
| 2810 | Structured query category ID | 'Sports>MLB'; 'Entertainment>Saint Louis, MO' |
| 2815 | Structured query request ID | '502.331.2204,12.12.08, 13 October 2006'; '555.224.2242, 12.28.00, 15 October 2006' |
| 2820 | Structured query result ID | 'Cardinals vs Dodgers 7PM June 16 Busch Stadium' |
| 2825 | Structured query profile ID | 'MLB Fan';'Saint Louis, MO resident' |
| 2830 | Structured query advertisement ID | 'cardinal baseball tickets' |

| | RESULT RECORD | |
|---|---|---|
| | Description | Example Content |
| 2905 | Result record ID | 'Cardinals vs Dodgers 7PM June 16 Busch Stadium' |
| 2910 | Result structured query ID | 'what is the next scheduled game for the Saint Louis Cardinals baseball team'; 'what is the next scheduled game for LA' |
| 2915 | Result webgem indicator | 'Yes';'No' |
| 2920 | Result request ID | '502.331.2204,12.12.08, 13 October 2006'; '555.224.2242, 12.28.00, 15 October 2006' |
| 2925 | Result structured query rating | '10';'7' |
| 2930 | Result guide ID | 'Bob Smith' |
| 2935 | Result URL | 'www.mlbschdeules.com\stlouis' |
| 2940 | Result display URL | 'cha.gs\stl' |

| | RESOURCE RECORD | |
|---|---|---|
| | Description | Example Content |
| 3005 | Resource record ID | 'sports scores' |
| 3010 | Resource category list | 'Sports>MLB';'Sports>NFL' |
| 3015 | Resource access information | '317.331.2224'; 'scores@sportsscores.com'; 'www.sportsscores.com' |

| | ADVERTISEMENT RECORD | |
|---|---|---|
| | Description | Example Content |
| 3105 | Advertisement record ID | 'cardinal baseball tickets' |
| 3110 | Advertisement category list | 'Sports>MLB';'Sports>Saint Louis' |
| 3115 | Advertsiement access info | 'https://www.chacha.com/ads/ticketscom/stlcards' |

FIG. 31

Raw Query

Did this go to me?

Do you need clarification?

| Interrogative |
|---|
| How |
| To whom |
| Who |
| What |
| Where |
| When |

Choose a Location 4010

Location

| Location Name | Location |
|---|---|
| Mer Rouge | Marion, Louisiana |
| Chickasaw | Mer Rouge, Louisiana |
| Clair Mel | Tampa, Florida |
| Mem | Memphis, Tennessee |
| Mem | Memphis, Tennessee |
| Mem | Memphis, Tennessee |
| Mem | Memphis, Tennessee |
| Mem | Memphis, Tennessee |
| Mem | Memphis, Tennessee | close or Esc Key

Select All | Reset All

Report Abuse | Abort this Query

View all Categories

Selected Categories (remove only)

/Health/Fitness/

| weren't |
| aren't |
| isn't |
| many |

CATEGORIZATION RECORD

| | Description | Example Content |
|---|---|---|
| 5305 | Categorization record ID | 'arts>music>jazz' |
| 5310 | Categorization guide ID list | 'guide1','guide2','guide3' |
| 5315 | Categorization guide rating list | '3','5','7' |
| 5320 | Categorization guide interest list | 'miles davis','silvano monasterios', 'sara montes', 'sara montes', 'daniel smith' |
| 5325 | Categorization linked category ID list | 'shopping>music>jazz', 'arts>music', 'arts>music>jazz>artists', |
| 5330 | Categorization linked category function | '-0.5','-1.2','-0.8' |
| 5335 | Categorization advertisement ID list | 'indiana jazz festival', 'www.cheaptickets.com' |
| 5340 | Categorization advertisement rating list | '7','7','3' |
| 5345 | Categorization resource ID list | 'www.jazzismything.org','www.jazzwiki.org', 'chicagoconcerts.org_17.dec.07' |
| 5350 | Categorization resource rating list | 'A','b-3','6' |
| 5355 | Categorization search space info | 'http://musicmozorg/','https://chachascouts.com', 'stufffrombill' |
| 5360 | Categorization search process information | 'http://rollyo.com/createroll.html?sid=149942', 'googleCSE1.html','billsswick.html' |
| 5365 | Categorization wiki ID | 'chachajazzwiki.html','chachasaramonteswiki.html' |
| 5370 | Categorization view information | 'CSE attention','display linked','TM icons active','sponsored' |
| 5375 | Categorization calendar ID list | 'US holidays','Jazz lovers events' |

REQUEST RECORD

| | Description | Example Content |
|---|---|---|
| 5605 | Request ID | 'Request1' |
| 5610 | Request content | 'What is the best Thai restaurant in Indy?' |
| 5615 | Request user ID | 'User1';'User2' |
| 5620 | Request guide ID | 'Guide1';'Guide2' |
| 5625 | Request category ID | 'Category1';'Category2' |
| 5630 | Request profile ID | 'Profile1' |
| 5635 | Request result ID | 'Result1.1';'Result1.2';'Result1.3'; |
| 5640 | Request result rank | '1';'3';'4'; |
| 5645 | Request advertisement ID | 'Advert1';'Advert4';'Advert2'; |
| 5650 | Request advertisement rank | '3';'1';'5' |
| 5655 | Request usage info | 'use counter = 20' |

GUIDE RECORD

| | Description | Example Content |
|---|---|---|
| 5705 | Guide ID | 'Guide1' |
| 5710 | Guide category ID | 'Category1';'Category3' |
| 5715 | Guide topic ID | Topic1.1='reggie miller';Topic1.2='basketball';Topic3.1='fishing' |
| 5720 | Guide profile ID | 'Demoprofileg1';'Geoprofileg1';'Persprofileg1' |
| 5725 | Guide result ID | 'Result1.1';'Result3.1';'Result3.2' |
| 5730 | Guide communication info | guidecomg1typ1='guide1';<br>guidecomg1typ2='guide1@chacha.com';<br>guidecomg1typ3='guide1@AIM';<br>guidecomg1typ4='317.224.2242'; |
| 5735 | Guide request ID | 'Request1';'Request3'; |

USER RECORD

| | Description | Example Content |
|---|---|---|
| 5805 | User ID | 'User1' |
| 5810 | User profile ID | 'DemoprofileU1';'GeoprofileU1';'PersprofileU1' |
| 5815 | User request ID | 'Request1';'Request2' |
| 5820 | User result ID | 'Result1.1';'Result1.2';'Result2.1' |
| 5825 | User advertisement ID | 'Advert1';'Advert2' |
| 5830 | User communication info | usercomu1typ1='user1';<br>usercomu1typ2='user1@chacha.com';<br>usercomu1typ3='twitter:user1';<br>usercomu1typ4='317.924.2242'; |

PROFILE RECORD

|  | Description | Example Content |
|---|---|---|
| 5905 | Profile ID | 'Profile1' |
| 5910 | Profile geographic info | 'Indiana' |
| 5915 | Profile demographic info | 'under30'AND'over20' |
| 5920 | Profile personality info | 'Foodie' |
| 5925 | Profile guide ID | 'Guide1';'Guide3';'Guide2';'Guide4';'Guide5' |
| 5930 | Profile guide rating | '2';'2';'1';'3';'3' |

RESULT RECORD

|  | Description | Example Content |
|---|---|---|
| 6005 | Result ID | 'Result1.1' |
| 6010 | Result guide ID | 'Guide1' |
| 6015 | Result content info | 'Thai sensations is the best Thai restaurant in Indy' |
| 6020 | Result resource ID | 'Resource2' |
| 6025 | Result usage information | 'use counter = 120' |

RESOURCE RECORD

|  | Description | Example Content |
|---|---|---|
| 6105 | Resource ID | 'Resource2' |
| 6110 | Resource guide ID | 'Guide1' |
| 6115 | Resource description | 'Dining in Indiana' |
| 6120 | Resource access info | 'www.diningindy.com' |
| 6125 | Resource usage information | 'use counter = 180' |

ADVERTISEMENT RECORD

| | Description | Example Content |
|---|---|---|
| 6205 | Advertisement ID | 'Advert1' |
| 6210 | Advertisement description | 'Gokimchee the asian grocery in fishers' |
| 6215 | Advertisement access info | 'https://adserver.chacha.com\gokimchee' |
| 6220 | Advertisement usage information | 'use counter = 180' |

SEARCH SESSION RECORD

| | Description | Example Content |
|---|---|---|
| 6305 | Search session ID | 'session 1100227' |
| 6310 | Search session search query | 'best email marketing companies'; 'where can I get info of the best email marketing practices?' |
| 6315 | Search session user ID | 'Market 101' |
| 6320 | Search session guide ID | 'Email guy1' |
| 6325 | Search session result ID | 'exacttarget.com';'mail2u.com' |
| 6330 | Search session resource ID | 'HarvardBusinessReview.net';'www.google.com' |
| 6335 | Search session keyword ID | 'email';'martketing companies';'email marketing companies' |
| 6340 | Search session category ID | 'Business>Marketing';'Computers>Marketing' |
| 6345 | Search session rating info | '5';'9/10';'4/10' |
| 6350 | Search session comments | 'www.emailmarkets.com is good for this';'Guide1' |
| 6355 | Search session chronological info | 'Startsession 1.40P_12_27_07';'result1-1.41P;result2-1.45P'; 'endsession1.46P_12_27_07' |
| 6360 | Search session clarification info | 'location:NewYork,NewYork' |

<?xml version="1.0" encoding="UTF-8"?>  —6502
<GoogleCustomizations>  —6504
6506—<CustomSearchEngine volunteers="false" keywords="indianapolisindy" language="en" visible="false" encoding="UTF8">
    6508—<Title>IndianapolisLocalSearch</Title>
    6510—<Description>CustomsearchforfindingallthingsIndianapolis</Description>
    6512—<Context>
        6514—<Facet>
            6548—<FacetItem>
                6552—<Label name="indianapolis_hotels" mode="BOOST">
                    6556—<Rewrite>IndianapolisORIndy</Rewrite>
                    6554—</Label>
                    6560—<Title>IndianapolisHotels</Title>
                6550—</FacetItem>
            6516—</Facet>
            6518—<BackgroundLabels>
                6534—<Label name="boost_highest" mode="BOOST" weight="1"/>
                6536—<Label name="boost_high" mode="BOOST" weight="0.859999"/>
                6538—<Label name="boost_med" mode="BOOST" weight="0.759999"/>
                6540—<Label name="_cse_heu_1oztoew" mode="FILTER"/>
                6542—<Label name="boost_low" mode="BOOST" weight="0.259999"/>
                6544—<Label name="negative_boost" mode="BOOST" weight="-0.459999"/>
                6546—<Label name="_cse_exclude_heu_1oztoew" mode="ELIMINATE"/>
            6520—</BackgroundLabels>
    6522—</Context>
    6524—<LookAndFeel/>
    6526—<SubscribedLinks/>
    6528—<AdSense/>
    6530—<EnterpriseAccount/>
6562—</CustomSearchEngine>
</GoogleCustomizations>  —6564
```

FIG. 65

```
<?xml version="1.0" encoding="UTF-8"?>  —6602
<GoogleCustomizations> —6604
    <Annotations> —6606
6608—    <Annotation about="indyrestaurant.compendiumsoftware.com/blog/dine-with-me" score="1">
6612—        <Label name="_cse_heu_1oztoew"/>
6610—    </Annotation>
6614—    <Annotation about="indianapolis.citysearch.com/profile/3935232/franklin_in/jim_o_brien_realty.html">
6618—        <Label name="_cse_exclude_heu_1oztoew"/>
6616—    </Annotation>
6620—    <Annotation about="www.indianapolis.com/">
6624—        <Label name="_cse_heu_1oztoew"/>
6622—    </Annotation>
6626—    <Annotation about="indianapolis.citysearch.com/profile/3932254/noblesville_in/tom_james_realty.html">
6630—        <Label name="negative_boost"/>
6628—    </Annotation>
6632—    <Annotation about="www.colts.org/">
6636—        <Label name="boost_high"/>
6634—    </Annotation>
6638—    <Annotation about="indianapolis.diningguide.com/">
6642—        <Label name="boost_low"/>
6640—    </Annotation>
6644— </Annotations>
</GoogleCustomizations> —6646
```

Quick Links Evaluation Criteria

April 17, 2008

The team behind Quick Links welcomes suggestions for new sites to add. Because of the action-oriented nature of Quick Links, which are meant to speed up search time and produce accurate answers, we must be very discerning in what we add.

Here are some of the criteria we use to evaluate sites for inclusion:

1. Expert-produced content
2. Original content
3. Current / relevant content
4. Non-invasive advertising
5. Public accessibility
6. Good internal search capability
7. Access to "related" or additional content
8. Ability to handle follow-up questions
9. Consistent location (permalinks)

1. Expert-produced Content
Web sites recommended by Search U. will have content that is produced, edited or vetted by experts in the respective field. The preference is for professionally edited content, such as that from newspapers, magazines, and encyclopedias, as well as websites operated by governments, universities or other educational institutions. The above is no guarantee of factual, authoritative information, but these types of sites are more likely to contain content that is the product and responsibility of information professionals.

Notes:
Many websites, including those operated by news organizations, contain areas where user-generated content is displayed. Examples of this are reader comments and wiki articles. Care must be taken to discern whether a given piece of information is expert-produced or user-generated.

Not all user-generated content is wrong. Some is of very high quality, including many pages on Wikipedia, blogs, and bulletin boards. But the lack of professional editorial oversight makes them unreliable as Quick Links. Please defer to the original sources of such information whenever possible.

2. Original Content
Search U. strongly recommends finding and using the original source of a piece of information whenever possible. Many websites license, borrow, steal, or re-create content (whether legally or illegally) from the original creators. Locating and using the original source of information almost always provides the best experience. In addition to "giving credit where credit is due," it also guards against any editing, abridging or rewording that may alter the information's original meaning or intention.

Notes:
Presentation does matter when considering which web resources to recommend as Quick Links, and occasions will arise where an aggregator site (i.e. not the original source) will present information in a more user-friendly way. In these situations, as long as the integrity of information is maintained, feel free to recommend the more user-friendly site.

Sites that are essentially collections of links to other sites are not particularly valuable to Guides in answering queries, and are generally not recommended as Quick Links.

3. Current/Relevant Content
All information has a shelf-life. Some facts hold true for years, decades, centuries, or longer. But many are less permanent, and great care must be taken to find timely and relevant resources to support answers. Consider the following questions:

What was the first NFL team to have a perfect record?
How many NFL teams have had perfect records?

Both questions deal with the same basic information. But the first question involves a fact that won't change, whereas the second question involves additional facts that may change over time. Some websites present the answer to question 1 (the 1972 Miami Dolphins) but are not actively updated so won't remain correct as other teams are added to the perfect-record list (the 2007 New England Patriots came very close).

4. Non-invasive Advertising
As mentioned above, a web resource's usability is an important consideration for inclusion in Quick Links. A key factor in usability is how advertising is presented. The amount, size, style, and positioning of advertising all affect the readability of a web page. We recommend against using websites with invasive advertising, such as:
pop-up or pop-under ads
interstitial ads
video ads that automatically play sound
ads that are deceptively integrated into content The appearance of such ads should not be an immediate disqualifier, but it should serve as a caution. Unfortunately, many reputable newspaper and magazine sites rely on pop-up and interstitial ads, making a trade-off necessary.

5. Public accessibility
Because ChaCha sends customers a link to Guides' source websites, Search U. recommends using sites that don't require user accounts or passwords for access. Unfortunately, this excludes some excellent newspaper sites which require registration to view most or all of their content.

In some cases, content that is password-protected in one location may be available freely elsewhere, including in the Google cache; using the free content link is encouraged.

6. Good internal search capability
Another criteria to look for when selecting Quick Links is relevant, usable internal search capability.

7. Access to "related" or additional content.
Website and pages that contain sidebars of additional information, or direct links to supporting material, are always welcome. The inclusion of such information is often done by Expert-produced sites, which is another reason to use them. The most highly recommended are those sites which provide well-written summaries of information, and include links to the primary source materials.

For example: Many news sites carry AP wire stories, but some news sites will include related content and/or links along with the wire story, such as to a court affidavit or scientific paper. Such "value add" sites are preferred as Quick Links for their ability to give Guides more context for their answers, as well as to handle any follow-up questions from the customer.

8. Ability to handle follow-up questions.
As just mentioned, having sufficient content or links to handle follow-up questions from a customer is a desirable feature of a website. Quick Links sites should have supporting material that goes deeper than a 160-character answer.

For example: Consider a query for "Who said [a famous quotation]?" Many pages exist on the Web that list famous quotes out of context. Search U. recommends using a site that gives additional detail beyond the quote and who said it, such as the date and original source of the quote. That way, if the customer follows up by saying "When did she say this?", the answer is already available.

9. Consistent location (permalinks)
The structure of some websites means that content available at a given URL one day may be gone the next. Or, with some dynamically generated sites like web-based maps, the page URL can't be saved in a usable way. Whenever possible, cite a source webpage whose URL will remain constant.

Notes:
When evaluating a site for Quick Links potential, see if the URL will generate the correct page if plugged into a different browser.

Also, when content is displayed on a site as a multiple-page article, look to see if a "printer-friendly" or "full page" option is available, which would be the preferred page to cite.

FIG. 70D

METHOD AND SYSTEM FOR IMPROVEMENT OF REQUEST PROCESSING

CROSS-REFERENCE TO RELATED APPLICATIONS

This application is related to and claims the benefit of U.S. patent application Ser. No. 12/275,864, inventor Scott A. Jones, et al., titled "METHOD AND SYSTEM FOR IMPROVING UTILIZATION OF HUMAN SEARCHERS", filed Nov. 21, 2008; and, U.S. patent application Ser. No. 11/819,719, inventor Scott A. Jones, et al., titled "METHOD AND SYSTEM FOR ACCESSING SEARCH SERVICES VIA MESSAGING SERVICES (SEARCH ASSISTED CHAT)", filed Jun. 27, 2007; and, U.S. patent application Ser. No. 11/774,852, inventor Scott A. Jones, et al., titled "METHOD AND SYSTEM FOR SHARING AND ACCESSING RESOURCES", filed Jul. 9, 2007; and, U.S. patent application Ser. No. 11/835,016, inventor Scott A. Jones, et al., titled, "ELECTRONIC PREVIOUS SEARCH RESULTS LOG", filed Aug. 7, 2007. In addition, this application is related to and claims the benefit of U.S. Provisional Application Ser. No. 61/049,597, inventor Scott A. Jones, et al., titled "METHOD AND SYSTEM FOR FORMULATING A SEARCH QUERY", filed May 1, 2008; U.S. Provisional Application Ser. No. 61/050,785, inventor Scott A. Jones, et al., titled "METHOD AND SYSTEM FOR IMPROVEMENT OF RESOURCE UTILIZATION", filed May 6, 2008, and U.S. Provisional Application Ser. No. 61/053,885, inventor Scott A. Jones, et al., titled "METHOD AND SYSTEM FOR SHARING RESOURCES", filed May 16, 2008, the contents of which are incorporated herein by reference.

BACKGROUND

1. Field of the Invention

The present invention is related to search system(s) including human-assisted search system(s), and more specifically related to assisting with search system operation(s) including improving utilization of resource(s) employed by a human assisted search system. A system and method whereby information conversion may be optimized utilizing a human assistant are described.

2. Description of the Related Art

In general search systems are keyword driven systems. Keywords included in a request for information may be used in various ways to index items such as URL's, advertisements, etc. which may be provided to a user responsive to a request for information. In order to perform an information search based on other types of information such as a spoken request, an image, a natural language request, or a request which requires translation, it may be desirable to convert information received as part of a request from one form to another. Software and systems have been developed to convert speech to text, to extract information from an image, to convert natural language queries into a form which may be more amenable to an automated search, to translate from a source language to a target language, etc. Technologies created by companies such as TellMe®, Nuance™, and Vlingo™ have been deployed to convert spoken information into text. Image recognition systems from companies such as Eyealike™, Esker®, etc. have been deployed in order to search images to associate keywords and/or tags with the images. Audio recognition systems such as Gracenote's Mobile MusicID™ system have been deployed to compare audio recordings to a database of known recordings. These types of technologies have allowed automated conversion of information to find a large and growing marketplace. However, there are limitations associated with such systems. Without feedback, the systems and software are not able to progressively improve the system capability. In some instances, speaker dependent voice recognition has been found to be more effective than speaker independent voice recognition, but it may be burdensome for a user to provide feedback to the system. In particular, correction of errors may become annoying to a user, and may cause a low acceptance rate of the system by customers. There is no known system and method whereby a human assistant may be provided to improve utilization of a resource such as a recognition system, an interpretation system, a translation system, or other system which may benefit from information provided by a human assistant(s).

Many people would benefit from and appreciate automated systems for speech, image, music, and handwriting recognition, or speech synthesis, translation, etc. However, error rates of such systems may exceed a user tolerance level. Learning algorithms may reduce error rates over time, but a user may not tolerate the learning curve, or user dependent information may not be available to a resource performing a conversion process.

In light of this and other limitations, a scalable method and system for making a human assistant available to improve utilization of system resources would be greatly appreciated.

SUMMARY

A system is provided whereby a user may submit a request for information using any or all communication services available to the user and a request handling system. A request is analyzed to determine any type of processing which may be required to respond to the request. A number of categories are associated with the request which may identify processing associated with providing a response to the request. A number of resources associated with a category associated with a request are identified and may be provided with information of the request. A response from any or all of the resources may be received by a request processing system. If it is determined that a human assistant is required, the request processing system may select a number of human assistants responsive to a request. A human assistant may review results provided by any number of resources. Information of a review may be recorded. A response may be provided to a user based on information obtained from the resources and the human assistants. A human assistant may be selected based on a category, keyword, or other information associated with a query.

The disclosed invention includes a system and method including generating a response for a query from a user, transferring the response to be reviewed by a human searcher, and presenting the response to the user in accordance with the review.

These together with other aspects and advantages which will be subsequently apparent, reside in the details of construction and operation as more fully hereinafter described, reference being had to the accompanying drawings forming a part hereof, wherein like numerals refer to like parts throughout.

BRIEF DESCRIPTION OF THE DRAWINGS

Aspects and advantages of the disclosure will become apparent and more readily appreciated from the following description of the embodiments, taken in conjunction with the accompanying drawings, of which:

FIG. 5 illustrates a database record for a user request.

FIG. 10 illustrates a database record for a profile.

FIG. 11 illustrates a database record for a category.

FIG. 12 illustrates a database record for a result.

FIG. 14A is a diagram illustrating a database relationship associated with notification of reviewer(s).

FIG. 19 illustrates a GUI useable for selecting a location.

FIG. 20 illustrates a GUI useable for viewing information of a request.

FIG. 27 illustrates a database record for a request.

FIG. 28 illustrates a database record for a structured query.

FIG. 29 illustrates a database record for a result.

FIG. 30 illustrates a database record for a resource.

FIG. 31 illustrates a database record for an advertisement.

FIG. 38 illustrates a GUI for logging in.

FIG. 40 illustrates a GUI for selecting a location.

FIG. 41 illustrates a GUI for viewing information of a request.

FIG. 47 illustrates a category selection GUI.

FIG. 53 illustrates a database record for a category.

FIG. 56 illustrates a database record for a request.

FIG. 57 illustrates a database record for a guide.

FIG. 58 illustrates a database record for a user.

FIG. 59 illustrates a database record for a profile.

FIG. 60 illustrates a database record for a result.

FIG. 61 illustrates a database record for a resource.

FIG. 62 illustrates a database record for an advertisement.

FIG. 63 illustrates a database record for a search session.

FIG. 65 illustrates exemplary HTML for a custom search engine (CSE).

FIG. 66 illustrates exemplary HTML for a CSE.

FIGS. 70A, 70B, 7C and 70D depict selection criteria for items which may be associated with a category.

DETAILED DESCRIPTION OF THE PREFERRED EMBODIMENTS

Figure 1:
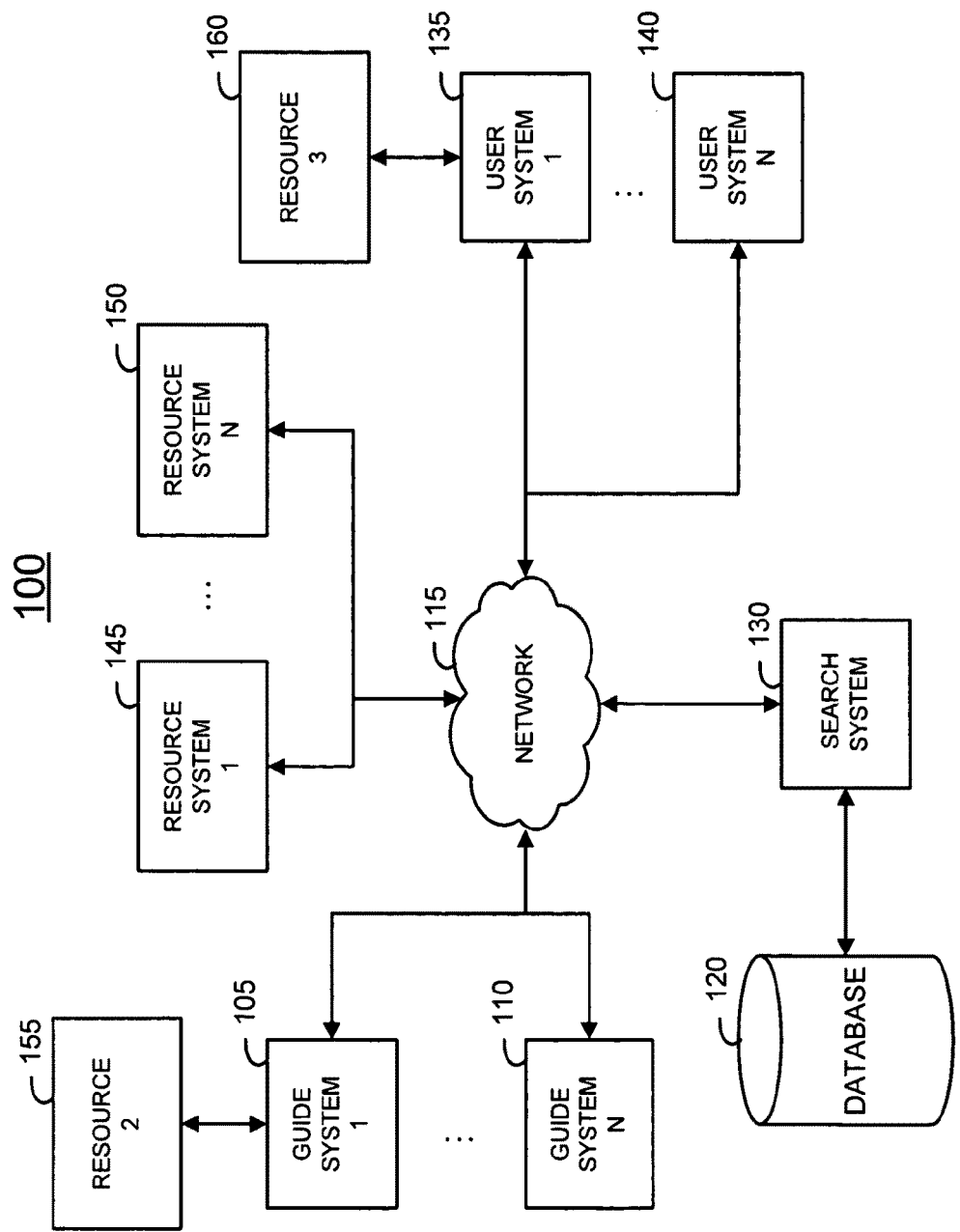
FIG. 1 is a block diagram of an exemplary system embodiment.

Reference will now be made in detail to the present embodiments discussed herein, examples of which are illustrated in the accompanying drawings, wherein like reference numerals refer to the like elements throughout. The embodiments are described below to explain the disclosed system and method by referring to the figures. It will nevertheless be understood that no limitation of the scope is thereby intended, such alterations and further modifications in the illustrated device, and such further applications of the principles as illustrated therein being contemplated as would normally occur to one skilled in the art to which the embodiments relate. As used herein words importing the singular shall include the plural and vice versa unless specifically counter indicated.

A method and system are disclosed to improve operation(s) of a search system including utilization of system resource(s) by providing a human assistant to respond to a request. A user may submit a request which may require a process(es) and/or operation(s) to be performed. For example, a user might submit a spoken request which is to be converted to a text query, the text may be converted from a natural language query to a structured query which is amenable to automated processing or indexing, which may produce a search result, which may be converted from a text message to an audio file, which may be presented to the user. A request processing system may be able to receive information in various formats using various communication services. A request received by the request processing system may require conversion of elements of a request from one form to another in order that a response may be provided to a user. Human assistants also called "guides" or "searchers" may be associated with a request processing system and may perform various tasks.

Various sources of information and/or processing facilities or "resources" may be available to the request processing system If a request is received, a unique identifier is associated with the request and a user submitting the request. A determination is made as to whether a resource(s) may be utilized to respond to a request. If a resource is identified which may perform a process associated with a request, information required to perform the process may be provided to the resource. A human assistant may review result(s) provided by a resource(s) and/or may perform a process before, in parallel with and/or after a resource performs the process. Information may be provided to a resource based on a review by a human assistant, which may improve future performance of a task. A resource(s) may be rated based at least in part on a result(s) provided by the resource and/or information provided by a human assistant. Any number of human assistants may be provided and/or utilized based on information associated with a request. By selectively providing a human assistant(s), and continuously evaluating the performance of a resource(s), utilization of resources by the system may be improved.

A system is provided which allows a user or InfoSeeker™ who may be any person or entity to submit a request to a "search service" or request processing system and receive a response or "search result" or "result". A system is implemented which may establish communication between a user, a guide, a resource, and/or a search system allows requests to be processed. A database comprising information regarding a number of users, guides, resources, requests advertisements, categories, keywords, tags, profiles, etc. is provided.

A request submitted by a user may receive a response which is produced automatically and/or utilizing assistance of a number of guides. In at least one embodiment, a request submitted by a user is compared to a database in order to determine if a matching request exists in the database. If a matching request is found, a result(s) associated with the matching request(s) may be presented to a user(s) responsive to a request(s).

A user request(s) may require various types of processing to be performed. A user request might include information which requires conversion from one form to another, and/or be processed in order that a response may be provided to the user. For example, a user request might be submitted as a spoken query in a natural language, which might require audio information to be converted to text information, might require natural language text to be converted to a structured query, and might require a search result(s) obtained in text form to be converted to audible speech. A user request may require any number and/or types of processing.

Various types of resources may be made available to perform information processing. A resource may be a completely automated system which receives information in a prescribed format, and returns a result in a prescribed format. For example, a web service, or an Application Program Interface (API), or other interface for exchanging information may be defined which does not include a human assistant and/or may employ the assistance of a human in order to produce a result. A human assistant may be provided by a search system in order to review, correct a result(s) produced by a resource, etc. Review results provided by a human assistant may be provided to a resource(s). Review result(s) may be associated with a user(s), a guide(s), a resource(s), a profile(s), a location(s), and/or other information associated with a user(s) and/or a guide(s) individually, and/or in aggregate.

A resource(s) may be rated and/or ranked based at least in part on information provided by a human assistant(s). A result(s) associated with a resource may be presented to a human assistant, and/or a human assistant may provide a result which is compared to a result provided by a resource(s) automatically and/or utilizing a human assistant(s). Methods and systems for optimizing the performance of a resource(s) and for providing a human assistant(s) are described further herein. The human assistant(s) may improve usability of the system, and resource(s) available to the system. Further, information of a resource(s), a request(s), a user(s), and/or a guide(s) may be provided to third parties for purposes such as targeting information such as services, advertising and/or other content, and/or for recruitment, compensation, etc.

A "user" is any person or entity which may submit a request or search request. A "request" or "search request" or "query" is any request for information which may be originated by a person and/or a device or system. A user may be referred to as a "requester", information seeker or InfoSeeker™.

A "guide" is any person who may be compensated and/or may be a volunteer who may respond to and/or assist with a request. An "ambassador" is a guide who may perform processing of a request and/or a search result(s). A "searcher" is a guide who may perform an information search responsive to a request. A "transcriber" who may also be a guide may convert a spoken portion of a request into text, and/or may otherwise convert information of a request from one form to another. A guide may be referred to as a "human assistant" or "human searcher" or "searcher". A guide may perform any type of task. Any guide may act in any defined guide role. However, a human assistant who performs a task and a guide who conducts a search may not necessarily be the same. For example, a human assistant may perform a task to facilitate a search which is conducted by another person who is registered as a guide.

An "identifier" or ID may include character(s), number(s) and/or other type(s) of information which may be used to identify an item including item(s) of a database. Items may include but are not limited to a guide(s), a user(s), a resource(s), an advertisement(s), a keyword(s), a category(ies), a search result(s), a search request(s), a query(ies), a rating(s), ranking(s), a message(s) and/or a profile(s).

A "guided request" is a request which uses the assistance of one or more guides.

A "result" or "search result" or "answer" is any information which may be provided responsive to a request. A result includes, but is not limited to, any of an advertisement(s), a link to a web page, a message of any sort, image, audio, text, games, interactive media and/or software of any sort.

A "search resource" or "resource" is any source of information which may be used to obtain a search result. A search resource includes automated and/or human-assisted systems, any repository of information, and any type of media and/or systems which may provide information. A resource may be a provider or source of item(s) and/or service(s). For example, a resource might provide an item such as a ringtone, a media file (e.g., audio, video, images, games, etc.), information such as news, lyrics, song titles, translations or any other type of information. A resource may be automated, and/or may utilize the assistance of a person(s).

A "profile" is one or more characteristics which may be associated with a person. Profile characteristics include but are not limited to demographic, geographic, personality, affiliations, areas of interest, historical actions, preferences, memberships, associations, etc., or any other data association with a user.

An "advertisement" is any information which may be delivered to a user including to promote a provider, a product, a service, etc. An advertisement may include text, audio, video, images, printed materials, interactive media such as a game, or other forms of media which may be provided to a user device.

A "category" or "taxonomy branch" or "categorization" is a unique node within an index which may be associated with any number of items. If a query is associated with a category, items associated with the category may be more likely to be selected responsive to the query.

A "path term" is a word or phrase which may be used to define a category in an index. A "path root term" is a top-level node within a taxonomy. A "proper path" is a sequence of path terms which defines a category which begins with a path root term. A "path snippet" is a sequence of path terms which does not begin with a path root term. A "guide topic" or "interest" is a word or phrase which may be associated with a category which may be used at least in part to associate an item such as a query with a category.

The terms voice and speech are used interchangeably herein. A user, a resource, and/or a guide may establish a communication session using a voice service, a messaging service such as Short Messaging Service (SMS), Enhanced Messaging Service (EMS), Multi-media Messaging Service (MMS), Instant Messaging (IM), email, an internet portal or web page, a web service, an API, regular mail or any other type of communication. A connection may be established using any device which is capable of utilizing a communication service. For example, a wireless device such as a cell phone, PDA, smart phone, etc. might be used to establish a communication session using voice, SMS, IM, email and/or internet protocols. A desktop, laptop or server system might be used to establish a communication session. A landline phone, a specialized communication terminal, or any other communication device might be used to establish a communication session.

Communication between a guide, a user, a resource and/or a search system may include conversion of text to speech and speech to text. Any type of media which can be sent or received using a communication system may be part of a communication session. A communication session may be conducted using any or all communication service(s) associated with a user, a resource and/or a guide.

An advertisement may be transmitted including during any or all communication sessions between a user, a guide, a resource, and/or a search system. A resource, a guide, and/or an advertisement may be rated. Rating information may be obtained from a user, a guide(s), a resource(s), and/or a search system. Rating information may be used to select a resource(s), a guide(s), an advertisement(s) and/or any item(s) based on information associated with an item indicated in a database. The search service may be compensated by advertising revenue, and/or by payments from a user(s) and/or a guide(s).

As illustrated in FIG. 1, the system 100 includes the guide systems 105, 110, a network 115 such as the Internet, a search system 130, the user systems 135, 140, a database 120, which may comprise various records, and the resources systems 145, 150, 155, and 160.

While only a limited number of systems associated with a guide, resource, user, and a search system are depicted in FIG. 1, it is within the scope of the disclosure for multiple systems for guide, resource, user, information seeker and search systems to be utilized.

Any user system (e.g., the user systems 135, 140) can be operated by an information seeker or user, who may be a person or entity, to submit a request(s) and/or receive a search result(s) and/or other information. Any guide system (e.g., the guide systems 105, 110) can be operated by a guide to obtain a search result for an information seeker located at a user system (e.g., the user systems 135, 140). Any resource system (e.g., the resource systems 145, 150) may be operated by a human provider of information and/or may be an automated system which may provide a result(s) and/or other information to a guide and/or a user. A resource may be a system such as a search engine, a database, a system which may perform tasks such as image recognition, voice recognition, translation, transcription, or other forms of information processing, a local information source of a guide system such as a disk drive, built-in or removable memory, an application and/or database accessible from a user system(s), and/or a guide system, etc. A resource may not be accessible using the network 115. For example, a resource such as the resource 155 may be accessible to a guide operating a guide system such as the guide system 105, or a resource such as the resource 160 may be accessible to a user operating a user system such as the user system 135. A resource might include printed materials, images, video, and/or audio information, a software application(s), any information accessible to a guide(s), and/or a user(s), a database(s), and/or any combination thereof.

The network 115 (FIG. 1) may be a global public network of networks (the Internet) and/or consist in whole or in part of one or more private networks and communicatively couples the guide systems 105, 110, the resource systems 145, 150 and the user systems 135, 140 with the other components of the system such as the search system 130, and the database 120. The network 115 may include one or more wireless networks which may enable wireless communication between the various elements of the system 100. For example, a mobile phone carrier network might be used to connect a user device to the search system 130.

The search system 130 allows interaction to occur among the guide systems 105, 110, the resource systems 145, 150 and the user systems 135, 140. For example, an information search query(ies) can be transmitted from the user systems 135, 140 to the search system 130, where a search query(ies) can be accessed by the guide systems 105, 110 and/or the resource systems 145, 150. Similarly, a result(s) produced from the resource systems 145, 150 including results produced using the guide systems 105, 110 in response to a search query(ies) submitted by the user systems 135, 140 may be transmitted to the search system 130, where it may be stored by the search system 130 and/or may be transmitted to the user systems 135, 140.

The search system 130 is communicatively coupled with the database 120. As will be described herein in further detail below, the database 120 includes data that is processed in association with operation of the embodiments. Although FIG. 1 illustrates the database 120 as a separate component of the system, the database 120 may be integrated with the search system 130. Further, the records maintained in the database 120 may be stored in any typical manner, including in a Network Attached Storage (NAS), a Storage Area Network (SAN), etc. using any typical or proprietary database software such as DB2®, Informix®, Microsoft® SQLServer™, MySQL®, Oracle®, etc., and may also be a distributed database on more than one server. Elements of the database 120 may reside in any suitable elements of the system 100.

The user systems 135, 140, the guide systems 105, 110, the search system 130 and the resource systems 145, 150 may include equipment, software, systems and personnel required to send and/or receive messages between a user system, a guide system, a resource system and/or the search system using the network 115. The database 120 includes information which may allow the search system 130 to establish communication between the other elements of the system 100.

A user system, a guide system, and/or a resource may be a desktop or mobile PC or Mac®, a mobile phone, a smart phone, a PDA, a server system, a landline phone, a specialized communication terminal, a terminal connected to a mainframe, or any other communication device and/or system. The search system 130 may include one or more servers, computers, etc. For example, servers such as the PowerEdge® 2900 by Dell, or the BladeCenterJS22 by IBM, or equivalent systems might be used to implement elements of the search system 130. The search system 130 may utilize an operating system (OS) such as Microsoft Windows XP, or Linux, etc. Voice routing and packet switching may be accomplished using well established technologies such as those provided by Cisco®, or other networking companies. After being presented with the disclosure herein, one of ordinary skill in the relevant art will immediately realize that any viable computer systems and/or communication devices known in the art may be used as user systems, guide systems, resources, and/or to implement the search system 130.

A guide may be required to register with the search system 130. As part of a registration process, at least one communication method is associated with a guide. In at least one embodiment, a guide may register with the search system 130 and establish a username and password which are associated with the guide. A guide may login to the search system 130 using a web browser functionality of the guide system 105 in order to communicate with the search system 130. Multiple communication services may be associated with a guide and may allow a communication session to be established between a guide system such as the guide system 105 and a user system, a resource system and/or the search system 130. Multiple identifiers of a guide may be associated with each other. Information such as IM credential(s), an email address(es), a phone number(s), a URL, a username, etc. of a guide may be identified which may allow the search system 130 to establish a communication session between a guide system and a user system, a resource system, and/or the search system 130.

When a guide registers with the search system 130 the guide may be associated with one or more keywords, categories, and/or other information. For example a keyword(s) and/or category(ies) may be selected by a guide, or may be associated with a guide based on a test(s) administered to a guide and/or other information provided during and/or after a registration process. Information associated with a guide may be stored in the database 120 and may be used for purposes such as matching a guide to a request, determining and/or providing compensation for a guide, communicating with a guide, etc. as will be described further herein below.

A user may be identified by the search system 130. When a user system such as the user system 135 establishes a communication session with the search system 130, an identifier of a user system is determined. An identifier of a user system may be associated with other information regarding a user. A user system may be identified using an email address, a telephone number, an IM credential, a username, and/or any other identifier which may be used to associate information with a user. Multiple identifiers of a user may be associated with each other. Using information of communication services associated with a user, a communication session may be established between a user system such as the user system 135 and a guide system, a resource system and/or the search system 130. Information such as a keyword(s), a category(ies), a user profile(s), a previous search request(s), a search result(s), etc. may be associated with a user. Information of a user may be stored in the database 120.

A resource, which may be a person(s), an entity(ies), a search engine, a database, a software application, a corpus of one or more types of media such as text or printed information, images, audio, video, etc. or a combination thereof, may be identified by the search system 130. Information of at least one method of communication is associated with a resource system which allows a communication session to be established between the search system 130, a user system and/or a guide system and a resource system such as the resource systems 145, 150. An identifier of a resource system may be associated with other information regarding a resource. A resource system may be identified using an email address, a telephone number, an IM credential, a resource username, a URL or other persistent identifier which may be used to associate information with a resource. Multiple identifiers of a resource may be associated with each other. Using the information of communication services associated with a resource, a communication session may be established between a resource system such as the resource system 145 and a user system, a guide system, and/or the search system 130. Information such as a keyword(s), a category(ies), a profile(s), and/or other information may be associated with a resource. Information of a resource may be stored in the database 120.

A resource such as the resources 155, 160 and/or resources accessible via the resource systems 145, 150 may include any system(s), software, hardware, personnel and/or other facility(ies) which may provide information to a guide(s), a user(s), and/or the search system 130. A resource may be freely accessible to any user(s) and/or guide(s) and/or may be available on a restricted basis. The resource system(s) 145, 150 may include resource(s) which are available on an unrestricted and/or restricted basis. A resource may not be accessible using the network 115, but may be accessible to a guide(s) and/or a user(s). For example, a resource such as the resource 155 may be accessible to one or more guide(s) operating a guide system(s) such as the guide system 105 using any type of communication. For example, a guide(s) may obtain information of an event(s) such as traffic conditions which may be observed by the guide to provide a search result(s). Information in any form, such as printed media, audio and/or visual information, software, hardware, etc. which may be accessible to a guide(s), a user(s) and/or an operator(s) of a resource system(s) may be a resource. Similarly, a resource such as the resource 160 may be accessible to a user of the user system 135. For example, the resource 160 may be a software application(s) and/or database which may in whole or in part be accessible by the user system 135.

The search system 130 may establish a communication session between any user system(s), guide system(s), or resource system(s) using information indicated in the database 120. For example, the user system 135 may establish a voice communication session with the search system 130, the search system 130 may establish a voice communication session between the user system 135 and the guide system 105, and the search system 130 may establish a voice communication session between the user system 135 and the resource system 145. While a voice communication session is used in this example, any type of communication session using one or more services such as SMS, EMS, MMS, email, IM, chat, web based communication, etc. may be established between any user system(s), guide system(s), and/or resource system(s) and/or the search system 130.

Information associated with a user(s), a guide(s) and/or a resource(s) may be obtained in various ways. For example, a registration process may be performed using a web form(s) provided by the search system 130, information may be obtained from an external database, and/or information may be obtained based on analysis of information indicated by a user(s), a guide(s), and/or a resource(s). A 'profile' is one or more characteristics which may be associated with one or more individuals. A profile may include geographic data such as a street address, latitude and longitude, etc., may include demographic information such as age, gender, race, income, family size, political affiliations, etc., personality information such as results of psychometric testing, subjective evaluations of an individual, etc., affiliation information such as employment, club, activity, societal membership information, information of a device(s), service(s), transaction(s) or any other information which might be associated with a user(s) and/or a guide(s).

Figure 2:
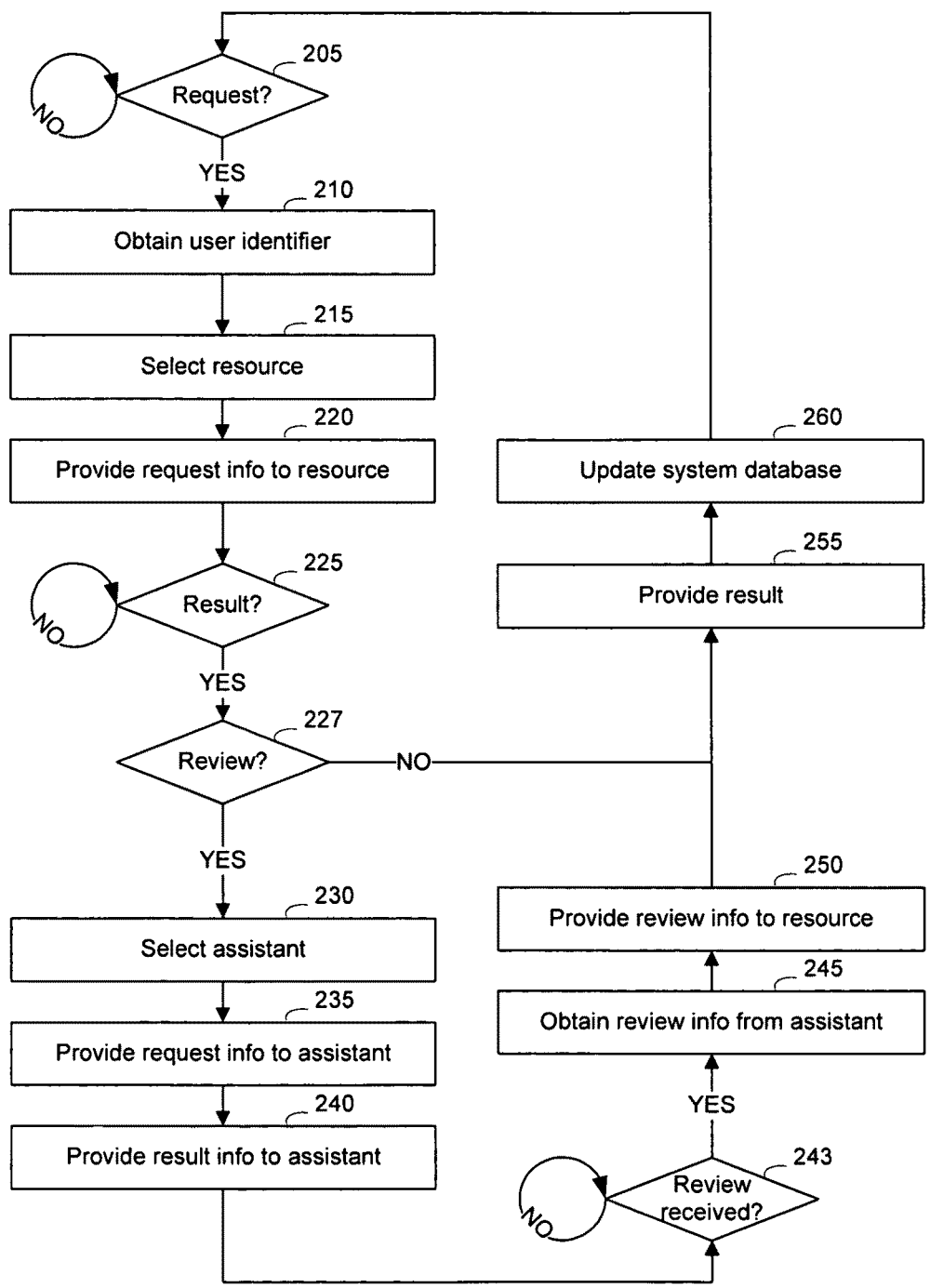
FIG. 2 is a flowchart of a process of handling a request by a system server perspective.

As illustrated in FIG. 2, a process 200 for processing a request by the search system 130 (FIG. 1) is provided. The process 200 may be operative for example on a server system (not shown) associated with the search system 130.

In operation 205 (FIG. 2) a determination is made as to whether a request is received. If it is determined in operation 205 that a request is not received control remains at operation 205 and process 200 continues. If it is determined in operation 205 that a request is received, control is passed to operation 210 and process 200 continues.

The determination in operation 205 may be made based on various criteria. It may be determined that a request is received based on receiving a message at any device(s) associated with the system 100 (FIG. 1). For example, a voice message might be received at telephone number, an SMS message might be received, an IM might be received, an email might be received, a web request might be received, and/or a message using any services associated with the search system 130 might be used to determine that a request has been received. A request may be received through an API or an Application Binary Interface (ABI).

In operation 210 an identifier of a user associated with a request is obtained. A user identifier may be any identifier of a user such as an IP address, or a persistent 'cookie'. In a preferred embodiment, an identifier of a user is uniquely associated with the user. Multiple identifiers of a user may be associated with each other, which may allow a user to access information provided by the system 100 (FIG. 1) from any device(s) which may provide an identifier of the user. The association of multiple identifiers of a user with each other may allow requests from multiple user devices to be associated with the user. In at least one embodiment, a mobile phone number associated with a user is an identifier of the user. In at least one embodiment, an identifier of a user is obtained by generating an identifier based on any information associated with the user if a user identifier is not available of provided. Control is passed to operation 215 and process 200 continues.

In operation 215 a resource is selected to respond to a request. A preferred process for selecting a resource(s) to respond to a request is described further herein below with respect to FIG. 13. An alternate process for selecting a resource responsive to a request is described in the related U.S. patent application Ser. No. 11/774,852 previously mentioned. In at least one embodiment a resource may selected based on a preferred resource identified by a user(s). A resource(s) may be selected based on a type of media and/or content indicated in a request. Control is passed to operation 220 and process 200 continues.

In operation 220, information associated with a request is provided to a resource(s). In at least one embodiment, audio information of a user request is provided to a speech to text conversion resource. In at least one embodiment, an image associated with a request is provided to an image recognition resource. In at least one embodiment, audio information associated with a request is provided to a music recognition resource. Information of a user associated with a request may be provided to a resource, which may be used to modify a response from the resource. For example, an identifier of a user may be provided to a speech to text conversion resource which may cause the resource to use a speaker dependent algorithm which may include historical information associated with the user. Information of a request may be provided to multiple resources. For example, information of an audio clip might be provided to two music recognition resources for verification purposes, or a text query to be categorized might be provided to two taxonomy resources. Information of a request may be provided to a resource using any or all communication services associated with a resource. For example, an image might be provided via an MMS message while audio information is provided using a voice channel. Control is passed to operation 225 and process 200 continues.

In operation 225 a determination is made as to whether a result is received in association with the information provided. If it is determined in operation 225 that a result is not received control remains at operation 225 and process 200 continues. If it is determined in operation 225 that a result is received, control is passed to operation 227 and process 200 continues.

The determination in operation 225 may be made based on various criteria. For example, if a message is received from a resource, it may be determined that a result is received. Alternately, if a message is not received from a resource within a time period after the request information is provided in operation 220, it may be determined that a result is received. For example, in some instances, a resource may be unable to provide a result(s) such as if the resource is unavailable due to overloading, or is unable to respond to a request(s) for any reason(s), in which case, the search system 130 (FIG. 1) or other elements of the system 100 may determine that a response is received which is a null response and/or a default response which has been defined for a number of cases wherein a message(s) and/or other response(s) from a resource are not received.

In operation 227 a determination is made as to whether a human-assisted review is required. If it is determined in operation 227 that a human-assisted review is not required control is passed to operation 255 and process 200 continues. If it is determined in operation 227 that a human-assisted review is required, control is passed to operation 230 and process 200 continues.

The determination in operation 227 may be made based on various criteria. For example, if a probability of an error computed by a resource in processing information is greater than a predetermined value, it may be determined that a human-assisted review is required. Alternately, a percentage of requests associated with a resource(s) and/or a user(s) may require a human-assisted review, or if a result provided by a first automated resource did not agree or match with a result provided by a second automated resource, it might be determined that a human-assisted review is required. In at least one embodiment, it may be determined that a human-assisted review is required based on historical information associated with a request, such as a number of requests associated with a user and/or information of a resource(s) may be used to determine if a human-assisted review is required. Any suitable criteria including related to providing relevant and/or applicable result(s) may be applied to determine whether a human-assisted review may be required.

In operation 230, an assistant(s) is selected to respond to a request. A preferred process for selecting an assistant(s) to respond to a request is described further herein with respect to FIG. 13. An alternate process for selecting an assistant or guide responsive to a request is described in the related U.S. patent application Ser. No. 11/774,852 previously mentioned. In at least one embodiment a guide be may selected based on a preferred resource identified by a user(s). A guide(s) may be selected based at least in part on rating information associated with a guide, a resource(s), a user(s) and/or using various factor(s) including expertise regarding subject matter of a request, etc. Control is passed to operation 235 and process 200 continues.

In operation 235 information of a request is provided to a human assistant(s). For example, an audio recording of information to be converted from speech to text, or an image which is to be converted to text, described, or tagged, or a recording of a song which is to be recognized, text which is to be converted to speech, and/or other information associated with a request is provided to a human assistant(s) selected in operation 230. Any information of a request may be provided to a human assistant(s). Control is passed to operation 240 and process 200 continues.

In operation 240 information of a result(s) is provided to a human assistant(s). For example, text, a translation of text and/or audio, an audio clip, an image, and/or any other information of a result(s) associated with a request may be provided to a human assistant(s) selected in operation 230. In at least one embodiment, a result(s) from more than one resource(s) may be provided to a human assistant(s). A human assistant may refer to information of a request and/or a result in order to perform a review of a result(s). A human assistant may obtain additional information in order to review a result(s). Control is passed to operation 243 and process 200 continues.

In operation 243 a determination is made as to whether review information is received. If it is determined in operation 243 that review information is not received control remains at operation 243 and process 200 continues. If it is determined in operation 243 that review information is received, control is passed to operation 245 and process 200 continues. The determination in operation 243 may be made based on various criteria. For example, actions of a guide(s) (assistant) and/or other person(s) such as activating elements of an interface, sending a message of any sort, etc. may be used to determine that review information is received. In at least one embodiment, if a time interval expires, it may be determined that review information is received.

In operation 245 review information is obtained. For example, a guide may indicate that a result is acceptable, may make corrections to a result, may indicate a preference for one or more result(s), etc. Review information is not limited to any particular type of information and may include any type of review and/or rating information obtained from a person. For example, in a case of more than one result being provided for review, a guide may provide a ranking(s) or rating(s) of the results based on relevancy of a result to the request, or may indicate good or bad, etc. Control is passed to operation 250 and process 200 continues.

In operation 250 review information is provided to a resource(s). Corrections to a result(s), a preference(s), and/or any other information associated with a result(s) and/or a guide(s) may be provided to a resource(s). For example, corrections to a transcription, a translation, or any other type of processing may be provided to a resource(s). Information of a users(s) and/or a guide(s) such as demographic, geographic, personality and/or other information associated with a user(s) and/or guide(s) may be provided to a resource(s). For example, if a guide rejects and/or modifies a result translation result produced by a resource, information of the demographics of the guide may be provided in order that the resource may modify its future results based on those conditions when associated with a user having similar demographic characteristics. Control is passed to operation 255 and process 200 continues.

In operation 255 a result is provided responsive to a request. A result(s) may be provided to a user(s) and/or may be recorded in the database 120 (FIG. 1). Rating information relating to a result(s) may be obtained from a user(s). Control is passed to operation 260 and process 200 continues.

In operation 260 the information of the process 200 is recorded. In at least one embodiment, the database 120 (FIG. 1) is updated. For example, information associated with a request, such as a resource(s), a guide(s), a user(s), and/or rating(s), ranking(s) and/or historical and/or usage information as further described herein associated with a resource(s), a user(s), and/or a guide(s) may be recorded and/or associated and information of the associations may be recorded in the database 120. Control is passed to operation 205 and process 200 continues.

The process 200 may be applied to any type of request. Some requests which are generally considered simple, such as conversion of text to speech, or speech to text may be processed without requiring human interaction. If a resource is unable to provide a result with high confidence, a guide may be provided when needed to improve the probability of a good result(s). Likewise, a request which is complex, or requires more subjective processing may be parsed into multiple "system requests" which are requests generated responsive to a user request. Some system requests may be processed automatically and some system requests may require the assistance of a guide. A response to a user request may be produced automatically and/or using a guide based on a result(s) produced responsive to a number of system requests. The decision criteria for operation 227 may be modified based on criteria such as system conditions and/or cost and/or quality considerations. A guide may act as a proxy for a user. For example, a guide may review a result in order to mitigate annoyance to the user due to the need to correct a result(s) produced by a resource.

Figure 3:
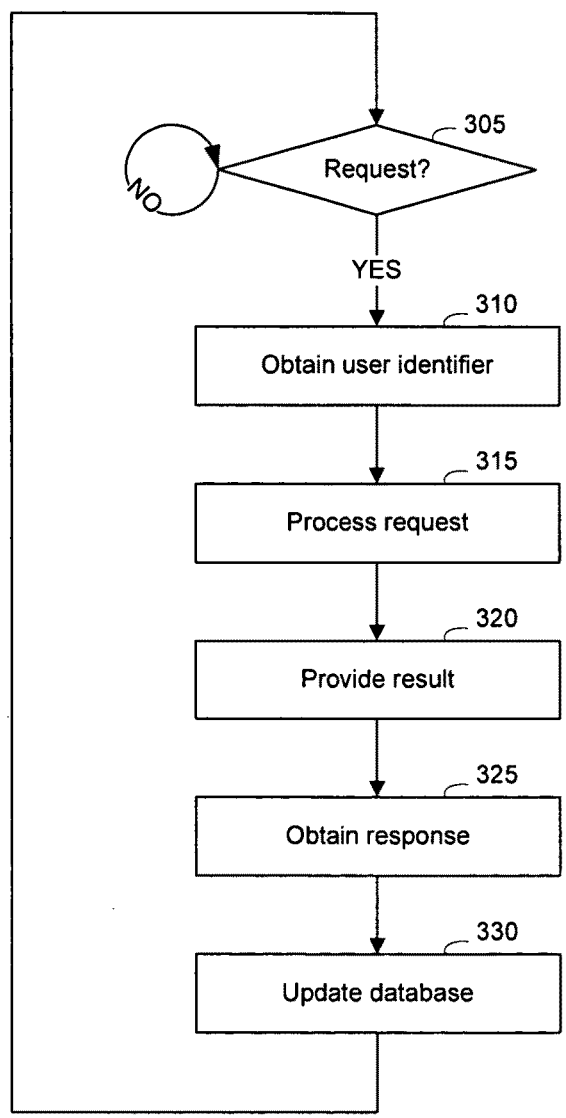
FIG. 3 is a flowchart of a process of handling a request by a resource system perspective.

As illustrated in FIG. 3, a process 300 for processing a request is provided. The process 300 may be operative for example on a system associated with the resource system 145 (FIG. 1).

In operation 305 (FIG. 3) a determination is made as to whether a request is received. If it is determined in operation 305 that a request is not received control remains at operation 305 and process 300 continues to wait. If it is determined in operation 305 that a request is received, control is passed to operation 310 and process 300 continues.

The determination in operation 305 may be made based on various criteria. It may be determined that a request is received based on receiving a message at any device(s) associated with a resource such as the resource system 145 (FIG. 1). For example, a voice message might be received including at a predetermined telephone number, an SMS message might be received, an IM might be received, an email might be received, a SOAP request might be received, and/or a message using any services associated with a resource system might be used to determine that a request has been received. A request may be received through an API provided in association with a resource system.

In operation 310 an identifier of a user associated with a request is obtained. A user identifier may be any identifier of a user such as an IP address, or a persistent 'cookie'. In at least one embodiment, a consistent identifier of a user is provided to the resource system by the search system 130. A user identifier may allow a resource to identify information associated with a user anonymously, and/or may identify a user independent of a source of information associated with the user. In at least one embodiment, a user identifier may not be required by a resource. In at least one embodiment, a user identifier may be provided by the search system 130, based on information indicated in the database 120 (FIG. 1). For example, if multiple services are associated with a user, the same identifier of the user may be provided to a resource regardless of the service that provided a request. Likewise, if a group of users share a relevant characteristic such as age, language, location, etc. an identifier which represents the group may be provided to a resource. In at least one embodiment, an identifier of a user is obtained by generating an identifier based on any information associated with the user if a user identifier is not available of provided. Control is passed to operation 315 and process 300 continues.

In operation 315 a process is performed responsive to a request received in operation 305. Any type of process(es) may be performed. For example, conversion of speech to text, conversion of text to speech, transcription of text or handwriting, translation, interpretation, recognition of media, classification of content, and/or conversion of any type of information, etc. may be performed. Control is passed to operation 320 and process 300 continues.

In operation 320, a result(s) is provided responsive to a request processed in operation 315. In at least one embodiment, text information resulting from processing of information associated with a request is provided. In at least one embodiment, image information resulting from processing of information associated with a request is provided. In at least one embodiment, audio information resulting from processing of information associated with a request is provided. Any type of information resulting from a process(es) may be provided in operation 320. Information of a result(s) may be provided using any or all communication services associated with a resource. Control is passed to operation 325 and process 300 continues.

In operation 325 a response is obtained by a resource system. Any information may be obtained responsive to a result(s) provided in operation 320. For example, rating information, corrections to and/or affirmation of information provided by the resource system, a rating(s) and/or other information may be obtained. In at least one embodiment, if no response is received via a communication system(s) and/or service(s) associated with a resource, that information may be recorded as a response. Any type of information may be included in a response. Control is passed to operation 330 and process 300 continues.

In operation 330 information of the process 300 is recorded. In at least one embodiment the database 120 (FIG. 1) is updated. For example, information associated with a request, such as a resource(s), a guide(s), a user(s), and/or rating(s), ranking(s) and/or historical and/or usage information as further described herein associated with a resource(s), a user(s), and/or a guide(s) may be recorded and/or associated and information of the associations may be recorded. As previously mentioned herein above, elements of the database 120 may be resident in any suitable systems within the system 100 and any storage comprised in whole or in part within a resource system, a user system and/or a guide system may be considered to be an element of the database 120. In at least one embodiment, information may be exchanged between a resource system(s), a guide system(s) and/or a user system(s) and the search system 130 which may be used to record information of the process 300. Control is passed to operation 305 and process 300 continues.

Figure 4:
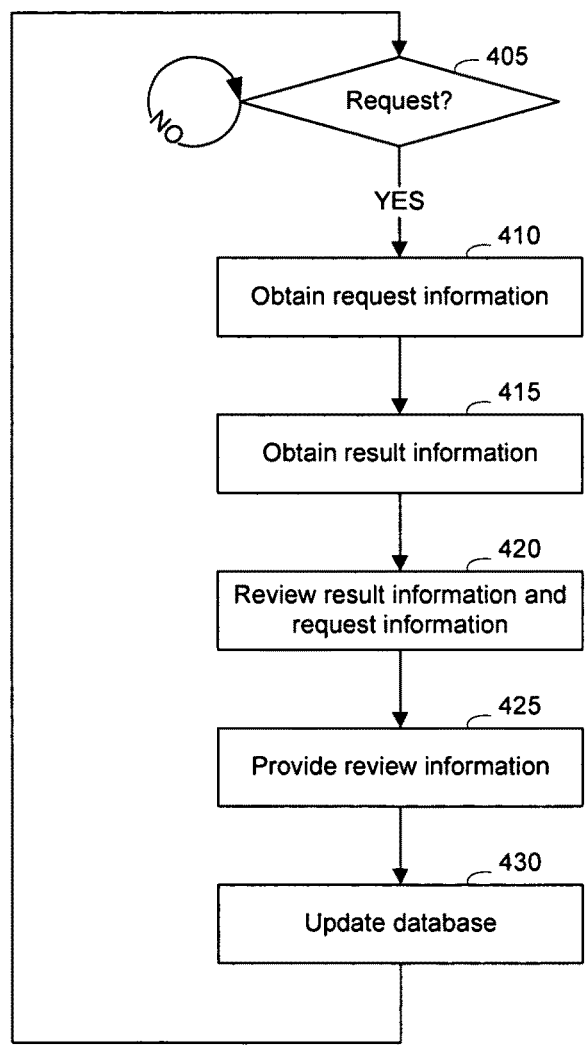
FIG. 4 is a flowchart of a process of handling a request by a guide system perspective.

As illustrated in FIG. 4, a process 400 for reviewing a result(s) is provided. The process 400 may be operative for example on a system associated with the guide system 105 (FIG. 1).

In operation 405 (FIG. 4) a determination is made as to whether a request is received. If it is determined in operation 405 that a request is not received control remains at operation 405 and process 400 continues. If it is determined in operation 405 that a request is received, control is passed to operation 410 and process 400 continues.

The determination in operation 405 may be made based on various criteria. It may be determined that a request is received based on receiving a message at any device(s) associated with a guide such as the guide system 105 (FIG. 1). For example, a voice message might be received, an SMS message might be received, an IM might be received, an email might be received, a web request might be received, and/or a message using any services associated with a guide might be used to determine that a request has been received. A request may be received through an API.

In operation 410, information associated with a request is obtained. Any type of information associated with a request may be obtained. For example, audio, text, video, images, media, information associated with a request(s) and/or a user(s) such as a profile, geographic, demographic, a transaction and/or query history, etc. may be obtained by a guide. In at least one embodiment, a user identifier may be obtained, and a user request history and/or transaction history may be obtained. In at least one embodiment, an audio recording of a spoken search request is obtained. In at least one embodiment, an image associated with a search request is obtained. In at least one embodiment, a recording of a song to be identified is obtained. In at least one embodiment, a natural language query which is to be transcribed is obtained. Information regarding one or more types of processing to be performed may be obtained. For example, an indication of translation, transcription, recognition, conversion and/or other processing to be performed may be provided. Control is passed to operation 415 and process 400 continues.

In operation 415 information of a result(s) associated with a request associated with information obtained in operation 410 is obtained. For example, text, audio, video, images, and/or any combination thereof which may be the result of processing a request associated with the information provided in operation 410 may be obtained by a guide. A result(s) provided by a number of resources associated with a request may be obtained by a guide. Control is passed to operation 420 and process 400 continues.

In operation 420, a review is performed regarding the information obtained in operation 410 and/or operation 415. In at least one embodiment, text information associated with an audio recording may be reviewed. In at least one embodiment, text information associated with an image may be reviewed. In at least one embodiment, audio information associated with text may be reviewed. In at least one embodiment, a translation of audio, and/or text may be reviewed. In at least one embodiment, a classification of an item may be reviewed. Any type of result(s) may be reviewed based on information of a request associated with the result(s). Information may be presented to a guide in any media. Control is passed to operation 425 and process 400 continues.

In operation 425 review information is provided by a guide. Review information may be provided using any or all communication service(s) and/or device(s) associated with a guide. Review information may include an opinion and/or rating of a result(s), corrections and/or additions to a result(s), etc. Any type of information may be provided as review information, such as audio, video, images, text, and/or any combination thereof. Control is passed to operation 430 and process 400 continues.

In operation 430 information of the process 400 is recorded. In at least one embodiment the database 120 (FIG. 1) is updated. For example, information associated with a request, such as a resource(s), a guide(s), a user(s), and/or rating(s), ranking(s) and/or historical and/or usage information as further described herein associated with a resource(s), a user(s), and/or a guide(s) may be recorded and/or associated and information of the associations may be recorded. As previously mentioned herein above, elements of the database 120 may be resident in any suitable systems within the system 100 and any storage comprised in whole or in part within a resource system, a user system and/or a guide system may be considered to be an element of the database 120. Control is passed to operation 405 and process 400 continues. In at least one embodiment, information may be exchanged between a resource system(s), a guide system(s) and/or a user system(s) and the search system 130 which may be used to record information of the process 400.

As illustrated in FIG. 5, an exemplary user request record 500 is provided, of which one or more may be associated with or resident in the database 120 (FIG. 1). The user request record 500 may include a user request ID field 505, a user request content field 510, a user request user ID field 515, a user request guide ID field 520, a user request category ID field 525, a user request profile ID field 530, a user request result ID field 535, a user request result rank field 540, a user request advertisement ID field 545, a user request advertisement rank field 550 and a user request system request field ID 555.

A user request record may be created responsive to various activities. For example, a guided search session, an interactive training session, a non-interactive training session, submission of a search request by a user, and/or other types of activity may cause a user request record to be created and/or modified. A request record may be imported from an external resource(s), a database, and/or any media accessible to the search system 130.

The user request ID field 505 preferably contains a unique identifier of a user request, which is preferably used consistently. For example, in at least one embodiment, the user request ID field 505 can include a randomly generated numerical code, and/or a text string indicating the content of a request. A user request ID serves to distinguish the user request record associated with a user request from a user request record associated with other user requests. Other unique identifiers of a user request may be utilized without departing from the spirit and scope of the embodiments.

A unique identifier may be assigned to a user request when it is received. A user request may include information that is not explicitly provided by a user. For example, location information, profile information, etc. may be associated with a request. As illustrated in FIG. 5, 'User request1' is the user request ID associated with the user request record 500 (FIG. 5).

The user request content field 510 may include information regarding content of a user request. For example, text associated with a query submitted by a user may be indicated in the user request content field 510. Content of the user request content field 510 may be processed in order to associate a keyword(s) and/or category(ies) and/or other information with a user request. In at least one embodiment, a structured query which conforms to a specific context may be indicated in the user request content field 510. User queries or requests which are associated with a structured query which may have been submitted by a number of users may be indicated in the user request content field 510. Information such as audio recordings, images, etc. which are associated with a user request may be indicated in the user request content field 510. Using the example illustrated in FIG. 5, the query 'What is the best Thai restaurant in Indy?.mp3' is the content associated with the user request record 500. This may indicate that the query 'What is the best Thai restaurant in Indy?.mp3' may be processed in order to respond to 'User request1'.

The user request user ID field 515 may include information of a user(s) that submitted a query. The user request user ID field 515 may be used to associate a user(s) with a query. Multiple users may submit a user request. A result(s) and/or other item(s) associated with a user request may be presented to a user(s) and/or a guide(s) responsive to a user request in an order based at least in part on a ranking of the item(s) associated with the user request. An identifier(s) of a number of users may be indicated in the user request user ID field 515. Information indicated in the user request user ID field 515 may be used to obtain information of a user(s) using a record(s) such as the user record 700 illustrated in FIG. 7. Using the example illustrated in FIG. 5 the user 'User1' is associated with 'User request1'

The user request guide ID field 520 may include information of a guide(s) who is associated with a user request. For example, if a guide obtains a search result(s) responsive to 'User request1', an identifier of the guide may be indicated in the user request guide ID field 520. Likewise, if a guide was selected to respond to a user request, an identifier of the guide may be indicated in the user request guide ID field 520. Information indicated in the user request guide ID field 520 may be used to obtain information associated with a guide using a record(s) such as the guide record 600 illustrated in FIG. 6. A guide may be associated with a user request if a guide has reviewed information associated with a user request. Using the example illustrated in FIG. 5 the guides 'Guide1' and 'Guide2' have been associated with 'User request1'.

The user request category ID field 525 may include information of a category(ies) and/or keyword(s) associated with a user request. Content of the user request category ID field 525 may be modified by an automated classification of a user request. A human may select a category(ies) and/or keyword(s) which is associated with a user request. A category may be associated with a resource(s) such as a search engine, a website, a resource system(s), etc., a guide(s), an advertisement(s), etc. An item(s) associated with a category may be presented to a guide(s) and/or a user(s) if a user request associated with a category is submitted to the search system 130 (FIG. 1). An item(s) associated with a category and/or other information may be presented to a voter(s) for review. Association of a category with a user request may be used to select items such as an advertisement(s) associated with the category to be presented to a user(s) responsive to a user request. Association of a category with a user request may be used to select a guide(s) associated with the category to vote regarding an item associated with the user request. A category may be associated with a user request based on any type of information associated with a user request. Using the example illustrated in FIG. 5, the categories 'Category1' and 'Category2' are associated with 'User request1'.

The user request profile ID field 530 may include information of a profile(s) which is associated with a user request. For example, a profile may be associated with a user request based at least in part on a profile(s) associated with a user(s) associated with a user request. For example, a geographic profile which is common to one or more users associated with a user request may be associated with a user request, or a guide may determine that a profile is to be associated with a user request based on the content or subject matter of a user request(s) associated with a user(s). A guide selected to respond to a user request may be selected at least in part based on a profile(s) associated with the user request. A reviewer(s) may be selected to review an item(s) associated with a user request based at least in part on a profile(s) associated with a user request. Using the example illustrated in FIG. 5, 'Profile1' is associated with 'User request1'.

The user request result ID field 535 may include information of a result(s) which is associated with a user request. For example, a search result may be associated with a user request when a guide obtains the search result responsive to the user request. For example, if a user request is submitted to the search system 130 (FIG. 1), a guide may be selected, and the guide may provide a result(s) responsive to the user request. Alternately, a result(s) may be associated with a user request if the user request is submitted to a resource such as a search engine, or other resource system. Any number of search results may be associated with a user request. Using the example illustrated in FIG. 5, 'Result1.1', 'Result1.2', and 'Result1.3' have been associated with 'User request1'.

The user request result rank field 540 may include information regarding a ranking of a result(s) associated with a user request. In at least one embodiment, the user request result ID field 535 and the user request result rank field 540 are linked by for example a pointer. Using the example illustrated in FIG. 5, 'Result1.1' has a ranking of '1', 'Result1.2' has a ranking of '3', and 'Result1.3' has a ranking of '4'. Content of the user request result ID field 535 and the user request result rank field 540 may be used at least in part to determine an order in which a search result(s) are presented to a user(s) responsive to a user request. Using the example illustrated in FIG. 5, 'Result1.1' might be preferentially presented to a user(s) responsive to 'User request1'.

The user request advertisement ID field 545 may include information of an advertisement(s) which is associated with a user request. For example, an advertisement may be associated with a user request when a guide selects the advertisement to be presented to a user responsive to the user request. For example, if a user request is submitted to the search system 130 (FIG. 1), a guide may be selected, and the guide may provide an advertisement(s) responsive to the user request. Alternately, an advertisement(s) may be associated with a user request automatically such as when a category(ies) and/or a keyword(s) is associated with the user request. Any number of advertisements may be associated with a user request. Using the example illustrated in FIG. 5, 'Advert1'; 'Advert4', and 'Advert2' have been associated with 'User request1'.

The user request advertisement rank field 550 may include information regarding a ranking of an advertisement(s) associated with a user request. In at least one embodiment, the user request advertisement ID field 545 and the user request advertisement rank field 550 are linked by for example a pointer. Using the example illustrated in FIG. 5, 'Advert1' has a ranking of '3', 'Advert4' has a ranking of '1', and 'Advert2' has a ranking of '5'. Content of the user request advertisement ID field 545 and the user request advertisement rank field 550 may be used at least in part to determine an order in which an advertisement(s) are presented to a user(s) responsive to a user request. Using the example illustrated in FIG. 5, 'Advert4' might be preferentially presented to a user(s) responsive to 'User request1'.

The user request system request ID field 555 may include information regarding one or more system requests which may be created responsive to a user request submitted to the search system 130 (FIG. 1). For example, a system request may include a request to transcribe, translate, interpret, convert, and/or process any information associated with a user request(s). In at least one embodiment, a request submitted to a resource(s) and/or a guide(s) responsive to a user request may be identified in the user request system request ID field 555. Using the example illustrated in FIG. 5, 'User request1' is associated with 'System request1.1', 'System request1.2', and 'System request1.3' which may indicate that 'User request1' has caused the system requests 'System request1.1', 'System request1.2', and 'System request1.3' to be submitted to a resource(s) and/or a guide(s).

Figure 6:
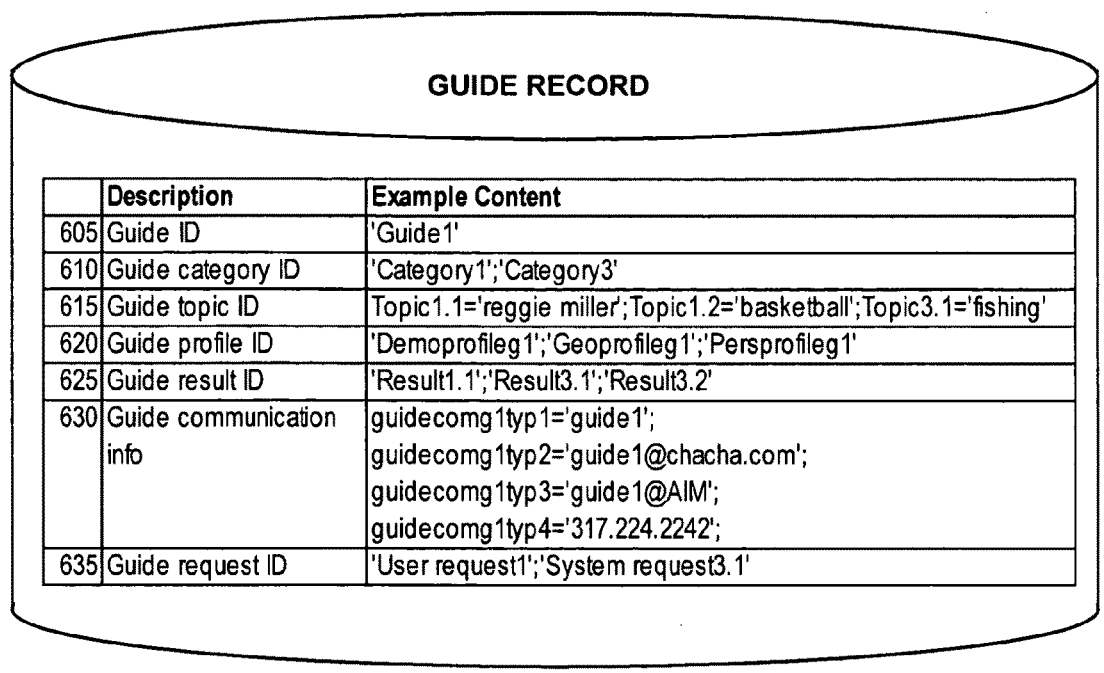
FIG. 6 illustrates a database record for a guide.

As illustrated in FIG. 6, an exemplary guide record 600 is provided, of which one or more may be associated with or resident in the database 120 (FIG. 1). The guide record 600 may include a guide ID field 605, a guide category ID field 610, a guide topic ID field 615, a guide profile ID field 620, a guide result ID field 625, a guide communication info field 630, and a guide request ID field 635.

The guide ID field 605 preferably contains a unique identifier of a guide, which is preferably used consistently. For example, in at least one embodiment, the guide ID field 605 can include a randomly generated numerical code, and/or a text string indicating a name associated with a guide. A guide ID serves to distinguish the guide record associated with a guide from a guide record associated with other guides. Other unique identifiers of a guide may be utilized without departing from the spirit and scope of the embodiments. Using the example illustrated in FIG. 6, 'Guide1' is the guide ID associated with the guide record 600.

The guide category ID field 610 may include information of a category(ies) associated with a guide. Content of the guide category ID field 610 may be modified based on an action(s) of a guide. A category(ies) may be associated with a guide based on one or more types of information processing. For example, the category 'translate English to Spanish', or 'transcribe spoken queries' or 'Sports' might be associated with a guide to indicate a skill or expertise associated with the guide. Such an association may be used in part to rate or rank a guide(s) and/or to select a guide(s). A person may select a category(ies) and/or keyword(s) which is associated with a guide. A category may be associated with a guide based on testing of a guide(s). A category may be associated with a guide based on an affiliate group associated with the guide. For example, if a guide has chosen to be affiliated with affiliate groups associated with a type of music, a category associated with the type of music might be associated with the guide. A category may signify any type of skill and/or expertise which may be used to match a guide to a task. A category(ies) associated with a guide may be used to select an item(s) which is to be presented to a guide. A guide(s) may be selected to review an item(s) such as a result(s) based on the association of a guide with a category(ies). Using the example illustrated in FIG. 6, 'Category1' and 'Category3' are associated with 'Guide1'.

The guide topic ID field 615 may include information of a topic(s) associated with a guide. Content of the guide topic ID field 615 may be modified based on an action(s) of a guide. A person may select a topic which is associated with a guide. For example, a guide may select a topic(s) to be associated with the guide during a registration process. A topic may be associated with a guide based on testing of a guide(s). For example, a guide may be required to demonstrate knowledge of a category and/or topic(s) in order to be associated with the topic(s). Content of the guide topic ID field 615 may be compared to content of a search request in order to determine a ranking of a guide(s) for responding to a search request. For example, if a topic indicated in the guide topic ID field is associated with content of a request, the guide may be more likely to be selected to respond to the request. Using the example illustrated in FIG. 6, the topics 'reggie miller', 'basketball' and 'fishing' are associated with 'Guide1'. This may indicate that 'Guide1' has indicated an interest in 'reggie miller', 'basketball' and 'fishing'.

The guide profile ID field 620 may include information of a profile(s) associated with a guide. Content of the guide profile ID field 620 may be modified based on action(s) of a guide. A person may select a profile which is associated with a guide. For example, a guide may select a profile(s) to be associated with the guide during a registration process. A profile may be associated with a guide based on testing of a guide(s). For example, a guide may be required to demonstrate knowledge relevant to a profile(s) in order to be associated with the profile(s), or a guide may take a test which is used to generate a profile, or a guide may provide information such as demographic, geographic, personality or other information which may be indicated in a profile(s) associated with the guide. Information indicated in a guide profile may be obtained from an external database. Information indicated in the content of the guide profile ID field 620 may be compared to information indicated in the content of a profile(s) associated with a request in order to determine a ranking of a guide(s) for responding to a search request. Likewise, a profile(s) associated with a guide(s) may be used to select and/or rank a guide(s). Using the example illustrated in FIG. 6, 'Demoprofileg1', 'Geoprofileg1' and 'Persprofileg1' are associated with 'Guide1'. This may indicate that 'Guide1' has indicated and/or generated 'Demoprofileg1' which may be a demographic profile, 'Geoprofileg1' which may be a geographic profile and 'Persprofileg1' which might indicate personality information regarding 'Guide1'. Any or all information indicated in a profile(s) associated with a guide may be used to determine a rating and/or ranking of a guide.

The guide result ID field 625 may include information of a result(s) associated with a guide. Content of the guide result ID field 625 may be modified based on an action(s) of a guide. If a guide produces a search result(s) responsive to a search request(s), an identifier of the search result(s) may be included in the guide result ID field 625. A rating(s) and/or ranking(s) associated with a search result(s) associated with a guide may affect compensation for a guide. Likewise a usage indicator associated with a search result(s) provided by a guide may affect a rating(s) and/or ranking(s) associated with a guide. Using the example illustrated in FIG. 6, 'Result1.1', 'Result3.1' and 'Result3.2' are associated with 'Guide1'. This may indicate that 'Guide1' has provided and/or reviewed 'Result1.1', 'Result3.1', and 'Result3.2'.

The guide communication info field 630 may include information of a device(s) and/or service(s) associated with a guide. Content of the guide communication info field 630 may be modified based on an action(s) of a guide. If a guide establishes communications using a device(s) and/or service(s), information regarding the device(s) and/or service(s) may be included in the guide communication info field 630. Any type of communication service(s) and/or system(s) may be indicated in the guide communication info field 630. For example, a username and/or password associated with a guide may be indicated in the guide communication info field 630. Communication services such as IM, e-mail, SMS, MMS, EMS, telephone, wireless or wired communication, etc. may be indicated in the guide communication info field 630. A telephone number, an email address, an IM provider and login ID, a keyword(s) associated with a service, etc. may be indicated in the guide communication info field 630. Using the example illustrated in FIG. 6, the login 'guide1', the email 'guide1@chacha.com', the IM credential 'guide1@AIM' and the phone number '317.224.2242' are associated with 'Guide1'. This may indicate that 'Guide1' may be contacted using the login ID 'guide1', via email at 'guide1@chacha.com', via IM as 'guide1@AIM' and/or via voice, text, and/or other service(s) associated with the phone number '317.224.2242'.

The guide request ID field 635 may include information of a request(s) associated with a guide. Content of the guide request ID field 635 may be modified based on an action(s) of a guide. If a guide produces a search result(s) responsive to a search request(s), an identifier of the search request(s) may be included in the guide request ID field 635. A rating(s) and/or ranking(s) associated with a request(s) associated with a guide may affect compensation for a guide. Likewise a usage indicator associated with a search request(s) and a guide may affect a rating(s) and/or ranking(s) associated with the guide. A request may be associated with a guide based on a vote(s) cast by a guide regarding items associated with the search request. Using the example illustrated in FIG. 6, 'User request1', and 'System request3.1' are associated with 'Guide1'. This may indicate that 'Guide1' has responded to, been selected to respond to, and/or has reviewed one or more item(s) associated with 'User request1' and 'System request3.1'.

Figure 7:
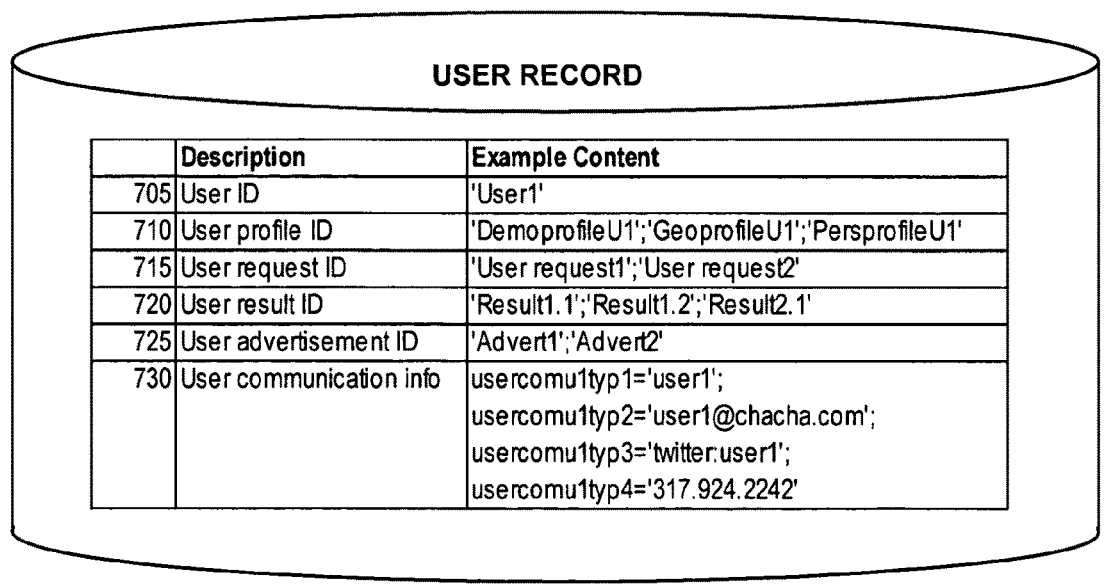
FIG. 7 illustrates a database record for a user.

As illustrated in FIG. 7, an exemplary a user record 700 is provided, of which one or more may be associated with or resident in the database 120 (FIG. 1). The user record 700 may include a user ID field 705, a user profile ID field 710, a user request ID field 715, a user result ID field 720, a user advertisement ID field 725, and a user communication info field 730.

The user ID field 705 preferably contains a unique identifier of a user, which is preferably used consistently. For example, in at least one embodiment, the user ID field 705 can include a randomly generated numerical code, and/or a text string indicating a name associated with a user. A user ID serves to distinguish a user record associated with a user from a user record associated with other users. Other unique identifiers of a user may be utilized without departing from the spirit and scope of the embodiments. In at least one embodiment, a user ID may include a phone number associated with a user. Using the example illustrated in FIG. 7, 'User1' is the user ID associated with the user record 700.

The user profile ID field 710 may include information of a profile(s) associated with a user. Content of the user profile ID field 710 may be modified based on an action(s) of a user. A person may select a profile which is associated with a user. For example, a user may select a profile(s) to be associated with the user during a registration process. A profile may be associated with a user based on testing of a user(s) and/or information from users. For example, a user may be required to demonstrate knowledge relevant to a profile(s) in order to be associated with the profile(s), or a user may take a test which is used to generate a profile, or a user may provide information such as demographic, geographic, personality or other information which may be indicated in a profile(s) associated with the user. Historical information such as a request(s) and/or result(s) associated with a user may be used to determine profile information. Information indicated in a user profile may be obtained from an external database. A profile(s) associated with a user(s) may be used to select and/or rank a user(s) for voting. Using the example illustrated in FIG. 7, 'DemoprofileU1', 'GeoprofileU1' and 'PersprofileU1' are associated with the user 'User1'. This may indicate that 'User1' has indicated and/or generated 'DemoprofileU1' which may be a demographic profile, 'GeoprofileU1' which may be a geographic profile and 'PersprofileU1' which might indicate personality information regarding 'User1'.

The user request ID field 715 may include information of a request(s) associated with a user. Content of the user request ID field 715 may be modified based on an action(s) of a user. If a user submits a request an identifier of the request may be included in the user request ID field 715. Using the example illustrated in FIG. 7, 'User request1' and 'User request2' are associated with 'User1' which may indicate that 'User1' has submitted 'User request1' and 'User request2'.

The user result ID field 720 may include information of a result(s) associated with a user. Content of the user result ID field 720 may be modified based on an action(s) of a user and/or a guide(s). If a user receives a result(s) responsive to a request(s), an identifier of the result(s) may be included in the user result ID field 720. A usage indicator associated with a result(s) provided to a user(s) may affect a rating(s) and/or ranking(s) associated with a guide. Using the example illustrated in FIG. 7, 'Result1.1', 'Result1.2' and 'Result2.1' are associated with the user 'User1'. This may indicate that 'User1' has been presented with the results 'Result1.1', 'Result1.2', and 'Result2.1'.

The user advertisement ID field 725 may include information of an advertisement(s) associated with a user. Content of the user advertisement ID field 725 may be modified based on an action(s) of a user. If a user receives an advertisement(s), an identifier of the advertisement(s) may be included in the user advertisement ID field 725. A usage indicator associated with an advertisement(s) provided to a user(s) may affect a rating(s) and/or ranking(s) associated with a guide, compensation for the search system, and/or rating(s) and/or ranking(s) of an advertisement(s). Using the example illustrated in FIG. 7, 'Advert1' and 'Advert2' are associated with 'User1'. This may indicate that 'User1' has been presented with 'Advert1', and 'Advert2'.

The user communication info field 730 may include information of a device(s) and/or service(s) associated with a user. Content of the user communication info field 730 may be modified based on an action(s) of a user. If a user establishes communications using a device(s) and/or service(s), information regarding the device(s) and/or service(s) may be included in the user communication info field 730. Any type of communication service(s) and/or system(s) may be indicated in the user communication info field 730. For example, a username and/or password associated with a user may be indicated in the user communication info field 730. Communication services such as IM, e-mail, SMS, MMS, EMS, telephone, wireless or wired communication, etc. may be indicated in the user communication info field 730. A telephone number, an email address, an IM provider and login ID, a keyword(s) associated with a service, etc. may be indicated in the user communication info field 730. Using the example illustrated in FIG. 7, the login 'user1', the email 'user1@chacha.com', the Twitter™ service account 'twitter:user1' and the phone number '317.924.2242' are associated with 'User1'. This may indicate that 'User1' may be contacted using the login ID 'user1', via email at 'user1@chacha.com', via Twitter as 'user1' and/or via voice, text, and/or other service(s) associated with the phone number '317.924.2242'.

Figure 8:
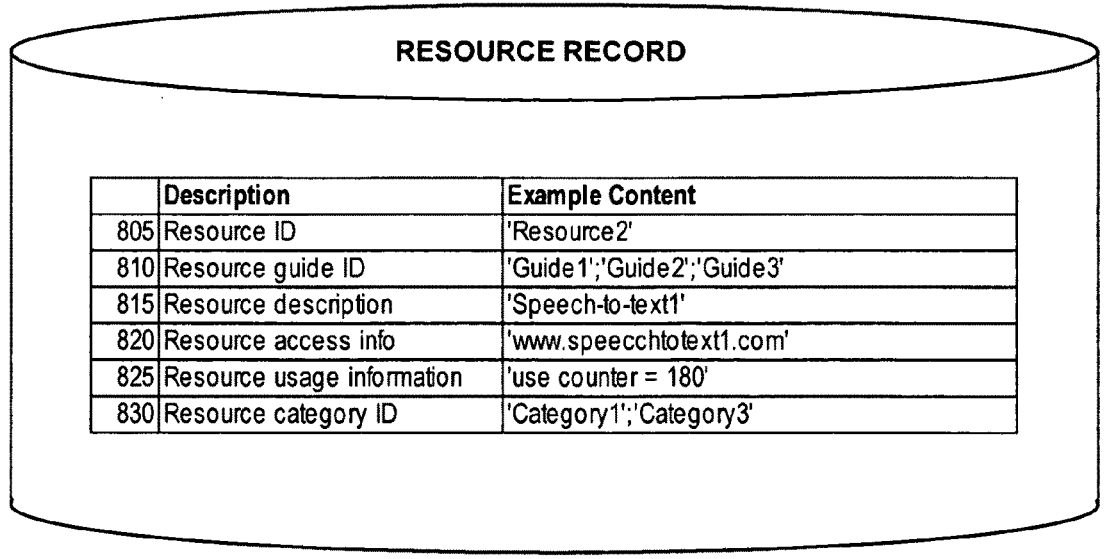
FIG. 8 illustrates a database record for a resource.

As illustrated in FIG. 8, an exemplary a resource record 800 is provided, of which one or more may be associated with or resident in the database 120 (FIG. 1). The resource record 800 may include a resource ID field 805, a resource guide ID field 810, a resource description field 815, a resource access info field 820, a resource usage information field 825 and a resource category ID field 830.

The resource ID field 805 preferably contains a unique identifier of a resource, which is preferably used consistently. For example, in at least one embodiment, the resource ID field 805 can include a randomly generated numerical code, and/or a text string indicating a name associated with a resource. A resource ID serves to distinguish the resource record associated with a resource from a resource record associated with other resources. Other unique identifiers of a resource may be utilized without departing from the spirit and scope of the embodiments. In at least one embodiment, a resource ID may include a description associated with a resource. Using the example illustrated in FIG. 8, 'Resource2' is the resource ID associated with the resource record 800.

The resource guide ID field 810 may include information of a guide(s) associated with a resource. For example, a guide(s) who reviewed a result produced by a resource may be indicated in the resource guide ID field 810. In at least one embodiment a guide ID associated with a guide(s) who has received information of a result(s) from a resource may be indicated in the resource guide ID field 810. A guide may be associated with a resource by an operator of the resource. For example, a guide skilled at transcription may be associated with a resource which performs transcriptions, which may allow the resource to be used more efficiently and/or with higher accuracy. Information contained in the resource guide ID field 810 may be used to obtain information regarding a guide associated with a resource based on records such as the guide record 600 (FIG. 6). Using the example illustrated in FIG. 8, 'Guide1'; 'Guide2' and 'Guide3' are associated with 'Resource2' which may indicate that 'Guide1'; 'Guide2' and 'Guide3' may be eligible to review a result(s) associated with 'Resource2'.

The resource description field 815 may include information of a description of a resource. For example, a text snippet associated with a resource may be indicated in the resource description field 815. A URL and/or other information associated with a resource may be indicated in the resource description field 815. Information contained in the resource description field 815 may be used to provide a description of a resource to a user(s) and/or a guide(s), which may aide in performing a task associated with the resource. Using the example illustrated in FIG. 8, the text snippet 'Speech-to-text1' is associated with 'Resource2', which may indicate that 'Resource2' may provide speech to text processing.

The resource access info field 820 may include access information associated with a resource. For example, a URL associated with a web page may be indicated in the resource access info field 820. Information of a password, a login ID, a template for submitting a request, an API for submitting and/or receiving information and/or any other information which may be utilized to access a resource may be indicated in the resource access info field 820. Information contained in the resource access info field 820 may be used to provide access to a resource(s) for a user(s), a guide(s), a resource(s) and/or the search system 130 (FIG. 1). Using the example illustrated in FIG. 8, the URL 'www.speechtotext1.com' is the access information associated with 'Resource2'. This may for example indicate that a result(s) may be obtained by providing information to a resource system associated with the URL 'www.speechtotext1.com'. While a URL has been used in FIG. 8 for the purposes of illustration and simplicity, no limitation is implied thereby. Any information required to provide information to a resource and/or to obtain information from a resource may be indicated in the resource access info field 820.

The resource usage information field 825 may include information regarding the use of a resource. For example, a number of times that a resource has been utilized by a guide(s) and/or systems such as a resource system, a user system, and/or the search system 130 (FIG. 1) may be indicated in the resource usage information field 825. Using the example illustrated in FIG. 8, the indicator 'use counter=180' is associated with 'Resource2'. This may indicate that 'Resource2' has been utilized one hundred eighty times. Information in the resource usage information field 825 may be utilized to determine whether a result(s) associated with a resource is to be reviewed, to determine a rating and/or a ranking of a resource, to determine compensation associated with a resource(s), and/or for other purposes.

The resource category ID field 830 may include information of a number of categories associated with a resource. For example, a category associated with a type of result which may be produced by a resource may be indicated in the resource category ID field 830. In at least one embodiment a category associated with a guide(s) who has received information from a resource may be indicated in the resource category ID field 830. Information contained in the resource category ID field 830 may be used to obtain information regarding a category associated with a resource based on a record(s) such as the category record 1100 (FIG. 11). Using the example illustrated in FIG. 8, 'Category1' and 'Category3' are associated with 'Resource2' which may indicate that a type(s) of information processing associated with 'Category1' and 'Category3' may be performed using 'Resource2'. Information associated with a category may be presented to a supplier(s) of systems and/or software which may perform processing associated with a category for various purposes. For example, a supplier of translation services might submit a bid to provide English to French translation services associated with the category 'English to French'.

Figure 9:
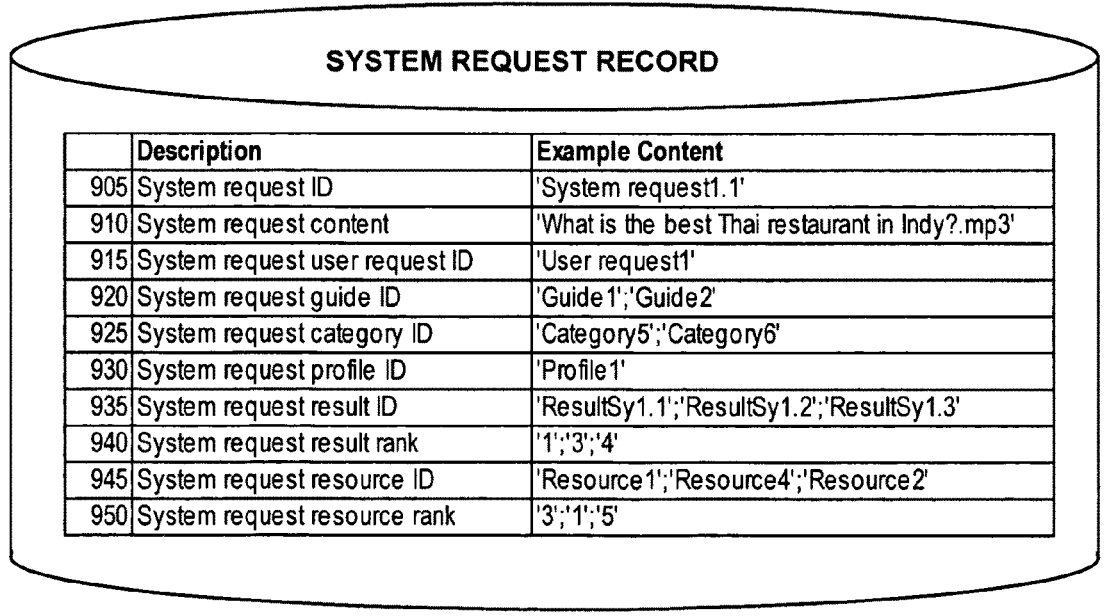
FIG. 9 illustrates a database record for a system request.

As illustrated in FIG. 9, an exemplary system request record 900 is provided, of which one or more may be associated with or resident in the database 120 (FIG. 1). The system request record 900 may include a system request ID field 905, a system request content field 910, a system request user request ID field 915, a system request guide ID field 920, a system request category ID field 925, a system request profile ID field 930, a system request result ID field 935, a system request result rank field 940, a system request resource ID field 945, and a system request resource rank field 950.

A system request record may be created responsive to various activities. For example a guided search session, an interactive training session, a non-interactive training session, submission of a request by a user, and/or other types of activity may cause a system request record to be created and/or modified. In at least one embodiment, a system request record is generated responsive to a request. A system request record may be imported from an external resource(s), a database, and/or any media accessible to the search system 130.

The system request ID field 905 preferably contains a unique identifier of a system request, which is preferably used consistently. For example, in at least one embodiment, the system request ID field 905 can include a randomly generated numerical code, and/or a text string indicating the content of a request. A system request ID serves to distinguish the system request record associated with a system request from a system request record associated with other system requests. Other unique identifiers of a system request may be utilized without departing from the spirit and scope of the embodiments. A unique identifier may be assigned to a system request when it is generated As illustrated in FIG. 9, 'System request1.1' is the system request ID associated with the system request record 900 (FIG. 9).

The system request content field 910 may include information regarding content of a system request. Text associated with a query submitted by a user may be indicated in the system request content field 910. For example, text of a request which is to be translated which may be processed by a resource(s) and/or a guide(s) may be indicated in the system request content field 910. Any information associated with a request may be indicated in the system request content field 910. Information such as audio recordings, images, text, video and/or other information etc. which are associated with a system request may be indicated in the system request content field 910. Using the example illustrated in FIG. 9, 'What is the best Thai restaurant in Indy?.mp3' is the content associated with the system request record 900. This may indicate that the audio file 'What is the best Thai restaurant in Indy?.mp3' may be processed responsive to 'System request1.1'.

The system request user request ID field 915 may include information of a user request(s) associated with a system request. The system request user request ID field 915 may be used to associate a user request with a system request using information indicated in a user request record such as the user request record 500 (FIG. 5). A result(s) and/or other item(s) associated with a system request may be presented to a user(s) and/or a guide(s) in an order based at least in part on a ranking of the item(s) associated with the system request. An identifier(s) of a number of user requests may be indicated in the system request user request ID field 915. Information indicated in the system request user request ID field 915 may be used to obtain information of a user(s) using a record(s) such as the user record 700 (FIG. 7), and the user request record 500 (FIG. 5). Using the example illustrated in FIG. 9 'User request1' is associated with 'System request1.1', which may for example indicate that 'User request1' caused 'System request 1.1' to be generated.

Information indicated in the system request user request ID field 915 may be used to enhance the ability of a resource to process information. For example, a text to speech resource such as 'Resource 2' might receive information associated with a user which may improve the ability of the resource to recognize a spoken query based on information indicated in a user record such as the user record 700 (FIG. 7). For example, requests may be received from various devices and/or services associated with a user. The system 100 (FIG. 1) may provide an identifier of a user, as well as other contextual information which may include previous requests, previous spoken requests, information of corrections provided by a human assistant(s), information of profiles associated with a user(s) such as geographic, demographic, native languages, etc. The search system may be able to provide context or other additional information of a request to any resource. For example a new resource for speech to text conversion, may be provided with information of a user which may allow the new resource to process a request based on historical and/or contextual information. This capability is not limited to any particular type of processing. For example, a query history associated with a user might be provided to a resource which may allow the resource to respond with more relevant information, such as an advertisement and/or other content, responsive to a request such as a system request and/or a user request. Likewise information of a user location, audio of a previous spoken query, and profile information associated with a user might be provided to a text to speech processing resource in order to provide a more natural text to speech conversion, etc. Any type of information indicated in the database 120 (FIG. 1) may be provided to a resource(s). Information provided to a resource may not only be associated with a particular user, but might also be associated with a group(s) of users. As the system 100 may associate an arbitrary identifier with a user for any purpose, it is not necessary that a resource is explicitly aware of personally identifying information associated with the user.

The system request guide ID field 920 may include information of a guide(s) who is associated with a system request. For example, if a guide produces a result(s) associated with 'System request1.1', an identifier of the guide may be indicated in the system request guide ID field 920. Information indicated in the system request guide ID field 920 may be used to obtain information associated with a guide using a record(s) such as the guide record 600 illustrated in FIG. 6. A guide may be associated with a system request if a guide has been selected to review a result(s) associated with the system request. Using the example illustrated in FIG. 9 'Guide1' and 'Guide2' have been associated with 'System request1.1'.

The system request category ID field 925 may include information of a category(ies) and/or keyword(s) associated with a system request. Content of the system request category ID field 925 may be modified by an automated classification of a system request. A person may select a category(ies) and/or keyword(s) which is associated with a system request. A category may be associated with a resource(s), a guide(s), an advertisement(s), etc. An item(s) associated with a category may be presented to a guide(s) and/or a user(s). An item(s) associated with a category and/or other information may be presented for review. Association of a category with a system request may be used to select item(s) such as an advertisement(s) associated with the category to be presented to a user(s) responsive to a request. Association of a category with a system request may be used to select a guide(s) associated with the category to review an item associated with the system request. A category may be associated with a system request based on any type of information and/or content associated with a system request. Using the example illustrated in FIG. 9, 'Category5' and 'Category6' are associated with 'System request1.1'. This may indicate for example that 'System request1.1' might require a resource(s) and/or guide(s) associated with 'Category5' and 'Category6'

The system request profile ID field 930 may include information of a profile(s) which is associated with a system request. For example, a profile may be associated with a system request based at least in part on a profile(s) associated with a user(s) associated with a system request. For example, a geographic profile which is common to one or more users associated with a system request may be associated with a system request, or a guide may determine that a profile is to be associated with a system request based on the content of a system request(s) associated with a user(s). A guide and/or a resource(s) selected to respond to a system request may be selected at least in part based on a profile(s) associated with the system request. A reviewer(s) may be selected to review an item(s) associated with a system request based at least in part on a profile(s) associated with a system request. Using the example illustrated in FIG. 9, 'Profile1' is associated with 'System request1.1'.

The system request result ID field 935 may include information of a result(s) which is associated with a system request. For example, a result may be associated with a system request when a resource provides the result responsive to the system request. For example, if a system request is submitted to the resource system 150 (FIG. 1), a result provided by the resource system 150 may be associated with a system request. Alternately, a result(s) may be associated with a system request subsequent to being reviewed and/or rated by a guide(s). Any number of results may be associated with a system request. Using the example illustrated in FIG. 9, 'ResultSy1.1', 'ResultSy1.2', and 'ResultSy1.3' have been associated with 'System request1.1'.

The system request result rank field 940 may include information regarding a ranking of a result(s) associated with a system request. In at least one embodiment, the system request result ID field 935 and the system request result rank field 940 are linked by for example a pointer. Using the example illustrated in FIG. 9, 'ResultSy1.1' has a ranking of '1', 'ResultSy1.2' has a ranking of '3', and 'ResultSy1.3' has a ranking of '4'. Content of the system request result ID field 935 and the system request result rank field 940 may be used at least in part to select a resource and/or a result responsive to a system request. Using the example illustrated in FIG. 9, 'ResultSy1.1' might be preferentially utilized responsive to 'System request1.1'.

The system request resource ID field 945 may include information of a resource(s) which is associated with a system request. For example, a resource may be associated with a system request when a guide selects the resource to be utilized responsive to the system request. For example, if a user request is submitted to the search system 130 (FIG. 1), a guide may be selected, and the guide may select a resource(s) responsive to a system request associated with a user request. A resource(s) may be associated with a system request automatically based on a category(ies) and/or other information associated with the system request. Any number of resources may be associated with a system request. Using the example illustrated in FIG. 9, 'Resource1'; 'Resource4', and 'Resource2', have been associated with 'System request1.1'.

The system request resource rank field 950 may include information regarding a ranking of a resource(s) associated with a system request. In at least one embodiment, the system request resource ID field 945 and the system request resource rank field 950 are linked by for example a pointer. Using the example illustrated in FIG. 9, 'Resource1' has a ranking of '3', 'Resource4' has a ranking of '1', and 'Resource2' has a ranking of '5'. Content of the system request resource ID field 945 and the system request resource rank field 950 may be used at least in part to determine an order in which a resource(s) are notified and/or utilized responsive to a system request. A resource ranking may be based on factors such as cost, quality, user ratings, etc. Using the example illustrated in FIG. 9, 'Resource4' might be preferentially utilized to respond to 'System request1.1'.

As illustrated in FIG. 10, an exemplary a profile record 1000 is provided, of which one or more may be associated with or resident in the database 120 (FIG. 1). The profile record 1000 may include a profile ID field 1005, a profile geographic info field 1010, a profile demographic info field 1015, a profile personality info field 1020, a profile guide ID field 1025, and a profile guide rating field 1030.

The profile ID field 1005 preferably contains a unique identifier of a profile, which is preferably used consistently. For example, in at least one embodiment, the profile ID field 1005 can include a randomly generated numerical code, and/or a text string indicating a name associated with a profile. A profile ID serves to distinguish a profile record associated with a profile from a profile record associated with other profiles. Other unique identifiers of a profile may be utilized without departing from the spirit and scope of the embodiments. In at least one embodiment, a profile ID may include a description associated with a profile. Using the example illustrated in FIG. 10, 'Profile1' is the profile ID associated with the profile record 1000.

The profile geographic info field 1010 may include geographic information associated with a profile. Any type of geographic information may be indicated in the profile geographic info field 1010. For example, GPS coordinates, a street address, a neighborhood name, a postal code, a city name, a state name, etc. could be indicated in the profile geographic info field 1010. Using the example illustrated in FIG. 10, the geographic information 'Indiana' is associated with 'Profile1'. This may indicate for example that a person with a home address in and/or other profile information associated with geographic information of the state of 'Indiana' may match 'Profile1', or may receive a higher rating(s) and/or ranking(s) associated with 'Profile1'.

The profile demographic info field 1015 may include demographic information associated with a profile. Any type of demographic information may be indicated in the profile demographic info field 1015. For example, date of birth, sex, race, political affiliation, income, number of children, marital status, membership in organizations, etc. could be indicated in the profile demographic info field 1015. Using the example illustrated in FIG. 10, the demographic information 'under30' AND 'over20' is associated with 'Profile1'. This may indicate that a person aged greater than 20 years and less than 30 years may receive a higher rating(s) and/or ranking(s) associated with 'Profile1'.

The profile personality info field 1020 may include personality information associated with a profile. Any type of personality information may be indicated in the profile personality info field 1020. For example, information of personality traits such as aggressiveness, curiosity, friendliness, intelligence, honesty, food preference, music preference, political affiliation, etc. could be indicated in the profile personality info field 1020. Using the example illustrated in FIG. 10, the characteristic 'Foodie' is associated with 'Profile1'. This may indicate that persons with an interest in food and/or restaurants may receive a higher rating(s) and/or ranking(s) associated with 'Profile1'.

The profile guide ID field 1025 may include information of a guide(s) who are associated with a profile. For example, if a guide elects to receive search requests associated with 'Profile1', or if profile information of a guide matches a profile, an identifier of the guide may be indicated in the profile guide ID field 1025 Information indicated in the profile guide ID field 1025 may be used to obtain information associated with a guide using a record(s) such as the guide record 600 (FIG. 6). Using the example illustrated in FIG. 10 'Guide1', 'Guide3', 'Guide2', and 'Guide4' and 'Guide5' have been associated with 'Profile1'.

The profile guide rating field 1030 may include information regarding a rating of a guide(s) associated with a profile. In at least one embodiment, the profile guide ID field 1025 and the profile guide rating field 1030 are linked by for example a pointer. Using the example illustrated in FIG. 10, 'Guide1' has a rating of '2', 'Guide3' has a rating of '2', 'Guide2' has a rating of '1', 'Guide4' has a rating of '3' and 'Guide5' has a rating of '3'. Content of the profile guide ID field 1025 and the profile guide rating field 1030 may be used at least in part to determine an order in which a guide(s) are notified responsive to a search request, a voting activity, a review activity, or other types of tasks and/or activities associated with a profile(s). Using the example illustrated in FIG. 10, 'Guide2' might be preferentially notified of a request associated with 'Profile1'. Any number of guides may be associated with a profile(s).

As illustrated in FIG. 11, an exemplary a category record 1100 is provided, of which one or more may be associated with or resident in the database 120 (FIG. 1). The category record 1100 may include a category ID field 1105, a category description field 1110, a category guide ID field 1115, a category guide rating field 1120, a category resource ID field 1125, and a category resource rating field 1130.

The category ID field 1105 preferably contains a unique identifier of a category, which is preferably used consistently. For example, in at least one embodiment, the category ID field 1105 can include a randomly generated numerical code, and/or a text string. A category ID serves to distinguish the category record associated with a category from a category record associated with other categories. Other unique identifiers of a category may be utilized without departing from the spirit and scope of the embodiments. As illustrated in FIG. 11, 'Category5' is the category ID associated with the category record 1100.

The category description field 1110 may include information of a description associated with a category. For example, text associated with a category may be indicated in the category description field 1110. Such information may be used to assist a guide in associating a search request with a category(ies). In at least one embodiment, a description of a category and other item(s) associated with a category may be presented to a guide(s) in order to allow a guide(s) to indicate a preferred item(s). For example, an advertisement(s), a search resource(s), etc. may be presented to a guide(s) associated with a category(ies) in order that a guide(s) may vote regarding the advertisement(s), the search resource(s), etc. In at least one embodiment a category description may indicate a type of processing that a resource may perform. As illustrated in FIG. 11, 'Speech to text' is the category description associated with the category 'Category5'.

The category guide ID field 1115 may include information of a guide(s) who are associated with a category. For example, if a guide elects to receive search requests associated with the category 'Category5', an identifier of the guide may be indicated in the category guide ID field 1115. Information indicated in the category guide ID field 1115 may be used to obtain information associated with a guide using a record(s) such as the guide record 600 (FIG. 6). Using the example illustrated in FIG. 11 'Guide1', 'Guide2', and 'GuideN' have been associated with 'Category5'.

The category guide rating field 1120 may include information regarding a rating of a guide(s) associated with a category. In at least one embodiment, the category guide ID field 1115 and the category guide rating field 1120 are linked by for example a pointer. Using the example illustrated in FIG. 11, 'Guide1' has a rating of '10', 'Guide2' has a rating of '6', and 'GuideN' has a rating of '2' with respect to 'Category5'. Content of the category guide ID field 1115 and the category guide rating field 1120 may be used at least in part to determine an order in which a guide(s) is notified responsive to a search request, a voting activity, and/or other types of tasks and/or activities associated with a category(ies). Using the example illustrated in FIG. 11, 'Guide1' might be preferentially notified of a request associated with the category 'Category5'.

The category resource ID field 1125 may include information of a resource(s) associated with a category. For example, if a guide utilizes a resource to respond to a search request(s)

associated with the category 'Category5', an identifier of the resource may be indicated in the category resource ID field 1125. Information indicated in the category resource ID field 1125 may be used to obtain information associated with a resource using a record(s) such as the resource record 800 illustrated in FIG. 8. Using the example illustrated in FIG. 11 the resources 'Resource1', 'Resource2', and 'ResourceN' have been associated with the category 'Category5'.

The category resource rating field 1130 may include information regarding a rating of a resource(s) associated with a category. In at least one embodiment, the category resource ID field 1125 and the category resource rating field 1130 are linked by for example a pointer. Using the example illustrated in FIG. 11, 'Resource1' has a rating of '8', 'Resource2' has a rating of '8.5', and 'ResourceN' has a rating of '3'. Content of the category resource ID field 1125 and the category resource rating field 1130 may be used at least in part to determine an order in which a search resource(s) are presented and/or utilized responsive to a request associated with a category(ies). Using the example illustrated in FIG. 11, 'Resource2' might be preferentially presented to a guide(s) associated with the category 'Category5'. Likewise, 'Resource2' might preferentially be selected for 'speech to text' requests.

Rating information of a guide(s), an advertisement(s), a search resource(s), and other information and or item(s) associated with a category may be based at least in part on votes of guides associated with the category, but may be based on any information indicated in the database 120 (FIG. 1). For example, if a resource is frequently corrected by guides or users, a rating of the resource may be decreased. Although few categories are illustrated, the present invention is not limited to any category and may include a category for a system request, advertisements, etc.

As illustrated in FIG. 12, an exemplary a result record 1200 is provided, of which one or more may be associated with or resident in the search system 130(FIG. 1). The result record 1200 may include a result ID field 1205, a result guide ID field 1210, a result content info field 1215, a result resource ID field 1220 and a result review information field 1225.

The result ID field 1205 preferably contains a unique identifier of a result, which is preferably used consistently. For example, in at least one embodiment, the result ID field 1205 can include a randomly generated numerical code, and/or a text string indicating a name associated with a result. A result ID serves to distinguish the result record associated with a result from a result record associated with other results. Other unique identifiers of a result may be utilized without departing from the spirit and scope of the embodiments. In at least one embodiment, a result ID may include a description associated with a result. Using the example illustrated in FIG. 12, 'ResultSy1.1' is the result ID associated with the result record 1200.

The result guide ID field 1210 may include information of a guide(s) associated with a result. For example, a guide who obtained a search result may be indicated in the result guide ID field 1210. In at least one embodiment a guide ID associated with one or more guides who have reviewed a result may be indicated in the result guide ID field 1210. For example, information contained in the result guide ID field 1210 may be used to obtain information regarding a guide associated with a result based on a record(s) such as the guide record 600 (FIG. 6). Using the example illustrated in FIG. 12, 'Guide1' is associated with 'ResultSy1.1' which may indicate that 'Guide1' has reviewed and/or provided 'ResultSy1.1'.

The result content info field 1215 may include information of content of a result. For example, a text snippet associated with a result may be indicated in the result content info field 1215. The result content information field may indicate any type of information. For example, text associated with a speech to text conversion process, audio associated with a text to speech conversion process, and/or any information which might be produced by a guide(s) and/or a resource(s) may be indicated in the result content info field 1215. Information contained in the result content info field 1215 may be used to provide a result to a user(s), a guide(s), a resource(s) and/or the search system 130 (FIG. 1). Using the example illustrated in FIG. 12, the text snippet 'What is the best Thai restaurant in Indy?' is associated with 'ResultSy1.1'. This may indicate that the text snippet 'What is the best Thai restaurant in Indy?' may have been produced by 'Resource2' as a result associated with the system request 'System request1.1' as indicated in the system request result ID field 935 (FIG. 9) of the system request record 900.

The result resource ID field 1220 may include information of a resource associated with a result. For example, a URL associated with a system from which a text snippet was obtained may be indicated in the result resource ID field 1220. Likewise, an ID associated with a resource record such as the resource record 800 (FIG. 8) may be indicated. A URL or other information associated with a resource may be indicated in the result resource ID field 1220. Information contained in the result resource ID field 1220 may be used to provide access to resource(s) for a user(s), a guide(s) and/or the search system 130(FIG. 1) using information indicated in a record such as the resource record 800 (FIG. 8). Using the example illustrated in FIG. 12, 'Resource2' is the resource ID associated with 'ResultSy1.1'. This may indicate that 'Resource2' was used to obtain 'ResultSy1.1'.

The result review information field 1225 may include information regarding a review of a result. For example, a correction to a result and/or an opinion(s) of a guide(s) and/or user(s) regarding a result may be indicated in the result review information field 1225. Using the example illustrated in FIG. 12, the correction 'replace "vest" with "best"' is associated with 'ResultSy1.1'. This may indicate that 'ResultSy1.1' has been corrected by 'Guide1', (i.e., 'Guide1' corrected the text 'what is the "vest" Thai restaurant in Indy?' produced by 'Resource2' to read 'what is the "best" Thai restaurant in Indy?') Information in the result review information field 1225 may be utilized to determine whether a result is to be reviewed. For example, a confidence factor associated with a result, a resource, etc. may be indicated in the result review information field 1225, which may be used to determine whether a review of a result is to be performed. Information indicated in the result review information field 1225 may be utilized to determine a ranking of items to be reviewed by a guide(s). For example, a result with a lower confidence factor may be more likely to be presented to a guide for review.

Figure 13:
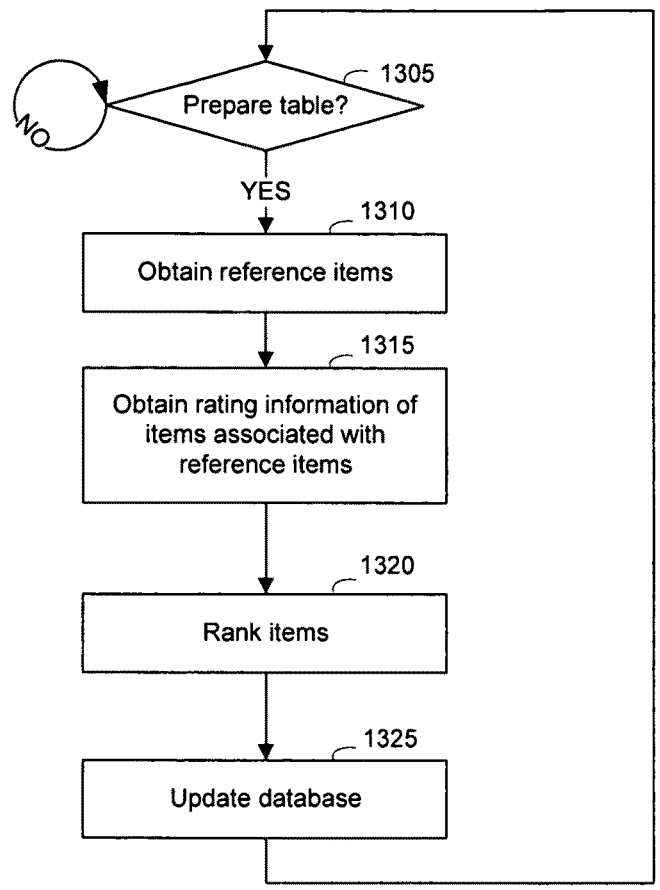
FIG. 13 is a flowchart of a process of creating a notification table.

As illustrated in FIG. 13, a process 1300 for creating a notification table is provided. The process 1300 may for example be operative on a server of the system 100 (FIG. 1). A notification table may be used to determine an order in which one or more persons, entities and/or resources may be notified of a task. In other embodiments, a notification table may be used to determine an order in which a task(s) may be provided. For example, if a number of tasks which might be assigned to a person exist, the tasks might be ranked and placed in a notification table. The availability status of a task may change based on factor(s) such as a time period associated with a task expiring, or a task being performed by another person, etc. The usage of a notification table to prioritize activities may improve utilization of a person(s) and/or resource(s) associated with the system 100 (FIG. 1).

In operation 1305 a determination is made as to whether a notification table is to be prepared. If it is determined in operation 1305 that a notification table is not to be prepared, control remains at operation 1305 and process 1300 continues. If in operation 1305 it is determined that a notification table is to be prepared, control is passed to operation 1310 and process 1300 continues. In at least one embodiment, the determination that a notification table is to be prepared is based on a task becoming available. For example, if a search request is submitted, a review is needed, and/or any other type of task requiring work to be performed is identified, it may be determined that a notification table is to be prepared. In at least one embodiment, if all resources and/or persons associated with a notification table have been notified, it may be determined that a notification table is to be prepared.

In operation 1310 a reference item(s) associated with a task is obtained. For example, information of a search request may be obtained, which may include a query, image(s), audio, media, keyword(s), category(ies), tag(s), profile(s), etc. Likewise, information of a category, an advertisement, or any item(s) which may be associated with information which may be associated with rating information may be obtained. Control is passed to operation 1315 and process 1300 continues.

In operation 1315 rating and/or ranking information of an item(s) and/or person(s) associated with a reference item(s) is obtained. For example, rating information of a person, resource, or entity associated with a reference item, which may include a query, image(s), audio, media, keyword(s), category(ies), tag(s), profile(s), etc. may be obtained. A rating(s) may be based on any type of information. For example, a guide rating associated with a category(ies), a keyword(s), a profile(s), etc. may be based on user ratings, peer ratings, ratings of results produced by the guide, activity(ies) of a guide, training of a guide, etc. Any number of items associated with rating information may be used to identify rating information associated with a guide. While a guide has been used for the purpose of simplicity and illustration, users, resource(s), task(s) and/or other items may be associated with a reference item which may be associated with rating information. Control is passed to operation 1320 and process 1300 continues.

In operation 1320 a ranking of a guide(s) and/or other items identified in operation 1315 is performed. For example, guides who are eligible and/or available for an activity may be ranked based on the rating data identified in operation 1315. Likewise, users who might be available and/or eligible to perform an activity might be ranked, or resources which might respond to a request might be ranked, or resources which might provide information of any sort might be ranked. Any type of item(s) indicated in the database 120 (FIG. 1) might be ranked based on rating information. Control is passed to operation 1325 and process 1300 continues. Any or all of the items obtained may be ranked 1320. For example, the system 100 (FIG. 1) may be set by an administrator such that a resource and a guide among other items are ranked based on demand.

In operation 1325 the system database 120 is updated. In at least one embodiment, a notification table is made available for use by the system 130 (FIG. 1). Information associated with a notification table may be recorded, such as a task ID associated with a notification table, etc. Information associated with items indicated in a notification table may be updated to indicate that an item has been added to a notification table, or that an item was not included in a notification table, or a ranking associated with an item in a notification table, etc. Control is passed to operation 1305 and process 1300 continues.

Figure 13A:
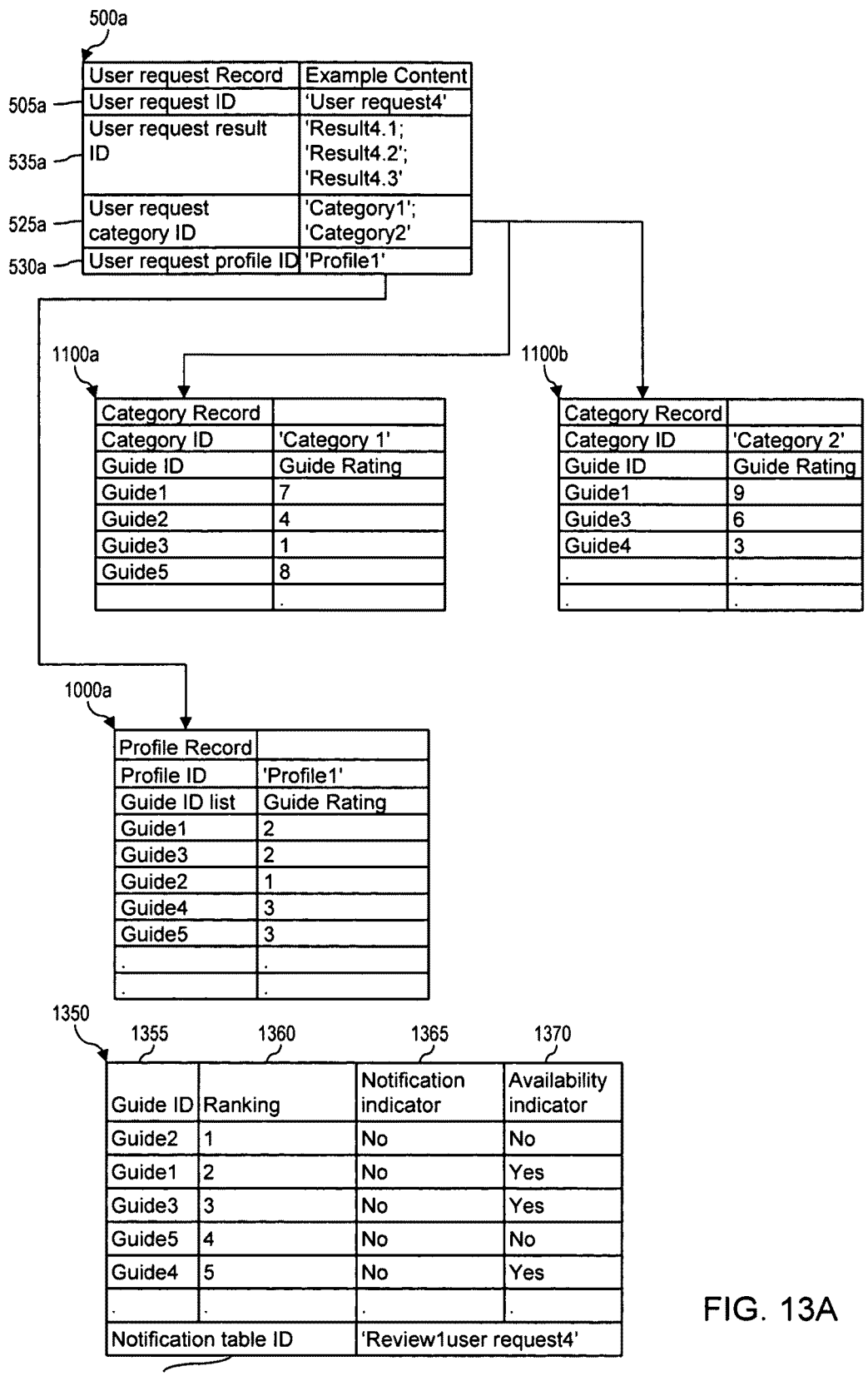
FIG. 13A illustrates a database relationship.

A database relationship for creating a ranked list of guides to be associated with a reference item and a review items is illustrated in FIG. 13A. A "reference item" may be an item such as a request, a category, and/or any combination of item(s) which may be presented to a guide as a reference for an action(s). For example, a search request may be presented to a guide in order that a guide may provide a search result(s) responsive to the search request, or a search request may be presented to a guide in order that a guide may vote regarding a search result(s) associated with the search request, or an indicator of a category may be presented to a guide in order that a guide may vote regarding a search resource(s), a topic, or a related category associated with the category. A "review item" may be any item such as a search result, a search resource, an advertisement, or any other item which may be presented for review. An "index item" may be any item such as a category, a profile, a location, a keyword, etc. which is used to select and/or rank guides based on a rating or ranking of guides associated with the guides and the index item. An index item may be associated with a reference item.

A notification table such as the notification table 1350 illustrated in FIG. 13A may be created of which one or more may be associated with or resident in the search system 130 (FIG. 1). The notification table 1350 may include a notification table ID field 1352, a guide ID field 1355, a ranking field 1360, a notification indicator field 1365 and an availability indicator field 1370. A notification table may be associated with a reference item such as a search request.

The notification table ID field 1352 preferably contains a unique identifier of a notification table, which is preferably used consistently. For example, in at least one embodiment, the notification table ID field 1352 can include a randomly generated numerical code, and/or a text string indicating a name associated with a task. A notification table ID serves to distinguish the notification table record associated with a notification table from a notification table record associated with other notification tables. Other unique identifiers of a notification table may be utilized without departing from the spirit and scope of the embodiments. In at least one embodiment, a notification table ID may include a description associated with a task. Using the example illustrated in FIG. 13A, 'Review1user request4' is the notification table ID associated with the notification table 1350.

The guide ID field 1355 may include a list of guide identifiers which may be used to contact a guide(s). The guide ranking field 1360 indicates a ranking of the guide associated with the guide ID indicated in the notification table guide ID field 1355. Using the example in FIG. 13, 'Guide2' is ranked '1', 'Guide1' is ranked '2', 'Guide3' is ranked '3', 'Guide5' is ranked '4', and 'Guide4' is ranked '5'. The notification indicator field 1365 indicates whether a guide indicated in the notification table guide ID field 1355 has been notified of a task. Using the example in FIG. 13A, none of the guides has been notified of the task 'Review1user request4' as indicated by the 'No' in the notification indicator field 1365. The availability indicator field 1370 indicates the availability of a guide. The availability status of a guide may change from time to time as guides become available for a task, as guides login to the system 100 (FIG. 1), or as guides are assigned tasks. Using the example in FIG. 13A, the guides 'Guide1', 'Guide3' and 'Guide4' are available as indicated by the 'Yes' in the availability indicator field 1370.

In order to determine the ranking of guides as indicated in the guide ranking field 1360 of the notification table 1350, the rating(s) and/or ranking(s) of a guide(s) associated with one or more index items may be utilized. Using the example illustrated in FIG. 13A, a reference item (i.e. 'User request4')

associated with the user request record 500a as indicated in the user request ID field 505a, is associated with the review items 'Result4.1','Result4.2', and 'Result4.3' as indicated in the user request result ID field 535a. 'User request4' is associated with the index items 'Category1' and 'Category2' as indicated in the user request category ID field 525a, and 'Profile1' as indicated in the user request profile ID field 530a. A ranking of guides may be performed based on information contained in the category records 1100a and 1100b, and the profile record 1000a. For example, a geographic profile which may include a location may be associated with a search request, and a guide within a first distance of the location may be given a rating '1', guides within a second distance of the location may receive a rating of '2', and guide at any greater distance may receive a rating of '3'. A guide(s) may have a rating(s) associated with a category. For example, a guide rating may be based on a rating(s) of search results produced by a guide for search requests associated with a category, wherein a higher rating indicates a better success rate which may be based on factors including but not limited to requester satisfaction with results, peer review by other guides, etc. Using the example illustrated in FIG. 13A, the guide ranking is based first on the rating associated with geographic location indicated in 'Profile1' and second on the average of rating(s) associated with 'Category1' and 'Category2'. Continuing with the example in FIG. 13A, the guide with the lowest rating with respect to 'Profile 1' (i.e. 'Guide 2') is ranked first due to geographic proximity even though 'Guide2' has a low average rating associated with 'Category1' and 'Category2'. The guides 'Guide1' and 'Guide3' are ranked '2' and '3', respectively, as they have the same rating with respect to 'Profile1' and 'Guide1' has a higher average rating associated with 'Category1' and 'Category2', and 'Guide5' and 'Guide4' are ranked '4' and '5', respectively, as they are rated '3' with respect to 'Profile1' and 'Guide5' has a higher average rating associated with 'Category1' and 'Category2'.

While a few index items are illustrated in FIG. 13A, no limitation is implied thereby. Any number of index items may be utilized and any number of review items may be ranked using the process 1300 (FIG. 13). Any criteria may be applied to determine a ranking and/or rating associated with an index item such as a category, a location, a keyword, a profile, a tag, a topic, etc. While a group of guides who may vote regarding a search result(s) associated with a search request is used for the purposes of illustration, no limitation is implied thereby. For example, a group of users might be selected to review a search result(s) associated with a search request, or a group of guides might be notified of a search request which is pending a response. A notification table may be used to notify any person(s), entity(ies) and/or system(s) of a pending task(s).

Figure 14:
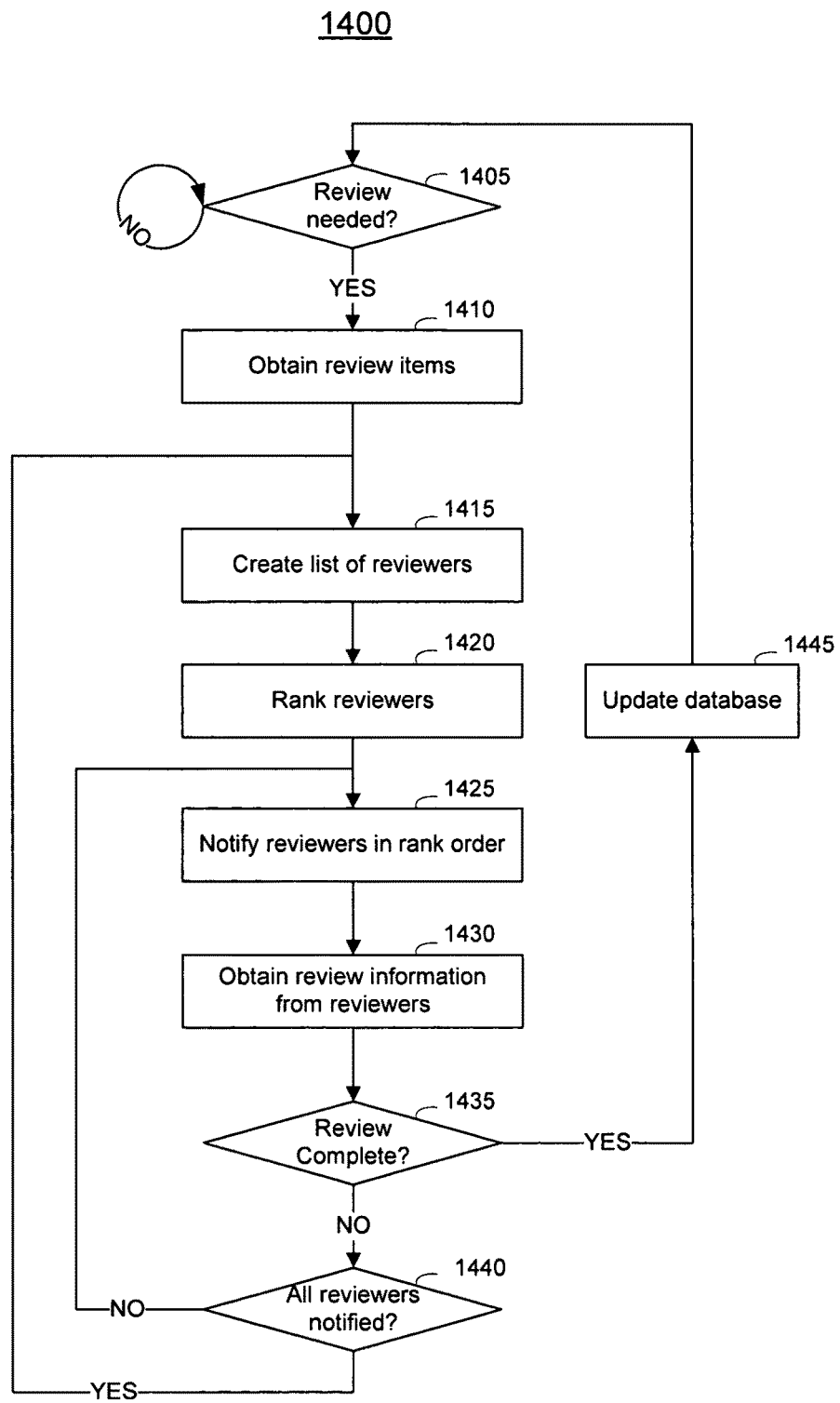
FIG. 14 is a flowchart of a process of reviewing item(s).

As illustrated in FIG. 14, a process 1400 for notification is provided. The process 1400 may be operative on a server associated with the system 100 (FIG. 1). The process 1400 may be used to select a reviewer(s) to be notified of a task, and/or to select an order in which a reviewer(s) may be notified of a task(s). A reference item is identified, which may be associated with one or more index items which may be associated with information which may be used to select items, such as reviewers, which may be notified of a task which may include information of a reference item(s), an index item(s) and/or review item(s) which may be associated with the index items.

In operation 1405 a determination is made as to whether review of an item is needed. If it is determined in operation 1405 that review of an item is not needed, control remains at operation 1405 and process 1400 continues. If in operation 1405 it is determined that review of an item is needed, control is passed to operation 1410 and process 1400 continues. In at least one embodiment, a value of a usage count associated with an item is utilized to determine whether review of an item is needed. In at least one embodiment, a number of review items associated with a reference item is utilized to determine whether review of an item is needed. For example, if a number of search results associated with a request exceeds a value it may be determined that a review is needed. Alternatively, a user may request that result(s) be reviewed.

In operation 1410 review items associated with a reference item are obtained. For example if a review item such as a search result or a search resource has been determined to need review, a reference item such as a search query or a category may be presented in order that an additional review item may be associated with the reference item. If a number of search results have been associated with a search request, or a number of topics have been associated with a category, a list of the reference items may be compiled for review. Control is passed to operation 1415 and process 1400 continues.

In operation 1415 a list of reviewers associated with a reference item is created. For example, voters associated with a reference item such as a search request may be identified. For example, voters associated with topic(s) and/or keyword(s) of a search request may be added to a reviewer list, or voters associated with a category(ies) and/or a profile(s) may be added to a reviewer list. Any information regarding a reviewer may be used to select members of a list of reviewers for a review item. For example, if a list of reviewers has been previously compiled based on one or more criteria, a list of reviewers may be compiled based on different criteria. Control is passed to operation 1420 and process 1400 continues.

In operation 1420 a ranking of reviewers is performed. For example, a notification table such as the notification table 1350 (FIG. 13A) may be constructed. Reviewers may be ranked based on various criteria. For example, reviewers may be ranked based on a rating(s) and/or ranking(s) associated with a reference item, as illustrated in FIG. 13A. In at least one embodiment, reviewers may be ranked based at least in part on a vote weight associated with a reviewer. Control is passed to operation 1425 and process 1400 continues.

In operation 1425 a reviewer(s) are notified in an order determined by the reviewer's rank. The highest ranking reviewer who is currently available and has not been notified of a review task is notified. Control is passed to operation 1430 and process 1400 continues.

In operation 1430 review information is obtained from a reviewer(s). For example one or more voters may register a vote regarding a review item(s), a reviewer may indicate acceptance or rejection of a review item(s), etc. Control is passed to operation 1435 and process 1400 continues.

In operation 1435 a determination is made as to whether a review is complete. If it is determined in operation 1435 that a review is complete, control is passed to operation 1445 and process 1400 continues. If in operation 1435 it is determined that a review is not complete, control is passed to operation 1440 and process 1400 continues. A review may be determined to be complete if a time period between a start of a review and a current time has exceeded a value, or a review may be determined to be complete based on information regarding a user(s), guide(s) and/or resource(s) such as a number of votes cast, etc. Any suitable criteria may be used to determine that a review is complete.

In operation 1440 a determination is made as to whether all available reviewers in the review list created in operation 1415 have been notified. If it is determined in operation 1440 that all available reviewers in the review list created in operation 1415 have not been notified, control is passed to operation 1425 and process 1400 continues. If in operation 1440 it is determined that all available reviewers in the review list created in operation 1415 have been notified, control is passed to operation 1415 and process 1400 continues.

In operation 1445 the search system 130 (FIG. 1) is updated. Information of a rating and/or vote weight associated with a voter(s) and/or a profile(s), a category(ies), keyword(s), etc. is recorded. Information of a rating(s) and/or ranking(s) associated with item(s) such as a search result(s), a search resource(s), an advertisement(s), etc. is recorded and updated. Control is passed to operation 1405 and process 1400 continues.

FIG. 14A illustrates a notification process utilizing a notification table such as the notification table 1350a. A notification table ID is assigned to the notification table 1350a as indicated in the notification table ID field 1352a of the notification table 1350a. When the notification table 1350a is created, the notification indicator field 1365a, and an availability indicator field 1370a indicate the notification status and the availability status respectively of the selected reviewers at an initial time, t1. Likewise, the guide ID and the guide rank are indicated in the notification table guide ID field 1355a and the notification table guide ranking field 1360a.

As guides are notified of a task, the notification indicator field 1365a is modified to indicate the notification status of guides at a later time, t2. As illustrated in FIG. 14A, the notification status of the guides 'Guide2' and 'Guide3' have been set to 'Yes' to indicate that 'Guide2' and 'Guide3' have been notified of a task. As each guide may be allowed a time interval in which to respond to a task, a lower ranking guide such as 'GuideN' may not be notified at the time t2 although the guide is available for the task 'Review1Request2'.

As the availability status of guides may change, 'Guide1' may become available at a time t3 which is later than t2 as indicated in the availability indicator field 1370a. In such a case, 'Guide1' will be notified before 'GuideN' due to the higher ranking of 'Guide1'.

At some later time, t4, all available guides may have been notified, as indicated in the notification indicator field 1365a of the notification table 1350a. In such a case, a new notification table 1350b may be created as indicated by the notification table ID field 1352b. The notification table guide ID field 1355b may include one or more guides who have previously been notified, as indicated in the notification indicator field 1365b. A guide who has been previously notified may not be notified again. A higher ranking guide as indicated in the notification table guide ranking field 1360b such as 'Guide0' who has been included in the notification table 1350b may be notified first. A lower ranking guide such as 'Guide4' who has become available as indicated in the availability indicator field 1370b and was not previously notified as indicated in the notification indicator field 1365b may not be notified until higher ranking guides such as 'Guide0' and 'Guide5', for example, have been notified of a task associated with the notification tables 1350a and 1350b. The persistence of the notification indicator associated with a task which is associated with a notification table may improve the quality of the persons, who may be guides or other voters who are assigned to a task while avoiding notifying the same person multiple times of a task.

As previously mentioned, the process 1300 (FIG. 13) and the process 1400 (FIG. 14) may be used to create a notification table which may be used to determine an order in which a result(s) are presented to a reviewer such as a guide. For example, if there are multiple tasks available which are associated with a category(ies) and a guide(s), the tasks may be ranked based on a ranking(s) of a category(ies) and a guide(s).

The guide may be notified of a task in an order based at least in part on a rating(s) associated with a guide and/or associated with the task based on a category(ies) associated with the guide and the task. For example, a status of a task may be modified based on a system condition(s) when a number of available tasks associated with a guide is less than a value set, and a new notification table of tasks for the guide may be created. While the example of review of an item by guide is used for the purpose of illustration, the process 1400 may be used for any type of review process which may be performed by users, resources, requests and/or guides.

Figure 15:
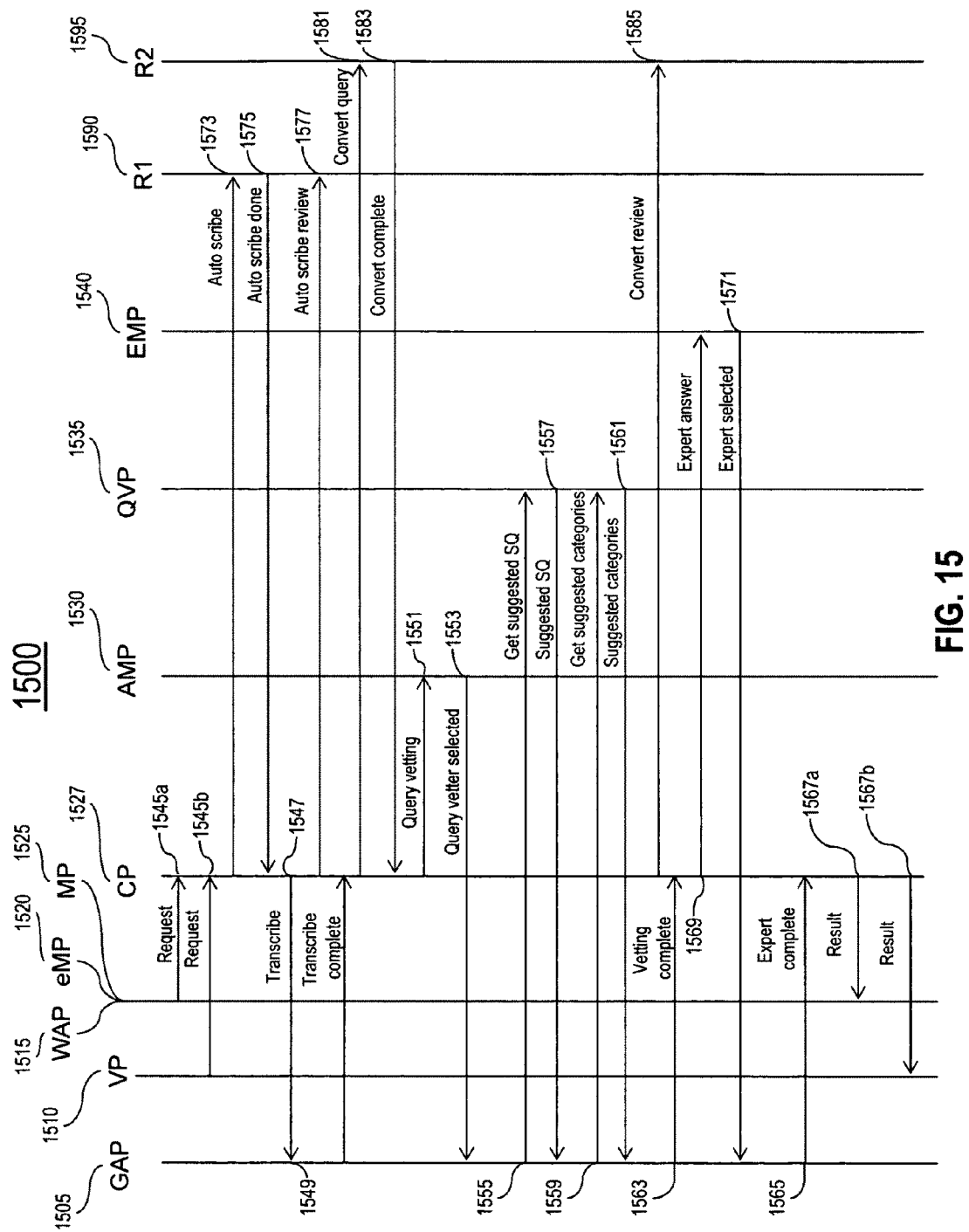
FIG. 15 illustrates a communication flow diagram.

As illustrated in FIG. 15 an exemplary message flow diagram is provided. The message flow diagram describes communication(s) between various processes which may be operative on elements of the system 100 (FIG. 1). The embodiment associated with the message flow diagram 1500 (FIG. 15) may employ human assistant(s) in various ways. For example, a guide who may receive a free-form query from a user may be referred to as an 'ambassador' when performing the task of processing a user request in order that it may be further processed. Similarly, a guide who may convert and/or review conversion of a speech query to a text query may be referred to as a 'transcriber', a guide who receives a processed request and may perform an information search and/or other activity(ies) in order to respond to the request may be referred to as an 'expert'. While various types of labels may be used to refer to a guide(s) based on the type of activity which the guide is performing, it is envisioned that any guide might perform an activity(ies) associated with any label(s) and/or type of activity. The use of the labels 'transcriber', 'ambassador' or 'expert' are used for the purposes of illustration and do not per se constrain the activity(ies) which may be performed by any guide(s).

Using the example illustrated in FIG. 15, processes which may send information to and/or receive information from a user are illustrated in the message flow diagram 1500. A messaging process (MP) 1525, which may receive and/or send information via a messaging service(s) such as SMS, MMS, EMS, IM, etc, may receive text and/or other media associated with a user request is provided. A web application process (WAP) 1515 which may receive and/or send information via any web-based communication service is provided. An email process (eMP) 1520, which may receive and/or send information via an email service using protocols such as SMTP, etc. is provided. A voice process (VP) 1510, which may receive and/or send information via a voice service using protocols such as SMTP, Simple Object Access Protocol (SOAP), etc. is provided. Any number and/or types of processes which may receive information of a request(s) and/or return a result(s) may be provided to allow the search system 130 (FIG. 1) to communicate with a user(s), a guide(s), and/or a resource(s). A control process (CP) 1527 which manages communication between the VP 1510, WAP 1515, eMP 1520, MP 1525, and other processes is provided.

A request message 1545 such as the request messages 1545a and 1545b may be received by the CP 1527. The CP 1527 may determine that additional processing may be required responsive to a request. For example, a request received from the VP 1510 may include information which may need to be transcribed. The 'transcribe' message 1547 which may include information of a transcription activity may be passed to the guide application process (GAP) 1505 which may perform a transcription, and may return information of the transcription to the CP 1527 via the 'transcribe complete' message 1549. The processing by the GAP 1505 may be performed entirely automatically and/or using the assistance of a guide(s).

A request message may require that a query be vetted (i.e., form a structured and/or categorized query) by an ambassador. The query vetting message 1551 may transmit information regarding a query to be vetted to the ambassador management process (AMP) 1530. The AMP 1530 may select an ambassador who may perform the query vetting process. The 'query vetter selected' message 1553 may include information of a request and a selected ambassador which may be provided to the GAP 1505, which may perform a vetting process, and may return information of the vetting process to the CP 1527 via the 'vetting complete' message 1563. The processing by the GAP 1505 may be performed automatically and/or using the assistance of a guide(s). The GAP 1505 may communicate with the query vetting process (QVP) 1535. As a structured query is formed and/or categorized, information of a structured query may be communicated to the QVP 1535 via the 'get suggested SQ' message 1555, which may respond to the GAP 1505 with a suggested structured query(ies) via the 'suggested SQ' message 1557. Likewise, as a structured query is formed and/or categorized, information of a structured query may be communicated to the QVP 1535 via the 'get suggested categories' message 1559, which may respond to the GAP 1505 with a suggested category(ies) via the 'suggested categories' message 1561.

A vetting complete message such as the 'vetting complete' message 1563 may cause a request that a guide or expert respond to a vetted query to be generated. The CP 1527 may transmit information of a request to the expert management process (EMP) 1540. For example the 'expert answer' message 1569 may include information of a request, a vetted query, etc. The 'expert selected' message 1571 may include information of a request, and of an expert(s) selected to respond to the request, which is provided to the GAP 1505. Information of a result(s) provided by a guide or expert may be provided to the CP 1527 by the GAP 1505 via the 'expert complete' message 1565. The processing by the GAP 1505 may be performed entirely automatically and/or using the assistance of a guide(s).

Information of a result(s) may be provided to a process(es) such as the VP 1510, WAP 1515, eMP 1520, MP 1525 via a 'result' message 1567, such as the 'result' messages 1567a and 1567b. Information provided via the result message 1567 may be provided to a user(s) via a process(es) such as the VP 1510, WAP 1515, eMP 1520, and MP 1525. While a few types and instances of processes are used in FIG. 15 for the purposes of simplicity and illustration, no limitation is implied thereby. Any number or types of processes may be provided in order to operate the embodiments.

Continuing with the example illustrated in FIG. 15, communications with resource systems such as the resource system 'R1' 1590 which might perform a process such as transcription, and the resource system 'R2' 1595 which might perform a process such as conversion of a free form query to a structured query may occur as part of the processing of a request. For example, the 'auto scribe' message 1573, which might include information such as an audio recording, may be transmitted to the resource system 'R1' 1590 by the CP 1527 responsive to the request message 1545b. The resource R11590 might respond with the 'auto scribe done' message 1575, which might include information of, for example, text produced by a transcription process or other activity performed by the resource 'R1' 1590. Subsequent to review by a human assistant as indicated by the 'transcribe complete' message 1549, a message such as the 'auto scribe review' message 1577, which may include information relating to a review provided by a human assistant may be transmitted by the CP 1527 to the resource "R1' 1590.

Similarly a resource system such as the resource "R2' 1595 might receive a message such as the 'convert query' message 1581, which might include information of a free-form query associated with a request from the CP 1527. The resource system 'R2' 1595 might respond with a message such as the 'convert complete' message 1583 which might include information of a result(s) produced by the resource 'R2' 1595. Subsequent to completion of the query vetting process as indicated by the 'vetting complete' message 1563, the CP 1527 might transmit the 'convert review' message 1585, which might include information of a human-assisted review to the resource 'R2' 1595.

While specific examples of types of processing, and a specific sequence of messaging and operations have been used in the description relating to FIG. 15 for the purposes of simplicity and illustration, no limitation is implied thereby. Any number of processes, messages and resources, and any information may be exchanged between elements of the system 100 (FIG. 1) in order to operate the embodiments.

Figure 16:
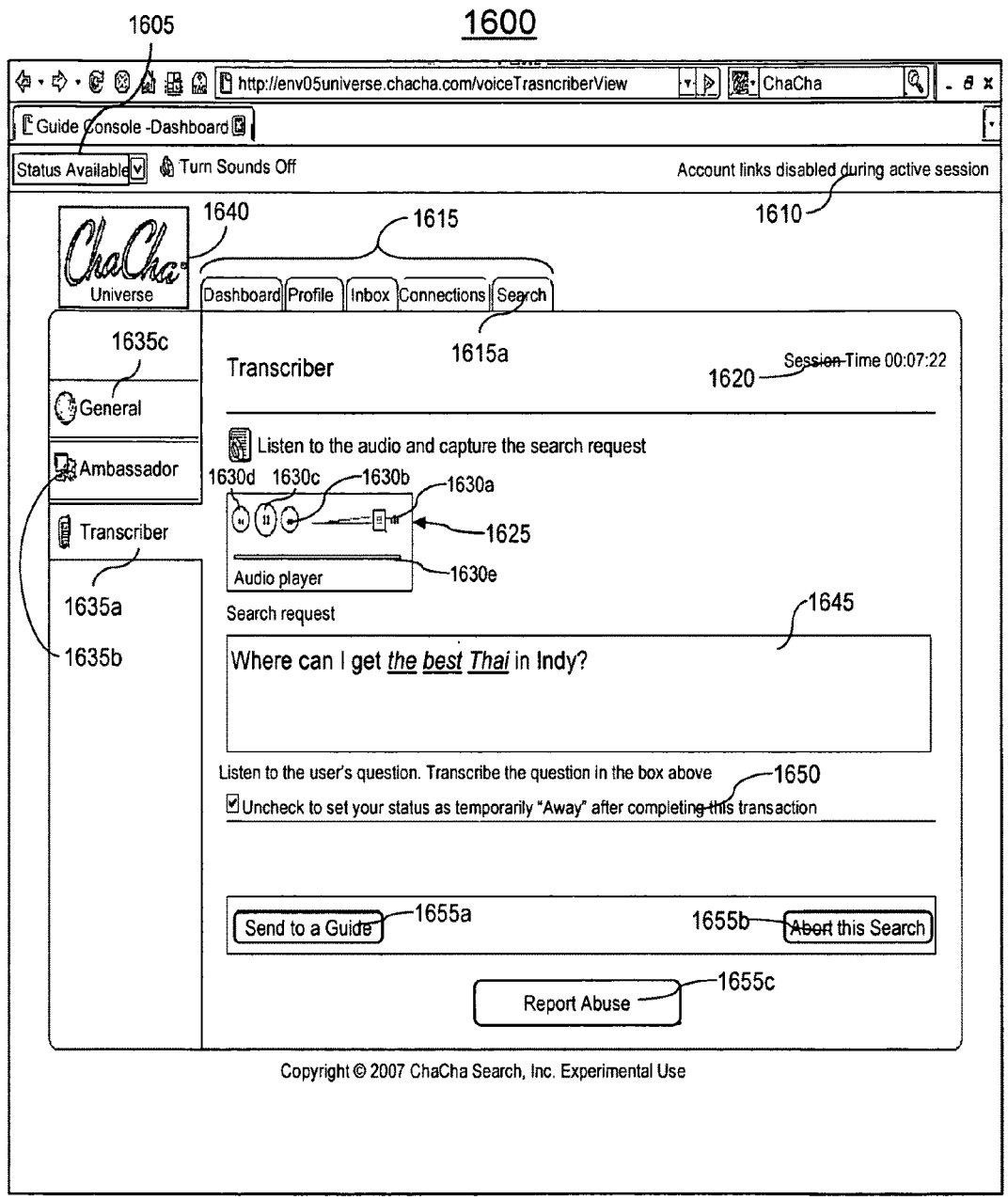
FIG. 16 illustrates a graphical user interface (GUI) for processing speech and text.

A GUI 1600 for transcription of a spoken query to a text query is illustrated in FIG. 16. The GUI 1600 may be presented to a guide and/or a transcriber responsive to a request. The GUI 1600 may include a status indicator 1605, an activity indicator 1610, selection tabs 1615, a session time indicator 1620, a media player 1625, media review controls 1630, role indicators 1635, an advertisement window 1640, a transcribed query box 1645, a status change control 1650, and action controls 1655.

The status indicator 1605 may be used to indicate the current status of a guide. A guide may elect to be available or unavailable for an activity(ies) by selecting a status using the status indicator 1605. If a guide is currently engaged in an activity, the status indicator 1605 may indicate that the guide is unavailable. The activity indicator 1610 may indicate an activity which may be available. Using the example illustrated in FIG. 16, the activity indicator 1610 shows that other activities are not available to the guide during a transcription session.

The selection tabs 1615 may be used to select and/or indicate an activity for a guide. The selection tabs may be active or inactive depending on the status of a guide operating the GUI 1600. For example, the 'Search' tab 1615a may only be active during a search activity by a guide. Any number of selection tabs may be provided for guide activities to be selected.

The session time indicator 1620 may be used to indicate time information regarding an activity. As illustrated in FIG. 16, time information in hours, minutes and seconds which a transcriber has spent transcribing a query is indicated in the session time indicator 1620.

The media player 1625 may be used to provide playback of content. The media player 1625 may control playback of audio, video or any type of media which may be transcribed. The media player 1625 may include media review controls 1630. Using the example illustrated in FIG. 16, the volume control 1630a may be used to adjust the audio playback level, the forward button 1630b may be used to speed up or to skip forward within a recording, the pause/play control 1630c may be used to pause and resume playback of a recording, the reverse button 1630d may be used to search or to skip backward within a recording, and the index slider 1630e may be used to move to a location within a recording by 'dragging' the indicator to a location.

The role indicators 1635 may be used to indicate a type of activity. For example, if a guide is performing an activity such as transcription, the 'Transcriber' role indicator 1635a may be active as indicated by for example the tab being associated with the current GUI, or using a color indicator, or other type of indication. The 'Ambassador' role indicator 1635*b* may be active during an activity related to query processing, and the 'General' role indicator 1635*c* may be active during information search activities. Any number of role indicators 1635 may be provided.

The advertisement window 1640 may be used to present an advertisement and/or other information. Content of the advertising window 1640 may be modified based on other information in the GUI 1600. For example, a category and/or keywords of a transcribed query may cause information presented in the advertising window 1640 to be modified. More than one advertisement window 1640 may be included in a GUI 1600. A guide may elect to send information indicated in the advertisement window 1640 to a user(s) associated with a query which is being transcribed.

The transcribed query box 1645 may include information of a transcribed query. In at least one embodiment, information of a transcription produced by a guide(s) and/or a resource may be presented in the transcribed query box 1645. For example, information of a result(s) produced by a resource such as an automated speech to text system(s) may be displayed in the transcribed query box 1645 which may be modified and/or confirmed. Alternately, information of a transcription performed by a guide may be presented in the transcribed query box 1645, which may be modified and/or confirmed. In other instances, text of a transcribed query may be entered in the transcribed query box 1645.

The status change control 1650 may be used to indicate that a status change is to be made after completion of a task. Using the example illustrated in FIG. 16, if the check box in the status change control 1650 is deactivated, the status of the guide will be changed to 'Away' after a current task is completed.

The action controls 1655 may be used to take actions regarding information obtained using the GUI 1600. The 'Send to a Guide' action control 1655*a* may be used to indicate that a transcription task is complete and may be submitted to a guide for a search. The 'Abort This Search' action control 1655*b* may be used to indicate that a transcription task is to be ended and sent to another transcriber. The 'Report Abuse' action control 1655*c* may be used to indicate that a query associated with a transcription task is inappropriate and should not be transcribed.

Figure 17:
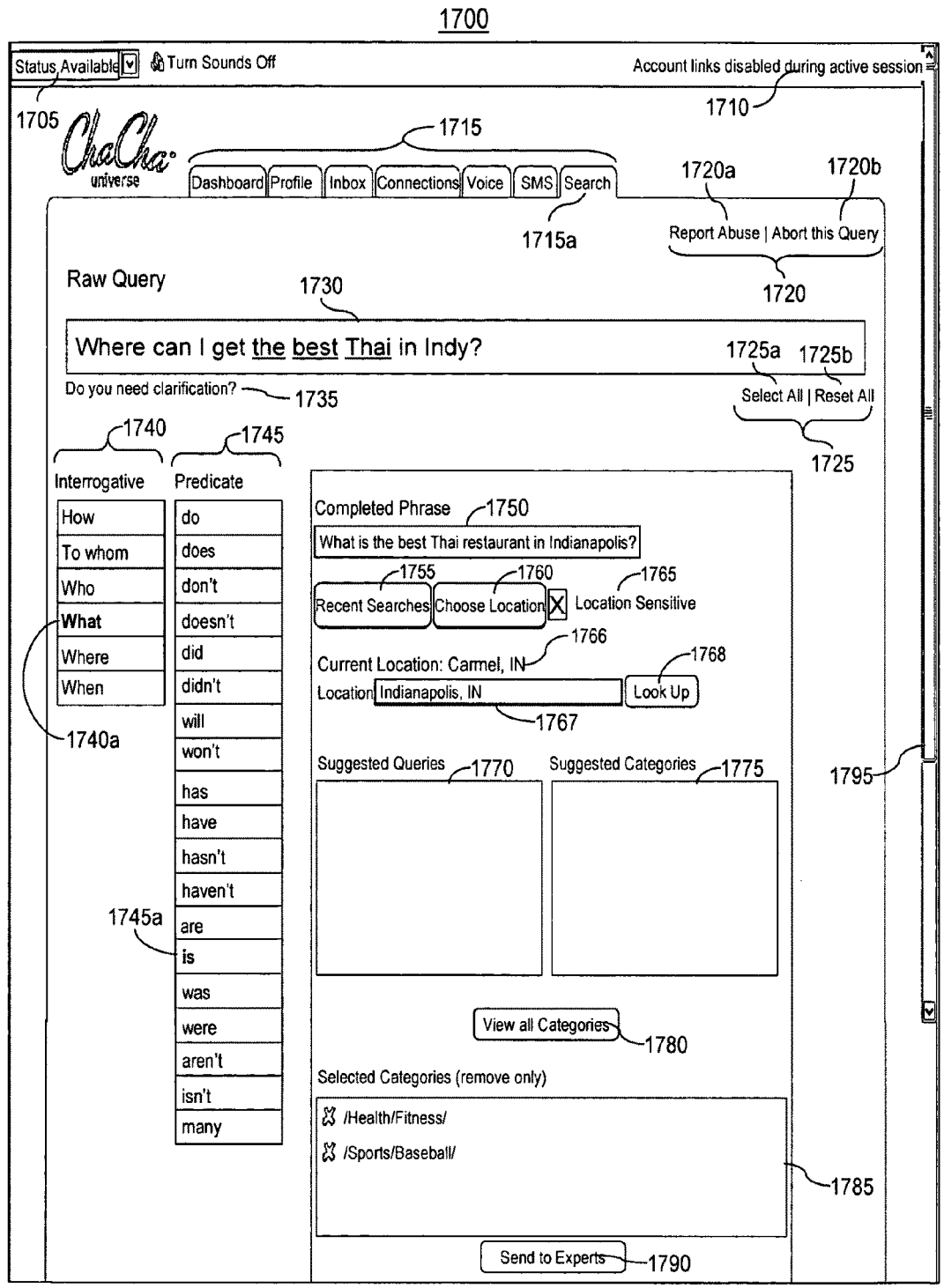
FIG. 17 illustrates a GUI for processing a request.

A GUI 1700 for construction of a structured or vetted query and associating a category(ies) with a vetted query is illustrated in FIG. 17. The GUI 1700 may be presented to a guide responsive to a search request. The GUI 1700 may include a status indicator 1705, an activity indicator 1710, selection tabs 1715, session controls 1720, query controls 1725, a raw query box 1730, a clarification control 1735, an interrogative selection control 1740, a predicate selection control 1745, a structured query box 1750, a recent searches control 1755, a location selection control 1760, a location relevance indicator 1765, a current location indicator 1766, a location search box 1767, a location search button 1768, a suggested queries window 1770, a suggested categories window 1775, a category viewing control 1780, a selected categories window 1785, an expert search control 1790 and navigation controls 1795.

The status indicator 1705 may be used to indicate the current status of a guide. A guide may elect to be available or unavailable for an activity(ies) by selecting a status using the status indicator 1705. If a guide is currently engaged in an activity, the status indicator 1705 may indicate that the guide is unavailable. The activity indicator 1710 may indicate an activity which may be available. Using the example illustrated in FIG. 17, the activity indicator 1710 shows that other activities are not available to the guide during a query vetting session.

The selection tabs 1715 may be used to select and/or indicate an activity for a guide. The selection tabs may be active or inactive depending on the status of a guide operating the GUI 1700. For example, the 'Search' tab 1715*a* may only be active during a search activity by a guide. Any number of selection tabs may be provided for guide activities to be selected.

The session controls 1720 may be used to take action(s) regarding a search session which is in progress. The 'report abuse' control 1720*a* may be used to indicate that a query is not within allowed parameters of the system. Activation of the 'report abuse' control 1720*a* may close a search session and send a report to system administrators. The 'Abort this query' control 1720*b* may be used to indicate that a session is to be halted. Activation of the 'Abort this query' control 1720*b* may cause the search session to be closed and/or transferred to another guide.

The query action controls 1725 may be used to take action(s) regarding elements of the query indicated in the raw query box 1730. The 'Select All' control 1725*a* may be used to select all of the elements of the query. The 'Reset All' control 1725*b* may be used to unselect all elements of the query.

The raw query box 1730 may include information of element(s) of a raw query. Any element of a raw query may be transferred to the structured query box 1750. For example, clicking on an element in the raw query box 1730 may transfer that text to a location in the structured query box 1750. Using the example in FIG. 17, the underlined words 'the', 'best' and 'Thai' included in the raw query box 1730 have been selected and transferred to the structured query box 1750.

The clarification control 1735 may be used to request clarification of a raw query from a user. Activation of the clarification control 1735 may cause a message(s) to be transmitted to a user who has submitted a search request who may provide additional information to clarify the content of a search request.

The interrogative selection controls 1740 may be used to select an interrogative expression which may be added to the structured query box 1750. For example, by clicking on an interrogative selection control such as the interrogative selection control 1740*a*, the interrogative 'What' may be transferred to the structured query box 1750.

The predicate selection controls 1745 may be used to select a predicate which may be added to the structured query box 1750. For example, by clicking on the predicate selection control 1745*a*, the predicate 'is' may be transferred to the structured query box 1750.

The structured query box 1750 may be used to enter and review text of a structured query. As information is added to the structured query box 1750, a search may be preformed of a database of categories and/or structured queries which may be displayed in the suggested queries box 1770 and/or the suggested categories box 1775.

The recent searches control 1755 may be used to review recent search activities associated with a user who has submitted a search request. Activation of the recent searches control 1755 may cause information of search activity associated with a user to be provided using a GUI such as the GUI 2000 illustrated in FIG. 20.

The location selection control 1760 may be used to select a location to be associated with a structured query. Activation of the location selection control 1760 may cause a GUI for selection and/or confirmation of location information associated with a request such as the GUI 1900 illustrated in FIG. 19 to be presented. The location relevance indicator 1765 may be used to indicate whether a location is relevant to a search request. By activating the location relevance indicator 1765, as indicated by the check mark in the location relevance indicator 1765, a selection of a guide(s) to respond to a query may be modified based on geographic information associated with a search request. Likewise, ratings of a resource(s), and advertisement(s), etc. which may be selected responsive to a search request may be modified based on geographic information associated with a search request.

The current location indicator 1766 may indicate a location associated with a user who has submitted a search request. For example, geographic information regarding the current location of a user may be displayed in the current location indicator 1766. A guide and/or a user may provide geographic information associated with a search request, the system 100 (FIG. 1) may associate location information with a request based on information of a request including but not limited to content, user communication information associated with the request, etc. The location search box 1767 may be used to enter a search term which may be compared to a database of locations. The location search button 1768 may be used to initiate a search for a location indicated in the location search box 1767.

The suggested queries box 1770 may display a list of structured queries. Suggested queries may be displayed based on a ranking of queries in a database of structured queries based at least in part on the content of the structured query box 1750. For example, previous structured queries of similar content may be suggested in the queries box 1770. A structured query may be selected by for example clicking on the query displayed in the suggested queries box 1770.

The suggested categories box 1775 may display a list of categories. Suggested categories may be displayed based on a ranking of categories in a database of categories based at least in part on the content of the structured query box 1750. A category may be selected by for example clicking on the category displayed in the suggested categories box 1775.

The category viewing control 1780 may be used to view a list of categories. Activation of the category viewing control 1780 may cause a GUI for selection of a category to be provided.

The selected category window 1785 may be used to display information of categories which have been selected to be associated with a structured query. A category may be removed from the selected category window 1785 by for example clicking on the indicator of the category in the selected category window 1785.

The expert search control 1790 may be used to submit a vetted query for a search by a guide. If a selected vetted query is associated with an answer(s) activation of the expert search control 1790 may cause a search result(s) to be returned to a user(s). The navigation controls 1795 may be used to scroll and navigate through the content of the GUI 1700.

As previously mentioned herein above, a location may be associated with a query or request. The location relevance indicator 1765 may be used to indicate that location may be relevant to a query. A location may be associated with a query automatically. In at least one embodiment, location information provided by a service provider associated with a device such as GPS information, triangulation information, and/or other information available to a service operator is a primary designator of location information associated with a request. In at least one embodiment, a user may specify a location associated with the user which may be used to determine a location associated with a request. For example, a user may transmit an SMS message to the search system 130 (FIG. 1) which contains information which indicates a location, a voice message may provide information of a user location, an email, an IM, an image, or any other type of information may be provided by a user to establish a location associated with a user.

In at least one embodiment, information indicated in a search history or search log(s) may be provided to a guide in order to assist in associating a location with a query, as is further described herein below.

Figure 18:
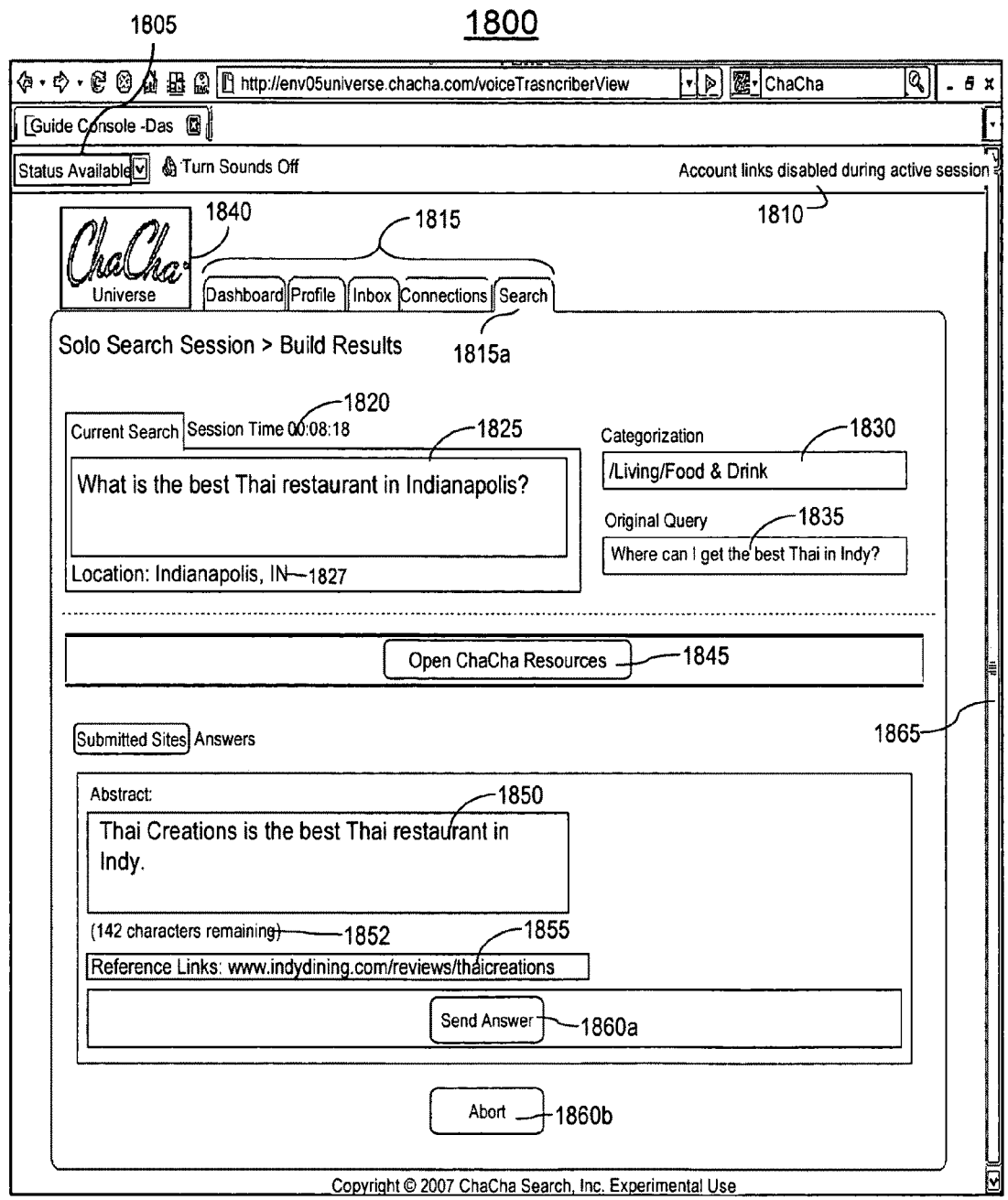
FIG. 18 illustrates a GUI for processing a request

A GUI 1800 for responding to a search request is illustrated in FIG. 18. The GUI 1800 may be presented to a guide or expert responsive to a search request. The GUI 1800 may include a status indicator 1805, an activity indicator 1810, selection tabs 1815, a session time indicator 1820, a query box 1825, a location indicator 1827, a categorization indicator 1830, an original query indicator 1835, an advertisement window 1840, a resource activation control 1845, an answer indicator 1850, a reference link indicator 1855, action controls 1860 and navigation controls 1865.

The status indicator 1805 may be used to indicate the current status of a guide. A guide may elect to be available or unavailable for an activity(ies) by selecting a status using the status indicator 1805. If a guide is currently engaged in an activity, the status indicator 1805 may indicate that the guide is unavailable. The activity indicator 1810 may indicate an activity which may be available. Using the example illustrated in FIG. 18, the activity indicator 1810 shows that other activities are not available to the guide during a transcription session.

The selection tabs 1815 may be used to select and/or indicate an activity for a guide. The selection tabs may be active or inactive depending on the status of a guide operating the GUI 1800. For example, the 'Search' tab 1815a may only be active during a search activity by a guide. Any number of selection tabs may be provided.

The session time indicator 1820 may be used to indicate time information regarding an activity. As illustrated in FIG. 18, the time in hours, minutes and seconds spent responding to a query is indicated in the session time indicator 1820.

The query box 1825 may be used to provide information of a search query which may have been vetted by a guide. Using the example illustrated in FIG. 18, the query 'What is the best Thai restaurant in Indianapolis?' is presented in the query box 1825. The location indicator 1827 may be used to provide information of a location associated with a search request. The location indicator 1827 may be used to modify a location associated with a query. The categorization indicator 1830 may be used to provide information of a categorization associated with a query or search request. The categorization indicator 1830 may be used to modify a categorization associated with a query.

The original query indicator 1835 may be used to provide information of an original query. For example, a text transcription and/or a media player such as the media player 1625 (FIG. 16) and/or any type of information associated with a search request may be provided in the original query indicator 1835.

The advertisement window 1840 may be used to present an advertisement and/or other information. Content of the advertising window 1840 may be modified based on other information in the GUI 1800. For example, a category or keywords of a query and/or an answer or search result may cause information presented in the advertising window 1840 to be modified. More than one advertisement window 1840 may be included in the GUI 1800. A guide may elect to send information indicated in the advertisement window 1840 to a user(s) associated with a query.

The resource activation control 1845 may be used to submit a search query to a resource(s) and/or provide information of a resource(s) which may be used to produce a search result(s). For example, a browser window which may include indicators of a resource(s) associated with a category and/or keyword(s) associated with a query may be provided if the resource activation control 1845 is activated. Although "ChaCha Resources" are described with the resource activation control 1845 in FIG. 18, the present invention is not limited to any particular resource(s).

The answer indicator 1850 may be used to provide information of an answer which may be provided responsive to a request or search query. Information obtained using any resource(s) available to the system 100 (FIG. 1) may be indicated in the answer indicator 1850. For example, a guide may select text from a web page and/or enter text in the answer indicator 1850. The constraint indicator 1852 may indicate a constraint(s) placed on an answer. Using the example illustrated in FIG. 18, the constraint indicator 1852 may be used to indicate a remaining number of characters which are allowed to be included in the text in the answer indicator 1850.

The reference link indicator 1855 may include information of a resource(s) and/or websites associated with an answer indicated in the answer indicator 1850. Using the example illustrated in FIG. 18, the link 'www.indydining.com/reviews/thaicreations' is indicated in the reference link indicator 1855.

The action controls 1860 may be used to take actions regarding information obtained using the GUI 1800. The 'Send Answer' action control 1860a may be used to indicate that a search task is complete, and a result may be utilized. The 'Abort' action control 1860b may be used to indicate that a search task is to be ended and might cause the request to be sent to another searcher(s). The navigation controls 1865 may be used to scroll and navigate through the content of the GUI 1800.

A GUI 1900 illustrated in FIG. 19 may be used to select a location. The GUI 1900 may include a location name indicator 1905, a location detail information indicator 1910, and a close control 1915.

The location name indicator 1905 may present information of a name associated with a location. The order of presentation of names in the location name indicator 1905 may be based on a ranking of elements of a database of locations based on location information which has been associated with a search request. A location may be selected by for example clicking on a location name indicator associated with the location. Using the example illustrated in FIG. 19, clicking on the location name indicator 1905a may cause the location 'Clair Mel' to be selected.

The location detail indicator 1910 may present information associated with a location name indicated in the location name indicator 1905. The content of the location detail indicator 1910 may be used to determine a location associated with a name which may be included in a search request. Using the example illustrated in FIG. 19, 'Tampa Fla.' is the location detail associated with the location detail indicator 1910a. The close control 1915 may be used to close the GUI 1900 and record information obtained. While a few examples and a specific type of geographic information have been illustrated in FIG. 19, it is anticipated that any type(s) of geographic information which might be associated with a query may be presented using a suitable interface. For example, a search facility might be provided in an interface which might enable a search of any geographic information which may be associated with a user(s) and/or a query(ies). For example, a keyword(s) associated with a search history of a user(s) might be used to determine geographic information which might be included in a search result(s) of geographic information which might be associated with a request. Likewise, geographic information associated with a user(s) who have submitted a request(s) which include information associated with a request(s) may be included in a search result(s) of geographic information which might be associated with a user(s) and/or a request(s).

A GUI 2000 illustrated in FIG. 20 may be used to review a search history associated with a search request. The GUI 2000 may include a history content indicator 2025, a historical question indicator 2005, a historical answer indicator 2010, a historical answer URL control 2015, a historical answer time stamp 2020 and navigation controls 2030. Any number of historical question indicators, historical answer indicators, historical answer URL controls, and historical answer time stamps may be indicated in the GUI 2000.

A history content indicator 2025 may be used to indicate the type of search history which is being presented. A search history may be stored based on a user, a location, a category, and/or other information. Using the example illustrated in FIG. 20, the username 'bryank' is indicated in the history content indicator 2025. This may for example indicate that the history is associated with the user 'bryank'.

The historical question indicator 2005 indicates a search query. The historical question indicator 2005 may include an indicator of a raw query and/or a structured query associated with a historical search and/or other information regarding a historical search request. Using the example illustrated in FIG. 20, 'external 500 Gb hard drive' is associated with the historical question indicator 2005a and the historical question indicator 2005b.

The historical answer indicator 2010 indicates a search result. For example, text of an answer provided responsive to a request may be included in the historical answer indicator 2010. The historical answer indicator 2010 may include an indicator of an answer associated with a historical search and/or other information regarding a historical search. Using the example illustrated in FIG. 20, 'WD My Book Essential Edition External 500 GB Hard Drive' is associated with the historical answer indicator 2010a and the historical answer indicator 2010b.

The historical answer URL control 2015 indicates a URL. The historical answer URL control 2015 may include an indicator of a URL associated with a historical search and/or other information regarding a historical search. Using the example illustrated in FIG. 20, 'http://computers.pricegrabber.com/hard-drives' is associated with the historical answer URL control 2015a.

The historical answer time stamp 2020 indicates a time stamp. The historical answer time stamp 2020 may include an indicator of a time stamp associated with a historical search and/or other information regarding a historical search. Using the example illustrated in FIG. 20, '2:48 pm' is associated with the historical answer time stamp 2020a and the historical answer time stamp 2020b.

The navigation controls 2030 may be used to scroll and navigate through the content of the GUI 2000. While a limited set of data and types of data which may be included in a search log(s) are illustrated with respect to the GUI 2000, no limitation is implied thereby. It is envisioned that any information associated with a search log indicated in the database 120 may be presented using the GUI 2000 and/or other suitable interface(s) in order that a person may select information which may be associated with a request(s).

While the GUIs described herein have been described using specific examples of interface elements, no limitation is implied thereby. The GUI's may be implemented using any interface elements which may accomplish the functionalities which are well known in the art may be used without departing from the scope and spirit of the embodiments herein. Any or all of the elements of the GUIs described herein may be suppressed as needed to operate the embodiments.

Using the GUIs described herein, information may be obtained and processed. A guide may perform one or more processes using a GUI such as the GUIs described herein above. While the GUIs 1600 (FIG. 16), 1700 (FIG. 17), and 1800 (FIG. 18) have been described in the context of performing specific tasks, any or all information provided in the GUIs may be produced and/or provided by one or more resources, and a guide may confirm and/or correct information using the GUIs.

Figure 21:
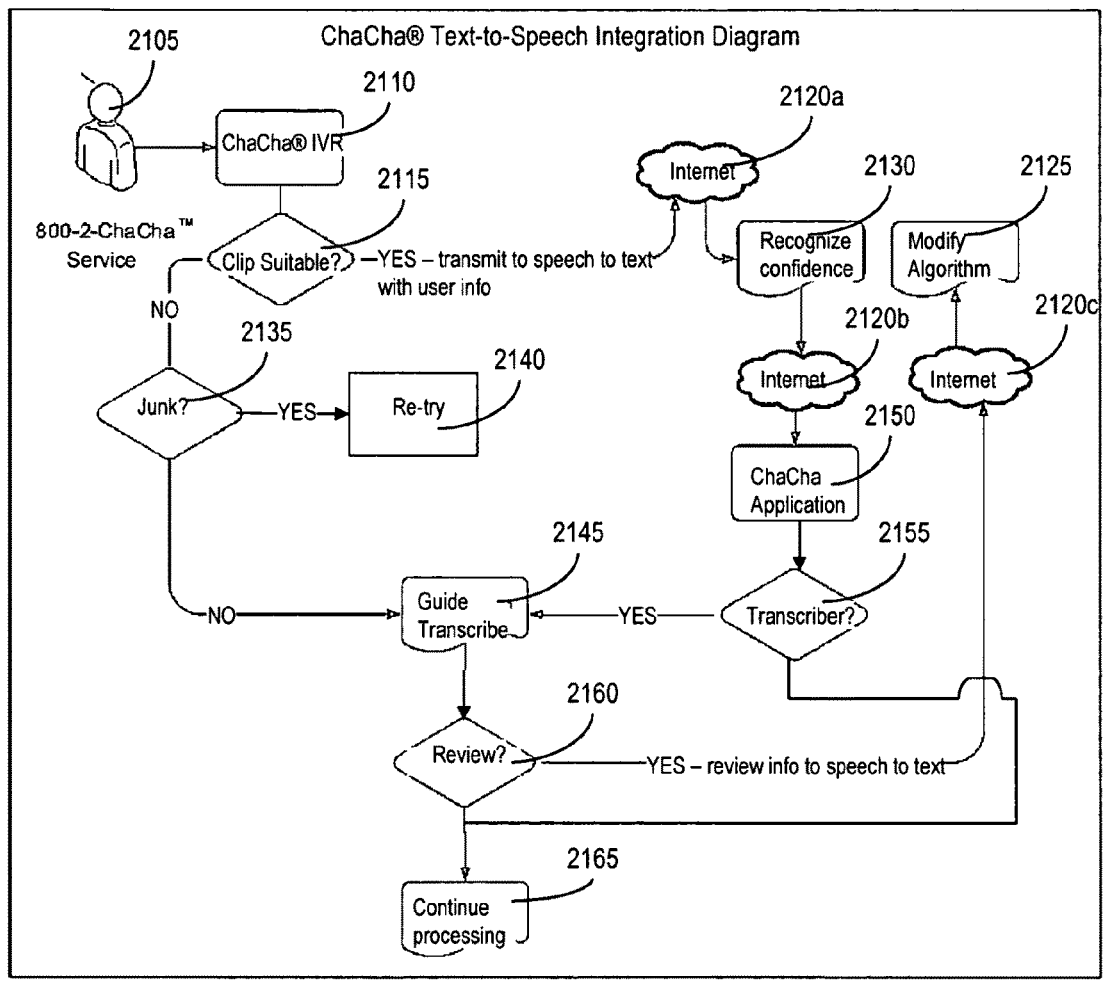
FIG. 21 illustrates an alternate embodiment of search operation(s).

An embodiment 2100 wherein a speech to text system resource(s) may be enhanced using the operations described herein is illustrated in FIG. 21.

The user 2105 may submit a spoken query using any service(s) associated with the user. For example, the user might access the 1-800-2CHACHA™ service. The query is received at a front-end processor 2110, which may be an interactive voice response (IVR) system. The front-end processor 2110 may receive a spoken query(ies) from the user 2105. Information of a request may be provided to an audio clip processor 2115, for example, which makes a determination as to whether the audio information or 'clip' is suitable for speech to text processing. For example, a guide and/or an automated system may analyze factors such as the length, average sound power level (APL), signal to noise (SNR), etc. and/or a person may listen to the content of the audio. If it is determined that the clip is suitable for speech to text conversion, the audio content of the query, along with any information associated with the query such as an identifier of a user, historical audio clips, demographic and/or geographic and/or other profile information may be transmitted to the speech recognition resource 2130 using the network 2120a, which may be a public network of networks, and/or consist in whole or in part of a private network(s). If it is determined that the clip is not suitable for speech recognition processing, the clip may be transmitted to a junk determination processor 2135.

The speech recognition resource 2130 may process information associated with the request, and may respond with a result(s) of the processing, which may include a text based on the audio information and/or a confidence factor associated with the text using the network 2120b. The response may be received by a query processing resource such as the query processing resource 2150 (i.e., 'ChaCha Application'). The query processing resource 2150 may pass information to a transcription determination processor 2155. The transcription determination processor 2155 may determine whether a human assistant is to be employed to review the response information received from the speech recognition resource 2130. If the transcription selection processor 2155 determines that a human assistant is to be employed, information of the response and/or the request may be transmitted to a guide transcription resource 2145. If the transcription determination processor 2155 determines that a human assistant is not to be employed, information of the query and/or the result(s) provided by the speech recognition resource 2130 may be provided to a query processor 2165.

The junk determination processor 2135 determines whether audio or other information associated with a request is not suitable for further processing. For example, a person may listen to audio while being provided with other information associated with a query, such as user information, which may be used to determine if the information is suitable for further processing. If it is determined that the information is not suitable for further processing, information of the query may be passed to a retry processor 2140, which may further process the request. For example, the retry processor 2140 may send a message(s) to the user 2105 requesting further information and/or informing the user that a query was not processed. If the junk determination processor 2135 determines that a query is suitable for further processing, information of the query may be transmitted to the guide transcriber processor 2145. The guide transcriber processor 2145 may select and/or present information of a query to a guide, or human assistant. Information of the transcription request is transmitted from the guide transcriber processor 2145 to the review processor 2160.

The review processor 2160 may determine whether information is to be transmitted to an algorithm modification processor 2125. If the review processor 2160 determines that information is to be transmitted to the algorithm modification processor 2125, information of the review which may include information of the reviewer and/or the user may be transmitted to the algorithm modification processor 2125 via the network 2120c. The algorithm modification processor 2125 may modify the algorithm and/or parameters utilized by the speech recognition resource 2130 in the process of converting speech to text. The review processor 2160 may pass information of the request to the query processor 2165. The query processor 2165 may perform any other processing of information associated with a request, and may provide a response(s) to the user 2105. Information associated with the processing of a query may be stored in a database (not shown) such as the database 120 (FIG. 1).

The system 100 (FIG. 1) allows any type of request to receive a response, as a human assistant may review any result(s) which may be produced automatically if the system determines that such a review and/or action may be needed. Likewise, the system 100 may provide information regarding processing which may have been performed by one or more guides and/or resources based on information indicated in the database 120. Information in the database 120 may be used to improve the capability of any resource(s) which may become available to the system 100. For example, if a resource is able to assist a guide(s) and/or perform processing which may respond to any sort of request, information indicated in the database may be provided in order to evaluate the capability of a resource(s). As such a resource might perform activities including, but not limited to transcription, interpretation, translation, conversion, recognition, identification, tagging, categorization, classification, extraction, etc.

While specific examples of information to be processed and results of a process(es) have been used for the purposes of illustration, no limitation is implied thereby. Any type of information which might be obtained, processed and/or reviewed might be provided. Further, while operations of the embodiment 2100 of FIG. 21 are explained using certain components, the invention is not limited to any particular elements. For example, any or all of the operations may be executed by a multiprocessor computer.

A method and system are described for improving utilization of system resource(s). A resource may be identified which may perform any type of information processing. Access information and a category(ies) may be associated with a resource(s), which may indicate a type of information processing which a resource may perform. A rating of a resource(s) may be obtained using information provided by a guide(s), a user(s), a resource(s) and/or a management system. A result(s) may be provided by a resource responsive to a request.

If a request is received by a management system, one or more requests associated with a request may be created. Information of a request may be provided to a resource(s) which may provide a result(s) responsive to the request. Information of a request and/or a result(s) may be provided to a guide, who may review the result. Information of a review may be provided to a resource(s) and/or third parties in order to improve utilization of a resource. A rating associated with a result and/or a guide may be utilized at least in part to select a resource and/or a guide.

Information associated with a request such as a user ID, a profile, demographic, geographic, etc. may be utilized by the search system and/or a resource. Such information may be used to improve performance and/or utilization of a resource by for example, personalizing a result provided by a resource based on information provided. Personalization may be based on information associated with an individual and/or any group of persons. For example, a group of guides and/or users might be created and/or designated based on any information indicated in the database 120 (FIG. 1).

A user may submit any type of information as any or all of a request. The system may provide an architecture whereby any types of resources which may be required to perform a type of information processing may be identified. Information of a system requirement and/or performance of a resource may be provided. For example, resources may be associated with a category, keyword or tag which identifies a type of processing and rating, usage, or other information regarding a resource may be provided for purposes such as compensation of a resource, obtaining an offer to perform processing, etc. For example, if there is a demand for a particular type of information processing, a provider of information processing services may be identified and/or requested to provide a type of processing and/or increased capacity for a type of processing.

A method for selecting and/or notifying a resource and/or a guide of available tasks is described which includes ranking available guides, resources and/or tasks in order to improve utilization and/or quality of services provided.

While the system 100 (FIG. 1) has been described in the context of a search system embodiment, no limitation is implied thereby. The system might be implemented to provide any type of information to any user, resource, guide, etc. in various embodiments. For example, the system 100 might be a transaction processing system for a financial institution which would provide the ability to process customer requests via any available access system, while preserving the anonymity and security of information associated with the customer.

Similarly, the system 100 (FIG. 1) might provide translation services to various customers. A query history, demographic information, spoken query and translation information might be provided by guides skilled in one or more languages which could be used as a basis for continuous improvement and training of automated resources which might augment the human translators and provide human translation services whenever needed on an ad-hoc basis. Likewise, the database 120 (FIG. 1) might be used to assist users in learning a new language by providing practical examples, interactions and corrections using a blend of human interpreters/transcribers and automated resources. The information provided is highly valuable to the learner, who may increase his rating and may thus be certified at a given level of proficiency versus native speakers, etc.

As previously discussed the use of system resources in a human-assisted search system is an essential element of success. Systems which utilize humans to respond to user requests have found general acceptance due to the user friendly nature of human interaction. However, the high cost of human interaction has driven many businesses to seek automation at the expense of user experience. In order to achieve a balance between user experience and cost, it is important that persons utilized to respond to user requests are provided with a toolset which may improve the speed and efficiency of processing a user request. Manpower costs may be a major component of cost in a human powered system. For this reason, a tool which allows a result to be provided with minimal time and effort would be greatly appreciated.

A tool for query processing which may improve utilization of resources is described. The query processing tool assists a person to provide a response to request rapidly while ensuring that a request is routed to an appropriate resource as the request is processed.

In a human assisted search system, a search request or search query is directed to a person who may perform an information search responsive to the search request and provide a result(s) to a user. Human assisted search systems have been implemented by companies such as AskMeNow, AnyQueryAnswered, ChaCha™ and others. For example, US Published application 20050289130 by Cohen et. al., describes a system whereby a query is received from a user device, transcribed, and a response provided to a user as a text message on the user device. Likewise US Published application 20070219987 by Meyers describes a system whereby text queries may be processed and answers returned to a user. These systems may require use of templates or other types of question formatting by users and transcribers in order to increase the percentage of queries which may be answered automatically. In particular, information contained in a query may be compared to a database of previously answered queries in order to determine whether a query may be answered automatically. In instances wherein a query is determined not to match a database of previous queries, a selection of one or more possibly related previous answers may be ranked and presented to a searcher who may select a previously provided answer or perform a search.

Such a system may locate a previous query(ies) using a matching of a raw or unprocessed query with information of previous queries and/or answers which are indicated in a system database. However, this sort of system may face difficulties. A natural language query which is a free-form request may not be easily matched to a database of previous queries. Various elements of a natural language query which may or may not be deduced from the syntax and/or equivalence tables of a target language may prevent a suitable matching of a raw user request to a result with the consequence that the efficiency, accuracy and timeliness of a response may be adversely affected.

In light of the above and other problems existing in human powered search systems, there is a need for a method, system and tools for creating and classifying a search query based on a user search request.

A method and system are disclosed whereby a human searcher or 'guide' may construct a search query based upon a user request. A structured query or 'succinct' query or 'vetted' query may be formed using a specific grammar or syntax for construction(s) of a query which is used to index queries in a database. A system for construction of a search query may assist in locating and utilizing a result(s), resource(s), searcher(s), advertisement(s), and/or other information. A search request is received and compared to a database of requests. If no matching request is located, a request is directed to a human searcher or guide, who may then review the request and construct a search query based on the request. Any number of search queries, searchers, results, resources, advertisements, categorizations, and/or other items indicated in a database which may be relevant to a request are presented to a searcher along with a request in order that the searcher may select items to be associated with the request.

A structured query conforming to a defined grammar syntax is constructed using the assistance of a guide which may be used to index a database of queries, which may improve matching of queries, searchers, results, resources, advertisements, categorizations, and/or other items indicated in a database to the user request. A system embodiment, methods, data structures and interfaces for operating the embodiments are disclosed.

A request which may include a keyword(s), a phrase, and/or a fully formed sentence, and/or information such as images, audio, video, or any type of media is received by a search system selectively utilizing the assistance of human searchers or 'guides'. A result(s) is provided to a user responsive to a request. A result(s) may be produced using any resource(s) and/or other information which may be accessible to a guide(s) and/or a search system. A request may be compared to a database of requests and/or queries in order to determine whether a matching query exists. If a matching query or request is determined to exist, a result(s) associated with the matching query may be automatically presented to a user(s) responsive to a request. If a match to a request is determined not to exist, a request may be routed to a searcher who may process the request. A guide may process a user request to construct a search query which conforms to a specific sentence structure or syntax. A structured query may be used to index a database of requests and/or queries. A structured and/or categorized query may improve selection of results and/or resources. A guide performing a query analysis role may be referred to as an "ambassador guide" or "ambassador".

A query formation tool is provided to assist in the formation and disambiguation of a search query and may provide information in order that a categorization(s), a result(s), a resource(s), an advertisement(s), and/or a searcher(s) may be associated with a request. A person may provide information which associates a query with an existing search query or request, which information may be stored in a database. Information of equivalence relationships between any or all elements of a request and information in a database may be recorded. A query which may be formed using the tool may be associated with an automated and/or human resource(s) based on content of the query or request. Recorded information may be used to associate queries which have a common syntax with a resource(s), category(ies), and/or information which may be used to produce a result(s) and/or information which may be returned responsive to a request.

A database is provided which may include records which indicate a result(s) associated with a structured query or a 'vetted query' constructed according to a particular syntax, and other forms of a request which have been associated with the structured query. Matching of a search query may be evaluated based on equivalence of structure and/or one or more elements contained in a search query. For example, a meaning of a keyword(s) may be determined based on a number of categories, tags, profiles, locations, etc. associated with a request, a location and/or profile may provide additional information regarding a query, etc.

The terms voice and speech are used interchangeably herein. As mentioned above, a user, a resource, and/or a guide may establish a communication session using a voice service, a messaging service such as Short Messaging Service (SMS), Enhanced Messaging Service (EMS), Multi-media Messaging Service (MMS), Instant Messaging (IM), email, an internet portal or web page, a web service, an API, regular mail or any other type of communication. A connection may be established using any device which is capable of utilizing a communication service. For example, a wireless device such as a cell phone, PDA, smart phone, etc. might be used to establish a communication session using voice, SMS, IM, email and/or internet protocols. A desktop, laptop or server system might be used to establish a communication session. A landline phone, a specialized communication terminal, or any other communication device might be used to establish a communication session.

Communication between a guide, a user, a resource and/or a search system may include conversion of text to speech and speech to text. Any type of media which can be sent or received using a communication system may be part of a communication session. A communication session may be conducted using any or all communication service(s) associated with a user, a resource and/or a guide.

An advertisement may be transmitted including during any or all communication sessions between a user, a guide, a resource, and/or a search system. A resource, a guide, and/or an advertisement may be rated. Rating information may be obtained from a user, a guide(s), a resource(s), and/or a search system. Rating information may be used to select a resource(s), a guide(s), an advertisement(s) and/or any item(s) based on information associated with an item indicated in a database. The search service may be compensated by advertising revenue, and/or by payments from a user(s) and/or a guide(s).

Figure 22:
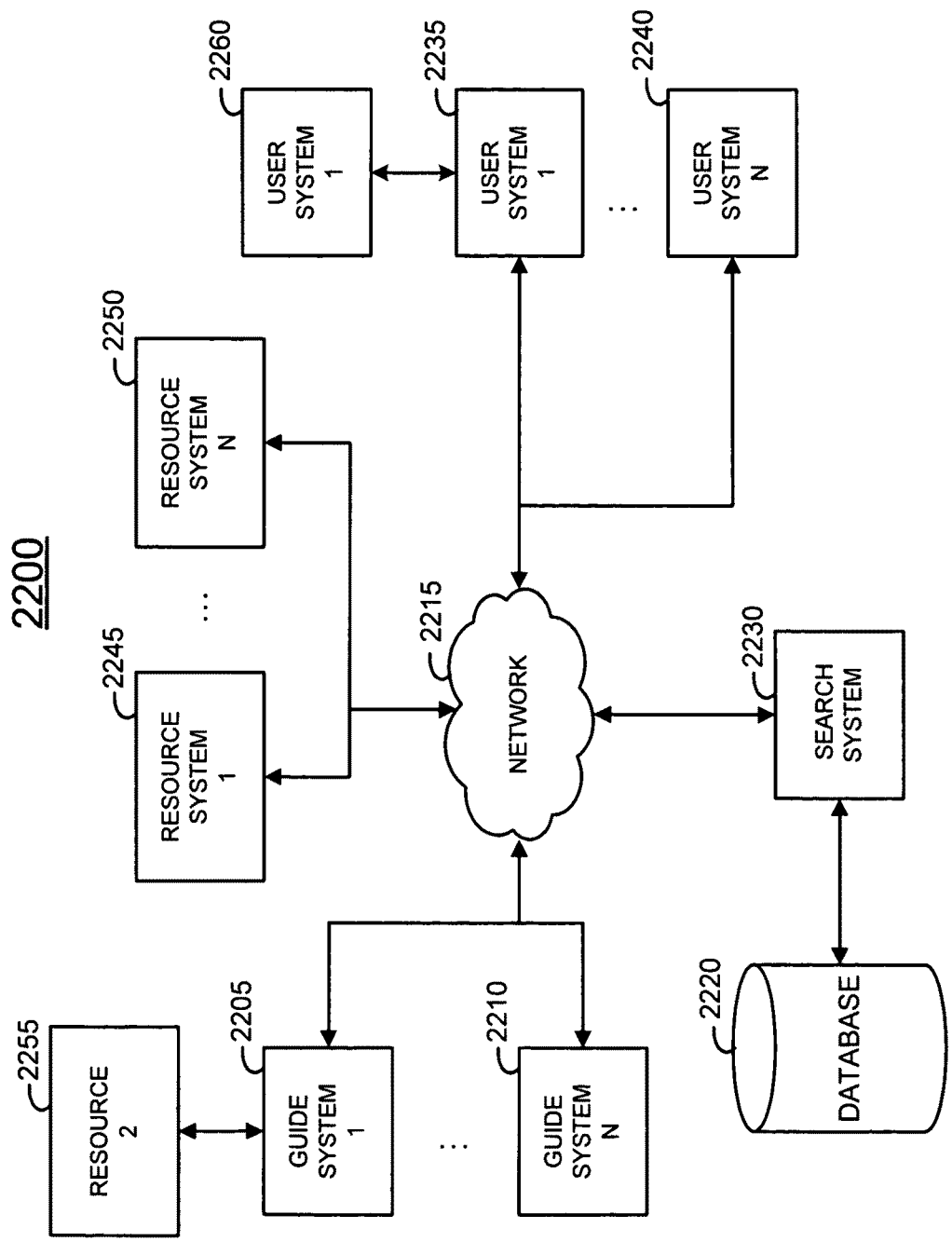
FIG. 22 is a block diagram of an exemplary system embodiment.

As illustrated in FIG. 22, the system 2200 includes the guide systems 2205, 2210, a network 2215 such as the Internet, a search system 2230, the user systems 2235, 2240, a database 2220, which may comprise various records, and the resources systems 2245, 2250, 2255, and 2260.

While only a limited number of systems associated with a guide, resource, user, and a search system are depicted in FIG. 22, it is within the scope of the disclosure for multiple systems for guide, resource, user, information seeker and search systems to be utilized.

Any user system (e.g., the user systems 2235, 2240) can be operated by an information seeker or user, who may be a person or entity, to submit a request(s) and/or receive a search result(s) and/or other information. Any guide system (e.g., the guide systems 2205, 2210) can be operated by a guide to obtain a search result for an information seeker located at a user system (e.g., the user systems 2235, 2240). Any resource system (e.g., the resource systems 2245, 2250) may be operated by a human provider of information and/or may be an automated system which may provide a result(s) and/or other information to a guide and/or a user. A resource may be a system such as a search engine, a database, a system which may perform tasks such as image recognition, voice recognition, translation, transcription, or other forms of information processing, a local information source of a guide system such as a disk drive, built-in or removable memory, an application and/or database accessible from a user system(s), and/or a guide system, etc. A resource may not be accessible using the network 115. For example, a resource such as the resource 2255 may be accessible to a guide operating a guide system such as the guide system 2205, or a resource such as the resource 2260 may be accessible to a user operating a user system such as the user system 2235. A resource might include printed materials, images, video, and/or audio information, a software application(s), any information accessible to a guide(s), and/or a user(s), a database(s), and/or any combination thereof.

The network 2215 (FIG. 22) may be a global public network of networks (the Internet) and/or consist in whole or in part of one or more private networks and communicatively couples the guide systems 2205, 2210, the resource systems 2245, 2250 and the user systems 2235, 2240 with the other components of the system such as the search system 2230, and the database 2220. The network 2215 may include one or more wireless networks which may enable wireless communication between the various elements of the system 2200. For example, a mobile phone carrier network might be used to connect a user device to the search system 2230.

The search system 2230 allows interaction to occur among the guide systems 2205, 2210, the resource systems 2245, 2250 and the user systems 2235, 2240. For example, an information search query(ies) can be transmitted from the user systems 2235, 2240 to the search system 2230, where a search query(ies) can be accessed by the guide systems 2205, 2210 and/or the resource systems 2245, 2250. Similarly, a result(s) produced from the resource systems 2245, 2250 including results produced using the guide systems 2205, 2210 in response to a search query(ies) submitted by the user systems 2235, 2240 may be transmitted to the search system 2230, where it may be stored by the search system 2230 and/or may be transmitted to the user systems 2235, 2240.

The search system 2230 is communicatively coupled with the database 2220. As will be described herein in further detail below, the database 2220 includes data that is processed in association with operation of the embodiments. Although FIG. 22 illustrates the database 2220 as a separate component of the system, the database 2220 may be integrated with the search system 2230. Further, the records maintained in the database 2220 may be stored in any typical manner, including in a Network Attached Storage (NAS), a Storage Area Network (SAN), etc. using any typical or proprietary database software such as DB2®, Informix®, Microsoft® SQLServer™, MySQL®, Oracle®, etc., and may also be a distributed database on more than one server. Elements of the database 2220 may reside in any suitable elements of the system 2200.

The user systems 2235, 2240, the guide systems 2205, 2210, the search system 2230 and the resource systems 2245, 2250 may include equipment, software, systems and personnel required to send and/or receive messages between a user system, a guide system, a resource system and/or the search system using the network 2215. The database 2220 includes information which may allow the search system 2230 to establish communication between the other elements of the system 2200.

A user system, a guide system, and/or a resource may be a desktop or mobile PC or Mac®, a mobile phone, a smart phone, a PDA, a server system, a landline phone, a specialized communication terminal, a terminal connected to a mainframe, or any other communication device and/or system. The search system 2230 may include one or more servers, computers, etc. For example, servers such as the PowerEdge® 3500 by Dell, or the BladeCenterJS22 by IBM, or equivalent systems might be used to implement elements of the search system 2230. The search system 2230 may utilize an operating system (OS) such as Microsoft Windows XP, or Linux, etc. Voice routing and packet switching may be accomplished using well established technologies such as those provided by Cisco, or other networking companies.

After being presented with the disclosure herein, one of ordinary skill in the relevant art will immediately realize that any viable computer systems and/or communication devices known in the art may be used as user systems, guide systems, resources, and/or to implement the search system 2230.

A guide may be required to register with the search system 2230. As part of a registration process, at least one communication method is associated with a guide. In at least one embodiment, a guide may register with the search system 2230 and establish a username and password which are associated with the guide. A guide may login to the search system 2230 using a web browser functionality of the guide system 2205 in order to communicate with the search system 2230. Multiple communication services may be associated with a guide and may allow a communication session to be established between a guide system such as the guide system 2205 and a user system, a resource system and/or the search system 2230. Multiple identifiers of a guide may be associated with each other. Information such as IM credential(s), an email address(es), a phone number(s), a URL, a username, etc. of a guide may be identified which may allow the search system 2230 to establish a communication session between a guide system and a user system, a resource system, and/or the search system 2230.

When a guide registers with the search system 2230 the guide may be associated with one or more keywords, categories, and/or other information. For example a keyword(s) and/or category(ies) may be selected by a guide, or may be associated with a guide based on a test(s) administered to a guide and/or other information provided during and/or after a registration process. Information associated with a guide may be stored in the database 2220 and may be used for purposes such as matching a guide to a request, determining and/or providing compensation for a guide, communicating with a guide, etc. as will be described further herein below.

A user may be identified by the search system 2230. When a user system such as the user system 2235 establishes a communication session with the search system 2230, an identifier of a user system is determined. An identifier of a user system may be associated with other information regarding a user. A user system may be identified using an email address, a telephone number, an IM credential, a username, and/or any other identifier which may be used to associate information with a user. Multiple identifiers of a user may be associated with each other. Using information of communication services associated with a user, a communication session may be established between a user system such as the user system 2235 and a guide system, a resource system and/or the search system 2230. Information such as a keyword(s), a category(ies), a user profile(s), a previous search request(s), a search result(s), etc. may be associated with a user. Information of a user may be stored in the database 2220.

A resource, which may be a person(s), an entity(ies), a search engine, a database, a software application, a corpus of one or more types of media such as text or printed information, images, audio, video, etc. or a combination thereof, may be identified by the search system 2230. Information of at least one method of communication is associated with a resource system which allows a communication session to be established between the search system 2230, a user system and/or a guide system and a resource system such as the resource systems 2245,150. An identifier of a resource system may be associated with other information regarding a resource. A resource system may be identified using an email address, a telephone number, an IM credential, a resource username, a URL or other persistent identifier which may be used to associate information with a resource. Multiple identifiers of a resource may be associated with each other. Using the information of communication services associated with a resource, a communication session may be established between a resource system such as the resource system 2245 and a user system, a guide system, and/or the search system 2230. Information such as a keyword(s), a category(ies), a profile(s), and/or other information may be associated with a resource. Information of a resource may be stored in the database 2220.

A resource such as the resources 2255, 2260 and/or resources accessible via the resource systems 2245, 2250 may include any system(s), software, hardware, personnel and/or other facility(ies) which may provide information to a guide(s), a user(s), and/or the search system 2230. A resource may be freely accessible to any user(s) and/or guide(s) and/or may be available on a restricted basis. The resource system(s) 2245, 2250 may include resource(s) which are available on an unrestricted and/or restricted basis. A resource may not be accessible using the network 2215, but may be accessible to a guide(s) and/or a user(s). For example, a resource such as the resource 2255 may be accessible to one or more guide(s) operating a guide system(s) such as the guide system 2205 using any type of communication. For example, a guide(s) may obtain information of an event(s) such as traffic conditions which may be observed by the guide to provide a search result(s). Information in any form, such as printed media, audio and/or visual information, software, hardware, etc. which may be accessible to a guide(s), a user(s) and/or an operator(s) of a resource system(s) may be a resource. Similarly, a resource such as the resource 2260 may be accessible to a user of the user system 135. For example, the resource 2260 may be a software application(s) and/or database which may in whole or in part be accessible by the user system 135.

The search system 2230 may establish a communication session between any user system(s), guide system(s), or resource system(s) using information indicated in the database 2220. For example, the user system 2235 may establish a voice communication session with the search system 2230, the search system 2230 may establish a voice communication session between the user system 2235 and the guide system 2205, and the search system 2230 may establish a voice communication session between the user system 2235 and the resource system 2245. While a voice communication session is used in this example, any type of communication session using one or more services such as SMS, EMS, MMS, email, IM, chat, web based communication, etc. may be established between any user system(s), guide system(s), and/or resource system(s) and/or the search system 2230.

Information associated with a user(s), a guide(s) and/or a resource(s) may be obtained in various ways. For example, a registration process may be performed using a web form(s) provided by the search system 2230, information may be obtained from an external database, and/or information may be obtained based on analysis of information indicated by a user(s), a guide(s), and/or a resource(s). A 'profile' is one or more characteristics which may be associated with one or more individuals. A profile may include geographic data such as a street address, latitude and longitude, etc., may include demographic information such as age, gender, race, income, family size, political affiliations, etc., may include personality information such as results of psychometric testing, subjective evaluations of an individual, etc., may include affiliation information such as employment, club, activity, societal membership information, information of a device(s), service(s), transaction(s) or any other information which might be associated with a user(s) and/or a guide(s). As mentioned above, the system 2200 is not limited by elements illustrated in FIG. 22. Further, the system 2200 may be used in conjunction with the system 100 illustrated in FIG. 1.

Figure 23:
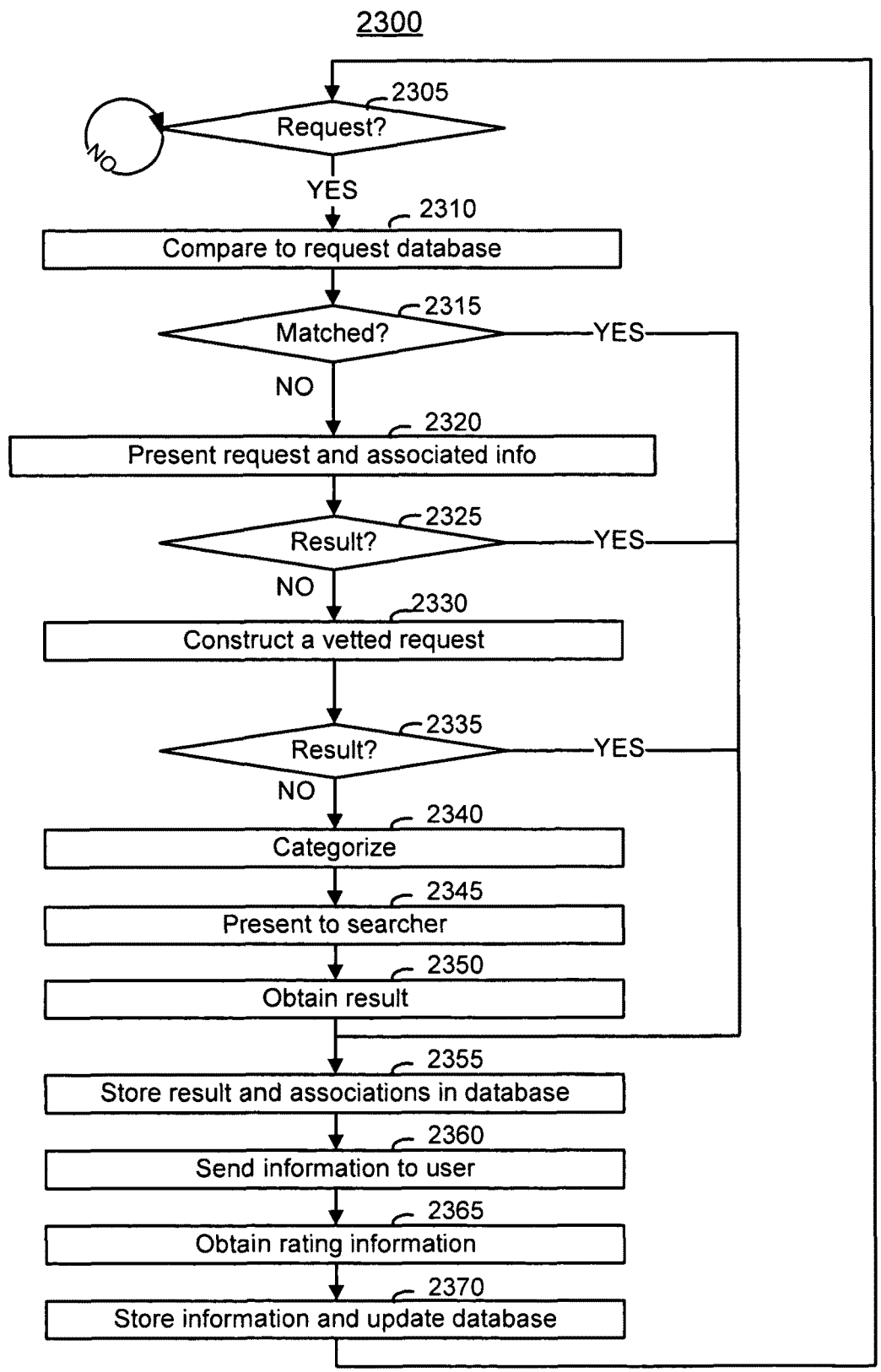
FIG. 23 illustrates a flow chart of a process for performing an information search.

As illustrated in FIG. 23, a process 2300 for performing an information search is provided. The process 2300 may be operative on a server associated with the search system 2230 (FIG. 22).

In operation 2305 (FIG. 23) a determination is made as to whether a request is received. For example, if a search query is submitted via voice, or SMS to a server, or an email is received at an email address, or if an IM is received at a IM service account associated with the search system 2230 (FIG. 22), it may be determined that a search query or request is received. If it is determined in operation 2305 that a request is not received, control remains at operation 2305 and process 2300 continues. If it is determined in operation 2305 that a request is received, control is passed to operation 2310 and process 2300 continues.

In operation 2310 a request is compared to a database. A database may include information of requests. A database may include previous request(s) and/or result(s), advertisement(s), resource(s) and/or any data processed in association with operation(s) of the system 2200 (FIG. 22), any or all of which may be compared with a request. A request may be processed in order to generate alternate forms of the request which may be compared to a database including other requests. For example, a request may be automatically analyzed and/or parsed, and a set of equivalence rules may be applied, etc. Control is passed to operation 2315 and process 2300 continues.

In operation 2315 a determination is made as to whether a match to the request is found in the request database. If in operation 2315 it is determined that a match to a request is not found, control is passed to operation 2320 and process 2300 continues. If in operation 2315 it is determined that a match to a request is found, control is passed to operation 2355 and process 2300 continues.

In at least one embodiment, an exact match of the request received to a request or search query indicated in the database is used to determine whether a match to a request is found. An exact match may be determined to be found based on a modified version of a request. For example, an original search query might be deconstructed and element(s) of the deconstructed query might be combined with other information in order to produce a search query which matches a search query indicated in the search system database 2220 (FIG. 22). An exact match may be determined to be found based on equivalence tables of any elements of a search query. In at least one embodiment, a calculated probability of a match between a request and a request indicated in the database exceeding a value may be used to determine that a match to a request is found. In at least one embodiment, the determination in operation 2315 may be made based on user acceptance of a result(s) and/or a search query provided to a user by the search system 2230 responsive to a request. In at least one embodiment, a result(s) or answer(s) may be provided responsive to a user request using an automated resource(s) based on automatic processing of a request. For example, if a user request conforms to a grammar construct such as 'quote xxxx' wherein 'xxxx' is a ticker symbol for a security, or if a user response matches a template in the database 2220, an automated system may deliver a response without the assistance of a guide. Alternatively, a guide may be presented with the request and possible match(es) from a database for determining whether there is a match 2315.

In operation 2320 a request and information associated with the request are presented to a guide or searcher. Information associated with a request may include information which may have been obtained regarding a request, such as geographic, demographic, and/or other information which is associated with a user(s) and/or system(s) submitting a request. Information associated with a request may include a number of items which may have been associated with a request based on processing of a request, such as keywords, categories, advertisements, structured queries, searchers, results, historical information, etc. Information may be associated with a request based on content of a raw query and/or other information indicated in a request. For example, content of a raw query may be compared to a database of categories and/or structured queries or "succinct queries" which may allow items associated with a database of queries and/or categories to be ranked based at least in part on content of the raw query. Control is passed to operation 2325 and process 2300 continues.

In operation 2325 a determination is made as to whether a result is found. If in operation 2325 it is determined that a result is not found, control is passed to operation 2330 and process 2300 continues. If in operation 2325 it is determined that a result is found, control is passed to operation 2355 and process 2300 continues.

The determination in operation 2325 may be made based on various criteria. In at least one embodiment, a searcher may select one or more suggested structured query(ies), and if a result(s) are associated with the structured query(ies) it may be determined that a result is found. For example, a structured query may be associated with a resource, which may produce a result based on submitting a request based at least in part on the structured query to a resource(s), which may associate a result(s) with the structured query. Alternately, a searcher may select other information which may determine that a result is found. For example, a searcher may associate a category(ies), keyword(s), resource(s), advertisement(s) and/or other item(s) with a request which may cause a result to be associated with a request, which may determine that a result is found. In at least one embodiment, the determination in operation 2325 may be made based on user acceptance of a result(s) previously provided to a user.

In operation 2330 a vetted query is constructed. A process for construction of a vetted query is further described herein below with respect to FIG. 24. Control is passed to operation 2335 and process 2300 continues.

In operation 2335 a determination is made as to whether a result is found. If in operation 2335 it is determined that a result is not found, control is passed to operation 2340 and process 2300 continues. If in operation 2335 it is determined that a result is found, control is passed to operation 2355 and process 2300 continues.

The determination in operation 2335 may be made based on various criteria. In at least one embodiment, a result may be automatically selected and/or created based on a vetted query constructed by a guide. For example, a query structure may be associated with a resource, which may produce a result for a request based at least in part on the query structure and content of the request, which may associate a result(s) with the structured query. Alternately, a structured query may be associated with one or more results which have been produced by a guide(s). For example, a guide(s) may have performed a search and obtained a result(s) responsive to an unstructured or 'raw' query which has been associated with a vetted query constructed by a guide(s) in operation 2330. In at least one embodiment, the determination in operation 2335 may be made based on user acceptance of a result(s) provided to a user. If a response to a request is not available, other information selected based at least in part on information of a request may be provided to a user(s), such as advertisement(s), a game, audio and/or video information, etc.

In operation 2340 a request is categorized. A guide may categorize a request and/or a category may be automatically associated with a request by the system 2200 (FIG. 22). A category(ies) may be associated with a request based on a keyword(s) included in a request and/or a structured query associated with a request. A category and/or keyword may be used to select a number of items to be associated with a request, such as guides, results, advertisements, resources, etc. Control is passed to operation 2345 and process 2300 continues.

In operation 2345 a vetted query or vetted request is provided to a searcher (a number of guides). A vetted query or vetted request is a request which has been associated with a structured query and a category. An ambassador guide may continue processing a request and/or the request may be transmitted to a number of other guides who may perform an information search responsive to the request. A guide constructing a structured query at operation 2330 and a guide presented with the query at operation 2345 may or may not be the same person. A searcher(s) may be selected automatically and/or may be selected by a guide(s). In at least one embodiment, a guide(s) are notified of a request in an order determined by a ranking of guides associated with a category(ies), keyword(s), profile(s), geographic information, and/or other information associated with a request. A guide(s) may be allowed to decline a request. A guide receiving a vetted query may construct a different vetted query. Control is passed to operation 2350 and process 2300 continues.

In operation 2350 a result(s) is obtained responsive to a request associated with a structured query. A result(s) may be obtained by one or more guides. A result(s) is associated with a request(s) and/or a structured query, which may be associated with other information such as a category(ies), keyword(s), advertisement(s), a user(s), a searcher(s), a resource(s), etc. Control is passed to operation 2355 and process 2300 continues.

In operation 2355 information of a request, a structured query, a vetted query, a result(s), and/or other items and their associations is recorded and/or updated. For example, information of a raw query and/or a request(s) which has been associated with a structured query, information of an advertisement(s) which has been associated with a request(s) and/or a structured query, information of usage and/or ratings of items such as a result(s), a resource(s), a guide(s), an advertisement(s), etc. may be recorded. Control is passed to operation 2360 and process 2300 continues.

In operation 2360 information such as a result(s) is provided to a user(s). A result(s) may be provided using any or all device(s) and/or service(s) which may be associated with a user(s). Information such as an advertisement(s), a result(s), etc. may be provided to a user(s) in any sequence. Control is passed to operation 2365 and process 2300 continues.

In operation 2365 rating(s) and/or information which may be used to compute a rating(s) of information presented to a user(s) is obtained. For example, a user may rate a result(s), information of usage of a coupon included with a result(s) might be obtained, a review by a guide(s) and/or administrator might be performed, and/or other information which may be used to determine a rating(s) may be obtained. Control is passed to operation 2370 and process 2300 continues.

In operation 2370 information of the process 2300 is recorded. Information associated with a user(s), such as result(s), advertisements, guide(s), profile(s), etc. may be recorded. Rating(s) of a result(s), a guide(s), an advertisement(s) and/or associated items such as a resource(s), a structured query(ies), etc. may be recorded and/or updated. In at least one embodiment, information is recorded in the search database 2220 (FIG. 22). Control is passed to operation 2305 and process 2300 continues.

Figure 24:
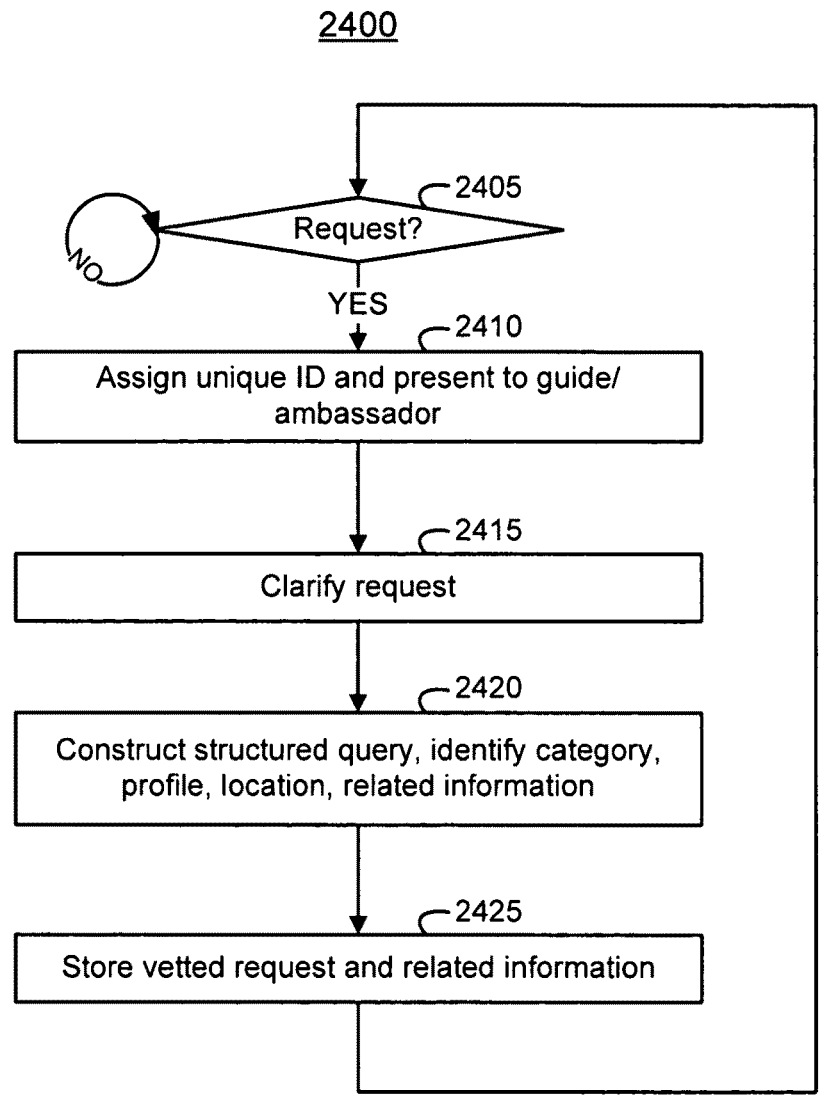
FIG. 24 illustrates a flow chart of a process for creating a search query.

As illustrated in FIG. 24, a process 2400 for processing a request is provided. The process 2400 may be operative for example on the guide system 2205 and/or a server associated with the search system 2230 (FIG. 22).

In operation 2405 a determination is made as to whether a request is received. If it is determined in operation 2405 that a request is not received, control remains at operation 2405 and process 2400 continues. If it is determined in operation 2405 that a request is received, control is passed to operation 2410 and process 2400 continues.

In operation 2410, a request is assigned a unique ID and presented to a guide who may be an ambassador. A request which has not been processed may be referred to as a 'raw query'. A guide may process a request in order to determine intent of the request. For example, a request may include elements which are ambiguous, and/or which are context sensitive. Control is passed to operation 2415 and process 2400 continues.

In operation 2415 a guide clarifies the request. A guide may identify contextual meaning(s) of words and/or phrases contained in a request. For example, a guide may indicate that "NCAA basketball tournament" is intended as a noun phrase in the request "Who won the 1997 NCAA basketball tournament?" Abbreviations and/or other elements of a raw query may be associated with a definition and/or comment. For example the noun "Cards" might be associated with the noun phrase "Saint Louis Cardinals" when the baseball team is indicated by the context of a request such as "When do the Cards play this week?" Such context may be based on any information associated with a request. For example, a request history, a profile of a user, etc. may be presented to a guide or ambassador to provide context. A guide(s) may interact with a user in order to determine context information associated with a request. Information of an association(s) and/or clarification(s) made by a guide is recorded in the database 2220 (FIG. 22). Such information may be associated with a user(s), and may be presented to a guide(s) responsive to a request(s) associated with the user(s). One or more category(ies) may be associated with a request. Control is passed to operation 2420 and process 2400 continues.

In operation 2420 a vetted query is formed. A vetted query is a structured query which is associated with at least one category profile, location, and/or other related information. A guide formats a query according to a prescribed or specific syntax. A formatted query may be referred to as a 'succinct' or 'structured' query. A grammar construction used may be based on any suitable set of rules for the source language of a query. For example, in the case of English, a question of fact may be formulated according to a subject, verb, object syntax wherein the subject is an interrogatory such as 'What', the verb is a form of 'to be' and the object is the information sought. Text created by an ambassador guide may be used to index a database of queries and/or categories. A category(ies) and/or query(ies) indicated in the database may be presented in an order based at least in part on a rating(s) and/or ranking(s) associated with a query(ies) and/or category(ies). Likewise, other information associated with a category(ies) and/or a query(ies) may be presented responsive to a query formed. For example, information of a number of guides, categories, advertisements, resources, etc. may be presented to an ambassador and/or searcher. An ambassador may select a guide(s), an advertisement(s), a resource(s), etc. For example, an ambassador may select an advertisement(s) and/ or other information which may be provided to a user(s) while a search is being performed. An ambassador preferably selects a category which is associated with a succinct query created. An ambassador may select a resource(s) which may provide a result(s). An ambassador may associate information with a request which may provide context. For example, an ambassador may associate a profile(s) with a request(s). Control is passed to operation 2425 and process 2400 continues.

In operation 2425 information of the process 2400 is recorded. Information associated with a request, a succinct query, a user, a guide, a resource(s), a category(ies), a keyword(s), an advertisement(s), etc. may be recorded. For example, information of an equivalence relationship such as "Cards" with "Saint Louis Cardinals" when associated with the category 'Sports>MLB' as described herein above may be recorded in association with a user(s). Likewise, if a resource(s) such as an RSS Feed, webpage, or other information source is associated with a result(s) which is determined to match a succinct query, such usage information may be recorded. Information of a resource(s) which may provide an automated search result(s) responsive request(s) may be recorded in association with a raw query and/or a succinct query and/or a category(ies). Any type of information related to an item(s) which may be associated with a request may be recorded. In at least one embodiment, information of the process 2400 is recorded in the database 2220 (FIG. 22). Control is passed to operation 2405 and process 2400 continues.

Figure 25:
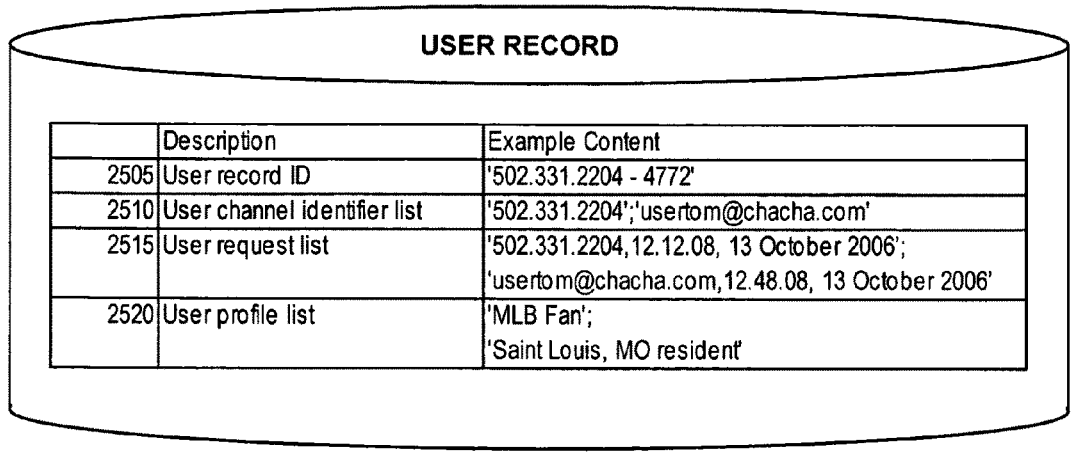
FIG. 25 illustrates a database record for a user.

As illustrated in FIG. 25, an exemplary user record 2500 is provided, of which one or more may be associated with or resident in the database 2220 (FIG. 22). The user record 2500 may include a user record ID field 2505, a user channel identifier list field 2510, a user request list field 2515, and a user profile list field 2520.

The user record ID field 2505 contains an identifier of a user, which is preferably unique and preferably used consistently. For example, in at least one embodiment, the user record ID field 2505 can include a randomly generated numerical code, and/or a string indicating a user. A user record ID serves to distinguish a user record associated with a user from a user record associated with other user(s). Although particular examples of identifiers are described herein, other types of identifiers uniquely indicating a user(s) may be utilized without departing from the spirit and scope of the embodiments. In at least one embodiment, a telephone number associated with a mobile phone service account may be included in the content of the user record ID field 2505. A user record ID may include a username, an IM credential, an email address, a URL, an IP address, etc. Using the example in FIG. 4, '502.331.2204-4772' is the user record ID associated with the user record 2500.

The user channel identifier list field 2510 may include one or more identifiers associated with a user. The user channel identifier list field 2510 may include one or more identifiers of a user and/or other information which may be used to establish communication with a user. For example, a telephone number, an email address, an IM credential, a username, a URL, a street address, and/or other information which may allow communication to be established with a user may be included in the user channel identifier list field 2510. Using the example in FIG. 25, the telephone number '502.331.2204' and the email address 'usertom@chacha.com' are the user channel identifiers which have been associated with '502.331.2204-4772'. While only a few channel identifiers and types of identifiers have been illustrated in FIG. 25, any number and/or type of channel identifiers may be associated with a user.

The user request list field 2515 may include information of one or more requests or requests or search queries associated with a user identifier(s). For example, the user request list field 2515 may include a unique identifier(s) associated with a request(s) submitted using a user system associated with any channel identifier associated with a user. Using the example illustrated in FIG. 25, the user request '502.331.2204,12.12.08, 13 Oct. 2006', and the user request 'usertom@chacha.com, 12.48.08, 13 Oct. 2006' have been associated with '502.331.2204-4772'. While only a few request identifiers have been illustrated in FIG. 25, any number of requests may be associated with a user.

The user profile list field 2520 may include information of one or more profiles which have been associated with a user ID(s). For example, the user profile list field 2520 may include a unique identifier(s) associated with a profile(s) associated with any channel identifier associated with a user. Using the example illustrated in FIG. 25, 'MLB Fan', and 'Saint Louis, Mo. resident' have been associated with '502.331.2204-4772'. This may indicate that information included in 'MLB Fan', and 'Saint Louis, Mo. resident' may be provided to a guide, and/or may be used to assist in construction of a query. While only a few profile identifiers have been illustrated in FIG. 25, any number of profiles may be associated with a user. A profile may be associated with a user based on information provided by a user, and/or may be based on analysis of items such as a request history, location information, demographic information, etc. using automated and/or human-assisted analysis. For example, if a result(s) associated with a category(ies) and/or keyword(s) and/or structured query(ies), is provided to a user(s), a profile associated with the category(ies) and/or keyword(s) and/or structured query(ies) may be associated with a user(s). However, there is no limitation to the user record 2500. For example, a field may be created and stored to relate or exclude any information in association with the user.

Figure 26:
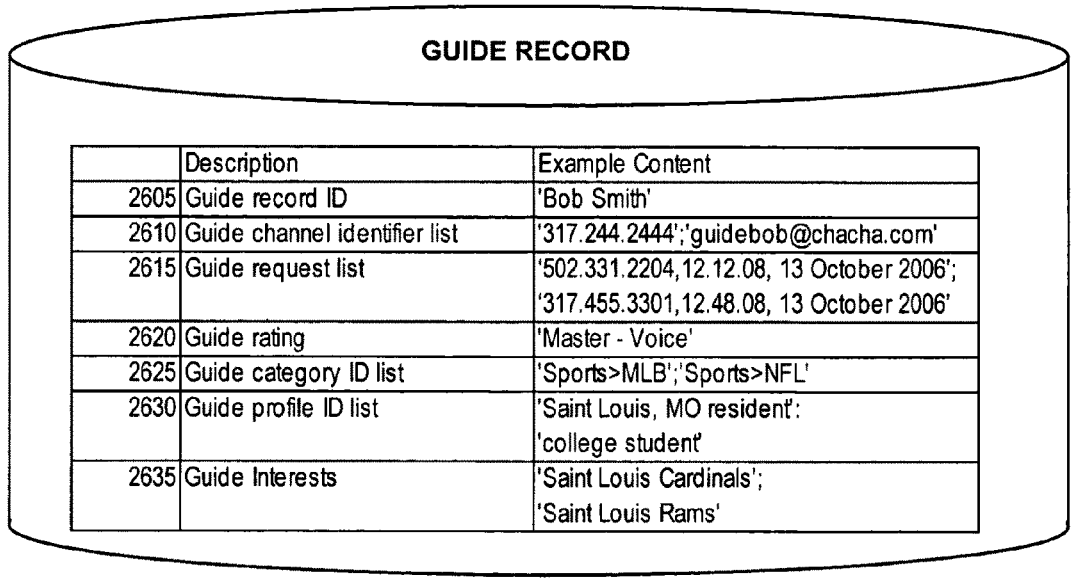
FIG. 26 illustrates a database record for a guide.

As illustrated in FIG. 26, an exemplary a guide record 2600 is provided, of which one or more may be associated with or resident in the search database 2220 (FIG. 22). The guide record 2600 may include a guide record ID field 2605, a guide channel identifier field 2610, a guide request ID field 2615, a guide rating field 2620, a guide category ID field 2625, guide profile ID list 2630, and guide interests ID field 2635.

The guide record ID field 2605 contains an identifier of a guide, which is preferably unique and preferably used consistently. For example, in at least one embodiment, the guide record ID field 2605 can include a randomly generated numerical code, and/or a string indicating a guide. A guide record ID serves to distinguish a guide record associated with a guide from a guide record associated with other guide(s). Although particular examples of identifiers are described herein, other types of identifiers uniquely indicating a guide(s) may be utilized without departing from the spirit and scope of the embodiments. In at least one embodiment, a guide record ID may include a first and last name of a guide. In at least one embodiment, a telephone number associated with a mobile phone service account may be included in the content of the guide record ID field 2605. A guide record ID may include a guide username, an IM credential, an email address, etc. Using the example in FIG. 26, 'Bob Smith' is the guide record ID associated with the guide record 2600.

The guide channel identifier field 2610 may include one or more identifiers associated with a guide. The guide channel identifier field 2610 may include one or more identifiers of a guide and/or other information which may be used to establish communication with a guide system. For example, a telephone number, an email address, an IM credential, a user-name, a password, access information, a URL, a street address, and/or other information which may allow communication to be established with a guide may be included in the guide channel identifier field 2610. Using the example in FIG. 26, the telephone number '317.244.2444' and the email address 'guidebob@chacha.com' are the guide channel identifiers which have been associated with 'Bob Smith'. While only a few channel identifiers have been illustrated in FIG. 26, any number of channel identifiers may be associated with a guide.

The guide request ID field 2615 may include information of one or more requests associated with a guide identifier. For example, the guide request ID field 2615 may include a unique identifier(s) associated with a user request(s) which has been assigned to a guide. Using the example illustrated in FIG. 26, '502.331.2204,12.12.08, 13 Oct. 2006', and '317.455.3301,12.48.08, 13 Oct. 2006' have been associated with 'Bob Smith'. This may indicate that 'Bob Smith' has been selected to respond to the requests '502.331.2204,12.12.08, 13 Oct. 2006', and '317.455.3301, 12.48.08, 13 Oct. 2006'.

The guide rating field 2620 may include information of one or more ratings associated with a guide. The content of the guide rating field 2620 may include one or more ratings of a guide which may be used to select a guide(s) to be assigned to a request. In at least one embodiment, a rating may be associated with a keyword(s), a category(ies), a profile(s) or other information which has been associated with a request. Any information indicated in the database 2220 (FIG. 22) may be used to determine a rating of a guide. Using the example illustrated in FIG. 26, the rating 'Master-Voice' is associated with 'Bob Smith'. This may indicate that 'Bob Smith' may accept voice based requests and has the rating of 'Master'. While only one type of rating has been illustrated in FIG. 26, ratings of a guide may be associated with various types of information. For example a guide may have a rating associated with one or more keywords, categories, skills, profiles, users and/or other types of information. Any type of information which may indicate a rating such as a number, text, etc. may be included in the guide rating field 2620.

The guide category ID field 2625 may include information of one or more categories associated with a guide. For example, the guide category ID field 2625 may include a unique identifier(s) associated with a category(ies) which has been associated with a guide. Using the example illustrated in FIG. 26, 'Sports>MLB', and 'Sports>NFL' have been associated with 'Bob Smith'. This may indicate that 'Bob Smith' has registered to accept requests associated with 'Sports>MLB' and 'Sports>NFL'. Category information associated with a guide may be used to select a guide, as will be further described herein.

The guide profile ID field 2630 may include information of one or more profiles associated with a guide. For example, the guide profile ID field 2630 may include a unique identifier(s) associated with a profile(s) which has been associated with a guide. Using the example illustrated in FIG. 26, 'Saint Louis, Mo. resident' and 'college student' have been associated with 'Bob Smith'. This may indicate that 'Bob Smith' may be ranked more highly for requests associated with the profiles 'Saint Louis, Mo. resident' and 'college student'. For example, if a profile is associated with a user and a guide, a request which has not been analyzed may be directed to a guide(s) associated with the profile. A profile may be associated with a guide based on information provided by a guide, information obtained from an external database, information derived from guide activities, etc. Using the example illustrated in FIG. 4 and FIG. 26, a ranking of guides who might respond to a request from '502.331.2204-4772' may be based at least in part on a rating(s) associated with the profile 'Saint Louis, Mo. resident'. Profile information may be used in the creation of a structured query, and/or association of a request with a structured query.

The guide interest ID field 2635 may include information of one or more interests associated with a guide. For example, the guide interest ID field 2635 may include a unique identifier(s) associated with an interest(s) which has been associated with a guide. Using the example illustrated in FIG. 26, 'Saint Louis Cardinals', and 'Saint Louis Rams' have been associated with 'Bob Smith'. This may indicate that 'Bob Smith' has registered to accept requests associated with 'Saint Louis Cardinals' and 'Saint Louis Rams'. Content of the guide interest ID field 2635 may be used to select a guide to respond to a request and/or to select other information, as will be further described herein. For example, a guide interest(s) may be associated with one or more categories, which may allow a category to be associated with a request and/or a structured query when text associated with a guide interest is associated with a request.

As illustrated in FIG. 27, an exemplary request record 2700 is provided, of which one or more may be associated with or resident in the search database 2220 (FIG. 22). The request record 2700 may include request record ID field 2705, request user ID field 2710, request guide ID field 2715, request raw query ID field 2720, request result ID field 2725, request succinct query ID field 2730, request category ID field 2735, request type field 2740, request mode field 2745, and request profile ID field 2750.

The request record ID field 2705 contains an identifier of a request, which is preferably unique and preferably used consistently. For example, in at least one embodiment, the request record ID field 2705 can include a randomly generated numerical code, and/or a string indicating a request. A request record ID serves to distinguish a request record associated with a request from a request record associated with other request(s). Although particular examples of identifiers are described herein, other types of identifiers uniquely indicating a request(s) may be utilized without departing from the spirit and scope of the embodiments. In at least one embodiment, the request record ID includes a telephone number. A request record ID may include a username, an IM credential, an email address, etc. Using the example in FIG. 27, '502.331.2204,12.12.08, 13 Oct. 2006' is the request record ID associated with the request record 2700. This may for example indicate a service associated with a request and a time-stamp.

The request user ID field 2710 may include an identifier of a user(s) associated with a request. Content of the request user ID field 2710 may be used to establish communication with a user(s) based on content of a user record such as the user record 2400 (FIG. 24). Using the example in FIG. 27, '502.331.2204-4772' is associated with '502.331.2204,12.12.08, 13 Oct. 2006'. This may indicate that '502.331.2204-4772' submitted '502.331.2204,12.12.08, 13 Oct. 2006'. While only a single user ID is associated with the request record 2700 illustrated in FIG. 27, any number of users may be associated with a request. For example, a user may receive information related to a request, which may be provided to other user(s), who may be associated with the request. Likewise, should a request be submitted by more than one user, multiple users may be associated with a request. Any number of groups of users may be indicated in the request user ID field 2710. For example, a group of users may be associated with a keyword(s), or other identifier(s) which may indicate the group. In at least one embodiment, a single user is associated with a request ID which may identify a communication session associated with the user.

The request guide ID field 2715 may include information of one or more guides associated with a request. Content of the request guide ID field 2715 may be used to establish communication with a guide based on content of a guide record such as the guide record 2600 (FIG. 26). Using the example illustrated in FIG. 27, 'Bob Smith' and 'Don White' are associated with '502.331.2204,12.12.08, 13 Oct. 2006', which may indicate that 'Bob Smith' and 'Don White' have been selected to respond to the request '502.331.2204,12.12.08, 13 Oct. 2006'. While only a few guide IDs are associated with the request record 2700 illustrated in FIG. 27, any number of guide identifiers may be associated with a request. For example, a first guide may be assigned to a request as a transcriber, a second guide may be assigned to a request as an ambassador, and a third guide(s) may produce a result(s) responsive to the request, etc.

The request raw query ID field 2720 may include information of a raw query associated with a request. Content of the request raw query ID field 2720 may for example be used to rank a structured query(ies) which may be associated with a request. Using the example illustrated in FIG. 27, the raw query 'when do the Cards play this week' has been associated with the request record 2700. This may indicate that the natural language query 'when do the Cards play this week' has been submitted as part of the request '502.331.2204, 12.12.08, 13 Oct. 2006'. Various forms of analysis may be applied to a raw query. For example, the raw query 'when do the Cards play this week' may be compared to a database of queries, keywords and/or categories. If a raw query has been associated with more than one structured queries, in which case the raw query may be ambiguous, the query may be routed to an ambassador guide who may be presented with a list of structured queries, and may associate a request with a structured query based on any or all information associated with the request. An ambassador guide may contact a user(s) in order to obtain additional information which may be associated with a request and/or may be used to select and/or create a structured query. Information associated with a request in order to select and/or create a structured query may be recorded in the database 2220 (FIG. 22) and may be used to associate items such as a profile(s), etc. with a user(s), which may be used to create and/or rate structured queries which may match and/or partially match a raw query. Information indicated in the request raw query ID field 2720 may be used to select and/or rank other types of information which may be presented to a guide(s) and/or a user(s). For example, a category(ies) may be associated with a request based on association of content indicated in the request raw query ID field 2720 with information associated with a category(ies).

The request result ID field 2725 may include information of one or more results associated with a request. Content of the request result ID field 2725 may be used to deliver a result(s) to a user based on information included in a result record such as the result record 2900 (FIG. 29). Using the example illustrated in FIG. 27, the result 'Cardinals vs LA Dodgers 7 PM June 16 Busch Stadium' has been associated with '502.331.2204,12.12.08, 13 Oct. 2006', which may indicate that the result 'Cardinals vs Dodgers 7 PM June 16 Busch Stadium' may be provided to the user '502.331.2204-4772' responsive to the request '502.331.2204,12.12.08, 13 Oct. 2006'.

The request structured query ID field 2730 may include information of a succinct query(s) associated with a request. As explained herein above with respect to FIG. 2, a structured query may be associated with a request in various ways. A structured query may be associated with a result(s) and/or a resource(s) which may produce a result(s), and/or an advertisement(s) to be associated with the query or request. A result(s) may be provided to a user(s) based on information included in a request record such as the request record 2700 and a user record such as the user record 2500 (FIG. 25). Using the example illustrated in FIG. 27, the structured query ID 'what is the next scheduled game for the Saint Louis Cardinals baseball team' has been associated with the request '502.331.2204,12.12.08, 13 Oct. 2006'. This may for example indicate that a guide has selected the structured query 'what is the next scheduled game for the Saint Louis Cardinals baseball team' to be associated with the request '502.331.2204,12.12.08, 13 Oct. 2006'. Such an association may be used to select and/or provide a result(s), an advertisement(s), a resource(s), a category(ies), etc. which may be associated with structured query(ies).

The request category ID field 2735 may include information of one or more categories associated with a request. Content of the request category ID field 2735 may be used to associate one or more categories with a request based on information indicated in a category record such as the category record 2900 (FIG. 29). Using the example illustrated in FIG. 27, the categories 'Sports>MLB' and 'Entertainment>Sports' are associated with '502.331.2204, 12.12.08, 13 Oct. 2006', which may indicate that 'Sports>MLB' and 'Entertainment>Sports' may be used to rate and/or rank information which may be presented to a guide(s) and/or a user(s) responsive to the request '502.331.2204,12.12.08, 13 Oct. 2006'. For example, a guide interest associated with the category 'Sport>MLB' may be indicated in a raw query and/or a structured query associated with a request. In such an instance, a guide(s), an advertisement(s), a resource(s) or other information associated with a category may be rated and/or ranked based on information associated with a guide(s), an advertisement(s), a resource(s), etc. and the category.

The request type indicator field 2740 may include information of a type which is associated with a request. Information indicated in the request type indicator field 2740 may be used to determine a type of processing which may be associated with a request. For example, the request type indicator field 2740 may include information regarding how a query is received from and/or an answer(s) or result(s) are provided to a user(s). Using the example in FIG. 27, the request type 'voice' is associated with the request '502.331.2204,12.12.08, 13 Oct. 2006', which may indicate that a user has submitted the request '502.331.2204,12.12.08, 13 Oct. 2006' using a voice interface and/or may receive a voice message indicating a result. However, the present invention is not limited to a particular request type. For example, a request type text-SMS may be associated with a request, which may indicate that a user has submitted the request as an SMS message. A user may receive an SMS message and/or a voice message indicating a result. Any type of communication services which may be available to the search system 2230 (FIG. 22) may be indicated in the request type indicator field 2740.

The request mode indicator field 2745 may include information of a mode which is associated with a request. Information indicated in the request mode indicator field 2745 may be used to determine a type of processing which may be associated with a request. For example, the request mode indicator field 2740 may include information regarding whether a request is part of a training session, a query, or any other type of activity. Using the example in FIG. 27, the request type 'user' is associated with the request '502.331.2204,12.12.08, 13 Oct. 2006'. This may indicate that a user has submitted the request '502.331.2204,12.12.08, 13 Oct. 2006', rather than a trainer, a trainee, etc.

The request profile ID field 2750 may include information of a profile(s) which may be associated with a request(s). A guide(s), an advertisement(s), a result(s), or other information associated with a profile may be ranked and/or rated. Information indicated in the request profile ID field may be used to select a guide(s) and/or other information which is to be provided responsive to a request based on the association of a guide(s) and/or other information with a profile(s). Using the example illustrated in FIG. 27, the profiles 'Saint Louis, Mo. resident' and 'baseball fan' are associated with the request '502.331.2204,12.12.08, 13 Oct. 2006'. This may indicate that a guide(s), an advertisement(s), etc. which are to be provided responsive to the request '502.331.2204,12.12.08, 13 Oct. 2006' may be selected based at least in part on the association of a guide, an advertisement, etc. with a profile(s) associated with '502.331.2204,12.12.08, 13 Oct. 2006'.

Figure 34:
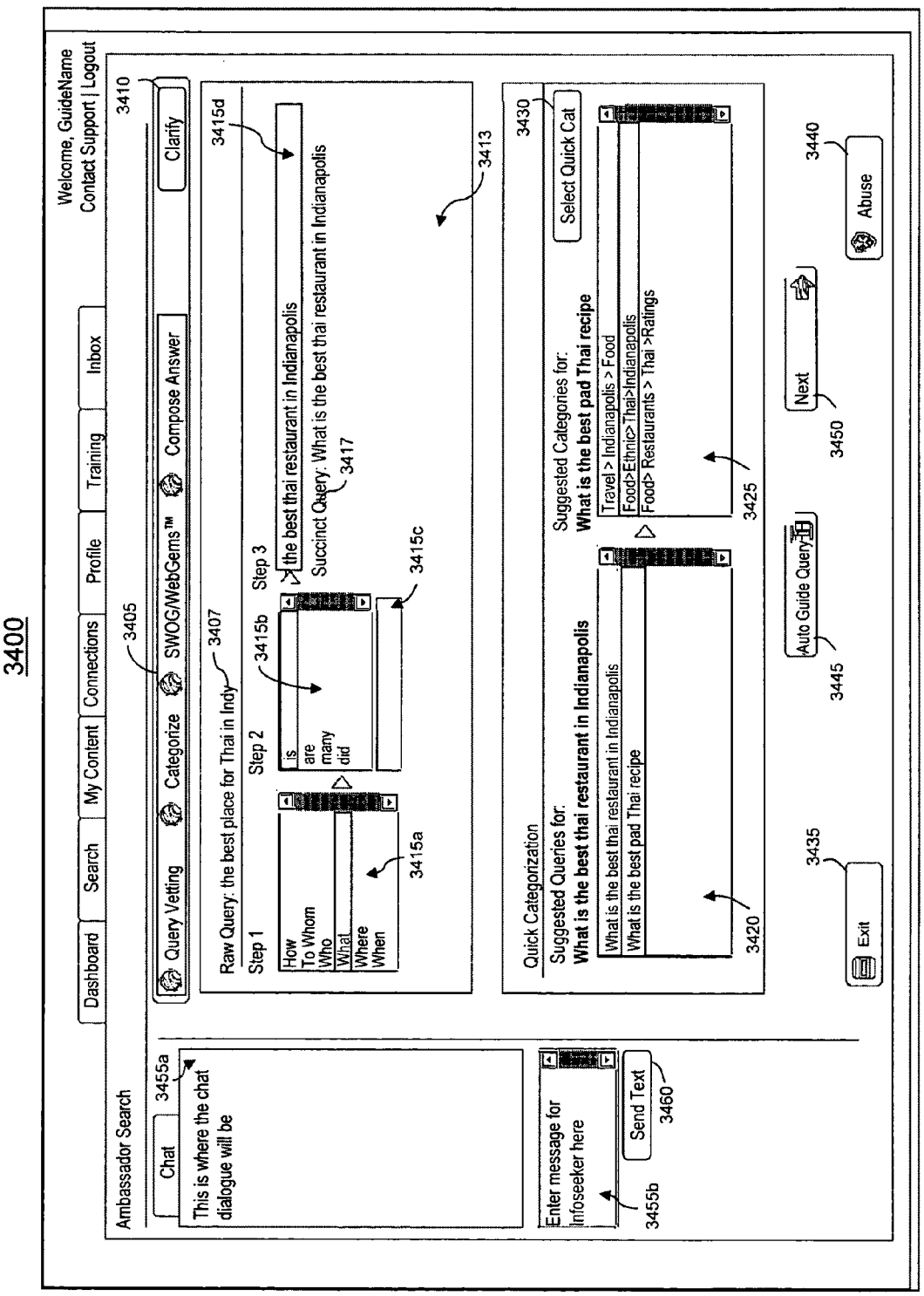
FIG. 34 illustrates a GUI for processing a request.

As illustrated in FIG. 34, a sample of a structured query record is provided, of which one or more may be associated with or resident in the database 2220 (FIG. 22). The structured query record 2800 may include structured query ID field 2805, structured query category field 2810, structured query request ID field 2815, structured query result ID field 2820, structured query profile ID field 2825, and structured query advertisement ID field 2830.

The structured query record 2800 may be created by various activities, including a guided search session, an interactive training session, a non-interactive training session; and an automated search. A structured query record may be imported from an external resource. In at least one embodiment, a structured query record is responsive to a query which requests assistance from a guide. A structured query is a request submitted to a search system which has been processed. A structured query may be a fully-formed, structured sentence which follows a standard grammar. It may include media, including but not limited to images, audio, video, etc.

The structured query ID field 2805 preferably contains a unique identifier of the structured query, which is preferably used consistently. For example, in at least one embodiment, the structured query ID field 2805 can include a randomly generated numerical code, and/or a text string indicating the content of the structured query. A structured query ID serves to distinguish a structured query record associated with a structured query from a structured query record associated with other structured query(ies). Although particular examples of identifiers are described herein, other types of identifiers uniquely indicating a structured query(ies) may be utilized without departing from the spirit and scope of the embodiments.

A unique ID may be assigned to a structured query when it is entered into the database 2220 (FIG. 22). If it is determined that a structured query is identical to an existing structured query in the search database, the structured query may be assigned the same structured query ID and information may be added to the structured query record associated with the structured query ID. A structured query may include other information than that explicitly provided by a user. For example, location information, profile information, etc. may be associated with a query phrase which might differentiate a structured query from another structured query(ies). Further, a structured query may include information from the guide(s) including information of a currently occurring situation (s), time information, etc. A structured query may receive a new structured query ID and/or the system 2200 may create a structured query record based on information such as a profile, a geographic location, or other information being associated with an existing structured query. Information obtained by an ambassador may be used to differentiate one structured query from another. As illustrated in FIG. 28, the text 'what is the next scheduled game for the Saint Louis Cardinals baseball team' is the structured query ID associated with the structured query record 2800.

The structured query category field 2810 may include information of a category(ies) associated with a structured query. Content of the structured query category field 2810 may be created by an automated classification of a structured query. A human guide may select a category(ies) which is associated with a structured query. A method for making and/or reviewing an association of a category with a structured query is further described in the related application 1918.1034P, Application Ser. No. 60/989,664 previously mentioned and incorporated herein by reference. For example, in the example illustrated in FIG. 28, the categories 'Sports>MLB' and 'Entertainment>Saint Louis, Mo.' are associated with the structured query 'what is the next scheduled game for the Saint Louis Cardinals baseball team', as a relevant result may be more likely to be found using resources associated with those categories, rather than a category such as 'Sports>News>NCAA'. More than one category may be associated with a structured query. In at least one embodiment, a result(s) may be rated based on an association between a result(s), a structured query, and a category(ies). A category associated with a structured query may be used to select information associated with the structured query. For example, a number of requests associated with a category may be determined based on a number of requests associated with structured queries associated with the category. Such information may be used for various purposes. For example, an advertiser(s) may choose to associate an advertisement(s) with one or more category(ies) based on a number of requests associated with the category(ies), or a guide(s) may elect to receive request(s) associated with a category(ies) based on a number of queries associated with the category(ies). The association of a structured query with a category may be used to associate a category with other structured queries and/or a raw query associated with a request. For example, if all or part of the content of a structured query is matched to all or part of a raw query and/or another structured query, a category(ies) associated with the structured query may be presented responsive to a request(s) which is associated with the raw query and/or the other structured query.

The structured query request ID field 2815 may include information of a request(s) which have been associated with a structured query. Information indicated in the structured query request ID list field 2815 may be used to associate a structured query with a request(s). For example, if a structured query is selected from a list of suggested structured queries presented responsive to a request, the structured query may be associated with the request. Using the example in FIG. 28, the request(s) '502.331.2204,12.12.08, 13 Oct. 2006', and '555.224.2242,12.28.00, 15 Oct. 2006' are associated with the structured query 'what is the next scheduled game for the Saint Louis Cardinals baseball team'. While only a limited number of requests are associated with the structured query record 2800 illustrated in FIG. 28, any number of requests may be associated with a structured query.

The structured query result ID field 2820 may include information of a result(s) associated with a structured query. The structured query result ID field 2820 (FIG. 34) may be used to associate a result(s) with a structured query. A result associated a structured query may be a specific answer to the query. For example, the result 'Cardinals vs Dodgers 7 PM June 16 Busch Stadium' is associated with the structured query 'what is the next scheduled game for the Saint Louis Cardinals baseball team'. While the content of the structured query result ID field 2820 is depicted as a static answer for the purposes of illustration, no limitation is implied thereby. The structured result ID field 2820 might include and/or indicate other types of information such as a URL, etc.

The structured query profile ID field 2825 may include information of a profile(s) associated with a structured query. The structured query profile ID field 2825 (FIG. 34) may be used to indicate a profile which may be associated with a structured query. A structured query record may be created and/or modified when a profile is associated with a structured query. Using the example illustrated in FIG. 28 the profile(s) 'MLB Fan' and 'Saint Louis, Mo. resident' have been associated with the structured query 'what is the next scheduled game for the Saint Louis Cardinals baseball team'. Information indicated in a profile associated with a structured query may be used to assist an ambassador with analysis of a request. For example, a user associated with a request associated with a structured query may be associated with a profile(s) identified in the structured query profile ID field 2825. If multiple requests associated with a user are associated with a profile, and/or items associated with the profile such as a structured query, the profile may be preferentially selected to match a user with a guide(s) and/or other information. Information indicated in a profile record such as the profile record 3300 (FIG. 33) may be used to select a guide(s) to respond to a user request as further described in U.S. provisional application Ser. No. 60/980,010, inventor by Scott A. Jones, et. al., filed Oct. 15, 2007, titled METHOD AND SYSTEM FOR MATCHING INFORMATION SEEKERS AND SEARCHERS.

The structured query advertisement ID field 2830 may include information of an advertisement(s) associated with a structured query. The structured query advertisement ID field 2830 may be used to associate an advertisement(s) with a structured query. A structured query record may be created or modified when an advertisement ID is associated with a structured query. Using the example illustrated in FIG. 28 the advertisement ID 'cardinal baseball tickets' has been associated with the structured query 'what is the next scheduled game for the Saint Louis Cardinals baseball team'. Information indicated in an advertisement record(s) associated with a structured query may be used to assist a guide in selecting an advertisement(s). For example, an advertisement(s) associated with a structured query may be presented to a guide(s) assigned to respond to a request associated with a structured query. A number of requests associated with an advertisement(s) may be tracked and used to determine compensation for a guide(s) and/or the search system 2230 (FIG. 22). Information indicated in an advertisement record(s) such as the advertisement record 3100 (FIG. 31) may be used to provide an advertisement to a user(s) and/or a guide(s).

As illustrated in FIG. 29, an exemplary result record 2900 is provided, of which one or more may be associated with or resident in the search database 2220 (FIG. 22). The result record 2900 may include result record ID field 2905, result structured query ID field 2910, result structured query web gem indicator field 2915, result request ID field 2920, result structured query rating field 2925, result guide ID field 2930, result URL field 2935, and result display URL field 2940.

The result record ID field 2905 contains an identifier of a result, which is preferably unique and preferably used consistently. For example, in at least one embodiment, the result record ID field 2905 can include a randomly generated numerical code, and/or a string indicating a result. A result record ID serves to distinguish a result record associated with a result from a result record associated with other result(s). Although particular examples of identifiers are described herein, other types of identifiers uniquely indicating a result(s) may be utilized without departing from the spirit and scope of the embodiments. In at least one embodiment, the result record ID is a text string. A result record ID may include a result description, a random number, and/or any other information which uniquely identifies a result. Using the example in FIG. 29, 'Cardinals vs Dodgers 7 PM June 16 Busch Stadium' is the result record ID associated with the result record 2900.

The result structured query ID field 2910 may include information of a structured query(ies) associated with a result. Content of the result structured query field 2910 may be used to select a result to be associated with a request. For example, a structured query associated with a result may be used to determine an order in which a result(s) may be presented to a user(s). As illustrated in FIG. 29, the structured query 'what is the next scheduled game for the Saint Louis Cardinals baseball team' and the structured query "what is the next scheduled game for LA" are associated with the result 'Cardinals vs Dodgers 7 PM June 16 Busch Stadium'.

The result webgem indicator field 2915 may include information related to a status of a result(s). In at least one embodiment, the result webgem indicator field 2915 and the result structured query ID field 2910 are linked by for example a pointer. Any type of status information may be indicated in the result rating field 2915. Using the example illustrated in FIG. 29, the result 'Cardinals vs Dodgers 7 PM June 16 Busch Stadium' may be a webgem with respect to the structured query 'what is the next scheduled game for the Saint Louis Cardinals baseball team' and not a webgem with respect to the structured query 'what is the next scheduled game for LA'. The webgem status indicator may be based on various criteria such as usage of a result(s), rating(s) of a result(s) by a user(s) and/or a guide(s), rating(s) of a resource associated with a result(s), rating(s) of a guide(s) associated with a result, etc. Information indicated in the result webgem indicator field 2915 may be used in ranking a result(s) which may be presented responsive to a request associated with a structured query(ies) such as the structured queries indicated in the result structured query list field 2910. In at least one embodiment, an indicator such as a Boolean 'flag' may be associated with a result(s) and a structured query which may be used to indicate a result has been determined to be a superior result or 'web gem' when associated with the structured query.

The result request ID field 2920 may include information of a request(s) which has been associated with a result. Information indicated in the result request ID field may be used to associate a result(s) with a request(s) indicated in the request ID list field 2920. For example, a result indicated in the result record ID field 2905 may have been presented to a user(s) responsive to a request(s) indicated in the request ID list field 2920. Using the example in FIG. 29, the request(s) '502.331.2204,12.12.08, 13 Oct. 2006', and '555.224.2242, 12.28.00, 15 Oct. 2006' are associated with the result 'Cardinals vs Dodgers 7 PM June 16 Busch Stadium'. While only a limited number of requests are associated with the result record 2900, any number of requests may be associated with a result(s). Association of request(s) with a result(s) as indicated in the request ID list field 2920 may for example be used to determine usage information of a result(s).

The result structured query rating field 2925 may include information related to a rating of a result(s). In at least one embodiment, the result structured query rating field 2925 and the result structured query ID field 2910 are linked by for example a pointer. Any type of rating information may be indicated in the result structured query rating field 2925. Using the example illustrated in FIG. 29, the result 'Cardinals vs Dodgers 7 PM June 16 Busch Stadium' may have a rating of '10' with respect to the structured query 'what is the next scheduled game for the Saint Louis Cardinals baseball team' and a rating of '7' with respect to the structured query 'what is the next scheduled game for LA'. Structured query rating information may be based on various criteria such as usage of a result(s), rating(s) of a result(s) by a user(s) and/or a guide(s), rating(s) of a resource associated with a result(s), rating(s) of a guide(s) associated with a result, etc. Information indicated in the result structured query rating field 2915 may be used in ranking a result(s) which may be presented to a guide(s) and/or a user(s) responsive to a request associated with a structured query(ies) such as the structured queries indicated in the result structured query list field 2910.

The result guide ID field 2930 may include information of a guide associated with a result(s). For example, if a guide has produced a result(s) an identifier of the guide may be indicated in the result guide ID field 2930. A guide(s) may be associated with a result based on voting, review, or approval(s) of a result(s) by a guide. For example, if an ambassador guide provides a result(s) to a user, an identifier of the guide may be indicated in the result guide ID field 2930. Content of the result guide ID field 2930 may be utilized for various purposes, such as determining a rating(s), compensation, etc. of a guide(s). Using the example illustrated in FIG. 29, 'Bob Smith' is associated with 'Cardinals vs Dodgers 7 PM June 16 Busch Stadium'.

The result URL field 2935 may include information of a URL associated with a result. Content of the result URL field 2935 may be used to provide access to information associated with a result. For example, a web page associated with a result may be identified by information in the result URL field 2935. Using the example illustrated in FIG. 29, the URL "www.mlbschdeules.com\stlouis' is associated with the result 'Cardinals vs Dodgers 7 PM June 16 Busch Stadium'.

The result display URL field 2940 may include information of a URL associated with a result. Content of the result display URL field 2940 may be used to provide access to information associated with a result. For example, the content of the result display URL field 2940 may indicate a display URL which is linked to the result URL indicated in the result display URL field 2935. For example, the content display URL may be provided to point to a webpage or other information indicated in the result display URL field 2940. Using the example illustrated in FIG. 29, the URL 'cha.gs\stl' is associated with the result 'Cardinals vs Dodgers 7 PM June 16 Busch Stadium'.

As illustrated in FIG. 30, an exemplary resource record 3000 is provided, of which one or more may be associated with or resident in the search database 2220 (FIG. 22). The resource record 3000 may include a resource record ID field 3005, resource category list field 3010, and resource access information field 3015.

The resource record ID field 3005 contains an identifier of a resource, which is preferably unique and preferably used consistently. For example, in at least one embodiment, the resource record ID field 3005 can include a randomly generated numerical code, and/or a string indicating a resource. A resource record ID serves to distinguish a resource record associated with a resource from a resource record associated with other resource(s). Although particular examples of identifiers are described herein, other types of identifiers uniquely indicating a resource(s) may be utilized without departing from the spirit and scope of the embodiments. In at least one embodiment, the resource record ID is a text string. A resource record ID may include a resource description, a random number, and/or any other information which uniquely identifies a resource. Using the example in FIG. 30, 'sports scores' is the resource record ID associated with the resource record 3000.

The resource category list field 3010 may include information of a category(ies) associated with a resource. Content of the resource category list field 3010 may be used to select a resource to be associated with a request. Using the example in FIG. 30, 'Sports>MLB' and 'Sports>NFL' are the categories associated with the resource 'sports scores'. This may indicate that the resource 'sports scores' may be presented responsive to a request associated with 'Sports>MLB' and/or 'Sports>NFL'.

The resource access information field 3015 may include information regarding how a resource may be accessed. For example, the resource access information field 3015 may include a URL, an email address, a telephone number, a password(s), a login ID, or other information which may be used to access a resource. Using the example illustrated in FIG. 30, the telephone number '317.331.2224', the email 'scores@sportsscores.com' and the URL 'www.sportsscores.com' have been associated with 'sports scores'. This may indicate that 'sports scores' may be accessed using and/or all of these services. Resource access information may include man and/or machine readable instructions for utilizing a resource, such as a web form, an API, etc.

As illustrated in FIG. 31, a sample of an advertisement record 3100 is provided, of which one or more may be associated with or resident in the search database 2220 (FIG. 22). The advertisement record 3100 may include advertisement record ID field 3105, advertisement category list field 3110, and advertisement access info field 3115.

The advertisement record ID field 3105 contains an identifier of an advertisement, which is preferably unique and preferably used consistently. For example, in at least one embodiment, the advertisement record ID field 3105 can include a randomly generated numerical code, and/or a text string indicating an advertisement. An advertisement record ID serves to distinguish an advertisement record associated with an advertisement from an advertisement record associated with other advertisement(s). Although particular examples of identifiers are described herein, other types of identifiers uniquely indicating an advertisement(s) may be utilized without departing from the spirit and scope of the embodiments. In at least one embodiment, the advertisement record ID is a text string. An advertisement record ID may include an advertisement description, a random number, and/or any other information which uniquely identifies an advertisement. Using the example in FIG. 31, 'cardinal baseball tickets' is the advertisement record ID associated with the advertisement record 3100.

The advertisement category list field 3110 may include information of a category(ies) associated with an advertisement. Content of the advertisement category list field 3110 may be used to select an advertisement to be associated with a request. Using the example in FIG. 31, 'Sports>MLB' and 'Sports>Saint Louis, Mo.' are associated with 'cardinal baseball tickets'.

The advertisement access information field 3115 may include information regarding how an advertisement may be accessed. For example, the advertisement access information field 3115 may include a URL, an email address, a telephone number, a password(s), a login ID, and/or other information which be allowed access to an advertisement. For example, a server address and a filename may be indicated in the advertisement access information field, or a tracking link to a web page may be provided, etc. Using the example illustrated in FIG. 31, the URL 'https://www.chacha.com/ads/ticketscom/stlcards' is the access information associated with 'cardinal baseball tickets'. This may indicate that a file(s) associated with the advertisement 'cardinal baseball tickets' may be found at the URL 'https://www.chacha.com/ads/ticketscom/stlcards'.

Figure 32:
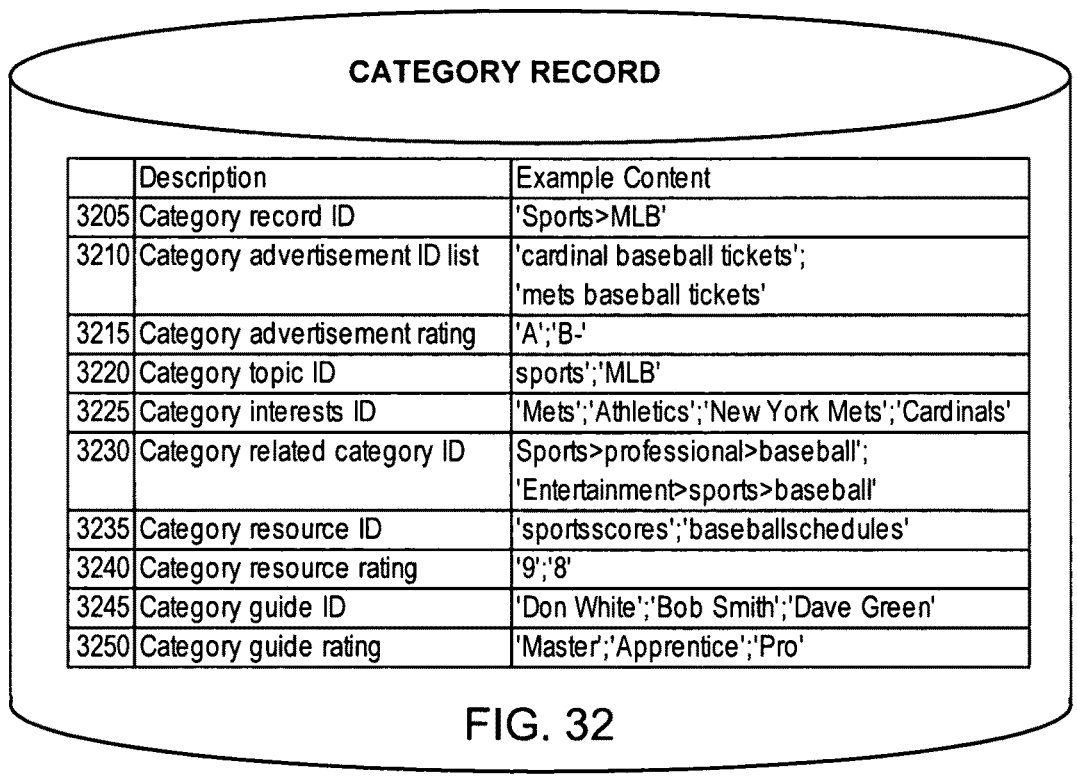
FIG. 32 illustrates a database record for a categorization.

As illustrated in FIG. 32, an exemplary category record 3200 is provided, of which one or more may be associated with or resident in the search database 2220 (FIG. 22), The category record 3200 may include a category record ID field 3205, a category advertisement ID field 3210, category advertisement rating field 3215, category topic ID field 3220, category interest ID field 3225, category related category ID field 3230, category resource ID field 3235, category resource rating field 3240, category guide ID field 3245, and category guide rating field 3250.

The category record ID field 3205 contains an identifier of a category, which is preferably unique and preferably used consistently. For example, in at least one embodiment, the category record ID field 3205 can include a randomly generated numerical code and/or a string indicating a category. A category record ID serves to distinguish a category record associated with a category from a category record associated with other category(ies). Although particular examples of identifiers are described herein, other types of identifiers uniquely indicating a category(ies) may be utilized without departing from the spirit and scope of the embodiments. In at least one embodiment, the category record ID is a text string. A category record ID may include a category description, a random number, and/or any other information which uniquely identifies a category. Using the example in FIG. 32, 'Sports>MLB' is the category record ID associated with the category record 3200.

The category advertisement ID field 3210 may include information of an advertisement(s) associated with a category. Content of the category advertisement ID field 3210 may be used to select an advertisement to be associated with a request. Using the example in FIG. 32, 'Cardinal baseball tickets', and 'Mets baseball tickets' are associated with the category record 3200. This may indicate that the advertisements 'Cardinal baseball tickets', and 'Mets baseball tickets' have been associated with the category 'Sports>MLB'.

The category advertisement rating field 3215 may include information of ratings of an advertisement(s) associated with a category. Content of the category advertisement rating field 3215 and the category advertisement ID field 3210 may be linked by, for example, a pointer. Any type of rating information may be indicated in the category advertisement rating field 3215. A higher advertisement rating may increase the probability that an advertisement will be selected to be associated with a request. For example, a list of advertisements may be presented to a guide in an order based at least in part on an advertisement rating associated with a category associated with a request. Using the example in FIG. 32, 'Cardinal baseball tickets' has a rating of 'A', and 'Mets baseball tickets' has a rating of 'B-'. Any rating system may be utilized within the scope of this disclosure. A rating(s) may be based on factors such as guide ratings, user ratings, advertiser ratings, an external database, time, proximity, etc. A ranking of an advertisement may be determined based on ratings associated with an advertisement and information associated with a request such as a keyword, a category, a profile, geographic location information, a user, a guide, etc. A selection of an advertisement(s) may be done automatically and/or using a guide(s).

The category topic ID field 3220 may include information of a topic(s) associated with a category. Content of the category topic ID field 3220 may be used to associate a category with a request(s). For example, text of a raw query and/or a structured query may be compared to any or all of the content of the category topic ID field 3220 to rate and/or rank a category. Such information may affect the order in which a category is presented responsive to a query. Using the example illustrated in FIG. 32, the topics 'sports' and 'MLB' are associated with the category 'Sports>MLB'. The category 'Sports>MLB' may receive a high ranking associated with a query including 'baseball' and 'majorleague'.

The category interest ID field 3225 may include information of an interest(s) associated with a category. Content of the category interest ID field 3225 may be used to associate a category with a request(s). For example, text of a query associated with a request may be compared to any or all of the interests indicated in the category interest ID field 3225 to rate and/or rank a category. Such ranking or rating information may affect the order in which a category is presented responsive to a search query. Using the example illustrated in FIG. 32, the interests 'Mets', 'Athletics', 'New York Mets', and 'Cardinals' are associated with the category 'Sports>MLB'. Interests may be associated with a category in various ways. In at least one embodiment, system administrators may associate interests with a category. In at least one embodiment, a guide(s) may recommend an interest(s) to be associated with a category and a voting and/or review process may be utilized to approve or reject a recommended addition.

The category related category ID field 3230 may include information of a related category associated with a category. Content of the category related category ID field 3230 may be used to associate a category with a request(s). For example, text of a query may be compared to any or all of the content of the topics and/or interests associated with a category identified in the category related category ID field 3230 to rate and/or rank a category. Such ranking or rating information may affect the order in which a category is presented responsive to a request. Using the example illustrated in FIG. 32, 'Sports>professional>baseball' and 'Entertainment>sports>baseball' are associated with 'Sports>MLB'. Related categories may be associated with a category in various ways. In at least one embodiment, a system administrator(s) may associate a related category(ies) with a category. In at least one embodiment, a guide(s) may recommend a related category(ies) to be associated with a category and a voting and/or review process may be utilized to approve or reject a recommended addition.

The category resource ID field 3235 may include information of a resource(s) associated with a category. Content of the category resource ID field 3235 may be used to select a resource to be associated with a request. Using the example in FIG. 32, the resources 'sportsscores', and 'baseballschedules' are associated with the category 'Sports>MLB'.

The category resource rating field 3240 may include information of ratings of a resource(s) associated with a category. Content of the category resource rating field 3240 and the category resource ID list field 3235 may be linked by, for example, a pointer. Any type of rating information may be indicated in the category resource rating field 3240. A higher resource rating may increase the probability that a resource will be selected to be associated with a request. For example, a list of resources may be presented to a guide in an order based at least in part on a resource rating associated with a category associated with a request. Using the example in FIG. 32, 'sportsscores' has a rating of '9' and 'baseballschedules' has a rating of '8'. Any rating system may be utilized within the scope of this disclosure. A rating(s) may be based on factors such as guide ratings, user ratings, advertiser ratings, an external database, time, proximity, etc. A ranking of a resource may be determined based on ratings associated with a resource and information associated with a request such as a keyword, a category, a profile, geographic location information, a user, a guide, etc. A selection of a resource may be done automatically and/or using a guide(s).

The category guide ID field 3245 may include information of a guide(s) associated with a category. Content of the category guide ID field 3245 may be used to select a. Using the example in FIG. 32, 'Don White', 'Bob Smith', and 'Dave Green' are associated with 'Sports>MLB'.

The category guide rating field 3250 may include information of ratings of a guide(s) associated with a category. Content of the category guide rating field 3250 and the category guide ID list field 3245 may be linked by, for example, a pointer. Any type of rating information may be indicated in the category guide rating field 3250. A higher guide rating may increase the probability that a guide will be selected. For example, a list of guides may be presented to a user in an order based at least in part on a guide rating associated with a category associated with a request, or a highly ranked guide may be notified first of a request. Using the example in FIG. 32, 'Don White' has a rating of 'Master', 'Bob Smith' has a rating of 'Apprentice', and 'Dave Green' has a rating of 'Pro'. Any rating system may be utilized within the scope of this disclosure. A rating(s) may be based on factors such as guide ratings, user ratings, advertiser ratings, an external database, time, proximity, etc. A ranking of a guide may be determined based on ratings associated with a guide and information associated with a request such as a keyword, a category, a profile, geographic location information, a user, a guide, etc. A selection of a guide may be done automatically and/or using a guide(s).

Figure 33:
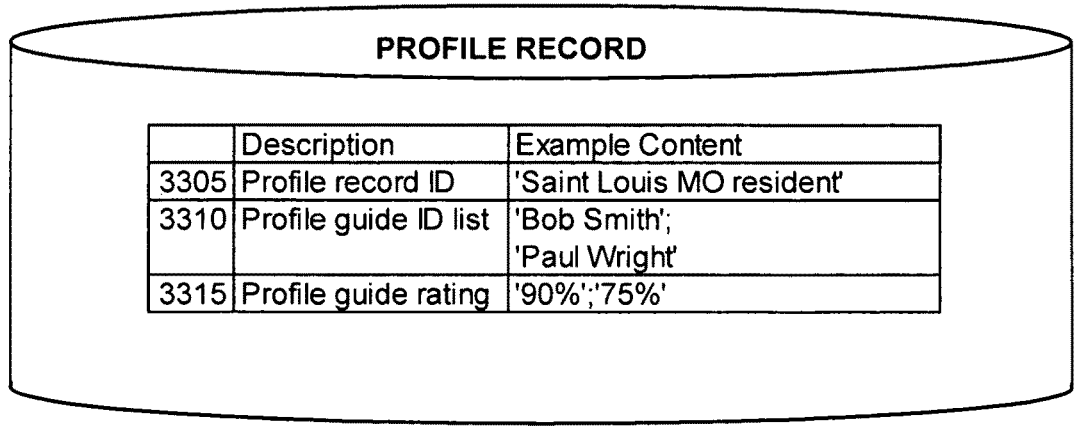
FIG. 33 illustrates a database record for a profile.

As illustrated in FIG. 33, an exemplary profile record 3300 is provided, of which one or more may be associated with or resident in the search database 2220 (FIG. 22). The profile record 3300 may include a profile record ID field 3305, a profile guide ID list field 3310, and a profile guide rating list field 3315.

The profile record ID field 3305 contains an identifier of a profile, which is preferably unique and preferably used consistently. For example, in at least one embodiment, the profile record ID field 3305 can include a randomly generated numerical code and/or a string indicating a profile. A profile record ID serves to distinguish a profile record associated with a profile from a profile record associated with other profiles. Although particular examples of identifiers are described herein, other types of identifiers uniquely indicating a profile(s) may be utilized without departing from the spirit and scope of the embodiments. In at least one embodiment, the profile record ID is a text string. A profile record ID may include a profile description, a random number, and/or any other information which uniquely identifies a profile. Using the example in FIG. 33, 'Saint Louis, Mo. resident' is the profile record ID associated with the profile record 3300.

The profile guide ID list field 3310 may include information of a guide(s) associated with a profile. Content of the profile guide ID list field 3310 may be used to select a guide. Using the example in FIG. 33, 'Bob Smith', and 'Paul Wright' are associated with the profile 'Saint Louis, Mo. resident'.

The profile guide rating list field 3315 may include information of ratings of a guide(s) associated with a profile. In at least one embodiment, the content of the profile guide rating list field 3315 and the profile guide ID list field 3310 may be linked by, for example, a pointer. Any type of rating information may be indicated in the guide rating list field 3315. In at least one embodiment, a higher guide rating may increase the probability that a guide will be selected to be associated with a request associated with a profile. For example, guides may be notified of a request in an order based on a ranking of guides associated with a profile associated with a request. Using the example in FIG. 33, 'Bob Smith' has a rating of '90%', and 'Paul Wright' has a rating of '75%', which may indicate that the guide 'Bob Smith' has received an average rating of '90%' and that the guide 'Paul Wright' has received an average rating of '75%' when responding to requests submitted by users associated with the profile 'Saint Louis, Mo. resident'. The rating may be with respect to all other registered guides that are currently available, or all guides that are associated with the profile record 3300.

As illustrated in FIG. 34, an exemplary GUI is provided for creation of a vetted query based upon a raw query which is to be associated with a category(ies). The GUI 3400 includes a progress bar 3405, a raw query box 3407, a "Clarify" button 3410, query formation controls 3415, a succinct query indicator 3417, a query selection window 3420, a category selection window 3425, a "Select Quick Category" button 3430, an "Exit" button 3435, an "Abuse" button 3440, an "AutoGuide Query" button 3445, a "Next" button 3450, chat windows 3455 and a "Send Text" button 3460.

The progress bar 3405 indicates operation(s) that a guide has completed using the GUI 3400. Using the example in FIG. 34, a guide may perform activities in which a succinct query is formed based on information obtained using the GUI 3400; a categorization of a query is performed using the GUI 3500 illustrated in FIG. 35, a review of available search results and guides responsive to the categorized succinct query is performed using the GUI 3600 illustrated in FIG. 36, and a review and revision of a response to a user query is performed using the GUI 3700 illustrated in FIG. 37. Indication in the progress bar 3405 may be done using indicators such as color, shading, underlining, flags, etc.

Information of a raw query is provided in the raw query box 3407. A raw query may be a query provided to a guide by an information seeker, by the search system database, etc. For example, the raw query may be text that a user typed into a search query box, on a web page, submitted as an SMS text message, or which was converted from speech to text by a transcriber, an automated process, etc. The query box 3407 is illustrated as a text box, however other information may be provided to a guide, such as an audio record associated with a raw query, images which may be associated with a raw query, etc.

The query formation controls 3415 may be used to transform a raw or free-form query into a succinct or structured query. As shown in FIG. 34, the query formation controls 3415 may be scrollable text boxes such as the text boxes 3415a, 3415b populated with a list of a plurality of words or phrases, and/or query text boxes such as the query text boxes 3415c, 3415d allowing entry of text, or containing keywords or other elements related to the raw query. The query formation controls 3415 may include any number of text boxes, drop-down lists, etc.

A succinct query may formed by combining the selection(s) in the query formation text boxes. The combination of the selections "What", "is", and "the best that restaurant in Indianapolis" from the query formation text boxes is used to form the succinct query, "What is the best that restaurant in Indianapolis", as displayed in the succinct query indicator 3417.

If a guide requests clarification of a query, the guide may click the "Clarify" button 3410. The "Clarify" button 3410 may cause the GUI 3470 illustrated in FIG. 34A to be provided.

The chat windows 3455 are provided for interaction between an information seeker and a guide. The user chat window 3455a may contain text entered by a user responsive to a clarification request from a guide, text derived from an audio response by a user, controls for playback of one or more audio recordings which may have been provided by a user, images, video, or other media, etc.

The searcher chat window 3455b may be provided to allow a guide to enter free-form text which may be transmitted to a user. The "Send Text" button 3460 is provided to a guide to send dialogue, for example, in response to an information seeker, to request assistance in the construction of a structured query, or to send a structured query to a user for review. Such information may be processed using text-to-speech or other technologies to provide an interface between a user and a guide.

The query suggestion window 3420 is populated with a list of suggested succinct queries. A list of suggested queries may be initially generated in relation to a raw query. As a guide selects an option(s) using the query formation controls 3415, the query selection window 3420 may be automatically modified and/or filtered based on any selection(s). The query suggestion window 3420 may include the currently constructed succinct query and/or any number of succinct queries that are associated with the succinct query as composed using the query formation controls 3415.

If a guide selects a query from the query selection window, the category selection window 3425 may be populated with a list of suggested categories. For example, if a guide selects the query, "What is the best pad Thai recipe" from the query selection window 3420, the category selection window 3425 may be indicate a category including "Food>Ethnic>Thai>Indianapolis". If a guide is satisfied with a suggested categorization presented in the category selection window 3425 the "Select Quick Category" button 3430 may be selected. The "Select Quick Category" button will direct the vetting application to omit the categorization operation in the vetting process as shown by the "Categorize" tab in the progress bar and direct the application to the "SWOG/WebGems™" section of the query vetting application. The suggested queries and the categories may include previously suggested queries and/or categories stored in the database 2220 (FIG. 22) in relation to keyword(s) contained in the raw query box 3407 and/or the query formation controls 3415.

If the "Exit" button 3435 is selected, the search session is ended and the guide is made available. The search session may be transferred to a different guide.

If the "Abuse" button 3445 is selected, a message may be sent to the system database, administrator, etc. reporting the incident. A user who is reported for abuse may not be permitted to utilize the services of a guide. The "Abuse" button 3445 may cause a review of a search session to be conducted. A search session may be terminated and/or transferred to another guide.

The "AutoGuide Query" button 3445 allows a guide to submit information provided in the GUI 3400 for an automated search and/or response. For example, if a guide determines that a search result(s) may be provided without further assistance of a human searcher, selection of the "Auto Guide Query" button 3445 may cause the search system 2230 (FIG.

22) to process information obtained using the GUI 3400 to provide a response to a user. For example, information from a search resource may be automatically formatted to provide a response to a user. In at least one embodiment a voice response may be provided using text-to-speech processing and/or a text response may be provided to a user which is automatically generated.

Upon completion of any required information of the query vetting process, a guide may activate the "Next" button 3450. Activation of the "Next" button 3450 may cause the GUI 3500 (FIG. 35) to be provided.

Figure 34A:
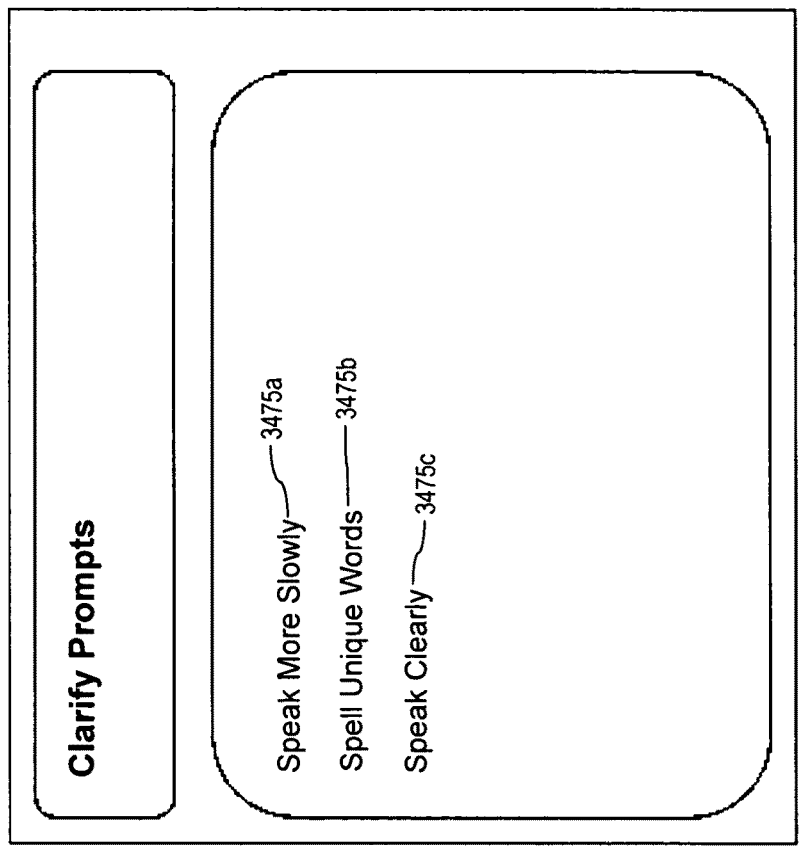
FIG. 34A illustrates a GUI for processing a request.

The GUI 3470 illustrated in FIG. 34A allows a guide to request clarification, of a search request from a user. The GUI 3470 may contain a list of standard clarification request phrases such as the clarification prompts 3475. For example in a voice-based interaction with a user, activation of the clarification prompt 3475a may send the audio message 'Speak more slowly' to a user. Activation of the clarification prompts 3475b and 3475c may send the associated spoken phrases to a user. Use of a standard set of response phrases may allow a more uniform response to a user. In the case of an interactive chat session, a guide may respond more rapidly using the standard prompts than by typing text in the chat windows 3455 (FIG. 34). In at least one embodiment, a guide may not be provided with the chat window 3455b. The GUI 3470 may be provided as a 'pop-up' or may be provided as an element of the GUI 3400 (FIG. 34).

Figure 35:
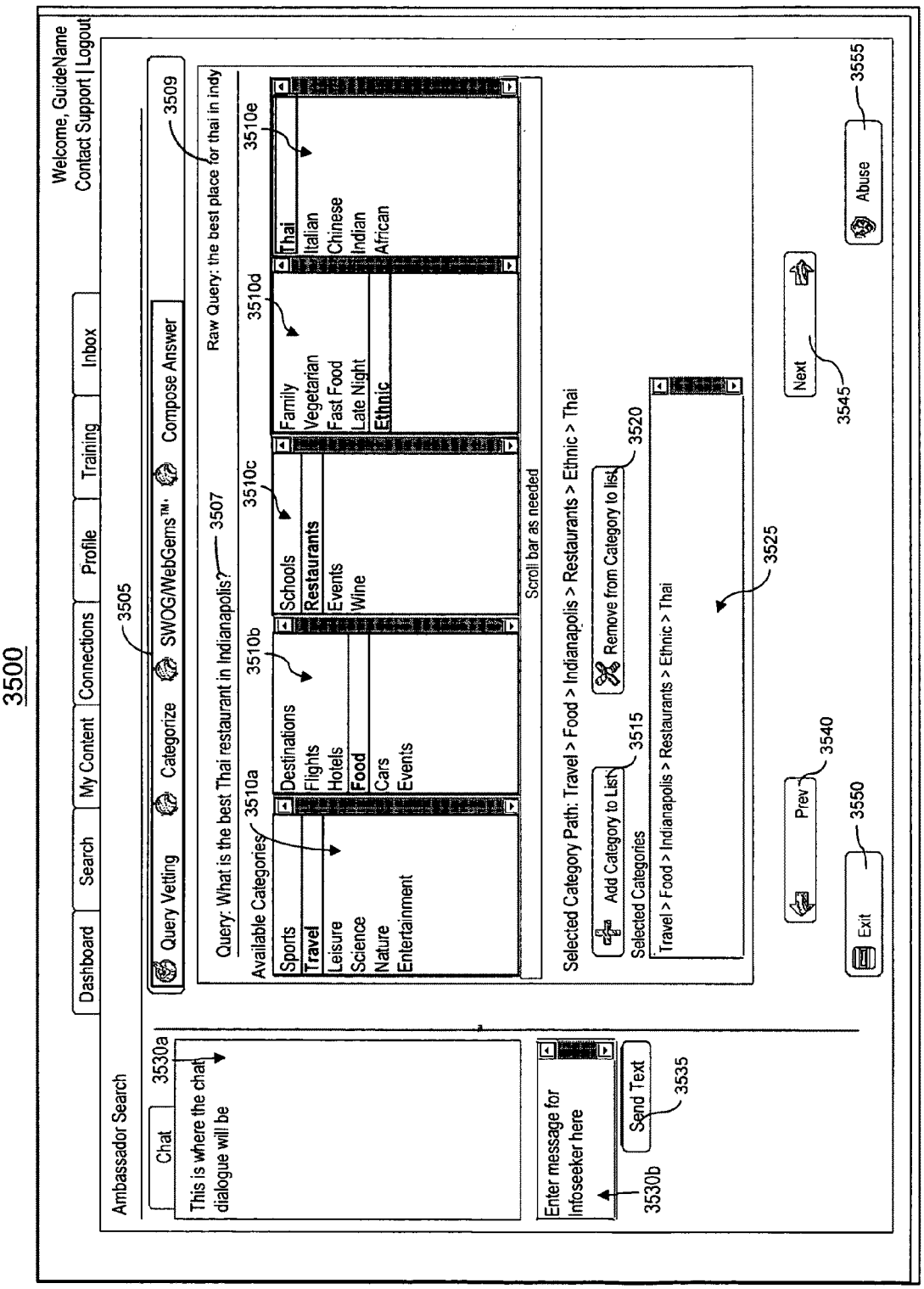
FIG. 35 illustrates a GUI for categorizing a request.

As illustrated in FIG. 35, an exemplary GUI 3500 is provided for categorization of a structured query. The GUI 3500 includes a progress bar 3505, a query box 3507, a raw query indicator 3509, category selection controls 3510, an "Add Category to List" button 3515, a "Remove Category from List" button 3520, a categorization list 3525, chat windows 3530, a "Send Text" button 3535, a "Prev" button 3540, a "Next" button 3545, an "Exit" button 3550, and an "Abuse" button 3555. The progress bar 3505 may include a list of a plurality of operations included in the vetting process and any operations may further be subdivided into parts or separate sections as desired. As shown in FIG. 35, any operations of the vetting process that have been completed and the vetting operation currently in progress may be marked by an identifier. In one embodiment, the vetting operations completed are identified by a check mark, and the current vetting operation in progress is highlighted and/or marked a different color. The identification methods in the progress bar 3505 are not limited to any configuration, for example completed vetting operations may be indicated by a flag, strikethrough, etc. and a current vetting operation may be indicated by a flag, underline, highlighted, etc.

A query constructed or selected during the vetting process is displayed in the query box 3507 and the raw query provided to a guide by an information seeker, by the search system database, etc. is displayed in the raw query indicator 3509.

The category selection controls 3510 are provided for selection of a categorization(s) of a query. The category selection controls 3510 are populated with a list of a plurality of elements within a taxonomy. The first level categorization control 3510a may include a list of the first level classifications in a taxonomy. Selection of an element using the first level categorization control 3510a may determine elements presented in the second level categorization control 3510b. Selection of an element using the second level categorization control 3510b may determine elements displayed in the third level categorization control 3510c. Selection of an element using the third level categorization control 3510c may determine elements displayed in the fourth level categorization control 3510d and selection of an element using the fourth level categorization control 3510d may determine elements displayed in the fifth level categorization control 3510e. Any number of categorization elements and/or levels may exist and any number of categorization controls and/or lists may be displayed during the categorization process. A guide may select any elements displayed to form a hierarchal category path for categorization of a vetted query. The category selection controls 3510 may be scrollable text boxes, drop-down lists, text fields and/or any other form of controls which allow entry or selection of words or characters.

Categorizations associated with a query displayed in the query box 3507 are displayed in the categorization list 3525. If a guide desires to associate a query with a selected categorization he or she may click the "Add Category to List" button 3515. If a guide desires to remove a category from the category list 3525 the guide may click the "Remove Category from List" button 3520.

To navigate to the previous vetting GUI, a guide may select the "Prev" button 3540, and upon completion of the categorization screen, a guide may select the "Next" button 3545 to navigate to the next GUI. The "Next" button 3545 may not be active if required information has not been provided in the GUI 3400 (FIG. 34) or the GUI 3500 (FIG. 35).

As previously explained with respect to FIG. 34, the chat windows 3530a, 3530b are provided for dialogue among an information seeker and guide(s) or searcher(s). The "Send Text" button 3535 is provided for a guide to send dialogue responses to an information seeker. If the "Exit" button 3550 is selected, the search session is ended and the guide is made available. If the "Abuse" button 3555 is selected, a message may be sent to the system database, administrator, etc. reporting the incident.

Upon completion of any required information in the categorization GUI 3500, a guide is directed to the "SWOG/WebGems™" section of the vetting application.

Figure 36:
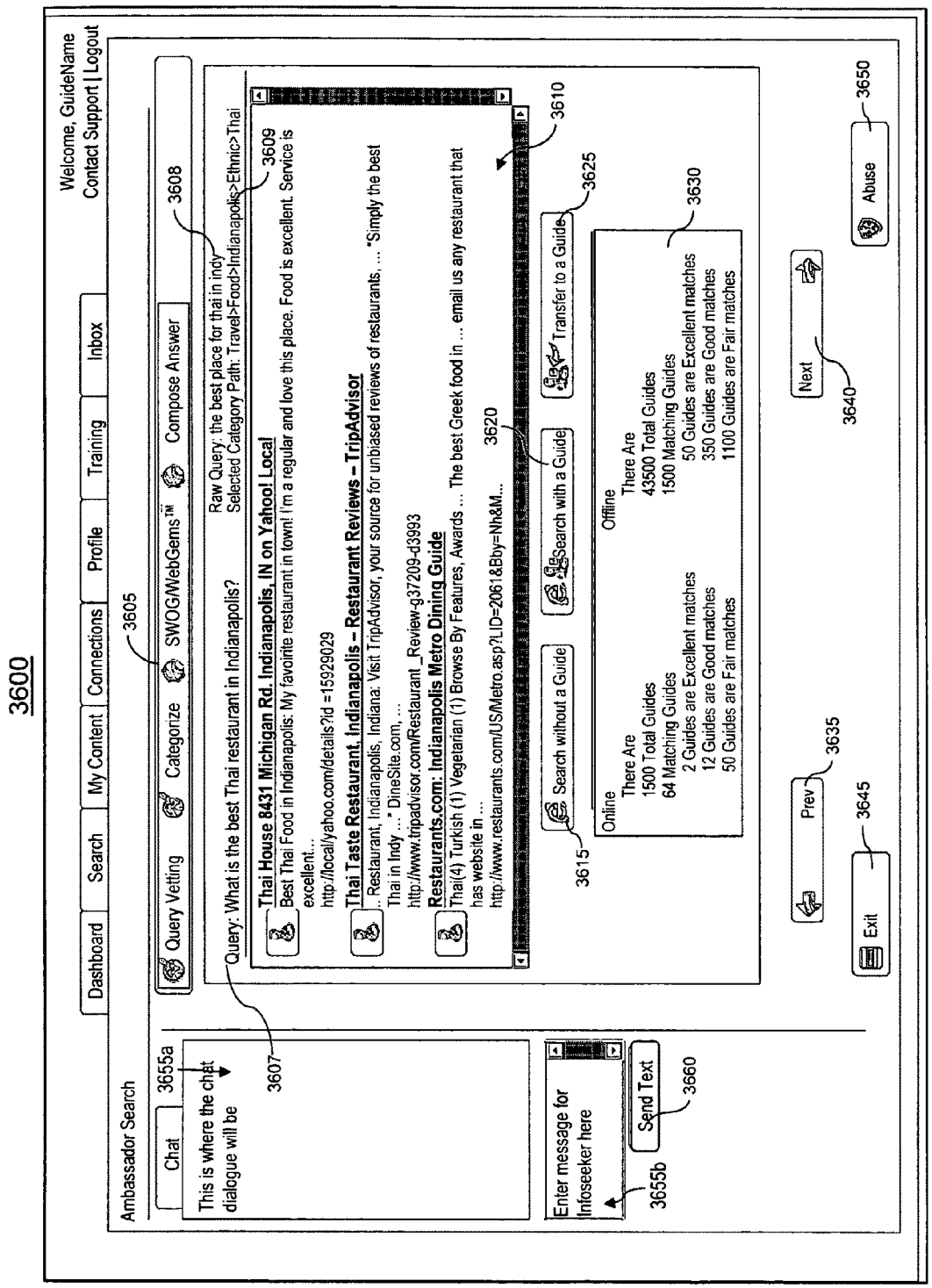
FIG. 36 illustrates a GUI for responding to a request.

As illustrated in FIG. 36, the GUI 3600 includes a progress bar 3605, a structured query indicator 3607, a raw query indicator 3608, a categorization indicator 3609, a browser window 3610, a "Search without a guide" (SWOG) button 3615, a "Search with a guide" button 3620, a "Transfer to a guide" button 3625, a guide availability lists 3630, a "Prev" button 3635, a "Next" button 3640, an "Exit" button 3645, an "Abuse" button 3650, chat windows 3655, and a "Send Text" button 3660.

The progress bar 3605 may include a list of a plurality of operations included in the vetting process and any operations may further be subdivided into parts or separate sections as desired, as previously explained with respect to FIG. 34. A query identified during the vetting process is displayed by the structured query indicator 3607 and information of a raw query provided to a guide by an information seeker, by the search system database, etc. is displayed by the raw query indicator 3608. The categorization indicator 3609 displays the selected categorizations associated with the structured query displayed by the structured query indicator 3607.

The results window 3610 may display any number of search results associated with the categorizations selected and the structured query constructed using the GUI 3400 and the GUI 3500. The results window 3610 may be a scrollable window. A guide may review any or all of the search results presented in the results window 3610. A guide may determine if a search result(s) indicated in the results window 3610 should be transmitted to a user.

If a guide selects the "Search without a guide" button 3615, the vetted, categorized query may be submitted for a search without the assistance of a human searcher. This option may be selected if a guide determines that none of the search results indicated in the results window 3610 may satisfy a user request. A guide may interact with a user to make such a determination. Submission of the categorized succinct query for a search without a guide may cause any number of search results to be added to the results indicated in the search results window 3610. A guide may return to the categorization and/or the query vetting GUI to modify the search results and/or the searcher information displayed in the GUI 3600.

A guide may view information displayed in the guide availability list 3630 to determine if a live guide is available to respond to the categorized vetted query. If a guide determines that a suitable guide is available, the guide may select the "Search with a guide" button 3620. The "Search with a guide" button 3620 may cause a search request to be directed to one or more guides who are not currently online. If a guide determines that a suitable guide is not immediately available based on information indicated in the guide availability list 3630, and that a user may accept a search result(s) provided by a guide at a later time, the "Search with a guide" button 3620 may be selected.

If a guide selects the "Transfer to a guide" button 3625, the session is transferred to an available guide associated with the system. A guide may elect to activate the "Transfer to a guide" button for various reasons. For example, a user request may require further interaction with a guide who has domain-specific knowledge, or a user may request a live interactive session with a searcher in order to obtain a search result(s) more rapidly.

A guide may elect to activate any or all of the action buttons 3615, 3620, 3625. While a specific set of options is illustrated in the GUI 3600, other options for conducting a search might be made available in the GUI 3600. Activation of any or all of the action buttons 3615, 3620, 3625 may cause the GUI 3600 to close.

The guide availability list 3630 indicates information of guides within the system. The online and/or offline statistics may include, for example, the total number of guides, the total number of matching guides, for example those well-suited to receive the search query, etc. Such information may be utilized by a guide in order to determine an optimal match between user requests and system resources.

To navigate to a previous GUI screen, a guide may select the "Prev" button 3635, and upon completion of the current screen, a guide may select the "Next" button 3640 to navigate to the next screen.

As previously explained with respect to FIG. 34, the chat windows 3655a, 3655b are provided for dialogue among an information seeker and guide(s) or searcher(s). The "Send Text" button 3660 is provided for a guide to send dialogue responses to an information seeker. If the "Exit" button 3645 is selected, the search session is ended and the guide is made available. If the "Abuse" button 3650 is selected, a message may be sent to the system database, administrator, etc. reporting the incident, and a guide may be made available.

Figure 37:
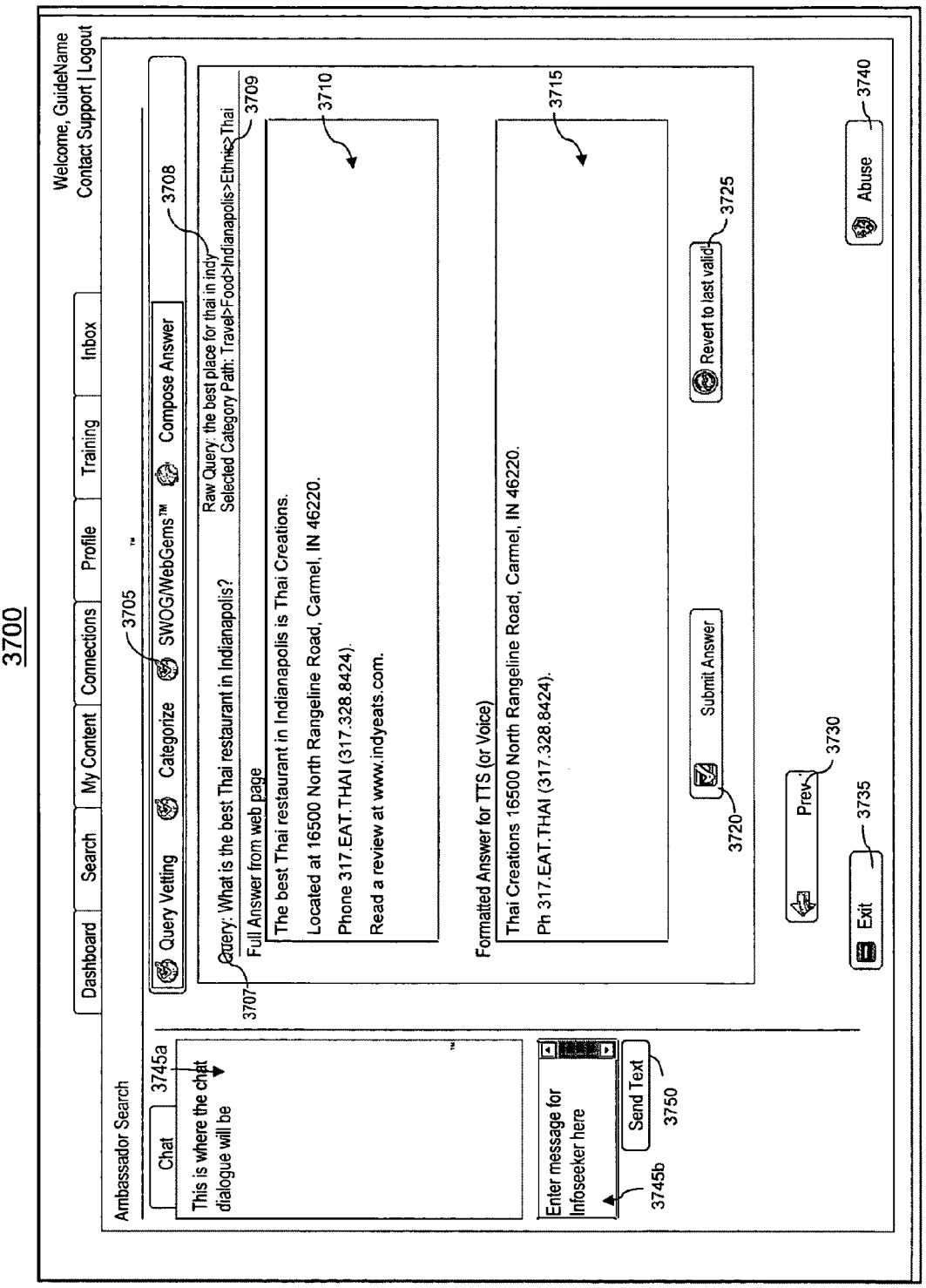
FIG. 37 illustrates a GUI for selecting a response or result.

The GUI 3700 illustrated in FIG. 37 may be presented to a guide subsequent to completion of required information, or to selection of a search result(s) using the GUI 3600 (FIG. 36). The GUI 3700 may be presented to a guide when a search result(s) have been provided responsive to a search request which was handled by another guide. For example, a search result may have been provided by a guide responsive to a user query which was not time critical, or a user may have requested that a search result(s) be provided as soon as possible, or a user may have requested that a search result(s) be provided using one or more communication services, etc. A guide may be presented with the GUI 3700 illustrated in FIG. 37 without providing information required in the GUI 3400, the GUI 3500, and/or the GUI 3600.

As illustrated in FIG. 37, the GUI 3700 includes a progress bar 3705, a structured query indicator 3707, a raw query indicator 3708, a categorization indicator 3709, a full answer window 3710, a formatted answer window 3715, a "Submit answer" button 3720, a "Revert to last valid" button 3725, a "Prev" button 3730, an "Exit" button 3735, an "Abuse" button 3740, chat windows 3745, a "Send Text" button 3750.

The progress bar 3705 may include a list of a plurality of operations included in the vetting process and any operations may further be subdivided into parts or separate sections as desired, as previously explained with respect to FIG. 34.

The structured query indicator 3707 indicates a vetted query associated with a search result(s) indicated in the full answer window 3710. The raw query indicator 3708 indicates a raw query. The categorization indicator 3709 indicates one or more category(ies) associated with a vetted query indicated in the structured query indicator 3707. The full answer window 3710 may indicate any search result(s) which have been provided responsive to a search request. Search result(s) associated with the vetted query and the categorization(s) indicated in the structured query indicator 3707 and the categorization indicator 3709 are displayed in the full answer window 3710.

The full answer window 3710 may be provided as a text box, scrollable window, drop-down list populated with a plurality of search results, etc. The formatted answer window 3715 displays a response to a user query which has been formatted to match one or more communication services associated with a user. For example, a search result may be modified in order to fit the maximum length of an SMS message; a search result may be modified to be a set of phonetic symbols in order that an audio response may be delivered to a user, a search result(s) may be formatted for multiple communication services, etc.

Various type(s) of modification(s) of a search result(s) may be presented in the formatted answer window 3715. The formatted answer window 3715 may be provided as a text box, scrollable window, drop-down list populated with a plurality of answers, etc. A guide may be able to modify information indicated in the formatted answer window 3715. For example, a guide may type, and/or paste text or other information from a search result(s) presented in the full answer window 3710 into the formatted answer window 3715. The formatted answer window 3715 may provide various forms of assistance for a guide to create a formatted answer. For example, the number of characters contained in a text message may be displayed in order that a guide may know when a limit has been reached, or a number of seconds of audio, or video may be indicated, or a number or size of images may be indicated, or a rendering of a result(s) on a user device may be indicated, etc.

If a guide selects the "Submit answer" button 3720, the formatted answer is transmitted to a user. If a guide selects the "Revert to last valid" button 3725, modifications to a formatted answer may be canceled and a previous formatted answer may be presented in the formatted answer window 3715.

To navigate to a previous GUI screen, a guide may select the "Prev" button 3730. As previously explained with respect to FIG. 34, the chat windows 3745a, 3745b are provided for dialogue among an information seeker and guide(s) or searcher(s). The "Send Text" button 3750 is provided for a guide to send dialogue responses to an information seeker. If the "Exit" button 3735 is selected, the search session is ended and the user is made unavailable. If the "Abuse" button 3740 is selected, a message may be sent to the system database, administrator, etc. reporting the incident.

Figure 38:
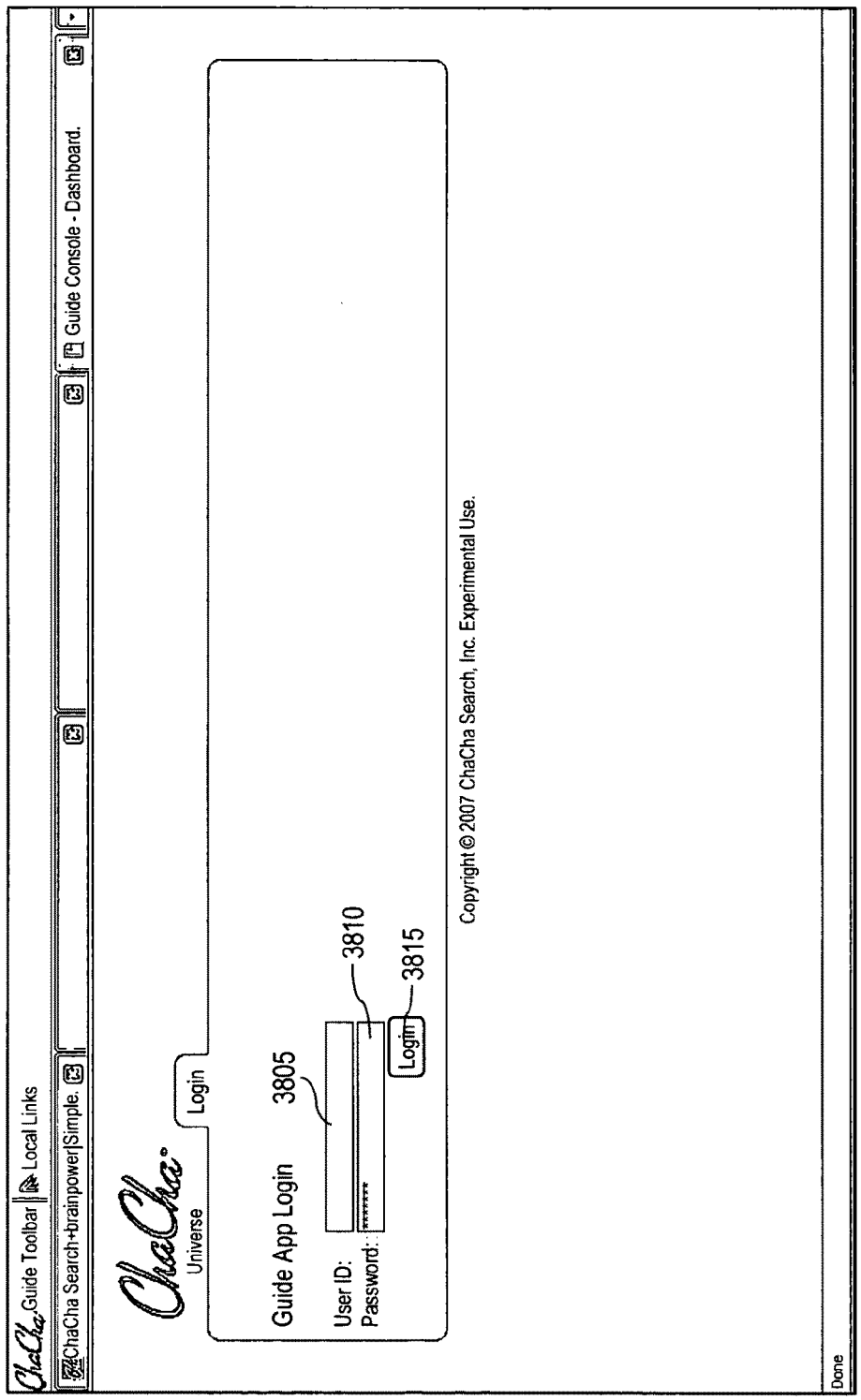

A GUI 3800 illustrated in FIG. 38, may be used to login. The GUI 3800 includes login ID entry box 3805, password entry box 3810, and 'Login' action button 3815. The login ID box 3805 may be used to enter a login ID. The password entry box 3810 may be used to enter a password associated with the user ID entered in the login ID box 3805. The 'Login' action button 3815 may be used to indicate that a login ID and password obtained using the GUI 3800 are to be submitted.

Figure 39:
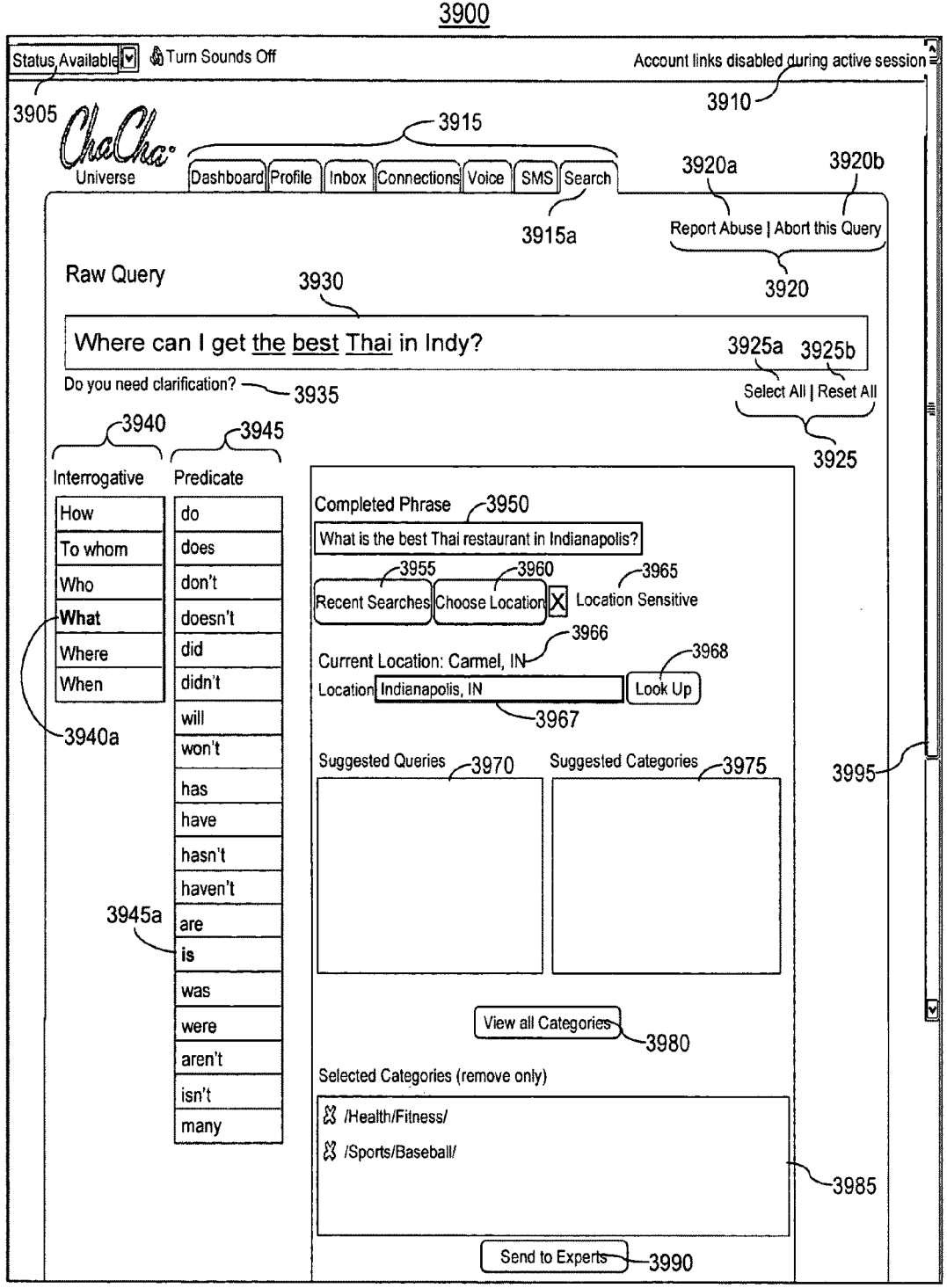
FIG. 39 illustrates a GUI for processing a request.

A GUI 3900 for construction of a structured query and associating a category(ies) with a vetted query is illustrated in FIG. 39. The GUI 3900 may be presented to a guide responsive to a request. The GUI 3900 may include status indicator 3905, activity indicator 3910, selection tabs 3915, session controls 3918, query controls 3925, a raw query box 3930, a clarification control 3935, an interrogative selection control 3940, a predicate selection control 3945, a structured query box 3950, a recent searches control 3955, a location selection control 3960, a location relevance indicator 3965, a current location indicator 3966, a location search box 3967, a location search button 3968, a suggested queries window 3970, a suggested categories window 3975, a category viewing control 3980, a selected categories window 3985, an expert search control 3990 and navigation controls 3995.

The status indicator 3905 may be used to indicate the current status of a guide. A guide may elect to be available or unavailable for an activity(ies) by selecting a status using the status indicator 3905. If a guide is currently engaged in an activity, the status indicator 3905 may indicate that the guide is unavailable. The activity indicator 3910 may indicate an activity which may be available. Using the example illustrated in FIG. 18, the activity indicator 3910 shows that other activities are not available to the guide during a query construction session.

The selection tabs 3915 may be used to select and/or indicate an activity for a guide. The selection tabs may be active or inactive. For example, the 'Search' tab 3915*a* may only be active during a search activity. Any number of selection tabs may be provided.

The session controls 3918 may be used to take actions regarding a search session which is in progress. The 'report abuse' control 3918*a* may be used to indicate that a query is not within allowed parameters of the system. Activation of the 'report abuse' control 3918*a* may close a search session and send a report to system administrators. The 'Abort this query' control 3918*b* may be used to indicate that a session is to be halted. Activation of the 'Abort this query' control 3918*b* may cause the search session to be closed and/or transferred to another guide.

The query action controls 3925 may be used to take actions regarding elements of the query indicated in the raw query box 3930. The 'Select All' control 3925*a* may be used to select all of the elements of the query. The 'Reset All' control 3925*b* may be used to unselect all elements of the query.

The raw query box 3930 includes information of elements of a raw query. Any element of a raw query may be transferred to the structured query box 3950. For example, clicking on an element in the raw query box 3930 may transfer that text to a location in the structured query box 3950. Using the example in FIG. 39, the highlighted words 'the', 'best' and 'Thai' included in the raw query box 3930 have been selected and transferred to the structured query box 3950.

The clarification control 3935 may be used to request clarification of a raw query from a user. Activation of the clarification control 3935 may cause a message(s) to be transmitted to a user who has submitted a request who may provide additional information to clarify the content of a request.

The interrogative selection controls 3940 may be used to select an interrogative expression which may be added to the structured query box 3950. For example, by clicking on an interrogative selection control such as the interrogative selection control 3940*a*, the interrogative 'What' may be transferred to the structured query box 3950.

The predicate selection controls 3945 may be used to select a predicate which may be added to the structured query box 3950. For example, by clicking on the predicate selection control 3945*a*, the predicate 'is' may be transferred to the structured query box 3950.

The structured query box 3950 may be used to enter and review text of a structured query. As information is added to the structured query box 3950, a search may be preformed of a database of categories and/or structured queries which may be displayed in the suggested queries box 3970 and the suggested categories box 3975.

The recent searches control 3955 may be used to review recent search activities associated with a user who has submitted a request. Activation of the recent searches control 3955 may cause the GUI 4100 (FIG. 41) to be presented.

The location selection control 3960 may be used to select a location to be associated with a structured query. Activation of the location selection control 3960 may cause the GUI 4000 (FIG. 40) to be presented to a guide. The location relevance indicator 3965 may be used to indicate whether a location is relevant to a request. By activating the location relevance indicator 3965, as indicated by the check mark in the location relevance indicator 3965, a selection of a guide(s) to respond to a query may be modified based on geographic information associated with a request. Likewise, ratings of a resource(s), and advertisement(s), etc. which may be selected responsive to a request may be modified based on geographic information associated with a request.

The current location indicator 3966 may indicate a location associated with a user who has submitted a request. For example, geographic information regarding the current location of a user may be displayed in the current location indicator 3966. A guide and/or a user may provide geographic information associated with a request. The location search box 3967 may be used to enter a search term which may be compared to a database of locations. The location search button 3968 may be used to initiate a search for a location indicated in the location search box 3967.

The suggested queries box 3970 may display a list of structured queries. Suggested queries may be displayed based on a ranking of queries in a database of structured queries based at least in part on the content of the structured query box 3950. A structured query may be selected by for example clicking on the query displayed in the suggested queries box 3970.

The suggested categories box 3975 may display a list of categories. Suggested categories may be displayed based on a ranking of categories in a database of categories based at least in part on the content of the structured query box 3950. A category may be selected by for example clicking on the category displayed in the suggested categories box 3975.

The category viewing control 3980 may be used to view a list of categories. Activation of the category viewing control 3980 may cause a GUI such as the GUI 4200 (FIG. 42) to be displayed.

The selected category window 3985 may be used to display information of categories which have been selected to be associated with a structured query. A category may be removed from the selected category window 3985 by for example clicking on the indicator of the category in the selected category window 3985.

The expert search control 3990 may be used to submit a categorized structured query for a search by a guide. If a selected structured query is associated with an answer(s), activation of the expert search control 3990 may cause a result(s) to be returned to a user(s). The navigation controls 3995 may be used to scroll and navigate through the content of the GUI 3900.

As previously mentioned herein above, a location may be associated with a query or request. The location relevance indicator 3965 may be used to indicate that location may be relevant to a query. A location may be associated with a query automatically. In at least one embodiment, location information provided by a service provider associated with a device such as GPS information, triangulation information, and/or other information available to a service operator is a primary designator of location information associated with a request. In at least one embodiment, a user may specify a location associated with a user which may be used to determine a location associated with a request. For example, a user may transmit an SMS message which contains information which indicates a location, a voice message may provide information of a user location, an email, an IM, an image, or any other type of information may be provided by a user to establish a location associated with a user.

In at least one embodiment, information indicated in a search history or search log such as the log described in the related U.S. patent application Ser. No. 11/835,016 previously mentioned may be provided to a guide in order to assist in associating a location with a query. In at least one embodiment, information indicated in a user profile, such as geographic information associated with a user may be used to associate a location with a query. In at least one embodiment, an area code associated with a user device and/or a previous query may be used to perform a reverse look-up of a location which may be associated with a query.

In a preferred embodiment, device location information obtained from a service provider associated with a user device is the default primary location information associated with a query, location information provided by a user is the default secondary location information associated with a query, location information obtained from a user profile and/or user search history is the default tertiary location information associated with a query, and location information obtained from a reverse look-up of an area code is the default quaternary location information associated with a query. Such information may be provided to a guide using an interface such as the GUI 4000 (FIG. 40).

A GUI 4000 (FIG. 40) may be used to select a location. The GUI 4000 may include a location name indicator 4005, a location detail information indicator 4010, and a close control 4015.

The location name indicator 4005 may present information of a name associated with a location. The order of presentation of names in the location name indicator 4005 may be based on a ranking of elements of a database of locations based on location information which has been associated with a request. A location may be selected by for example clicking on a location name indicator associated with the location. Using the example illustrated in FIG. 40, clicking on the location name indicator 4005a may cause the location 'Clair Mel' to be selected.

The location detail indicator 4010 may present information associated with a location name indicated in the location name indicator 4005. The content of the location detail indicator 4010 may be used to determine a location associated with a name which may be included in a request. Using the example illustrated in FIG. 40, 'Tampa Fla.' is the location detail associated with the location detail indicator 4010a. The close control 4015 may be used to close the GUI 4000 and record information obtained.

A GUI 4100 illustrated in FIG. 41 may be used to review a search history associated with a request. The GUI 4100 may include a history content indicator 4125, a historical question indicator 4105, a historical answer indicator 4110, a historical answer URL control 4115, a historical answer time stamp 4120, and navigation controls 4130. Any number of historical question indicators, historical answer indicators, historical answer URL controls, and historical answer time stamps may be indicated in the GUI 4100.

A history content indicator 4125 may be used to indicate the type of search history which is being presented. A search history may be based on a user, a location, a category, and or other information. Using the example illustrated in FIG. 41, the username 'bryank' is indicated in the history content indicator 4125. This may for example indicate that the history is associated with the user 'bryank'.

The historical question indicator 4105 indicates a search query. The historical question indicator 4105 may include an indicator of a raw query and/or a structured query associated with a historical search and/or other information regarding a historical request. Using the example illustrated in FIG. 41, 'external 2600 Gb hard drive' is associated with the historical question indicator 4105a and the historical question indicator 4105b.

The historical answer indicator 4110 indicates a result. For example, text of an answer provided responsive to a request may be included in the historical answer indicator 4110. The historical answer indicator 4110 may include an indicator of an answer associated with a historical search and/or other information regarding a historical search. Using the example illustrated in FIG. 41, 'WD My Book Essential Edition External 2600 GB Hard Drive' is associated with the historical answer indicator 4110a and the historical answer indicator 4110b.

The historical answer URL control 4115 indicates a URL. The historical answer URL control 4115 may include an indicator of a URL associated with a historical search and/or other information regarding a historical search. Using the example illustrated in FIG. 41, 'http://computers.pricegrabber.com/hard-drives' is associated with the historical answer URL control 4115a.

The historical answer time stamp 4120 indicates a time stamp. The historical answer time stamp 4120 may include an indicator of a time stamp associated with a historical search and/or other information regarding a historical search. Using the example illustrated in FIG. 41, '2:48 pm' is associated with the historical answer time stamp 4120a and the historical answer time stamp 4120b. The navigation controls 4130 may be used to scroll and navigate through the content of the GUI 4100.

Figure 42:
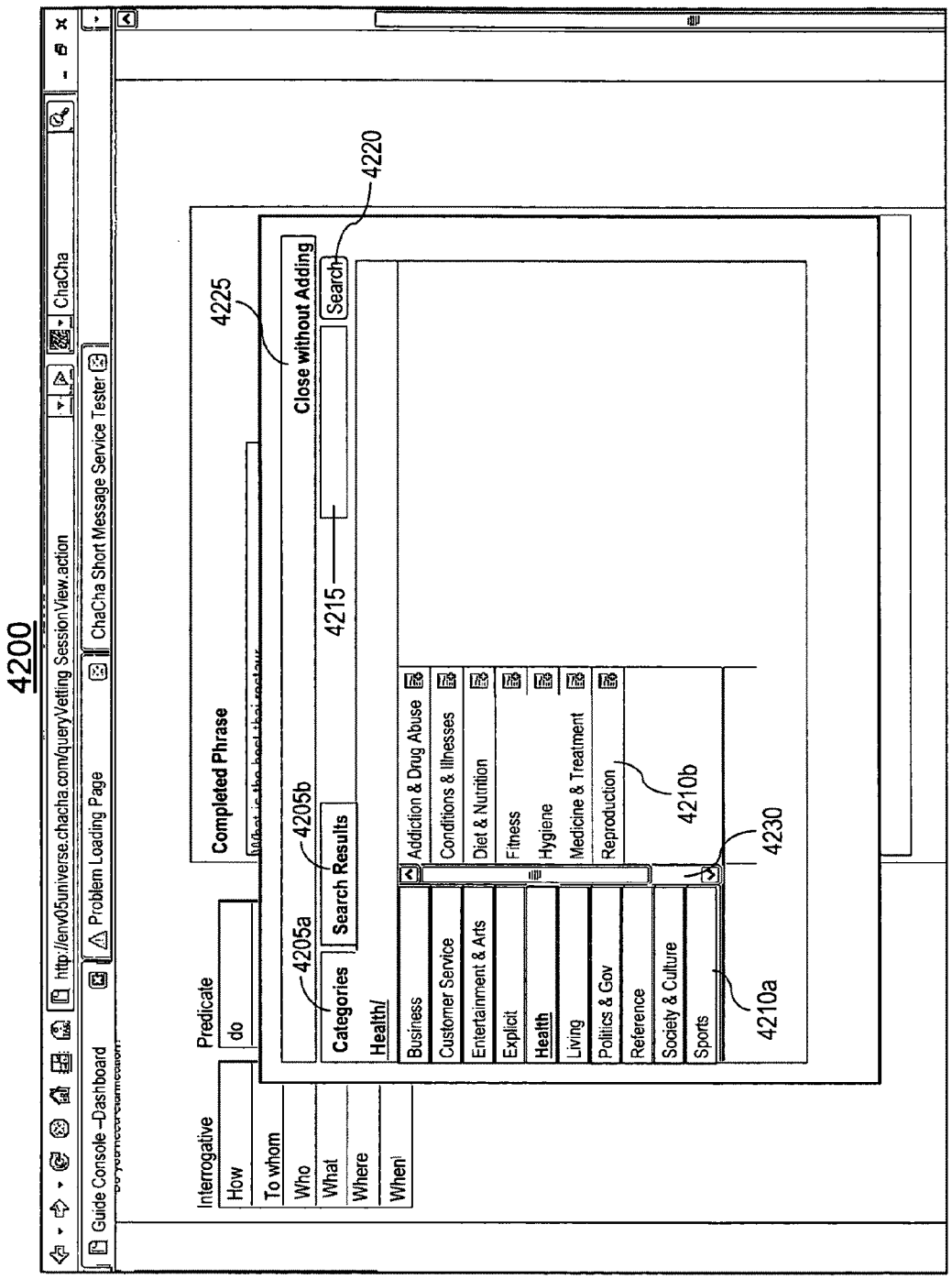
FIG. 42 illustrates a GUI for selecting a category.

The GUI 4200 illustrated in FIG. 42 may be used to select a category. The GUI 4200 may include selection tabs 4205, root topic selection controls 4210, a search box 4215, a search control 4220, a close control 4225 and navigation controls 4230.

Figure 43:
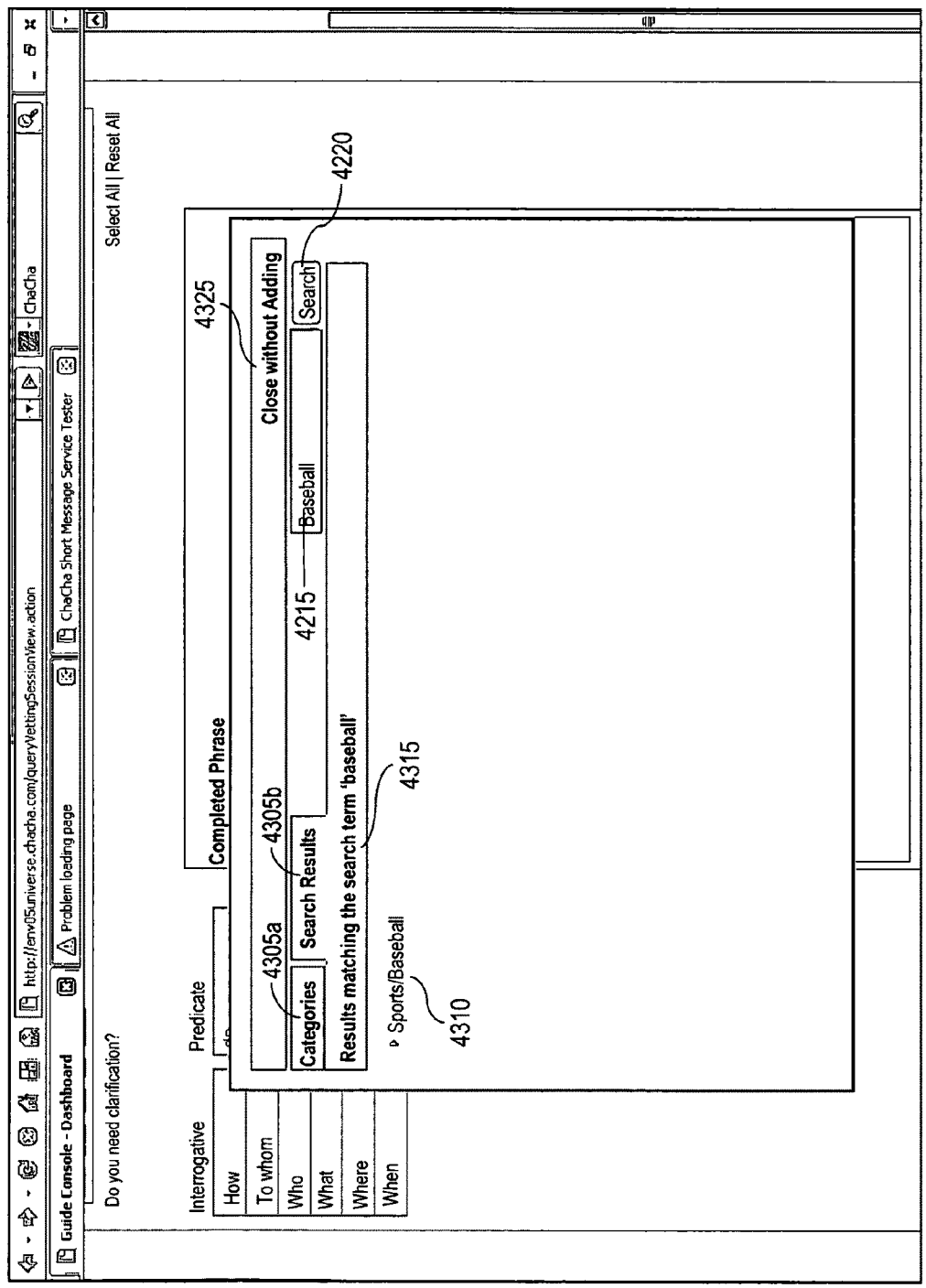
FIG. 43 illustrates an alternate GUI for selecting a category.

The selection tabs 4205 may be used to view GUIs such as the GUI 4200. The 'Categories' selection tab 4205a may present a tree-structure for selecting a category, and the 'Results' tab 4205b may present a GUI such as the GUI 4300 (FIG. 43).

The category selection controls 4210 may be used to select a category. Any number of category selection controls may be provided. Using the example illustrated in FIG. 42, the category selection control 4210a has been used to select the topic 'Health' as indicated by the highlighting in the category selection control 4210a. Activation of the category selection control 4210a may cause the category selection control 4210b to be displayed. Topic such as 'Hygiene' might be selected using the category selection control 4210b by for example clicking on the text 'Hygiene'.

The search box 4215 may be used to enter a search term. The search control 4220 may be used to initiate a search based on the content of the search box 4215. Activation of the search control 4220 may cause the GUI 4300 (FIG. 43) to be presented.

The close control 4225 may be used to close the GUI 4200 without recording information obtained using the GUI 4200. The navigation controls 4230 may be used to scroll and navigate through the content of the category selection controls 4210.

A GUI 4300 illustrated in FIG. 43 may be used to select a category. The GUI 4300 may include selection tabs 4305, category selection controls 4310, a search box 4215, a search control 4220, a result indicator 4315 and close control 4325.

The selection tabs 4305 may be used to view GUIs such as the GUI 4300. The 'Categories' selection tab 4305a may present a tree-structure for selecting a category such as the GUI 4200 (FIG. 42), and the 'Results' tab 4305b may present a GUI such as the GUI 4300 (FIG. 43).

The category selection controls 4310 may be used to select a category. While only a single category selection control is depicted in FIG. 43, any number of category selection controls may be provided. Using the example illustrated in FIG. 43, the category selection control 4310 may be provided responsive to a search for categories associated with the search term 'baseball' as indicated in the results indicator 4315. Activation of the category selection control 4310 may cause the category associated with the category selection control 4310 to be added to the selected categories box 3985 (FIG. 39).

The search box 4215 may be used to enter a search term. The search control 4220 may be used to initiate a search based on the content of the search box 4215. Activation of the search control 4220 may cause the GUI 4300 (FIG. 43) to be presented.

The close control 4325 may be used to close the GUI 4300 without recording information obtained using the GUI 4300.

Using the methods and systems described herein, a guide(s) or human searcher(s) may receive a request submitted by a user(s) and may create a structured query based on a user request(s) and/or information associated with the request. A guide may use the tools described herein to associate a query with a structured query. A structured query may be used to index a database of queries and/or other items which may be presented to a user and/or a guide(s).

A user interface is provided for a guide to efficiently process a user request in order to create and/or identify a structured query which will provide a suitable response to a user request. Information associated with a structured query may allow improved re-use of a result(s) and/or other system resources. Categorization of a request(s) is expedited, and may provide context for assigning a request to a guide(s). A facility for reviewing available system resources which may be utilized to respond to a user request or search query is provided, which may improve utilization of system resources and/or matching of a guide(s) to a user request(s). An interface which may improve utilization of automated resources which may respond to a user request is described. A guide may reformat and/or disambiguate a request in order that a response from an automated and/or human assisted search may be obtained efficiently.

A user interface is described which may allow a guide to convert a result(s) into a format which is suitable for a user device(s). A result(s) are presented to a guide, and may be selected, edited, and/or modified in order to match with a user device. Information of result processing may be recorded for future processing of a result(s) which are delivered to a user. An alternate embodiment of the query processing tool is further described.

Figure 44:
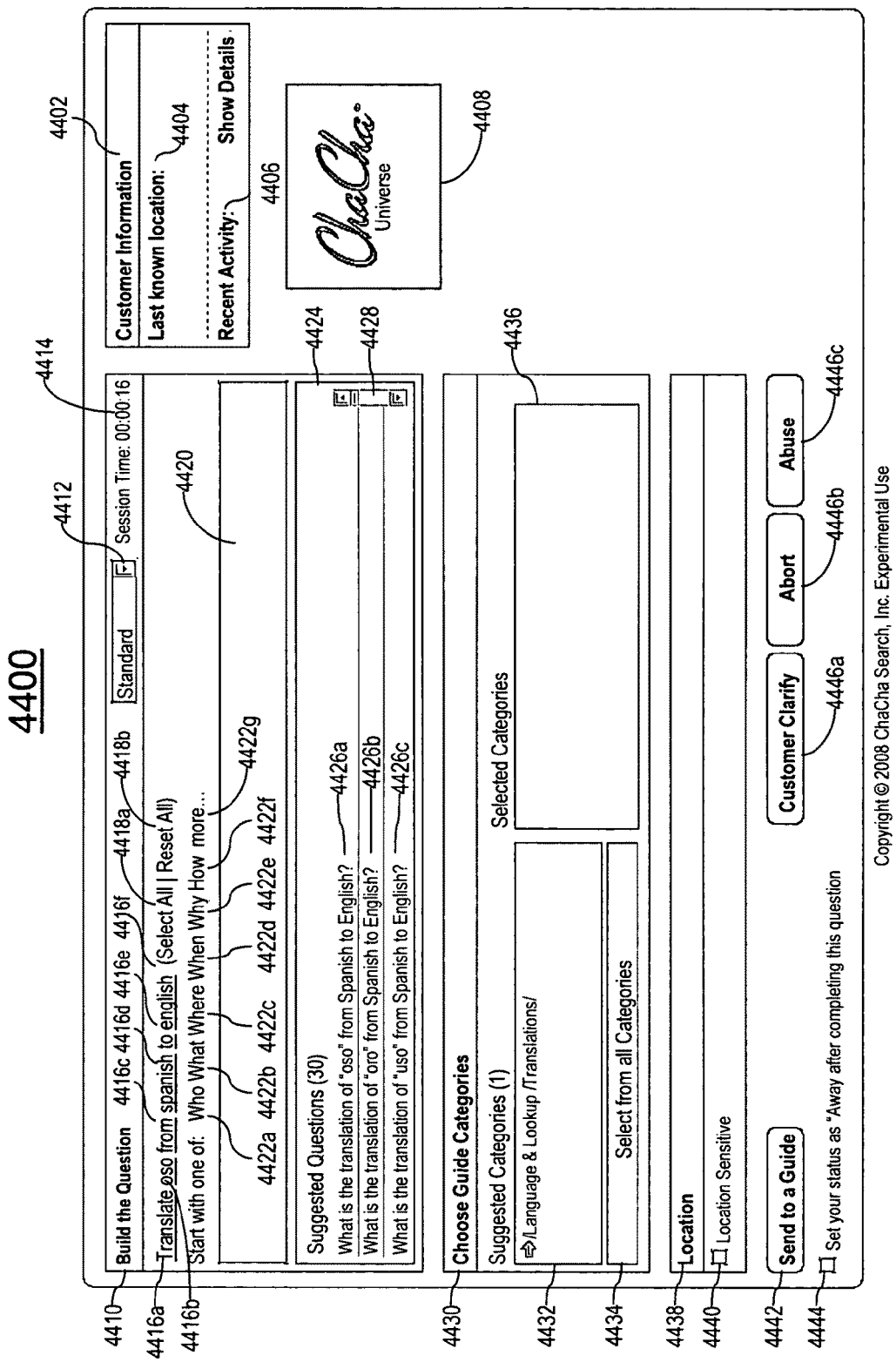
FIG. 44 illustrates a query processing GUI.

As illustrated in FIG. 44, a GUI 4400 for processing a query is provided. The GUI 4400 includes a customer information window 4402, an advertisement window 4408, a query building window 4410, a category selection window 4430, a location selection window 4438, a 'Send to Guide' button 4442, a status selection tool 4444, and user controls 3246.

The customer information window 4402 may include the last known location indicator 4404 and the recent activity indicator 4406. The last known location indicator 4404 may display a user's most recent geographic location. This information may be used to facilitate provision of an answer to a user that is relevant to a certain location, area, region, etc. The recent activity indicator 4406 may display a user's most recent use of the search system and other context information which may be relevant to a request. For example, the recent activity indicator 4406 may display a user's previous query(ies), responses by the search system, any advertisements that may have been provided to the user, previous search results, profile information of a user, etc. The advertisement window 4408 may display a selected advertisement based on content of the GUI 4400, which may be transmitted to a user based on actions of a guide.

Prior to a providing a response to a query, an initial guide or ambassador may use the GUI 4400 to develop a well-formed or structured query from a user submitted query, categorize the query, provide a database response, ask a user for clarification, report abuse to the search system, etc. before passing (forwarding) the well-formed query on to an additional guide(s). The query building window 4410 may include a query type control 4412, a session time indicator 4414, query segment selection tools 4416, query segment controls 4418, a query building text box 4420, interrogative word selection controls 4422, a suggested questions window 4424, suggested question indicators 4426, and a scrolling control 4428.

Figure 49:
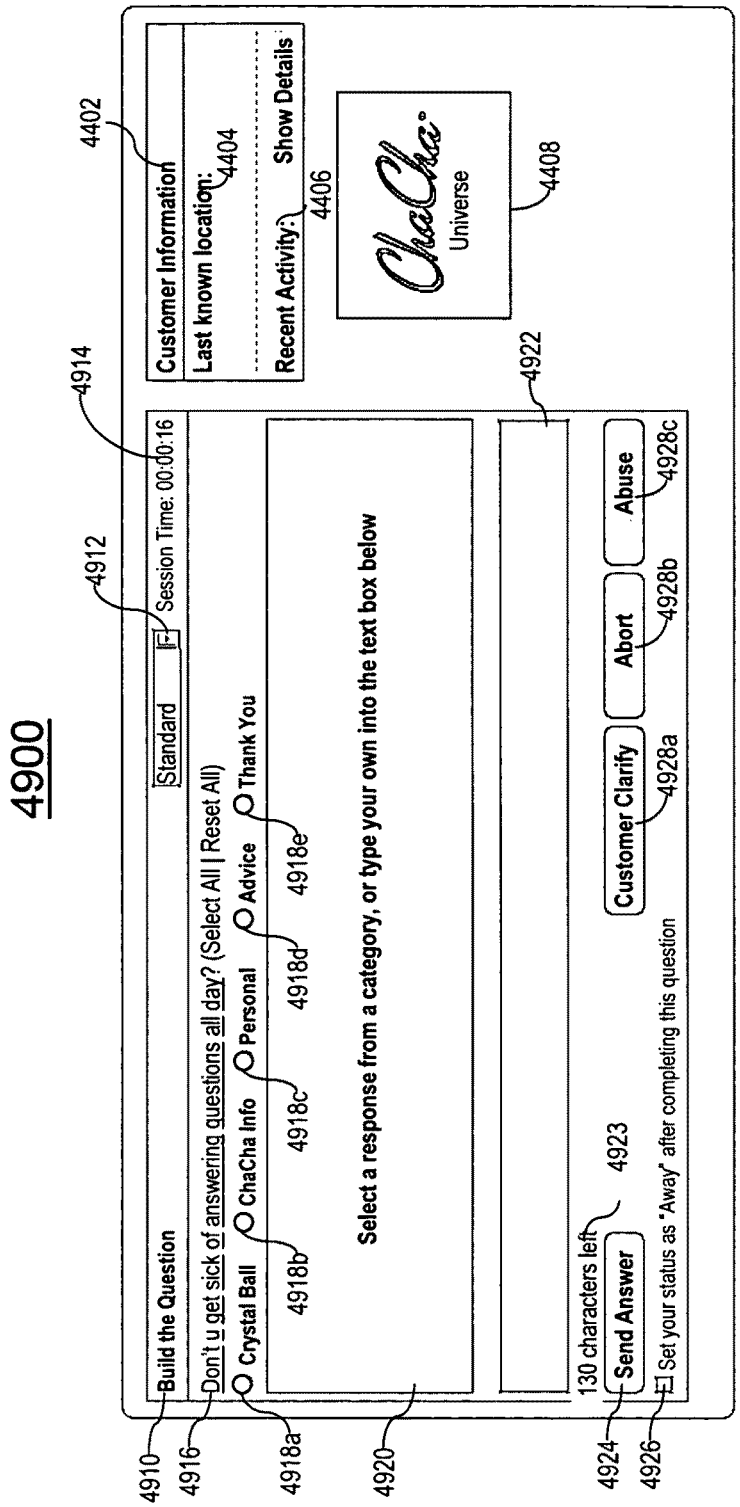
FIG. 49 illustrates a query processing GUI.

The query building window 4410 may be used by a guide to develop a well-formed query based upon a user submitted query. For example, as illustrated in FIG. 44, the query 'Translate oso from spanish to english' has been submitted to the search system. A guide may use the query type control 4412 to classify a response that may be provided in return to an incoming query. For example, an incoming query may be classified as a 'Standard' in which a guide may continue through the GUI 4400 building a well-formed query in response to the user submitted query. Alternatively, the query type control 4412 may include the option 'Conversational', which if selected by a guide, may result in the GUI 4900 as shown in FIG. 49 being presented. The session time indicator 4414 may display the amount of time that is being spent by a guide using the GUI 4400.

The query segment selection tools 4416 may allow a guide to select any number of the initial segments of a user submitted query to include in a well-formed query that may be assembled in the query building text box 4420. For example, a guide may choose to select only the subject of a user submitted query, such as the word 'oso' illustrated in FIG. 44. If a guide selects the query segment selection tool 4416*b* corresponding to the word 'oso' then the word 'oso' would be added to the query building text box 4420. To select all segments of a user submitted query, the query segment controls 4418 may include a 'Select All' control 4418*a*, and to deselect all segments of a user submitted query, the 'Reset All' control 4418*b* may be included.

The interrogative word selection controls 4422 may include any number of interrogative words that a guide my select in assembling a well-formed query in the query building text box 4420. For example, if a query is submitted to the search system by a user in a declarative form, a guide may choose to start a well-formed query with a word such as 'Who' 4422*a*, 'What' 4422*b*, etc.

Figure 45:
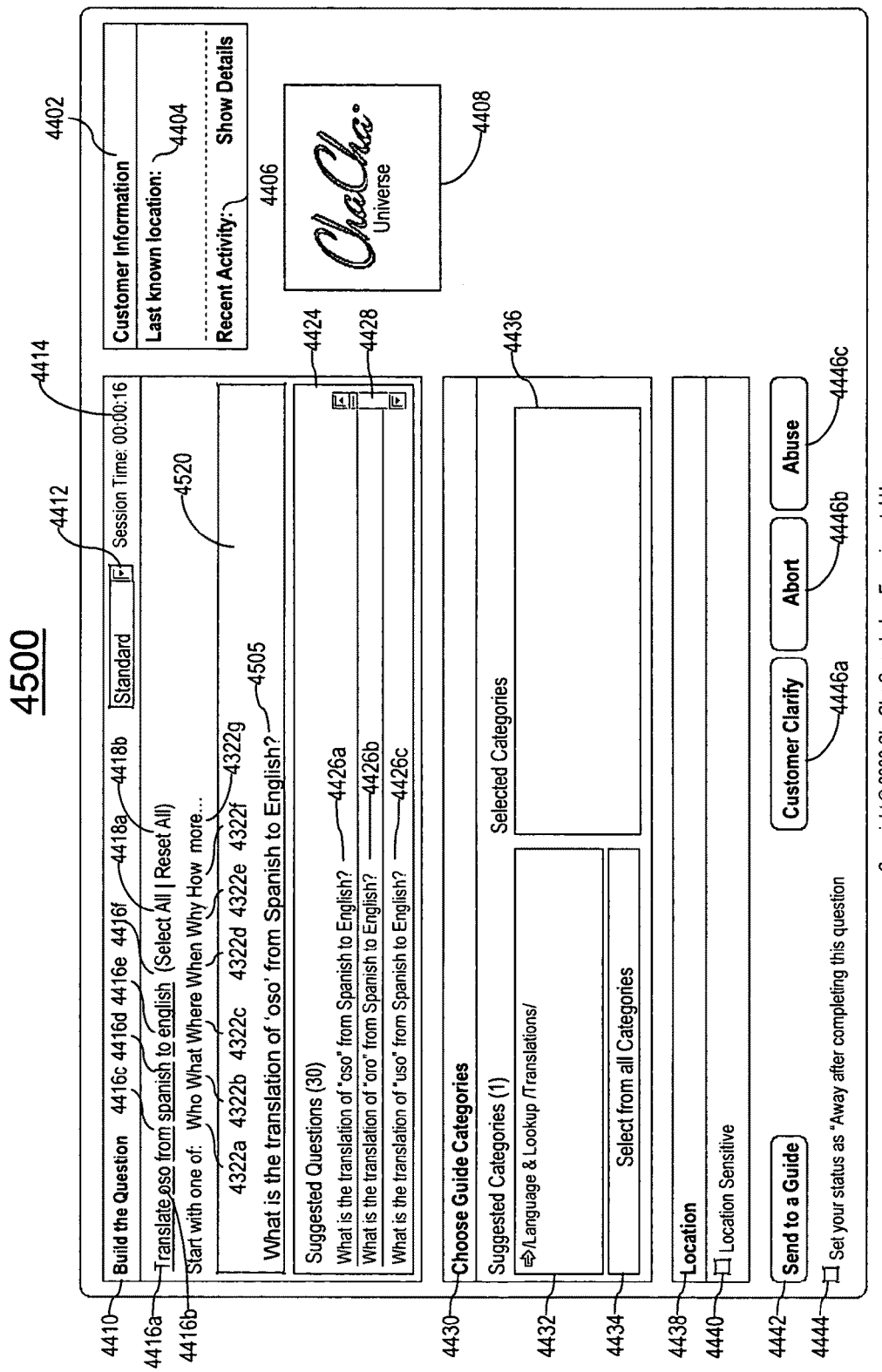
FIG. 45 illustrates a query processing GUI.

The query building window may include the suggested questions window 4424. The suggested questions window 4424 may include any number of suggested question indicators 4426 contained in the search system database. The suggested questions 4426 may be provided by the search system database as associated with the user submitted query based on any of the words or segments contained in the user submitted query. For example, as illustrated in FIG. 44, the search system database has returned the suggested questions, 'What is the translation of 'oso' from Spanish to English?', ', 'What is the translation of 'oro' from Spanish to English?' and, 'What is the translation of 'uso' from Spanish to English?' based on the user submitted query, 'Translate oso from spanish to english'. A guide may use the scrolling control 4428 to view any additional suggested questions that may not be displayed. A guide may select a suggested question indicator 4426 by clicking or otherwise selecting the question. If a guide selects a suggested question indicator 4426, the selected question is entered into the query building text box 4420 as shown in FIG. 45.

The category selection window 4430 may contain the suggested categories window 4432, the categories selection control 4434, and the selected categories window 4436. The suggested categories window 4432 may display any categories determined by the search system to be a potential category associated with the user submitted query. For example, as illustrated in FIG. 44, the category, '/Language & Lookup/Translations/' is displayed in the suggested categories window 4432 as a potential 'match' to the user submitted query, 'Translate oso from spanish to english'. A guide may use the categories selection control 4434 to select any category that may not be contained in the suggested categories window 4432. If a guide selects a category from the suggested categories window 4432, such selection may be indicated by the addition of the suggested category to the selected category window 4434 as shown by the selected category in FIG. 46.

The location selection window 4438 may include a location selection control 4440. If a guide determines that a user submitted query may be location related, a guide may select the location selection control 4440 in which case a subsequent guide may better provide an answer to a user submitted question.

The 'Send to a Guide' button 4442 may be selected if a guide has completed the assembly, formation, selection or otherwise of a well-formed query, and completed categorization of the query, or other operations as may be determined by the search system. A guide may select the 'Send to Guide' button to pass the vetted query to an additional guide(s), or to the search system that may in turn provide an answer to a user submitted query based on the vetted query. A guide may alternatively select from the user controls 4446. The 'Customer Clarify' user control 4446*a* may be selected to obtain clarification of a user submitted query and/or obtain additional information from a user that may be advantageous in forming a well-formed query. The 'Abort' user control 4446*b* may be used to cancel the current session and close the GUI 4400. The 'Abuse' user control 4446*c* may be used to report abuse or other prohibited behavior of a user to the search system. In addition, a guide may select the status selection tool 4444 to indicate that the guide desires to change his or her status to 'Away' and not accept additional queries after completion of the current session.

A GUI 4500 wherein a guide has made a selection of the suggested question 4426*a* of GUI 4400 (FIG. 44) is illustrated in FIG. 45. The GUI 4500 indicates a guide has selected the suggested question 4426*a*, 'What is the translation of 'oso' from Spanish to English?'. If selected, a suggested question contained in the suggested question window 4424 may be entered into the query building text box 4520. For example, as shown in the GUI 4500, the suggested question 4426*a* has been selected and is shown as the selected suggested question 4505 displayed in the query building text box 4520.

Figure 46:
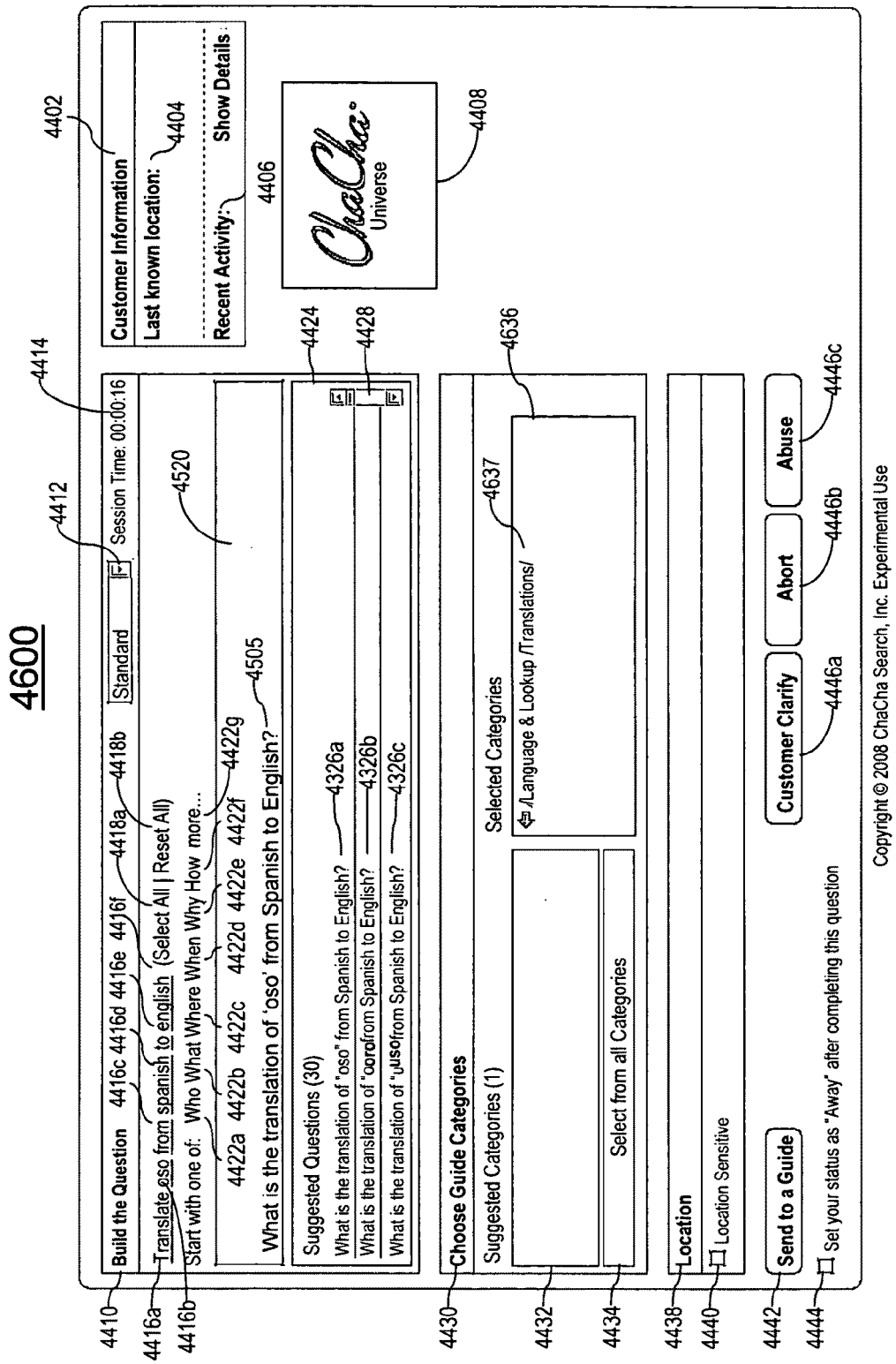
FIG. 46 illustrates a query processing GUI.

As illustrated in FIG. 44, a guide may make a selection of the suggested category contained in the suggested categories window 4432 of GUI 4400 (FIG. 44). A GUI 4600 (FIG. 46) illustrates a guide's selection of a suggested category contained in the suggested category window 4432 using the category selection control 4434. As illustrated in the GUI 4600, a guide has selected the suggested category '/Language & Lookup/Translations/'. If a guide selects a suggested category from the suggested category window 4432, the category is moved from the suggested category window 4432 to the selected categories window 4436. As a result, as illustrated in FIG. 46, the suggested category window 3432 of GUI 4600 no longer contains a suggested category. The suggested category has been selected, becoming the selected category 4637 of the selected category window 4636 of GUI 4600.

If a guide determines that the suggested categories are not sufficient, a guide may select the categories selection control 4434 to display any categories contained in the search system database. As illustrated in FIG. 47, a guide's selection of the categories selection control 4434 may result in a GUI 4700 being presented to the guide. The GUI 4700 may be presented as 'pop-up' window. The GUI 4700 may contain the category tabs 4702, the category list 4704, the category scroll tool 4706, the search box 4708, the search selection control 4709 and the cancellation control 4710.

The GUI 4700 may contain any number of category tabs 4702. As illustrated in FIG. 47, the GUI 4700 contains the 'Categories' tab 4702*a* and the 'Find Categories' tab 4702*b*. Selection of the 'Categories' tab 4702*a* may display the category list 4704. The category list 4704 may be populated with any categories that may be contained in the search system database. For example, the category list contains the categories, 'Customer Service' 4704*a*, 'Entertainment & Arts' 4704*b*, 'Health' 4704*c*, as well as additional categories that are illustrated. A guide may use the category scroll tool 4706 to navigate up and down the category list 4704. A guide may select any category contained in the category list 4704 by 'clicking' on or otherwise selecting a category.

The GUI 4700 may contain a search box 4708 to allow a guide to enter text to search available categories contained in the search system database. If a guide enters text into the search box 4708, a guide may select the search selection control 4709 to initiate a search of the search system database on the entered text. The system may locate a number of categories based on association of a search term with the text entered by a guide.

As illustrated in FIG. 47, the GUI 4700 may contain additional category tabs, such as the 'Find Categories' tab 4702b that may allow for additional searching or selection of desired categories. The cancellation control 4710 may allow a guide to exit or cancel out of the GUI 4700, or return to a previous window or GUI without making a selection of any category.

Figure 48:
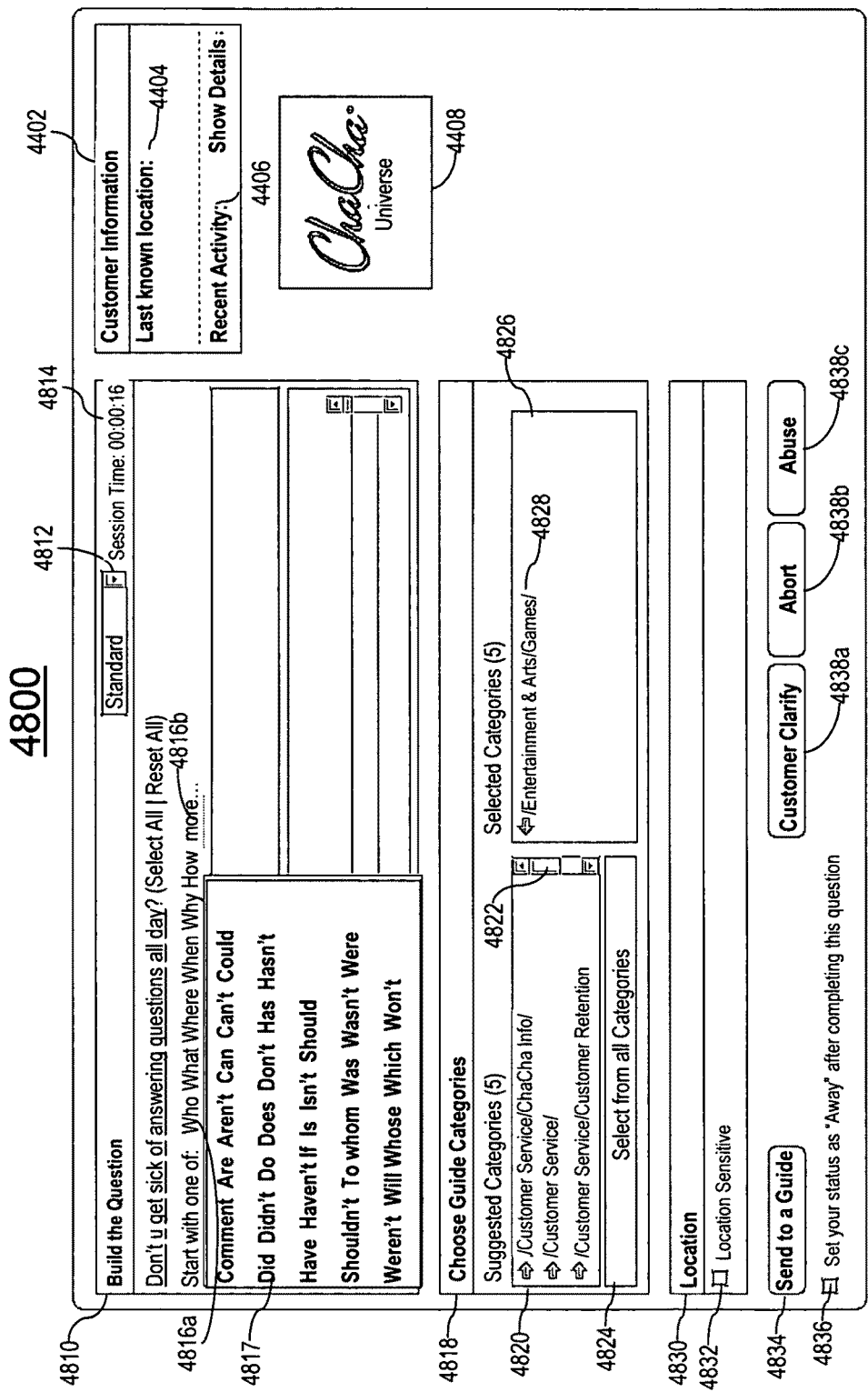
FIG. 48 illustrates a query processing GUI.

As illustrated in FIG. 48, a GUI 4800 for processing a user request includes a customer information window 4402, an advertisement window 4408, a query building window 4810, a category selection window 4818, a location selection window 4830, a 'Send to a Guide' button 4834, a status selection tool 4836, and user controls 4838.

The query building window 4810 may include a query categorization control 4812, a session time indicator 4814, interrogative word selection controls 4816 and interrogative word window 4817.

The query building window 4810 may display a user submitted query with grammatical errors. For example, as illustrated in FIG. 48, the query 'Dont u get sick of answering questions all day?' has been submitted to the search system. The query contains the letters 'Dont' which a guide may recognize to be the interrogative word, 'Don't', however as 'Don't' is not displayed as a choice of the visible interrogative word selection controls 4816a, a guide may select the interrogative word 'more' selection control 4816b resulting in additional words display in the interrogative word window 4817. A guide may select any of the words contained in the interrogative word window 4817 in assembling a well-formed query.

The category selection window 4818 may contain the suggested categories window 4820, the categories scroll control 4822, the categories selection control 4824, the selected categories window 4826 and the selected categories 4828. The suggested categories window 4820 may display any categories determined by the search system to be a potential category(ies) associated with the user submitted query. For example, as illustrated in FIG. 48, the categories, '/Customer Service/ChaCha Info/', '/Customer Service/' and/Customer Service/Customer Retention/' are displayed in the suggested categories window 4820 as potential 'matches' to the user submitted query, 'Dont u get sick of answering questions all day?'. As illustrated, the text '(5)' of the suggested categories window 4820 indicates that the search system database returned five potential matches. As three categories are visible in the suggested categories window 4820, a guide may use the categories scroll control 4822 to navigate up and down the window to display additional categories. A guide may use the categories selection control 4824 to select any category that may not be contained in the suggested categories window 4820. If a guide selects a category from the suggested categories window 4820, such selection may be indicated by the addition of the suggested category to the selected category window 4826 as shown by the selected category 4828 in FIG. 48.

The location selection window 4830 may include a location selection control 4832. If a guide determines that a user submitted query may be location related, a guide may select the location selection control 4832 in which case a subsequent guide may better provide an answer to a user submitted question.

The 'Send to a Guide' button 4834 may be selected if a guide has completed the assembly, formation, selection or otherwise of a well-formed query, and completed categorization of the query, or other operations as may be determined by the search system. A guide may select the 'Send to Guide' button to pass the vetted query to an additional guide(s), or to the search system that may in turn provide an answer to a user submitted query based on the vetted query. A guide may alternatively select from the user controls 4838. The 'Customer Clarify' user control 4838a may be selected to obtain clarification of a user submitted query and/or obtain additional information from a user that may be advantageous in forming a well-formed query. The 'Abort' user control 4838b may be used to cancel the current session and close the GUI 4800. The 'Abuse' user control 4838c may be used to report abuse or other prohibited behavior of a user to the search system. In addition, a guide may select the status selection tool 4836 to indicate that the guide desires to change his or her status to 'Away' and not accept additional queries after completion of the current session.

The session time indicator 4814 may keep track of the total time a guide has spent on a particular query and display the amount of time that is being spent by the guide using the GUI 4800. A guide may use the query type control 4812 to classify a response that may be provided in return to an incoming query. For example, an incoming query may be classified as a 'Standard' in which a guide may continue through the GUI 4800 building a well-formed query in response to the user submitted query. Alternatively, the query type control 4812 may include the option 'Conversational', which if selected by a guide, may result in the GUI 4900 as shown in FIG. 49 being presented. For example, a guide may recognize the user submitted query, 'Dont u get sick of answering questions all day?' as a conversational query as opposed to a standard or fact-based question. Use of the query type control 4812 may allow an ambassador guide to rapidly respond to queries which require minimal effort. For example, a standard set of responses may be provided for queries which are within a class. If a guide uses the query type control 4812 to indicate 'Conversational' a GUI such as the GUI 4900 (FIG. 49) may be displayed.

As illustrated in FIG. 49, a guide has selected the 'Conversational' selection of the categorization control 4912 resulting in the display of the GUI 4800. A GUI 4900 may be used by a guide to assemble an answer to a user submitted query that the guide has recognized as conversational in nature. As illustrated in FIG. 49, the GUI 4900 includes a customer information window 4402, an advertisement window 4408, an answer building window 4910, a query type control 4912, a session time indicator 4914, a user submitted query 4916, conversational type selection tools 3918, a provided answer display window 4920, an answer building text box 4922, a 'Send Answer' button 4924, a status selection tool 4926, and user controls 4928.

The answer building window 4910 displays the user submitted query 4916. The conversational category selection tools 4918 may be selected by a guide based on a guide's interpretation of the user submitted query 4916. For example, as illustrated in FIG. 49, the user submitted query, 'Don't you get sick of answering questions all day?' may be interpreted to be a conversational query that elicits an answer from the category, 'Thank You' of the category selection tool 4918e. Alternatively, a user submitted query may be better answered by a conversational category of 'Crystal Ball' 4918a, 'ChaCha Info' 4918b, 'Personal' 4918c, or 'Advice' 4918d. If a guide selects any of the conversational category selection tools 4918, individual responses associated with the selected category in the search system database may be displayed in the provided answer display window 4920. A guide may select any response displayed in the provided answer display window 4920 to submit as a response to a query. Alternatively, a guide may use any part of a provided answer and/or his or her own text as a response to a user submitted query by entering such text into the answer building text box 4922. The text remaining indicator 4923 may display the number of characters a guide has remaining to provide in the answer building text box 4922 based on a total number of characters and/or words that a guide is allowed to use in building his or her answer. The number of characters may be based on a user device constraint, or any system constraints.

The 'Send Answer' button 4924 may be selected if a guide has completed the assembly, formation, selection or otherwise an answer in response to the user submitted query. A guide may alternatively select from the user controls 4928. The 'Customer Clarify' user control 4928a may be selected to obtain clarification of a user submitted query and/or obtain additional information from a user that may be advantageous in forming an answer. The 'Abort' user control 4928b may be used to cancel the current session and close the GUI 4900. The 'Abuse' user control 4928c may be used to report abuse or other prohibited behavior of a user to the search system. In addition, a guide may select the status selection tool 4926 to indicate that the guide desires to change his or her status to 'Away' and not accept additional queries after completion of the current session.

An ambassador may act as a 'first line' responder to a user request. An ambassador guide is trained and provided with a toolset which allows the ambassador to construct a vetted query. A vetted query is categorized, formatted to remove spelling, grammar, structure or other natural-language ambiguities or errors, and may be associated with information such as a location, or attributes of a user who submitted a query. Utilizing an ambassador, who may spend a few seconds to at most a few minutes to process a query, the cost to serve a customer is greatly reduced.

An ambassador may respond to a user request which does not require a rigorous search using a tool which provides a selection of approved response options. By responding with a standardized set of responses which may be targeted by the search system, efficiency of the ambassador may be improved while retaining the human touch and avoiding unstructured replies. As a query which is not requesting information is not directed to a searcher, the quality of such a response is improved, and searchers are not occupied with irrelevant queries. By providing an ambassador, the cost and speed of response to a user request is improved. An ambassador may create a query which may be mapped to a query in a database which may be associated with a search result(s). The more effective categorization and systematic formulation of a query may greatly increase the reuse of previous answers, reducing cost and improving answer quality.

Pre-processing of a query by an ambassador may reduce the time required by a searcher to provide a response, as a searcher receives a request which is clear, concise and is directed to or forwarded to an appropriate searcher. A less experienced or lower cost searcher may be selected which may reduce the overall cost to serve a customer. A better targeted advertisement may be delivered to a user more rapidly, which may be provided to the user during a search process.

As a raw query is mapped to a vetted or structured query, the re-use of search results may be improved. The mapping of a raw query to a structured query may be personalized to a user, as an ambassador may indicate relevance of location, and may categorize a request, and may include information based on a history record obtained by the search system An ambassador guide may be presented with information regarding availability of system resources. An ambassador guide may be able to view information regarding search result(s), available searcher(s), rating information, etc. which may be used to respond to a user search request. An ambassador guide may respond to a user request, may transfer a search request to a searcher or other guide, and/or may utilize an automated search resource to respond to a user. An ambassador guide may select one or more communication services which may be used to provide information to a user responsive to a search request(s).

When a search result(s) is available, an ambassador guide may review a result(s) and may determine whether and/or how a search result(s) is provided to a user. An ambassador guide may interact with a user to determine how information responsive to a search request is transmitted to a user. An ambassador guide may process a search result(s) so that it is suited to a user device(s) and/or communication service(s). An ambassador may be provided with a tool set which may be used to perform formatting or other processing of information provided responsive to a search request. An ambassador guide may select an advertisement and/or other information to be provided to a user responsive to a search request.

Information of activity by ambassador guides may be used to improve automated matching of requests to resources. For example, a database of requests which have been associated with vetted queries may be used to improve automated categorization, structuring of a query, etc. in order that a query may be answered automatically and/or may be automatically routed to a suitable searcher without the intervention of an ambassador. The ambassador activity may be preformed more rapidly than a free-form search activity. As a result, the compensation of an ambassador per activity may be lower than that for a searcher. If the percentage of queries which can receive either an automated response or a response from an ambassador is increased, overall system costs and efficiency may be improved. Likewise, as a vetted query may be directed to a more knowledgeable searcher, response time of the searcher, quality of a search result, and user experience may be improved.

While the ambassador role has been described in the context of a search request, it may be applied in other types of human-assisted information processing. For example, an ambassador might determine that a request included a request for a product, service, or item. An ambassador might obtain additional information from a user and route the user to a guide or other person who might fulfill the user request.

In order to efficiently serve users of a human assisted search system multiple technologies must be deployed to ensure the best use of system resources. As previously discussed, the cost of manpower may be the largest element of cost. Likewise it is highly desirable to provide a robust infrastructure to the human elements of a human assisted search service. However, the task is more complex than it might appear, particularly in light of the need to have a scalable system of providing information to a community which may be continuously changing. As most workers in a distributed work environment are independent contractors, the work hours will be irregular and contractors will join and leave the community at will.

In such an environment, it is necessary that workers be provided with domain specific training information in order to acquire expertise associated with a new domain rapidly. For example, methods and resources for finding information of restaurants and hotels would be completely different than those for finding information of scientific research regarding recombinant DNA. In order to process such a diversity of queries people with generalized skills must not only be provided with training, but tools which may provide access to needed information sources. The conventional approach has been to provide training materials which are directed to generic searching, and to provide a few recommendations of search engines or websites which are most likely to produce a result. However such systems suffer from a lack of scalability as the resource tree is homogeneous and undirected to a particular area of interest. In light of these and other problems a scalable system for targeting support information would be greatly appreciated.

A method and system are disclosed to improve the accessibility and relevance of support information. The support information may be provided to human searchers or "guides" who may respond to a user request. A user may be provided with support information and/or resources which may enable a user to perform a search more effectively when a guide is not used to assist with a search. Guides are associated with a number of categories and a 'common area' is created which may be accessible to guides associated with a category. Access to resources, search tools, guidance, and relevant information may be provided based on various privileges. If a guide is associated with a category the guide may be able to create and/or modify items which may be associated with the category. Resources may include any source of information such as websites, software programs, documents, databases, persons, any type of media, and/or combinations thereof. Search tools may include items such as data feeds, custom search engines (CSE's), etc. which may index resources of any sort, Guidance may include media which may explain use of resources, search tools, domain specific information and/or general techniques for performing a search.

Content and/or other information associated with a category may be associated with a common area which may be a 'wiki' which is shared and editable by a group of persons which may include guides. Items may be added to the common area based on use and/or recommendation of items by guides, addition of items by guides and/or system administrators, processing and analysis of historical search data, and/or importing information provided by a database such as DMOZ. Content associated with a category may be indexed in various ways. Keywords may be extracted from content associated with a category, which may then be matched with keywords contained in a request. For example, if a keyword occurs with high frequency in resources associated with a category, a query including the keyword may be more likely to be associated with the category. In at least one embodiment, a guide may select a category to be associated with a request, which may cause items associated with the category to be ranked based on keywords of the request. In at least one embodiment, keywords may be associated with a category which may be used to rank the category based on keywords indicated in a request, and resources associated with the category may be ranked based on keywords associated with the category.

If a request is associated with a category, an interface including items associated with the category may be provided. In at least one embodiment, at least a portion of the request may be submitted to a search tool, a resource, or other information associated with a category. An interface presented responsive to a request may be customized based on content of the request, which may include combining information associated with multiple categories in order that relevant information may be provided if a categorization associated with a request is not certain, etc.

An index of information associated with categories may be edited in various ways. An index may be created and/or modified by a human editor or taxonomist, who may be able to create associations between categories as further described herein with respect to FIG. 51 and FIG. 52. An index of information associated with a category(ies) may be created and/or modified based on information obtained from a database such as DMOZ, or any database(s) which may include and/or indicate resources which may be included in the database. A database of information associated with a category(ies) may be created and/or modified based on information indicated in a search session log(s) such as that described herein below with respect to FIG. 63. A guide(s) and/or a user(s) may be able to associate information with a category(ies) and/or other elements of an index such as 'tags' and/or keywords. For example, a 'wiki' of any sort may be associated with a category(ies). A guide(s) and/or user(s) may have various rights to add, remove, and/or review information which may be associated with a category(ies), which may be based on information associated with a guide(s) and/or user(s) such as rating or ranking information. For example, a permission level may be based experience, qualification, quality rating, and/or other criteria.

A search tool may be associated with a category(ies). For example, a custom search engine may be associated with a category(ies) which may be customized by a person(s), who may be a guide(s), which may be used to locate information related to the category(ies). A search tool may be dynamically updated. A database may be created and/or modified which may be used to modify the performance of a search tool(s).

Information associated with a category or index may be used to provide assistance with using a search facility associated with the category. For example a frequently asked questions (FAQ) list might be associated with a category, which might assist first time users to be better able to use information presented. In at least one embodiment, video, audio and/or other media which might be relevant to use of a resource(s), tool(s), and/or other information associated with an index. News feeds, information finders such as dictionaries, etc. may be provided which may assist with a search.

The terms voice and speech are used interchangeably herein. A user, a resource, and/or a guide may establish a communication session using a voice service, a messaging service such as Short Messaging Service (SMS), Enhanced Messaging Service (EMS), Multi-media Messaging Service (MMS), Instant Messaging (IM), email, an internet portal or web page, a web service, an API, regular mail or any other type of communication. A connection may be established using any device which is capable of utilizing a communication service. For example, a wireless device such as a cell phone, PDA, smart phone, etc. might be used to establish a communication session using voice, SMS, IM, email and/or internet protocols. A desktop, laptop or server system might be used to establish a communication session. A landline phone, a specialized communication terminal, or any other communication device might be used to establish a communication session.

Communication between a guide, a user, a resource and/or a search system may include conversion of text to speech and speech to text. Any type of media which can be sent or received using a communication system may be part of a communication session. A communication session may be conducted using any or all communication service(s) associated with a user, a resource and/or a guide.

An advertisement may be transmitted including during any or all communication sessions between a user, a guide, a resource, and/or a search system. A resource, a guide, and/or an advertisement may be rated. Rating information may be obtained from a user, a guide(s), a resource(s), and/or a search system. Rating information may be used to select a resource(s), a guide(s), an advertisement(s) and/or any item(s) based on information associated with an item indicated in a database. The search service may be compensated by advertising revenue, and/or by payments from a user(s) and/or a guide(s).

Figure 50:
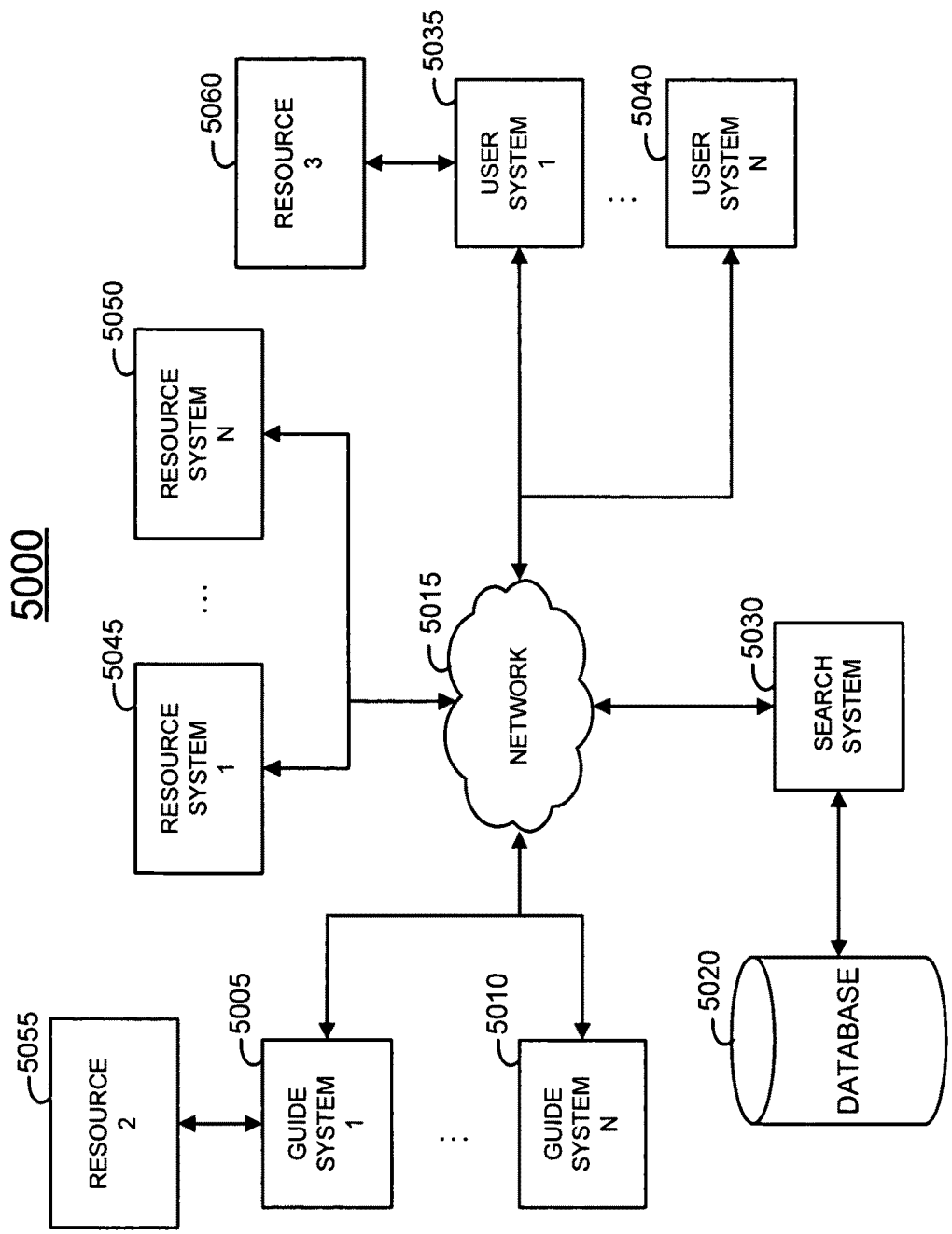
FIG. 50 is a block diagram of an exemplary system embodiment.

As illustrated in FIG. 50, the system 5000 includes the guide systems 5005, 5010, a network 5015 such as the Internet, a search system 5030, the user systems 5035, 5040, a database 5020, which may comprise various records, and the resources systems 5045, 5050, 5055, and 5060.

While only a limited number of systems associated with a guide, resource, user, and a search system are depicted in FIG. 50, it is within the scope of the disclosure for multiple systems for guide, resource, user, information seeker and search systems to be utilized.

Any user system (e.g., the user systems 5035, 5040) can be operated by an information seeker or user, who may be a person or entity, to submit a request(s) and/or receive a search result(s) and/or other information. Any guide system (e.g., the guide systems 5005, 5010) can be operated by a guide to obtain a search result for an information seeker located at a user system (e.g., the user systems 5035, 5040). Any resource system (e.g., the resource systems 5045, 5050) may be operated by a human provider of information and/or may be an automated system which may provide a result(s) and/or other information to a guide and/or a user. A resource may be a system such as a search engine, a database, a system which may perform tasks such as image recognition, voice recognition, translation, transcription, or other forms of information processing, a local information source of a guide system such as a disk drive, built-in or removable memory, an application and/or database accessible from a user system(s), and/or a guide system, etc. A resource may not be accessible using the network 5015. For example, a resource such as the resource 5055 may be accessible to a guide operating a guide system such as the guide system 5005, or a resource such as the resource 5060 may be accessible to a user operating a user system such as the user system 5035. A resource might include printed materials, images, video, and/or audio information, a software application(s), any information accessible to a guide(s), and/or a user(s), a database(s), and/or any combination thereof.

The network 5015 (FIG. 50) may be a global public network of networks (the Internet) and/or consist in whole or in part of one or more private networks and communicatively couples the guide systems 5005, 5010, the resource systems 5045, 5050 and the user systems 5035, 5040 with the other components of the system such as the search system 5030, and the database 5020. The network 5015 may include one or more wireless networks which may enable wireless communication between the various elements of the system 5000. For example, a mobile phone carrier network might be used to connect a user device to the search system 5030.

The search system 5030 allows interaction to occur among the guide systems 5005, 5010, the resource systems 5045, 5050 and the user systems 5035, 5040. For example, an information search query(ies) can be transmitted from the user systems 5035, 5040 to the search system 5030, where a search query(ies) can be accessed by the guide systems 5005, 5010 and/or the resource systems 5045, 5050. Similarly, a result(s) produced from the resource systems 5045, 5050 including results produced using the guide systems 5005, 5010 in response to a search query(ies) submitted by the user systems 5035, 5040 may be transmitted to the search system 5030, where it may be stored by the search system 5030 and/or may be transmitted to the user systems 5035, 5040.

The search system 5030 is communicatively coupled with the database 5020. As will be described herein in further detail below, the database 5020 includes data that is processed in association with operation of the embodiments. Although FIG. 50 illustrates the database 5020 as a separate component of the system, the database 5020 may be integrated with the search system 5030. Further, the records maintained in the database 5020 may be stored in any typical manner, including in a Network Attached Storage (NAS), a Storage Area Network (SAN), etc. using any typical or proprietary database software such as DB2®, Informix®, Microsoft® SQLServer™, MySQL®, Oracle®, etc., and may also be a distributed database on more than one server. Elements of the database 5020 may reside in any suitable elements of the system 5000.

The user systems 5035, 5040, the guide systems 5005, 5010, the search system 5030 and the resource systems 5045, 5050 may include equipment, software, systems and personnel required to send and/or receive messages between a user system, a guide system, a resource system and/or the search system using the network 5015. The database 5020 includes information which may allow the search system 5030 to establish communication between the other elements of the system 5000.

A user system, a guide system, and/or a resource may be a desktop or mobile PC or Mac®, a mobile phone, a smart phone, a PDA, a server system, a landline phone, a specialized communication terminal, a terminal connected to a mainframe, or any other communication device and/or system. The search system 5030 may include one or more servers, computers, etc. For example, servers such as the PowerEdge® 2900 by Dell, or the BladeCenterJS22 by IBM, or equivalent systems might be used to implement elements of the search system 5030. The search system 5030 may utilize an operating system (OS) such as Microsoft Windows XP, or Linux, etc. Voice routing and packet switching may be accomplished using well established technologies such as those provided by Cisco, or other networking companies. After being presented with the disclosure herein, one of ordinary skill in the relevant art will immediately realize that any viable computer systems and/or communication devices known in the art may be used as user systems, guide systems, resources, and/or to implement the search system 5030.

A guide may be required to register with the search system 5030. As part of a registration process, at least one communication method is associated with a guide. In at least one embodiment, a guide may register with the search system 5030 and establish a username and password which are associated with the guide. A guide may login to the search system 5030 using a web browser functionality of the guide system 5005 in order to communicate with the search system 5030. Multiple communication services may be associated with a guide and may allow a communication session to be established between a guide system such as the guide system 5005 and a user system, a resource system and/or the search system 5030. Multiple identifiers of a guide may be associated with each other. Information such as IM credential(s), an email address(es), a phone number(s), a URL, a username, etc. of a guide may be identified which may allow the search system 5030 to establish a communication session between a guide system and a user system, a resource system, and/or the search system 5030.

When a guide registers with the search system 5030 the guide may be associated with one or more keywords, categories, and/or other information. For example a keyword(s) and/or category(ies) may be selected by a guide, or may be associated with a guide based on a test(s) administered to a guide and/or other information provided during and/or after a registration process. Information associated with a guide may be stored in the database 5020 and may be used for purposes such as matching a guide to a request, determining and/or providing compensation for a guide, communicating with a guide, etc. as will be described further herein below.

A user may be identified by the search system 5030. When a user system such as the user system 5035 establishes a communication session with the search system 5030, an identifier of a user system is determined. An identifier of a user system may be associated with other information regarding a user. A user system may be identified using an email address, a telephone number, an IM credential, a username, and/or any other identifier which may be used to associate information with a user. Multiple identifiers of a user may be associated with each other. Using information of communication services associated with a user, a communication session may be established between a user system such as the user system 5035 and a guide system, a resource system and/or the search system 5030. Information such as a keyword(s), a category(ies), a user profile(s), a previous search request(s), a search result(s), etc. may be associated with a user. Information of a user may be stored in the database 5020.

A resource, which may be a person(s), an entity(ies), a search engine, a database, a software application, a corpus of one or more types of media such as text or printed information, images, audio, video, etc. or a combination thereof, may be identified by the search system 5030. Information of at least one method of communication is associated with a resource system which allows a communication session to be established between the search system 5030, a user system and/or a guide system and a resource system such as the resource systems 5045, 5050. An identifier of a resource system may be associated with other information regarding a resource. A resource system may be identified using an email address, a telephone number, an IM credential, a resource username, a URL or other persistent identifier which may be used to associate information with a resource. Multiple identifiers of a resource may be associated with each other. Using the information of communication services associated with a resource, a communication session may be established between a resource system such as the resource system 5045 and a user system, a guide system, and/or the search system 5030. Information such as a keyword(s), a category(ies), a profile(s), and/or other information may be associated with a resource. Information of a resource may be stored in the database 5020.

A resource such as the resources 5055, 5060 and/or resources accessible via the resource systems 5045, 5050 may include any system(s), software, hardware, personnel and/or other facility(ies) which may provide information to a guide(s), a user(s), and/or the search system 5030. A resource may be freely accessible to any user(s) and/or guide(s) and/or may be available on a restricted basis. The resource system(s) 5045, 5050 may include resource(s) which are available on an unrestricted and/or restricted basis. A resource may not be accessible using the network 5015, but may be accessible to a guide(s) and/or a user(s). For example, a resource such as the resource 5055 may be accessible to one or more guide(s) operating a guide system(s) such as the guide system 5005 using any type of communication. For example, a guide(s) may obtain information of an event(s) such as traffic conditions which may be observed by the guide to provide a search result(s). Information in any form, such as printed media, audio and/or visual information, software, hardware, etc. which may be accessible to a guide(s), a user(s) and/or an operator(s) of a resource system(s) may be a resource. Similarly, a resource such as the resource 5060 may be accessible to a user of the user system 5035. For example, the resource 5060 may be a software application(s) and/or database which may in whole or in part be accessible by the user system 5035.

The search system 5030 may establish a communication session between any user system(s), guide system(s), or resource system(s) using information indicated in the database 5020. For example, the user system 5035 may establish a voice communication session with the search system 5030, the search system 5030 may establish a voice communication session between the user system 5035 and the guide system 5005, and the search system 5030 may establish a voice communication session between the user system 5035 and the resource system 5045. While a voice communication session is used in this example, any type of communication session using one or more services such as SMS, EMS, MMS, email, IM, chat, web based communication, etc. may be established between any user system(s), guide system(s), and/or resource system(s) and/or the search system 5030.

Information associated with a user(s), a guide(s) and/or a resource(s) may be obtained in various ways. For example, a registration process may be performed using a web form(s) provided by the search system 5030, information may be obtained from an external database, and/or information may be obtained based on analysis of information indicated by a user(s), a guide(s), and/or a resource(s). A 'profile' is one or more characteristics which may be associated with one or more individuals. A profile may include geographic data such as a street address, latitude and longitude, etc., may include demographic information such as age, gender, race, income, family size, political affiliations, etc., may include personality information such as results of psychometric testing, subjective evaluations of an individual, etc., may include affiliation information such as employment, club, activity, societal membership information, information of a device(s), service(s), transaction(s) or any other information which might be associated with a user(s) and/or a guide(s).

Figure 51:
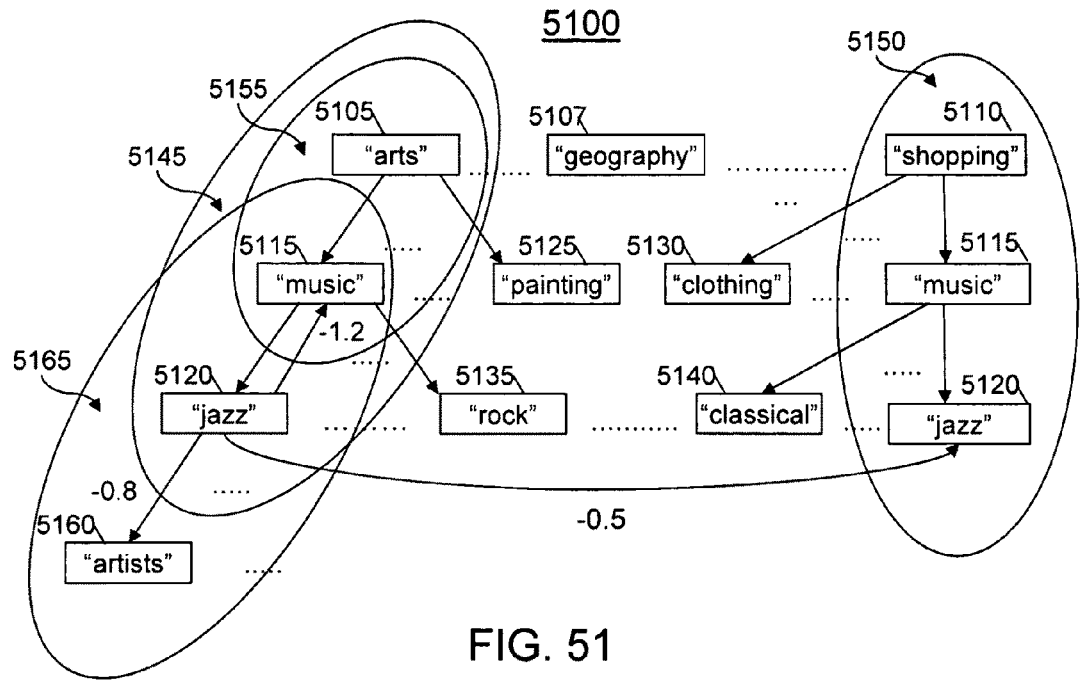
FIG. 51 is an illustration of an index relationship.

A database relationship 5100 is illustrated in FIG. 51. Top-level elements or nodes of the tree represent broad categories of information (also referred to as 'path root terms') which are intended to encompass as much information as possible without overlapping each other. Path root terms such as the path root terms "arts" 5105, "geography" 5107 and "shopping" 5110 may be a limited set of words and/or phrases which may be used to classify or categorize information such as a search request, a guide, an advertisement, a search result, etc.

Figure 52:
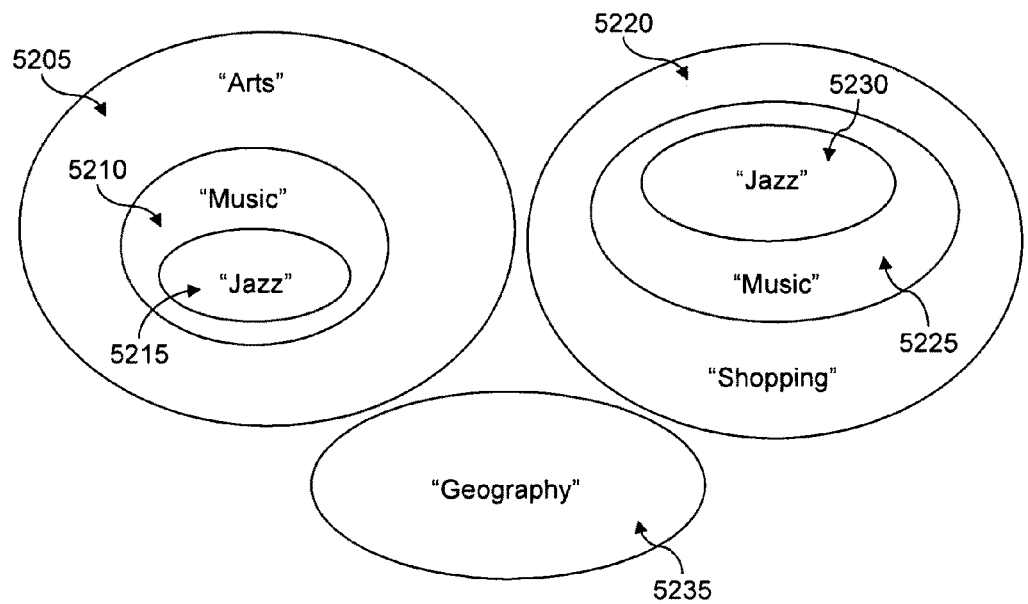
FIG. 52 is an illustration of an index relationship.

A word(s) or phrase(s) associated with lower-level nodes may appear in multiple locations within an index or database. Such words and/or phrases may be referred to as 'topics'. For example, words and/or phrases such as the topics "music" 5115, "jazz" 5120", "painting" 5125, "clothing" 5130, "rock" 5135, "classical" 5140, "artists" 5160 and/or others may be utilized in any path defined in the database relationship 5100. A subset of information is defined by specifying topics (or 'path terms') which may follow a subset relationship (i.e., any added word and/or phrase defines a more specific type of information which is contained within the preceding set of information). An example of this relationship is designated by the notation "arts>music>jazz" indicating that "jazz" is a subset of "music" which is a subset of "arts". This may for example designate the path "arts>music>jazz" 5145. Such a subset relationship is represented in FIG. 52. The selected subset of information is contained within a perimeter of the set 5215. Thus a guide and/or information associated with a more specific subject, which may correspond to a longer path (e.g., the path "arts>music>jazz" 5145 (FIG. 51)) may be more likely to be relevant to a query associated with the path than a guide and/or information associated with a shorter path (e.g., the path "arts>music" 5155).

A path which begins with a path root term, such as the path "arts>music" 5155, or the path "shopping>music>jazz" 5150 may be referred to as a 'proper path'. A path which does not begin with a path root term such as the path "music>jazz>artists" 5165 may be referred to as a 'path snippet'. A path snippet may occur in multiple locations within the database 5020. The presence of such a path snippet may indicate that proper paths which contain identical path snippets may be related.

As illustrated in FIG. 52, an overlap in relevant information associated within any given set(s) of information defined by a path root term may exist. For example, the information included in the root term set "arts" 5205, and the topic subset "music" 5210, and the topic subset "jazz" 5215 (i.e., associated with the path "arts>music>jazz" 5145 (FIG. 51) may also be relevant to the information included in the root term set "shopping" 5220, and the topic subset "music" 5225, and the topic subset "jazz" 5230 (i.e., associated with the path "shopping>music>jazz" 5150 (FIG. 51). If a hierarchical approach is used to rank guide(s) and/or information such as resources, or advertisements, a guide and/or information associated with the "shopping>music>jazz" subset it is unlikely it is going to be ranked highly when selecting a guide and/or information to respond to a request associated with the classification "arts>music>jazz".

The presence of a shared path snippet (e.g., "music>jazz") may be identified by the system 5000 (FIG. 50). In order to improve effectiveness of a taxonomic classification, a link may be established between proper paths. For example, a link may be established between the proper path "arts>music>jazz" 5145 (FIG. 51) and the proper path "shopping>music>jazz" 5150. Such a link may be established based on automatic detection of a relationship between the paths by the search system 5030 (FIG. 50) and/or may be based on a judgment of a human taxonomist operating a taxonomist system such as the taxonomist systems 5045, 5050. Such a link may be unidirectional (i.e., "arts>music>jazz" is equivalent to "shopping>music>jazz", but "shopping>music>jazz" is not equivalent to "arts>music>jazz"), or bidirectional (i.e., "arts>music>jazz" is equivalent to "shopping>music>jazz" and vice-versa). A method and system for creating and maintaining linkages between proper paths is described further herein below.

While the data structure 5100 (FIG. 51) is illustrated with only a few levels (i.e., short paths), any number of levels and/or length of paths may exist within the data structure 5100. As such it is possible that paths which contain multiple topics in common may exist. For example, a proper path such as "arts>music>jazz>artists>1960" and a proper path "arts>music>jazz>1960>artists" might exist. Such a condition may be identified, and a human taxonomist and/or the system 5030 (FIG. 50) may determine that one or more proper paths are equivalent. The system 5030 (FIG. 50) may determine association between paths based on a similarity of information identifying categories. In such a case, a linkage may be established which associates guides and/or information associated with a proper path with any equivalent proper path. Using a different example, a proper path such as "arts>music>songwriters>baby boomers" might exist. Such a path might be determined to be more strongly related to a path such as "arts>music>artists>1960s" because the first path terms are common, and the path snippet "songwriters>baby boomers" is related to the snippet "artists>1960s". A taxonomist and/or other elements of the system 5000 (FIG. 50) may determine if a linkage should be established between a proper path(s). Alternatively, a linkage between path(s) may also be established based on usage information.

Various types of information may be associated with any proper path within a data structure such as the data structure 5100 (FIG. 51). Any proper path designates a unique element within the data structure 5100. Using the example in FIG. 51, the node designated by the proper path "arts>music" 5155 is different than the node designated by the proper path "arts>music>jazz" 5145 and the node designated by the proper path "shopping>music>jazz" 5150. Each element within the data structure 5100 may be associated with one or more records such as the categorization record 5300 illustrated in FIG. 53. A categorization record may be used to associate any type of information with a node within a data structure which may be used to index the information. In at least one embodiment, a list of URLs, a set of search engine parameters, and/or pages of a wiki are associated with any or all nodes within an index which may be taxonomic, semantic, flat, or blended. Any type of index may be used within the scope of the embodiments herein.

As illustrated in FIG. 53, an exemplary categorization record 5300 is provided, of which one or more may be associated with or resident in the search database 5020 (FIG. 50). The categorization record 5300 may include a categorization record ID field 5305, a categorization guide identifier list field 5310, a categorization guide rating list field 5315, a categorization guide interest list field 5320, a categorization linked category ID list field 5325 a categorization linked category function field 5330, a categorization advertisement ID list field 5335, a categorization advertisement rating list field 5340, a categorization resource ID list field 5345, a categorization resource rating list field 5350, a categorization search space info field 5355, a categorization search process information field 5360, a categorization wiki ID field 5365, a categorization view information field, and a categorization calendar ID list field.

The categorization record ID field 5305 contains an identifier of a categorization, which is preferably unique and preferably used consistently. For example, in at least one embodiment, the categorization record ID field 5305 can include a randomly generated numerical code and/or a character string indicating a categorization. A categorization record ID serves to distinguish a categorization record associated with a categorization from a categorization record associated with other categorization(s). Although particular examples of identifiers are described herein, other types of identifiers uniquely indicating a categorization(s) may be utilized without departing from the spirit and scope of the embodiments herein. In at least one embodiment, a description of a proper path may be included in the content of the categorization record ID field 5305. A categorization record ID may include a categorization description, a random numeric code, and/or any other information uniquely identifying an element within a data structure. Using the example in FIG. 53, 'arts>music>jazz' is the categorization record ID associated with the categorization record 5300.

The categorization guide ID list field 5310 may include one or more identifiers associated with a guide(s). The categorization guide ID list 5310 may include one or more identifiers of a guide(s) which may be used to obtain further information of a guide using a record such as the guide record 5700 illustrated FIG. 57. Using the example in FIG. 53, 'guide1', 'guide2' and 'guide3' have been associated with 'arts>music>jazz'. Any number of guides may be associated with a categorization. Association of a guide with a categorization may indicate that a guide has registered to respond to requests associated with the categorization, or that a guide may recommend, review, edit and/or otherwise associate information with the categorization.

The categorization guide rating list field 5315 may include information of one or more ratings associated with a guide(s).

For example, the categorization guide rating list field 5315 may include a rating of a guide(s) based on result(s) produced by a guide responsive to request(s) associated with the categorization. In at least one embodiment, the categorization guide ID list field 5310 and the categorization guide rating list field 5315 may be linked by for example a pointer. Using the example illustrated in FIG. 53, 'guide1' has the rating '3', 'guide2' has the rating '5' and 'guide3' has the rating '7' associated with 'arts>music.jazz'. This may indicate that the guide 'guide3' has the highest rating and might be selected first to respond to a request associated with the category 'arts>music>jazz'. A rating(s) of a guide(s) may be determined based on any information indicated in the database 5020 (FIG. 50).

The categorization guide interest list field 5320 may include information of one or more interests associated with a guide associated with the categorization indicated in the categorization record ID field 5305. Information indicated in the categorization guide interest list field 5320 may be compared to information indicated in a request. A match between information associated with a request and information indicated in the categorization guide interest list field 5320 may modify the ranking of a guide. In at least one embodiment, the categorization guide ID list field 5310 and the categorization guide interest list field 5320 may be linked by for example a pointer. Using the example illustrated in FIG. 53, 'miles davis' and 'silvano monasterios' have been associated with 'guide1', 'sara montes' has been associated with 'guide2' and 'sara montes' and 'daniel smith' have been associated with 'guide3'. This may indicate that 'guide1' would be more likely to be selected to respond to a request associated with the category 'arts>jazz>music' which contained the phrase 'miles davis' even though a rating of 'guide1' is lower than a rating of 'guide2' and 'guide3' when responding to a request associated with the category 'arts>music>jazz'. Similarly a request associated with 'arts>music>jazz' which contained the keyword or interest 'sara montes' is received, 'guide3' might be selected to respond to the request, as both 'guide2' and 'guide3' are associated with the interest 'sara montes' and 'guide3' has a higher rating associated with 'arts>music>jazz'.

The categorization linked category ID list field 5325 may include information of categorizations which are associated with a categorization identified in the categorization record ID field 5305. The information included in the categorization linked category ID list field 5325 may be used to identify categorizations which may be associated with a guide and/or information which may be selected responsive to a request. For example, a list of related categorization record ID's may be used to identify a categorization(s) which may include information of a guide(s) who may have relevant knowledge regarding a request which is associated with the category 'arts>music>jazz'. Using the example in FIG. 53, the categories 'shopping>music>jazz', 'arts>music' and 'arts>music>jazz>artists' have been associated with 'arts>music>jazz'. This may indicate that a guide and/or information associated with 'shopping>music>jazz', 'arts>music' and 'arts>music>jazz>artists' may be ranked responsive to a request associated with 'arts>music>jazz'.

The categorization linked category function field 5330 may include information associated with a linkage between a category listed in the categorization linked category ID list field 5325 and a category indicated in the categorization record ID field 5305. Information indicated in the categorization linked category function field 5330 may be used to modify a rating(s) and/or ranking(s) of a guide(s) and/or other item(s) associated with a category indicated in the categorization linked category ID list field 5325. For example, when selecting a guide and/or other information to be associated with a request associated with 'arts>jazz>music' a ratings of items associated with 'shopping>music>jazz', 'arts>music' and 'arts>music>jazz>artists' may be modified based on information indicated in the linked category function field 5330. In at least one embodiment, the categorization linked category ID list field 5325 and the categorization linked category function field 5330 may be linked by for example a pointer. Using the example in FIG. 53, the function '−0.5' has been associated with 'shopping>music>jazz'. This may indicate that a rating of a guide associated with 'shopping>music>jazz' should be reduced by 0.5 when ranking guides to respond to a request associated with the categorization 'arts>music>jazz'. Likewise, the function '−1.2' and '−0.8' have been associated with the categories 'arts>music' and 'arts>music>jazz>artists', respectively. This may indicate that a rating(s) of a guide(s) associated with the category 'arts>music' may be reduced by 1.2, and that the rating(s) of a guide(s) associated with the category 'arts>music>jazz>artists' may be reduced by 0.8 when ranking guides to be selected responsive to a request associated with the categorization 'arts>music>jazz'. While only a few categorization IDs are illustrated in FIG. 53, multiple categorization ID's with various linked category functions may be utilized within the scope of the embodiments herein.

Information indicated in the categorization linked category ID list field 5325 and the categorization linked category function field 5330 may be produced in various ways. In at least one embodiment a human taxonomist may identify linked categorizations, and may assign a strength value. Algorithmic techniques may be used in combination with human judgment to determine linked categorizations. For example, an algorithmic search may identify proper paths which may share one or more path terms, and may present the identified proper paths for consideration by a human taxonomist and/or automatically add a proper path(s) to the categorization linked category ID list field 5325. Information indicated in the categorization linked category function field 5330 may be modified based on rating(s) of a search result(s) provided by a guide(s) selected using the information indicated in a linked category ID list field. For example, a higher success rate by a guide(s) associated with a categorization identified in the categorization linked category ID list field 5325 may decrease a difference in ratings for guides associated with the categorization. A human taxonomist may be presented with various types of information to assist in modification and/or addition of links and/or paths within a selection index or data structure, as will be described further herein below.

The categorization advertisement ID list field 5335 may include one or more identifiers associated with an advertisement(s). The categorization advertisement ID list field 5335 may include one or more identifiers of an advertisement(s) which may be associated with a categorization. Using the example in FIG. 53, 'indiana jazz festival' and 'www.cheaptickets.com' have been associated with 'arts>music>jazz', which may indicate that an indicator of the advertisements 'indiana jazz festival' and 'www.cheaptickets.com' may be presented responsive to a request associated with 'arts>music>jazz'. Any number of advertisement identifiers may be associated with a categorization.

The categorization advertisement rating list field 5340 may include information of one or more ratings associated with an advertisement(s). For example, the categorization advertisement rating list field 5340 may include a rating of an advertisement(s) based at least in part on frequency of selection of an advertisement by a guide(s). In at least one embodiment, the categorization advertisement ID list field 5335 and the categorization advertisement rating list field 5340 may be linked by for example a pointer. Using the example illustrated in FIG. 53, the rating '7' has been associated with the advertisement 'indiana jazz festival' and the rating '7.3' has been associated with the advertisement 'www.cheaptickets.com'. This may indicate that 'www.cheaptickets.com' has the highest rating and might be more likely to be selected responsive to a request associated with 'arts>music>jazz'.

The categorization resource ID list field 5345 may include one or more identifiers of a resource(s) which may be associated with a categorization. Using the example in FIG. 53, the resource IDs 'www.jazzismything.org', 'www.jazzwiki.org' and 'chicagoconcerts.org_17.dec.07' have been associated with 'arts>music>jazz'. Any number of resource identifiers may be associated with a categorization. A resource may be any source of information which may be utilized to respond to a request.

The categorization resource rating list field 5350 may include information of one or more ratings associated with a resource(s). For example, the categorization resource rating list field 5350 may include a rating of a resource(s) based at least in part on frequency of use of a resource(s) by a guide(s) associated with a categorization. A rating of a resource(s) may be based on any information indicated in the database 5020 (FIG. 50). In at least one embodiment, the categorization resource ID list field 5345 and the categorization resource rating list field 5350 may be linked by for example a pointer. Using the example illustrated in FIG. 53, the rating 'A' has been associated with 'www.jazzismything.org', the rating 'b-3' has been associated with 'www.jazzwiki.org' and the rating '6' has been associated with 'chicagoconcerts.org_17.dec.07'. Any type of rating information may be included in a rating field(s) such as the categorization resource rating field 5350. While the linked categorization function field was illustrated using the example of searchers, ratings of other items such as advertisements, resources, etc. may be adjusted in a similar manner.

The categorization search space info field 5355 may include one or more identifiers of resources, media, content, systems, and/or other information which may be associated with a categorization. Using the example in FIG. 53, the search space indicated in 'http://musicmoz.org/', 'https://chachascouts.com' and 'stufffrombill' have been associated with the categorization record 5300. This may indicate that information indicated in 'http://musicmoz.org/', 'https://chachascouts.com' and 'stufffrombill' may be included in a search space for a request associated with the categorization 'arts>music>jazz'. While only a few search space identifiers have been illustrated in FIG. 53, any number of search space identifiers may be associated with a categorization. A search space identifier may indicate any type of information and may include information which may allow a guide(s), user(s), a resource(s) and/or the search system 5030 (FIG. 50) to access information. In at least one embodiment, a search space indicator may be used to access a list of URLs which have been edited by one or more human editors, such as a DMOZ directory list. Information such as a collection of any sort any corpus of documents, images, and/or other media may be indicated in the categorization search space info field 5355 which may be used to indicate information associated with the categorization.

The categorization search process information field 5360 may include one or more identifiers of information which may be associated with a categorization, which may be used to define parameters associated with a search process which may be applied to information indicated in a categorization search space info field(s). For example, search strategy information might indicate that a search be conducted on one or more lists of URL's, and that a number of results from each search be combined, similar to the meta-search concept. Alternately, a search strategy might specify parametric information, which might be used by an algorithmic search such as a Google® CSE or Swicki® which might be applied to any or all information indicated by information in a categorization search space field(s). In at least one embodiment, the categorization search space info field 5355 and the categorization search process information field 5360 may be linked by for example a pointer. Using the example illustrated in FIG. 53, the URL 'http://rollyo.com/createroll.html?sid=149942', the file 'googleCSE1.html' and the file 'billsswicki.html' have been associated with the categorization 'arts>music>jazz'. This may indicate that a Rollyo™ search algorithm may be applied to the URLs indicated at 'http://musicmoz.org/', that a Google® CSE may be applied to the collection 'https://chachascouts.com' and that the swicki search 'billsswicki.html' is to be applied to the collection 'stufffrombill'. Further processes may be indicated in the categorization search process information field 5360, such as a weighting or number of results, or any other processing which might be applied to a result(s) obtained from processing of a search.

The categorization wiki ID field 5365 may include one or more identifiers of wikis which may be associated with a categorization. For example, information indicated in one or more wikis associated with a guide(s) associated with a categorization may be indicated in the categorization wiki ID field. In at least one embodiment, a wiki which is editable by any and/or all guides associated with a categorization may be indicated in the categorization wiki ID field 5365. In at least one embodiment, a wiki(s) associated with any guide indicated in a categorization guide ID list field may be associated with the categorization. Using the example illustrated in FIG. 53, the wiki 'chachajazzwiki.html' and 'chachasaramonteswiki.html' are associated with the categorization 'arts>music>jazz', which may indicate that any or all information indicated in the wikis 'chachajazzwiki.html' and 'chachasaramonteswiki.html' may be searched in order to provide information to a guide(s), a user(s), a resource(s) and/or the search system 5030 (FIG. 50) responsive to a request. Similarly, guidance information regarding use of search tools, FAQ information, training media, etc. may be indicated in the categorization wiki ID field.

The categorization view information field 5370 may include information associated with presentation of information associated with a categorization. For example, information which may be used to determine the appearance, content, functionality, etc. of a GUI which may be presented may be indicated in the categorization view information field 5370. Information indicated in a categorization view information field 5370 associated with one or more categorizations may be utilized at least in part to present information in any sort of interface. For example, an IVR, graphical, video, audio, motion, multifaceted, etc. interface(s) may be generated based at least in part on information indicated in a categorization view information field. Information of an interface may be associated with information of a guide, a user, etc. which may be utilized to modify elements of an interface. Using the example illustrated in FIG. 53, 'CSE attention', 'display linked', 'TM icons active' and 'sponsored' are the view information associated with the categorization 'arts>music>jazz'. This may for example indicate that content of a request may be indicated in a CSE interface and that action will be initiated there, that information of a category(ies) linked with 'arts>music>jazz' may be presented, that icons associated with trademarks will appear, and that sponsored content in an interface associated with 'arts>music>jazz'. While particular examples of parameters which might be selected have been used for the purposes of illustration, any interface parameter specifications which are well known in the art might be indicated in the categorization view information field 5370.

The categorization calendar ID list field 5375 may include information of events which may be associated with a categorization. For example, a calendar of recurring events, or a customized list of events, or information of resources which may indicate an event(s) may be included in the categorization calendar ID list field 5375. Information indicated in a categorization calendar ID list field 5375 may be utilized for any purpose, such as modifying a view(s), triggering an activity such as an information search, an audit, an automated or human-assisted activity, etc. Using the example illustrated in FIG. 53, 'US Holidays' and 'Jazz lovers events' are associated with the category 'arts>music>jazz'. This may indicate for example that information indicated in a calendar of US Holidays, and a calendar of jazz related events may be used to trigger activities related to the category 'arts>jazz>music'. For example, an interface and a search space might be modified to emphasize information associated with the Indianapolis Jazz Festival a few days prior to the event.

As previously noted, herein information associated with categorizations indicated in the categorization linked category ID list may be utilized in order to provide information responsive to a request.

Figure 54:
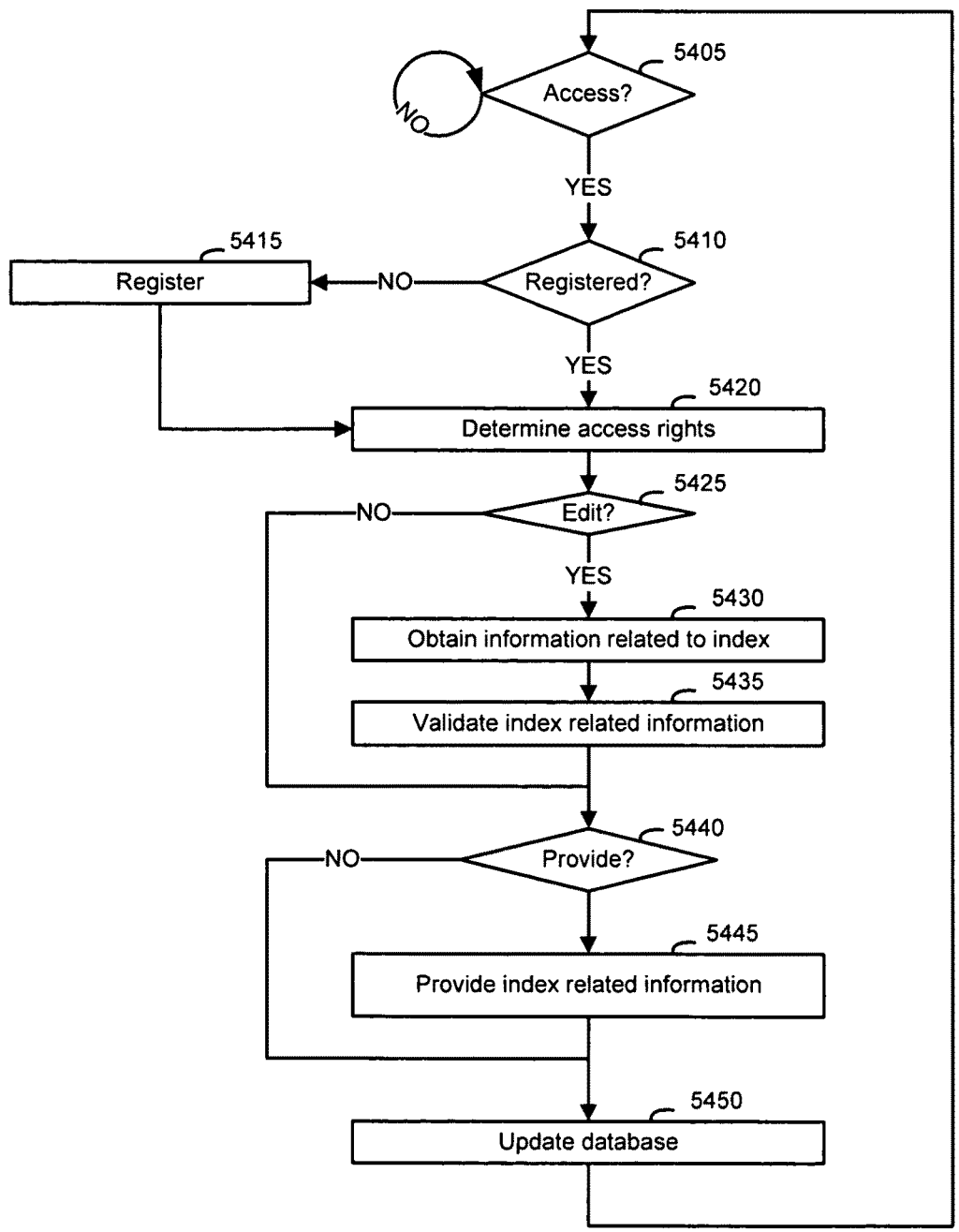
FIG. 54 illustrates a flowchart of a process for managing item(s) associated with a category.

As illustrated in FIG. 54, a process 5400 for creating, editing and providing information regarding a categorization is provided. The process 5400 may for example be operative on a server associated with the search system 5030 (FIG. 50).

In operation 5405 a determination is made as to whether a request to access information associated with a categorization is received. For example, if a guide requests access to a files associated with a categorization, or if a system administrator requests access to a database associated with a categorization, or if a message of any sort which requests access to information associated with a categorization is received, it may be determined that a request to access information associated with a categorization is received. If it is determined in operation 5405 that a request to access information associated with a categorization is not received, control remains at operation 5405 and process 5400 continues to wait. If it is determined in operation 5405 that a request to access information associated with a categorization is received, control is passed to operation 5410 and process 5400 continues.

In operation 5410 a determination is made as to whether a person associated with an access request is registered. For example, if a guide requests access to a file(s) associated with a categorization the search system 5030 (FIG. 50) may determine whether the guide is registered. If it is determined in operation 5410 that a person associated with an access request is not registered, control is passed to operation 5415 and process 5400 continues. If it is determined in operation 5410 that a person associated with an access request is registered, control is passed to operation 5420 and process 5400 continues.

In operation 5415 a person is registered with the system 5030 (FIG. 50). For example, a person may be required to provide information which may be used by the search system 5030 to identify the person. A person may be required to provide information regarding any or all categorizations which may be associated with the person. A person may be required to perform any activities which may be identified in order to complete registration. Control is passed to operation 5420 and process 5400 continues.

In operation 5420 access rights associated with a categorization are determined. Any information indicated in the database 5020 (FIG. 50) may be used to determine access rights. For example, an activity history, or a rating or ranking, or a skill level, an affiliation, security information, and/or any information associated with a person(s) and/or a categorization may be used to determine access rights associated with a categorization. In at least one embodiment, a rating of a guide(s) based on ratings associated with a result(s) associated with a categorization may be used to determine access rights associated with a guide(s). Control is passed to operation 5425 and process 5400 continues.

In operation 5425 a determination is made as to whether information associated with a categorization is to be edited. If it is determined in operation 5425 that information associated with a categorization is not to be edited, control is passed to operation 5440 and process 5400 continues. If it is determined in operation 5425 that information associated with a categorization is to be edited, control is passed to operation 5430 and process 5400 continues.

The determination in operation 5425 may be made based on various criteria. For example, if a guide indicates the intent to modify items associated with a categorization, and the guide has been determined to have editing privileges for the items, it may be determined that a information associated with a categorization is to be edited. It may be determined that information associated with a categorization is to be edited based on system conditions, including lapse of a predetermined amount of time since last edit, etc., an action(s) of a guide(s), a user(s), etc. If a resource(s) provides authentication information it may be determined that information associated with a categorization is to be edited.

In operation 5430 content, resource(s), and/or other information which may be associated with a categorization is obtained. For example, a list of URL's which are to be associated with or excluded from being associated with a categorization may be obtained, or information of content of any sort which may be provided to be associated with a categorization may be obtained. For example, a collection of documents, or images, or audio files, or other types of media may be added to a list of information which may be associated with a categorization, or a guide may create and/or modify the content of a 'wiki' associated with a categorization. A guide may indicate a file(s) which may be associated with a categorization, or a user(s) may recommend a URL(s) to be associated with a categorization, or a "taxonomist" or system administrator may provide search strategy information, etc. Control is passed to operation 5435 and process 5400 continues.

In operation 5435 content, resources, and/or other information which may be associated with a categorization is validated. For example, a list of URL's which are to be associated with or excluded from being associated with a categorization may be reviewed by a guide(s), a system administrator(s), an editor(s), or other person(s). Information may be reviewed using automated and/or human-assisted methods. In at least one embodiment, information provided may be subject to different validation criteria based on a source(s) of the information. For example, information from an experienced guide and/or from a trusted resource may not require validation, or information from low ranked guides may require review by high ranked guides, etc. Any validation process may be utilized. Control is passed to operation 5440 and process 5400 continues.

In operation 5440 a determination is made as to whether information associated with a categorization is to be provided. If it is determined in operation 5440 that information associated with a categorization is not to be provided, control is passed to operation 5450 and process 5400 continues. If it is determined in operation 5405 that information associated with a categorization is to be provided, control is passed to operation 5445 and process 5400 continues.

The determination in operation 5440 may be made based on various criteria. For example, if a request is received at a web server associated with the search system 5030 (FIG. 50) it may be determined that information associated with a categorization is to be provided. A request to provide information associated with a categorization may be received via an Application Programming Interface (API).

In operation 5445 content, resources, and/or other information which may be associated with a categorization is provided. For example, a list of URL's which are associated with or excluded from being associated with a categorization may be provided to a guide(s), a system administrator(s), an editor(s), and/or other person(s) and/or system(s). In at least one embodiment, a guide may be provided with information associated with a categorization which may be reviewed, but not modified. For example, information from an experienced guide(s) and/or from a trusted resource may be presented to a guide(s) as a training activity, or may be provided to a resource system(s). Control is passed to operation 5450 and process 5400 continues.

In operation 5450 information associated with a categorization(s) is recorded. The system database 5020 (FIG. 50) may be updated. For example, a list of URL's which are associated with or excluded from being associated with a categorization may be updated, or rating(s) and/or ranking(s) of information and/or item(s) associated with a categorization may be recorded. For example, a weighting of result(s) associated with a resource(s) may be modified, or a ranking(s) and/or rating(s) of a guide(s) may be recorded, or voting activity(ies) by a guide(s), and/or user(s) may be recorded. Information of usage of items associated with a categorization may be recorded. Control is passed to operation 5405 and process 5400 continues.

Figure 55:
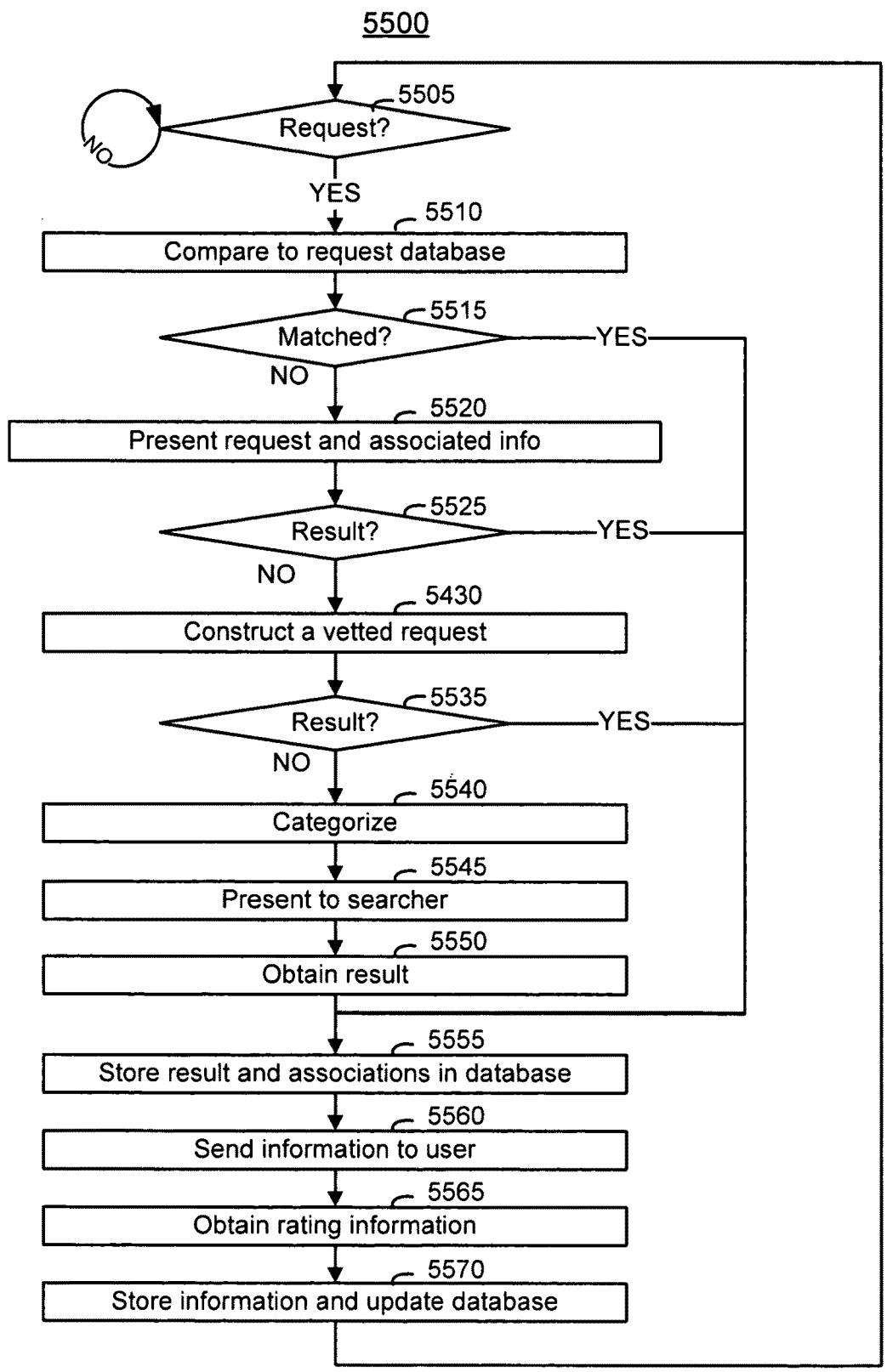
FIG. 55 illustrates a flowchart of a process for processing a request.

As illustrated in FIG. 55, a process 5500 for performing an information search is provided. The process 5500 may be operative on a server associated with the search system 5030 (FIG. 50).

In operation 5505 (FIG. 55) a determination is made as to whether a request is received. For example, if a search query is submitted via voice, or SMS to a server, or an email is received at an email address, or if an IM is received at a IM service account associated with the search system 5030 (FIG. 50), it may be determined that a search query or request is received. If it is determined in operation 5505 that a request is not received, control remains at operation 5505 and process 5500 continues. If it is determined in operation 5505 that a request is received, control is passed to operation 5510 and process 5500 continues.

In operation 5510 a request is compared to a database. The database may include information of requests. A database may include previous request(s) and/or result(s), advertisement(s), resource(s) and/or any data processed in association with operation(s) of the system 5000 (FIG. 50), any or all of which may be compared with a request. A request may be processed in order to generate alternate forms of the request which may be compared to a database including other requests. For example, a request may be automatically analyzed and/or parsed, and a set of equivalence rules may be applied, etc. Control is passed to operation 5515 and process 5500 continues.

In operation 5515 a determination is made as to whether a match to a request is found. If in operation 5515 it is determined that a match to a request is not found, control is passed to operation 5520 and process 5500 continues. If in operation 5515 it is determined that a match to a request is found, control is passed to operation 5555 and process 5500 continues.

In at least one embodiment, an exact match of a request to a request or search query indicated in the database is used to determine whether a match to a request is found. An exact match may be determined to be found based on a modified version of a request. For example, an original search query might be deconstructed and element(s) of the deconstructed query might be combined with other information in order to produce a search query which matches a search query indicated in the search system database 5020 (FIG. 50). An exact match may be determined to be found based on equivalence tables of any elements of a search query. In at least one embodiment, a calculated probability of a match between a request and a request indicated in the database exceeding a value may be used to determine that a match to a request is found. In at least one embodiment, the determination in operation 5515 may be made based on user acceptance of a result(s) and/or a search query provided to a user by the search system 5030 responsive to a request. In at least one embodiment, a result(s) or answer(s) may be provided responsive to a user request using an automated resource(s) based on automatic processing of a request. For example, if a user request conforms to a grammar construct such as 'quote xxxx' wherein 'xxxx' is a ticker symbol for a security, or if a user response matches a template in the database 5020, an automated system may deliver a response without the assistance of a guide.

In operation 5520 a request and information associated with the request are presented to a guide or searcher. Information associated with a request may include information which may have been obtained regarding a request, such as geographic, demographic, and/or other information which is associated with a user(s) and/or system(s) submitting a request. Information associated with a request may include a number of items which may have been associated with a request based on processing of a request, such as keywords, categories, advertisements, structured queries, searchers, results, historical information, etc. Information may be associated with a request based on content of a raw query and/or other information indicated in a request. For example, content of a raw query may be compared to a database of categories and/or structured queries or "succinct queries" which may allow items associated with a database of queries and/or categories to be ranked based at least in part on content of the raw query. Control is passed to operation 5525 and process 5500 continues.

In operation 5525 a determination is made as to whether a result is found. If in operation 5525 it is determined that a result is not found, control is passed to operation 5530 and process 5500 continues. If in operation 5525 it is determined that a result is found, control is passed to operation 5555 and process 5500 continues.

The determination in operation 5525 may be made based on various criteria. In at least one embodiment, a searcher may select one or more suggested structured query(ies), and if a result(s) are associated with the structured query(ies) it may be determined that a result is found. For example, a structured query may be associated with a resource, which may produce a result based on submitting a request based at least in part on the structured query to a resource(s), which may associate a result(s) with the structured query. Alternately, a searcher may select other information which may determine that a result is found. For example, a searcher may associate a category(ies), keyword(s), resource(s), advertisement(s) and/or other item(s) with a request which may cause a result to be associated with a request, which may determine that a result is found. In at least one embodiment, the determination in operation 5525 may be made based on user acceptance of a result(s) previously provided to a user.

In operation 5530 a vetted request (query) is constructed. A process for construction of a vetted query is further described herein below with respect to FIG. 52. Control is passed to operation 5535 and process 5500 continues.

In operation 5535 a determination is made as to whether a result is found. If in operation 5535 it is determined that a result is not found, control is passed to operation 5540 and process 5500 continues. If in operation 5535 it is determined that a result is found, control is passed to operation 5555 and process 5500 continues.

The determination in operation 5535 may be made based on various criteria. In at least one embodiment, a result may be automatically selected and/or created based on a vetted query constructed by a guide. For example, a query structure may be associated with a resource, which may produce a result for a request based at least in part on the query structure and content of the request, which may associate a result(s) with the structured query. Alternately, a structured query may be associated with one or more results which have been produced by a guide(s). For example, a guide(s) may have performed a search and obtained a result(s) responsive to an unstructured or 'raw' query which has been associated with a vetted query constructed by a guide(s) in operation 5530. In at least one embodiment, the determination in operation 5535 may be made based on user acceptance of a result(s) provided to a user. If a response to a request is not available, other information selected based at least in part on information of a request may be provided to a user(s), such as advertisement(s), a game, audio and/or video information, etc.

In operation 5540 a request is categorized. A guide may categorize a request, or a category may be automatically associated with a request by the system 5000 (FIG. 50). A category(ies) may be associated with a request based on a keyword(s) included in a request and/or a structured query associated with a request. A category and/or keyword may be used to select a number of items to be associated with a request, such as guides, results, advertisements, resources, etc. Control is passed to operation 5545 and process 5500 continues.

In operation 5545 a vetted query or vetted request is provided to a searcher (a number of guides). A vetted query or vetted request is a request which has been associated with a structured query and a category. An ambassador guide may continue processing a request and/or the request may be transmitted to a number of other guides who may perform an information search responsive to the request. A guide constructing a structured query at operation 5530 and a guide presented with the query at operation 5545 may or may not be the same person. A searcher(s) may be selected automatically and/or may be selected by a guide(s). In at least one embodiment, a guide(s) are notified of a request in an order determined by a ranking of guides associated with a category(ies), keyword(s), profile(s), geographic information, and/or other information associated with a request. A guide(s) may be allowed to decline a request. A guide receiving a vetted query may construct a different vetted query. Control is passed to operation 5550 and process 5500 continues.

In operation 5550 a result(s) is obtained responsive to a request associated with a structured query. A result(s) may be obtained by one or more guides. A result(s) is associated with a request(s) and/or a structured query, which may be associated with other information such as a category(ies), keyword(s), advertisement(s), a user(s), a searcher(s), a resource(s), etc. Control is passed to operation 5555 and process 5500 continues.

In operation 5555 information of the process 5500 is recorded. For example, information of a request, a structured query, a vetted query, a result(s), and/or other items and their associations is recorded and/or updated. For example, information of a raw query and/or a request(s) which has been associated with a structured query, information of an advertisement(s) which has been associated with a request(s) and/or a structured query, information of usage and/or ratings of items such as a result(s), a resource(s), a guide(s), an advertisement(s), etc. may be recorded. Control is passed to operation 5560 and process 5500 continues.

In operation 5560 a user(s) is provided with information. A result(s) may be provided using any or all device(s) and/or service(s) which may be associated with a user(s). Information such as an advertisement(s), a result(s), etc. may be provided to a user(s) in any sequence. Control is passed to operation 5565 and process 5500 continues.

In operation 5565 rating(s) and/or information which may be used to compute a rating(s) of information presented to a user(s) is obtained. For example, a user may rate a result(s), information of usage of a coupon included with a result(s) might be obtained, a review by a guide(s) and/or administrator might be performed, and/or other information which may be used to determine a rating(s) may be obtained. Control is passed to operation 5570 and process 5500 continues.

In operation 5570 information of the process 5500 is recorded. Information associated with a user(s), such as result(s), advertisements, guide(s), profile(s), etc. may be recorded. Rating(s) of a result(s), a guide(s), an advertisement(s) and/or associated items such as a resource(s), a structured query(ies), etc. may be recorded and/or updated. In at least one embodiment, information is recorded in the search database 5020 (FIG. 50). Control is passed to operation 5505 and process 5500 continues.

As illustrated in FIG. 56, an exemplary request record 5600 is provided, of which one or more may be associated with or resident in the search database 5020 (FIG. 50). The request record 5600 may include a request ID field 5605, a request content field 5610, a request user ID field 5615, a request guide ID field 5620, a request category ID field 5625, a request profile ID field 5630, a request result ID field 5635, a request result rank field 5640, request advertisement ID field 5645, request advertisement rank field 5650 and a request usage info field ID 5655.

A request record may be created responsive to various activities. For example, a guided search session, an interactive training session, a non-interactive training session, submission of a request by a user, and/or other types of activity may cause a request record to be created and/or modified. A request record may be imported from an external resource(s), a database, and/or any media accessible to the search system 5030.

The request ID field 5605 preferably contains a unique identifier of a request, which is preferably used consistently. For example, in at least one embodiment, the request ID field 5605 can include a randomly generated numerical code, and/or a text string indicating the content of a request. A request ID serves to distinguish the request record associated with a request from a request record associated with other requests. Other unique identifiers of a request may be utilized without departing from the spirit and scope of the embodiments.

A unique identifier may be assigned to a request when it is received. A request may include information that is not explicitly provided by a user. For example, location information, profile information, etc. may be associated with a request. As illustrated in FIG. 56, 'Request1' is the request ID associated with the request record 5600 (FIG. 56).

The request content field 5610 may include information regarding content of a request. For example, text associated with a query submitted by a user may be indicated in the request content field 5610. Content of the request content field 5610 may be processed in order to associate a keyword(s) and/or category(ies) and/or other information with a request. In at least one embodiment, a structured query which conforms to a specific context may be indicated in the request content field 5610. User requests which are associated with a structured query which may have been submitted by a number of users may be indicated in the request content field 5610. Information such as audio recordings, images, etc. which are associated with a request may be indicated in the request content field 5610. Using the example illustrated in FIG. 56, the query 'What is the best Thai restaurant in Indy?.mp3' is the content associated with the request record 5600. This may indicate that the query 'What is the best Thai restaurant in Indy?.mp3' may be processed in order to respond to 'Request1'. Information indicated in the request content field 5610 may be used to determine which information associated with an index may be provided responsive to a request. For example, keywords associated with a transcription of the request 'What is the best Thai restaurant in Indy?.mp3' may compared to interests or keywords associated with an index to determine a number of categories associated with the request 'Request1'.

The request user ID field 5615 may include information of a user(s) that submitted a query. The request user ID field 5615 may be used to associate any number of users with a query. In at least one embodiment, each request is uniquely associated with a single user. In at least one embodiment, if a request submitted by a user is equivalent to a previous request, multiple users may be associated with a request. In at least one embodiment, an individual user may submit a request which is associated with a group(s) of one or more users. A result(s) and/or other item(s) associated with a request may be presented responsive to a request in an order based at least in part on a ranking of the item(s) associated with the request. Information indicated in the request user ID field 5615 may be used to obtain information of a user(s) using a record(s) such as the user record 5800 illustrated in FIG. 58. Using the example illustrated in FIG. 56 'User1' and 'User2' are associated with 'Request1'.

The request guide ID field 5620 may include information of a number of guides associated with a request. For example, if a guide obtains a search result(s) responsive to 'Request1', an identifier of the guide may be indicated in the request guide ID field 5620. Likewise, if a guide was selected to respond to a request, an identifier of the guide may be indicated in the request guide ID field 5620. Information indicated in the request guide ID field 5620 may be used to obtain information associated with a guide using a record(s) such as the guide record 5700 illustrated in FIG. 57. A guide may be associated with a request if the guide has reviewed information associated with a request. Using the example illustrated in FIG. 56 the guides 'Guide1' and 'Guide2' have been associated with 'Request1'.

The request category ID field 5625 may include information of a number of categorizations and/or keywords associated with a request. Content of the request category ID field 5625 may be modified by an automated classification of a request. A human may select a category(ies) and/or keyword(s) associated with a request. A categorization may be associated with a resource(s), a guide(s), an advertisement(s), training information, etc. An item(s) associated with a category may be presented to a guide(s) and/or a user(s) if a request associated with a category is submitted. An item(s) associated with a category and/or other information may be presented for review by a person(s). Association of a category with a request may be used to select items such as an advertisement(s) associated with the category to be presented responsive to a request. Association of a category with a request may be used to select a guide(s) associated with the category to vote regarding an item associated with the request. A category may be associated with a request based on any type of information associated with the request. Using the example illustrated in FIG. 56, the categories 'Category1' and 'Category2' are associated with 'Request1'.

The request profile ID field 5630 may include information of a number of profiles associated with a request. For example, a profile may be associated with a request based at least in part on a profile(s) associated with a user(s) associated with a request. For example, a geographic profile which is common to a number of users associated with a request may be associated with a request, or a guide may determine that a profile is to be associated with a request based on content and/or subject matter of a request(s) associated with a user(s), etc. A guide selected to respond to a request may be selected based at least in part on a profile(s) associated with the request. A reviewer(s) may be selected to review an item(s) associated with a request based at least in part on a profile(s) associated with a request. Using the example illustrated in FIG. 56, 'Profile1' is associated with 'Request1'.

The request result ID field 5635 may include information of a result(s) which is associated with a request. For example, a search result may be associated with a request when a guide obtains the search result responsive to the request. For example, if a request is submitted to the search system 5030 (FIG. 50), a guide may be selected, and the guide may provide a result(s) responsive to the request. Alternately, a result(s) may be associated with a request if the request is submitted to a resource such as a search engine, database or other resource system. Any number of search results may be associated with a request. Using the example illustrated in FIG. 56, 'Result1.1', 'Result1.2', and 'Result1.3' have been associated with 'Request1'.

The request result rank field 5640 may include information regarding a ranking of a result(s) associated with a request. In at least one embodiment, the request result ID field 5635 and the request result rank field 5640 are linked by for example a pointer. Using the example illustrated in FIG. 56, 'Result1.1' has a ranking of '1', 'Result1.2' has a ranking of '3', and 'Result1.3' has a ranking of '4'. Content of the request result ID field 5635 and the request result rank field 5640 may be used at least in part to determine an order in which a search result(s) are presented to a user(s) responsive to a request. Using the example illustrated in FIG. 56, 'Result1.1' might be preferentially presented to a user(s) responsive to 'Request1'. A ranking of a result may be determined based on criteria such as keyword ranking, guide ratings, etc. which may include automated and/or human assisted rating and/or ranking.

The request advertisement ID field 5645 may include information of an advertisement(s) which is associated with a request. For example, an advertisement may be associated with a request when a guide selects the advertisement to be presented to a user responsive to the request. For example, if a request is submitted to the search system 5030 (FIG. 50), a guide may be selected, and the guide may provide an advertisement(s) responsive to the request. Alternately, an advertisement(s) may be associated with a request automatically such as when a category(ies) and/or a keyword(s) is associated with the request. Any number of advertisements may be associated with a request. Using the example illustrated in FIG. 56, 'Advert1', 'Advert4', and 'Advert2' have been associated with 'Request1'.

The request advertisement rank field 5650 may include information regarding a ranking of an advertisement(s) associated with a request. In at least one embodiment, the request advertisement ID field 5645 and the request advertisement rank field 5650 are linked by for example a pointer. Using the example illustrated in FIG. 56, 'Advert1' has a ranking of '3', 'Advert4' has a ranking of '1', and 'Advert2' has a ranking of '5'. Content of the request advertisement ID field 5645 and the request advertisement rank field 5650 may be used at least in part to determine an order in which an advertisement(s) are presented responsive to a request. Using the example illustrated in FIG. 56, 'Advert4' might be preferentially presented to a user(s) responsive to 'Request1'.

The request usage info field 5655 may include information of usage of a request. For example, if multiple users submit a request which is equivalent to 'Request1' the request usage info field may be incremented. Content of the request usage info field 5655 may be used for various purposes. For example, if a request receives high usage, it may be determined that a review of information associated with the request may be performed, or if a request receives high usage, a guide who has produced a highest ranked result associated with the request may receive recognition or compensation, etc. Using the example in FIG. 56, the usage indicator 'use counter=20' is associated with 'Request1'.

As illustrated in FIG. 57, an exemplary guide record 5700 is provided, of which one or more may be associated with or resident in the search database 5020(FIG. 50). The guide record 5700 may include a guide ID field 5705, a guide category ID field 5710, a guide topic ID field 5715, a guide profile ID field 5720, a guide result ID field 5725, a guide communication info field 5730, and a guide request ID field 5735.

The guide ID field 5705 preferably contains a unique identifier of a guide, which is preferably used consistently. For example, in at least one embodiment, the guide ID field 5705 can include a randomly generated numerical code, and/or a text string indicating a name associated with a guide. A guide ID serves to distinguish the guide record associated with a guide from a guide record associated with other guides. Other unique identifiers of a guide may be utilized without departing from the spirit and scope of the embodiments. Using the example illustrated in FIG. 57, 'Guide1' is the guide ID associated with the guide record 5700.

The guide category ID field 5710 may include information of a number of categories associated with a guide. Content of the guide category ID field 5710 may be modified based on an action(s) of a guide. A category(ies) may be associated with a guide based on one or more types of information processing. For example, the category 'translate English to Spanish', or 'transcribe spoken queries' or 'Sports' might be associated with a guide to indicate a skill or expertise associated with the guide. Such an association may be used in part to rate or rank a guide(s) and/or to select a guide(s). A person may select a category(ies) and/or keyword(s) which is associated with a guide. A category may be associated with a guide based on testing of a guide(s). A category may be associated with a guide based on an affiliate group associated with the guide. For example, if a guide has chosen to be affiliated with affiliate groups associated with a type of food, a category associated with the type of food might be associated with the guide. A category may signify any type of skill or expertise which may be used to match a guide to a task. A category(ies) associated with a guide may be used to select an item(s) which is to be presented to a guide. A guide(s) may be selected to review an item(s) based on the association of a guide with a category(ies). For example, a guide may be selected to review and/or provide information such as resources, media, search results, etc. based on a category associated with the guide. Using the example illustrated in FIG. 57, 'Category1' and 'Category3' are associated with 'Guide1'.

The guide topic ID field 5715 may include information of a number of topics associated with a guide. Content of the guide topic ID field 5715 may be modified based on an action(s) of a guide. A person may select a topic which is associated with a guide. For example, a guide may select a topic(s) to be associated with the guide during a registration process. A topic may be associated with a guide based on testing of a guide(s). For example, a guide may be required to demonstrate knowledge of a category and/or topic(s) in order to be associated with the topic(s). Content of the guide topic ID field 5715 may be compared to content of a request in order to determine a ranking of a guide(s) for responding to a request. For example, if a topic indicated in the guide topic ID field is associated with content of a request, the guide may be more likely to be selected to respond to the request. Using the example illustrated in FIG. 57, the topics 'reggie miller', 'basketball' and 'fishing' are associated with 'Guide1'. This may indicate that 'Guide1' has indicated an interest in 'reggie miller', 'basketball' and 'fishing'.

The guide profile ID field 5720 may include information of a number of profiles associated with a guide. Content of the guide profile ID field 5720 may be modified based on action(s) of a guide. A person may select a profile which is associated with a guide. For example, a guide may select a profile(s) to be associated with the guide during a registration process. A profile may be associated with a guide based on testing of a guide(s). For example, a guide may be required to demonstrate knowledge relevant to a profile(s) in order to be associated with the profile(s), or a guide may take a test which is used to generate a profile, or a guide may provide information such as demographic, geographic, personality or other information which may be indicated in a profile(s) associated with the guide. Information indicated in a guide profile may be obtained from an external database. Information indicated in the content of the guide profile ID field 5720 may be compared to information indicated in the content of a profile(s) associated with a request in order to determine a ranking of a guide(s) for responding to a request. Likewise, a profile(s) associated with a guide(s) may be used to select and/or rank a guide(s). Using the example illustrated in FIG. 57, 'Demoprofileg1', 'Geoprofileg1' and 'Persprofileg1' are associated with 'Guide1'. This may indicate that 'Guide1' has indicated and/or generated 'Demoprofileg1' which may be a demographic profile, 'Geoprofileg1' which may be a geographic profile and 'Persprofileg1' which might indicate personality information regarding 'Guide1'. Any or all information indicated in a profile(s) associated with a guide may be used to determine a rating and/or ranking of a guide.

The guide result ID field 5725 may include information of a result(s) associated with a guide. Content of the guide result ID field 5725 may be modified based on an action(s) of a guide. If a guide produces a search result(s) responsive to a request(s), an identifier of the search result(s) may be included in the guide result ID field 5725. A rating(s) and/or ranking(s) associated with a search result(s) associated with a guide may affect compensation for a guide. Likewise a usage indicator associated with a search result(s) provided by a guide may affect a rating(s) and/or ranking(s) associated with a guide. Using the example illustrated in FIG. 57, 'Result1.1', 'Result3.1' and 'Result3.2' are associated with 'Guide1'. This may indicate that 'Guide1' has provided and/or reviewed 'Result1.1', 'Result3.1', and 'Result3.2'.

The guide communication info field 5730 may include information of a device(s) and/or service(s) associated with a guide. Content of the guide communication info field 5730 may be modified based on an action(s) of a guide. If a guide establishes communications using a device(s) and/or service(s), information regarding the device(s) and/or service(s) may be included in the guide communication info field 5730. Any type of communication service(s) and/or system(s) may be indicated in the guide communication info field 5730. For example, a username and/or password associated with a guide may be indicated in the guide communication info field 5730. Communication services such as IM, e-mail, SMS, MMS, EMS, telephone, wireless or wired communication, etc. may be indicated in the guide communication info field 5730. A telephone number, an email address, an IM provider and login ID, a keyword(s) associated with a service, etc. may be indicated in the guide communication info field 5730. Using the example illustrated in FIG. 57, the login 'guide1', the email 'guide1@chacha.com', the IM credential 'guide1@AIM' and the phone number '317.224.2242' are associated with 'Guide1'. This may indicate that 'Guide1' may be contacted using the login ID 'guide1', via email at 'guide1@chacha.com', via IM as 'guide1@AIM' and/or via voice, text, and/or other service(s) associated with the phone number '317.224.2242'.

The guide request ID field 5735 may include information of a request(s) associated with a guide. Content of the guide request ID field 5735 may be modified based on an action(s) of a guide. If a guide produces a search result(s) responsive to a request(s), an identifier of the request(s) may be included in the guide request ID field 5735. A rating(s) and/or ranking(s) associated with a request(s) associated with a guide may affect compensation for a guide. Likewise a usage indicator associated with a request(s) and a guide may affect a rating(s) and/or ranking(s) associated with the guide. A request may be associated with a guide based on a vote(s) cast by a guide regarding items associated with the request. Using the example illustrated in FIG. 57, 'Request1', and 'Request3' are associated with 'Guide1'. This may indicate that 'Guide1' has responded to, been selected to respond to, and/or has reviewed one or more item(s) associated with 'Request1', and 'Request3'.

As illustrated in FIG. 58, an exemplary a user record 5800 is provided, of which one or more may be associated with or resident in the search database 5020(FIG. 50). The user record 5800 may include a user ID field 5805, a user profile ID field 5810, a user request ID field 5815, a user result ID field 5820, a user advertisement ID field 5825, and a user communication info field 5830.

The user ID field 5805 preferably contains a unique identifier of a user, which is preferably used consistently. For example, in at least one embodiment, the user ID field 5805 can include a randomly generated numerical code, and/or a text string indicating a name associated with a user. A user ID serves to distinguish a user record associated with a user from a user record associated with other users. Other unique identifiers of a user may be utilized without departing from the spirit and scope of the embodiments. In at least one embodiment, a user ID may include a phone number associated with a user. Using the example illustrated in FIG. 58, 'User1' is the user ID associated with the user record 5800.

The user profile ID field 5810 may include information of a profile(s) associated with a user. Content of the user profile ID field 5810 may be modified based on an action(s) of a user. A person may select a profile which is associated with a user. For example, a user may select a profile(s) to be associated with the user during a registration process. A profile may be associated with a user based on testing of a user(s) and/or information from users. For example, a user may be required to demonstrate knowledge relevant to a profile(s) in order to be associated with the profile(s), or a user may take a test which is used to generate a profile, or a user may provide information such as demographic, geographic, personality or other information which may be indicated in a profile(s) associated with the user. Historical information such as a request(s) and/or result(s) associated with a user may be used to determine profile information. Information indicated in a user profile may be obtained from an external database. A profile(s) associated with a user(s) may be used to select and/or rank a user(s) for voting. Using the example illustrated in FIG. 58, 'DemoprofileU1', 'GeoprofileU1' and 'PersprofileU1' are associated with the user 'User1'. This may indicate that 'User1' has indicated and/or generated 'DemoprofileU1' which may be a demographic profile, 'GeoprofileU1' which may be a geographic profile and 'PersprofileU1' which might indicate personality information regarding 'User1'.

The user request ID field 5815 may include information of a request(s) associated with a user. Content of the user request ID field 5815 may be modified based on an action(s) of a user. If a user submits a request an identifier of the request may be included in the user request ID field 5815. Using the example illustrated in FIG. 58, 'Request1' and 'Request2' are associated with 'User1' which may indicate that 'User1' has submitted 'Request1' and 'Request2'.

The user result ID field 5820 may include information of a result(s) associated with a user. Content of the user result ID field 5820 may be modified based on an action(s) of a user and/or a guide(s). If a user receives a result(s) responsive to a request(s), an identifier of the result(s) may be included in the user result ID field 5820. A usage indicator associated with a result(s) provided to a user(s) may affect a rating(s) and/or ranking(s) associated with a guide. Using the example illustrated in FIG. 58, 'Result1.1', 'Result1.2' and 'Result2.1' are associated with the user 'User1'. This may indicate that 'User1' has been presented with the results 'Result1.1', 'Result1.2', and 'Result2.1'.

The user advertisement ID field 5825 may include information of an advertisement(s) associated with a user. Content of the user advertisement ID field 5825 may be modified based on an action(s) of a user. If a user receives an advertisement(s), an identifier of the advertisement(s) may be included in the user advertisement ID field 5825. A usage indicator associated with an advertisement(s) provided to a user(s) may affect a rating(s) and/or ranking(s) associated with a guide, compensation for the search system, and/or rating(s) and/or ranking(s) of an advertisement(s). Using the example illustrated in FIG. 58, 'Advert1' and 'Advert2' are associated with 'User1'. This may indicate that 'User1' has been presented with 'Advert1', and 'Advert2'.

The user communication info field 5830 may include information of a device(s) and/or service(s) associated with a user. Content of the user communication info field 5830 may be modified based on an action(s) of a user. If a user establishes communications using a device(s) and/or service(s), information regarding the device(s) and/or service(s) may be included in the user communication info field 5830. Any type of communication service(s) and/or system(s) may be indicated in the user communication info field 5830. For example, a username and/or password associated with a user may be indicated in the user communication info field 5830. Communication services such as IM, e-mail, SMS, MMS, EMS, telephone, wireless or wired communication, etc. may be indicated in the user communication info field 5830. A telephone number, an email address, an IM provider and login ID, a keyword(s) associated with a service, etc. may be indicated in the user communication info field 5830. Using the example illustrated in FIG. 58, the login 'user1', the email 'user1@chacha.com', the Twitter™ service account 'twitter: user1' and the phone number '317.924.2242' are associated with 'User1'. This may indicate that 'User1' may be contacted using the login ID 'user1', via email at 'user1@chacha.com', via Twitter as 'user1' and/or via voice, text, and/or other service(s) associated with the phone number '317.924.2242'.

As illustrated in FIG. 59, an exemplary a profile record 5900 is provided, of which one or more may be associated with or resident in the database 5020 (FIG. 50). The profile record 5900 may include a profile ID field 5905, a profile geographic info field 5910, a profile demographic info field 5915, a profile personality info field 5920, a profile guide ID field 5925, and a profile guide rating field 5930.

The profile ID field 5905 preferably contains a unique identifier of a profile, which is preferably used consistently. For example, in at least one embodiment, the profile ID field 5905 can include a randomly generated numerical code, and/or a text string indicating a name associated with a profile. A profile ID serves to distinguish a profile record associated with a profile from a profile record associated with other profiles. Other unique identifiers of a profile may be utilized without departing from the spirit and scope of the embodiments. In at least one embodiment, a profile ID may include a description associated with a profile. Using the example illustrated in FIG. 59, 'Profile1' is the profile ID associated with the profile record 5900.

The profile geographic info field 5910 may include geographic information associated with a profile. Any type of geographic information may be indicated in the profile geographic info field 5910. For example, GPS coordinates, a street address, a neighborhood name, a postal code, a city name, a state name, etc. could be indicated in the profile geographic info field 5910. Using the example illustrated in FIG. 59, the geographic information 'Indiana' is associated with 'Profile1'. This may indicate for example that a person with a home address in and/or other profile information associated with geographic information of the state of 'Indiana' may match 'Profile1', or may receive a higher rating(s) and/or ranking(s) associated with 'Profile1'.

The profile demographic info field 5915 may include demographic information associated with a profile. Any type of demographic information may be indicated in the profile demographic info field 5915. For example, date of birth, sex, race, political affiliation, income, number of children, marital status, membership in organizations, etc. could be indicated in the profile demographic info field 5915. Using the example illustrated in FIG. 59, the demographic information 'under30' AND 'over20' is associated with 'Profile1'. This may indicate that a person aged greater than 20 years and less than 30 years may receive a higher rating(s) and/or ranking(s) associated with 'Profile1'.

The profile personality info field 5920 may include personality information associated with a profile. Any type of personality information may be indicated in the profile personality info field 5920. For example, information of personality traits such as aggressiveness, curiosity, friendliness, intelligence, honesty, food preference, music preference, political affiliation, etc. could be indicated in the profile personality info field 5920. Using the example illustrated in FIG. 59, the characteristic 'Foodie' is associated with 'Profile1'. This may indicate that persons with an interest in food and/or restaurants may receive a higher rating(s) and/or ranking(s) associated with 'Profile1'.

The profile guide ID field 5925 may include information of a guide(s) who are associated with a profile. For example, if a guide elects to receive requests associated with 'Profile1', or if profile information of a guide matches a profile, an identifier of the guide may be indicated in the profile guide ID field 5925 Information indicated in the profile guide ID field 5925 may be used to obtain information associated with a guide using a record(s) such as the guide record 5700 (FIG. 57). Using the example illustrated in FIG. 59 'Guide1', 'Guide3', 'Guide2', 'Guide4' and 'Guide5' have been associated with 'Profile1'.

The profile guide rating field 5930 may include information regarding a rating of a guide(s) associated with a profile. In at least one embodiment, the profile guide ID field 5925 and the profile guide rating field 5930 are linked by for example a pointer. Using the example illustrated in FIG. 59, 'Guide1' has a rating of '2', 'Guide3' has a rating of '2', 'Guide2' has a rating of '1', 'Guide4' has a rating of '3' and 'Guide5' has a rating of '3'. Content of the profile guide ID field 5925 and the profile guide rating field 5930 may be used at least in part to determine an order in which a guide(s) are notified responsive to a request, a voting activity, a review activity, or other types of tasks and/or activities associated with a profile(s). Using the example illustrated in FIG. 59, 'Guide2' might be preferentially notified of a request associated with 'Profile1'. Any number of guides may be associated with a profile(s).

As illustrated in FIG. 60, an exemplary result record 6000 is provided, of which one or more may be associated with or resident in the search database 5020 (FIG. 50) The result record 6000 may include a result ID field 6005, a result guide ID field 6010, a result content info field 6015, a result resource ID field 6020 and a result usage information field 6025.

The result ID field 6005 preferably contains a unique identifier of a result, which is preferably used consistently. For example, in at least one embodiment, the result ID field 6005 can include a randomly generated numerical code, and/or a text string indicating a name associated with a result. A result ID serves to distinguish the result record associated with a result from a result record associated with other results. Other unique identifiers of a result may be utilized without departing from the spirit and scope of the embodiments. In at least one embodiment, a result ID may include a description associated with a result. Using the example illustrated in FIG. 60, 'Result1.1' is the result ID associated with the result record 6000.

The result guide ID field 6010 may include information of a guide(s) associated with a result. For example, a guide who obtained a result may be indicated in the result guide ID field 6010. In at least one embodiment a guide ID associated with a guide(s) who have voted on a result may be indicated in the result guide ID field 6010. Information contained in the result guide ID field 6010 may be used to obtain information regarding a guide associated with a search result based on records such as the guide record 5700 (FIG. 57). Using the example illustrated in FIG. 60, 'Guide1' is associated with 'Result1.1' which may indicate that 'Guide1' has provided 'Result1.1'.

The result content info field 6015 may include information of content of a result. For example, a text snippet associated with a result may be indicated in the result content info field 6015. A URL or other information associated with a result may be indicated in the result content info field 6015. Information contained in the result content info field 6015 may be used to provide information of a result to a user(s) and/or a guide(s). For example, text indicated in the result content info field may be sent to a user as an SMS message. Using the example illustrated in FIG. 60, the text snippet 'Thai sensations is the best Thai restaurant in Indy' is associated with 'Result1.1'. This may indicate that 'Thai sensations is the best Thai restaurant in Indy' may be provided if 'Result1.1' is selected to be presented.

The result resource ID field 6020 may include information of a resource associated with a result. For example, a URL associated with a web page from which a text snippet was obtained may be indicated in the result resource ID field 6020. A URL and/or other information such as a search query and/or a macro instruction(s) associated with a resource may be indicated in the result resource ID field 6020. Information contained in the result resource ID field 6020 may be used to provide access to a resource(s) for a guide(s), users(s) and/or the search system 5030 (FIG. 50). Using the example illustrated in FIG. 60, 'Resource2' is the resource ID associated with the result 'Result1.1'. This may indicate that 'Resource2' was used to obtain 'Result1.1'.

The result usage information field 6025 may include information regarding the use of a result. For example, a number of times that a result has been presented may be indicated in the result usage information field 6025. Using the example illustrated in FIG. 60, the indicator 'use counter=120' is associated with 'Result1.1'. This may indicate that 'Result1.1' has been presented one hundred twenty times. Information in the result usage information field 6025 may be utilized to determine whether a result is to be reviewed.

As illustrated in FIG. 61, an exemplary resource record 6100 is provided, of which one or more may be associated with or resident in the search database 5020 (FIG. 50). The resource record 6100 may include a resource ID field 6105, a resource guide ID field 6110, a resource description field 6115, a resource access info field 6120 and a resource usage information field 6125.

The resource ID field 6105 preferably contains a unique identifier of a resource, which is preferably used consistently. For example, in at least one embodiment, the resource ID field 6105 can include a randomly generated numerical code, and/or a text string indicating a name associated with a resource. A resource ID serves to distinguish the resource record associated with a resource from a resource record associated with other resources. Other unique identifiers of a resource may be utilized without departing from the spirit and scope of the embodiments. In at least one embodiment, a resource ID may include a description associated with a resource. Using the example illustrated in FIG. 61, 'Resource2' is the resource ID associated with the resource record 6100.

The resource guide ID field 6110 may include information of a number of guides associated with a resource. For example, a guide(s) who utilized a resource may be indicated in the resource guide ID field 6110. In at least one embodiment a guide ID associated with a guide(s) who have voted on a resource may be indicated in the resource guide ID field 6110. Information contained in the resource guide ID field 6110 may be used to obtain information regarding a guide associated with a resource based on records such as the guide record 5700 (FIG. 57). Using the example illustrated in FIG. 61, 'Guide1' is associated with 'Resource2' which may indicate that 'Guide1' has administrative access to 'Resource2'.

The resource description field 6115 may include information of a description of a resource. For example, a text snippet associated with a resource may be indicated in the resource description field 6115. A URL or other information associated with a resource may be indicated in the resource description field 6115. Information contained in the resource description field 6115 may be used to provide a description of resource. For example, a description of a resource may be presented to allow a person to identify and access a resource among other resources, such as when multiple resources are presented in a user interface. Using the example illustrated in FIG. 61, the text snippet 'Dining in Indiana' is associated with the resource 'Resource2'.

The resource access info field 6120 may include access information associated with a resource. For example, a URL associated with a web page may be indicated in the resource access info field 6120. A password, a login ID, a template for submitting a search query, an API for submitting and receiving information and/or any other information which may be utilized to access a resource may be indicated in the resource access info field 6120. Information contained in the resource access info field 6120 may be used to provide access to a resource(s). For example, a guide may be able to submit a request to a data feed without having personal permission to access the data feed, or an appliance in a toolset provided may include a macro instruction which may be indicated in the resource access info field 6120. Using the example illustrated in FIG. 61, the URL 'www.diningindy.com' is the access information associated with 'Resource2'. This may for example indicate that a result(s) may be obtained using the resource found at 'www.diningindy.com'.

The resource usage information field 6125 may include information regarding the use of a resource. For example, a number of times that a resource has been utilized by a guide(s) may be indicated in the resource usage information field 6125. Using the example illustrated in FIG. 61, the indicator 'use counter=180' is associated with 'Resource2'. This may indicate that 'Resource2' has been utilized one hundred eighty times. Information in the resource usage information field 6125 may be used for various purposes. For example, a count of usage may be related to compensation of a resource owner, compensation of the search system 5020 (FIG. 50), compensation of a guide, review timing of a resource, rating(s) of a resource, etc.

As illustrated in FIG. 62, an exemplary advertisement record 6200 is provided, of which one or more may be associated with or resident in the search database 5020 (FIG. 50). The advertisement record 6200 may include an advertisement ID field 6205, an advertisement description field 6210, an advertisement access info field 6215 and an advertisement usage information field 6220.

The advertisement ID field 6205 preferably contains a unique identifier of an advertisement, which is preferably used consistently. For example, in at least one embodiment, the advertisement ID field 6205 can include a randomly generated numerical code, and/or a text string indicating a name associated with an advertisement. An advertisement ID serves to distinguish the advertisement record associated with an advertisement from an advertisement record associated with other advertisements. Other unique identifiers of an advertisement may be utilized without departing from the spirit and scope of the embodiments. In at least one embodiment, an advertisement ID may include a description associated with an advertisement. Using the example illustrated in FIG. 62, 'Advert1' is the advertisement ID associated with the advertisement record 6200.

The advertisement description field 6210 may include information of a description associated with an advertisement. For example, a description of an advertisement may be presented to a guide(s) in order that a guide may select an advertisement to be associated with a request. Using the example illustrated in FIG. 62, 'Gokimchee the asian grocery in fishers' is the advertisement description associated with 'Advert1'. Any type of information such as text, audio, video, images, etc. may be indicated in the advertisement description field 6210. Information indicated in the advertisement description field may be presented to assist in selection of an advertisement.

The advertisement access info field 6215 may include access information associated with an advertisement. For example, a URL associated with a web page may be indicated in the advertisement access info field 6215. Information contained in the advertisement access info field 6215 may be used to provide access to an advertisement(s). The advertisement access information may for example point to an advertising server, or other source of advertisements. Using the example illustrated in FIG. 62, the URL 'https://adserver.chacha.com\gokimchee' is the access information associated with 'Advert1'. This may for example indicate that 'Advert1' may be delivered to a user using content accessed at 'https://adserver.chacha.com\gokimchee'.

The advertisement usage information field 6220 may include information regarding the use of an advertisement. For example, a number of times that an advertisement has been delivered to a user(s) may be indicated in the advertisement usage information field 6220. Using the example illustrated in FIG. 62, the indicator 'use counter=180' is associated with 'Advert1'. This may indicate that 'Advert1' has been delivered to user(s) one hundred eighty times. Information in the advertisement usage information field 6220 may be used for various purposes such as determining whether an advertisement is to be reviewed, compensation of any sort, etc.

As illustrated in FIG. 63, an exemplary search session record 6200 is provided, of which one or more may be associated with or resident in the search database 5020 (FIG. 50). The search session record 6300 may include a search session ID field 6305, search session search query field 6310, a search session user ID field 6315, a search session guide ID field 6320, a search session result ID field 6325, a search session resource ID field 6330, a search session keyword ID field 6335, a search session category ID field 6340, a search session rating info field 6345, a search session comments field 6350, a search session chronological info field 6355, and a search session clarification info field 6360. A search session record may be created responsive to various types of activities, such as an interactive search session, a non-interactive training session, a collaborative search session by multiple searchers, etc. Both real-time and non real-time communication information associated with a search session may be recorded. Any information associated with a search session may be recorded in a search session record.

The search session ID field 6305 may include a unique identifier of a search session. The content of the search session ID field serves to identify a search session record associated with a search session from the search session record associated with other search sessions. A search session ID may include any type of information which may uniquely identify a search session. In at least one embodiment, a time stamp and a user ID may be used to uniquely identify a search session. Using the example in FIG. 63, 'session 1100227' is the search session ID associated with the search session record 6300.

The search session search query field 6310 may include information of a request submitted by a user. It may contain request information, such as a structured query, which may have been created as part of a search session(s). Using the example illustrated in FIG. 63, the query 'best email marketing companies', and the query 'where can I get info of the best email marketing companies?' have been associated with the search session 'session 1100227', which may indicate for example that the query 'best email marketing companies' was received from a user, and that the structured query 'where can I get info of the best email marketing companies?' was associated with the search session by a guide.

The search session user ID field 6315 may include information identifying a user(s) associated with a search session (e.g., 'Market101'). Information indicated in the search session user ID field 6315 may be used to 'look up' information of a user(s) using records such as the user record 5800 (FIG. 58).

The search session guide ID field 6320 may include information identifying a guide(s) associated with a search session (e.g., 'Emailguy1'). Any number of guides may be associated with a search session. For example, a first guide may receive information of a request which may be processed by the first guide, a second guide may construct a structured query and/or categorize a user request, a third guide may perform a search associated with a search session, and a fourth guide may review a result(s) responsive to a request associated with a search session, etc. Information indicated in the search session guide ID field 6320 may be used to 'look up' information of a guide using a record(s) such as the guide record 5700 (FIG. 57).

The search session result ID field 6325 may include information of a result(s) provided responsive to a request (e.g., 'exacttarget.com', 'mail2u.com'). The search session result ID field may indicate information included in a record(s) such as the result record 6000 (FIG. 60). A result may be ranked and/or rated based on information indicated in a search session record(s).

The search session resource ID field 6330 may include information of a resource(s) utilized by a guide(s) in a search session. The search session resource ID field 6330 may contain data such as a URL (e.g., 'HarvardBusinessReview.net', 'www.google.com') or other information of a resource utilized to obtain a search result(s). For example, a URL associated with a web page which has been indicated by a guide as including a search result(s) or a resource such as a custom search engine which may have been used to obtain information as part of a search session may be indicated in the search session resource ID field 6330. Information indicated in the search session resource ID filed 6330 may indicate information included in a record such as the resource record 6100 (FIG. 61).

The search session keyword ID field 6335 may include information of a keyword(s) which may have been associated with a request as part of a search session, (e.g., 'email', 'marketing companies', 'email marketing companies'). Information associated with a request may be processed automatically and/or using the assistance of a person(s) in order to associate a keyword(s) with the request. For example, the search system 5030 (FIG. 50) may parse a query in order to extract one or more keywords from the query, or a guide(s) may be presented with a list of keywords which might be associated with a request and may select a keyword(s) to be associated with the request, or a spoken query might be automatically associated with a keyword(s). Information indicated in the search session keyword ID field may be used for various purposes. For example, a guide(s), an advertisement(s), a resource(s), a search result(s), and/or other information may be ranked based on information associated with a keyword(s) indicated in the search session keyword ID field 6335.

The search session category ID field 6340 may include information of a category(ies) which may have been associated with a request as part of a search session, (e.g., 'Business>Marketing', 'Computers>Marketing'). A category(ies) or categorization(s) may be associated with a request and/or a search session automatically, and/or using the assistance of a person(s). For example, a keyword(s) associated with a search session may be used to identify one or more categories which may be associated with a request.

The search session rating info field 6345 may include information of ratings associated with the search session. The rating field may contain ratings of various items indicated in a search session log which are associated with an item via for example a pointer. For example, a rating may be associated with a result associated with a request, a rating may be associated with a searcher for a search session (e.g., example a user rating, or a trainer rating for the search session), a rating may be associated with a resource based on review by a guide(s) of a search session record(s), etc. Any type of ratings may be associated with any information indicated in a search session record.

The search session comments field 6350 may include information of comments and/or annotations associated with a search session. Annotations of the search session record 6350 provided by any person(s). For example, a trainer may review a search session record and add comments regarding alternate resources, ratings of a searcher, etc. Information indicated in the search session comments field 6350 may include information of the person who performed the annotation. Using the example illustrated in FIG. 63, the comment 'www.emailmarkets.com is good for this' may have been added to the search log 'session 11002277' by 'Guide1'. Any type of annotation information may be indicated in the search session comments field 6350.

The search session chronological info field 6355 contains time-related information regarding a search session. For example, a time stamp may indicate when a query is submitted (e.g., 'startsession 1.40P_12_27_07'), a time stamp might be included indicating when a particular result(s) is returned to a user(s) (e.g., 'result1—1.41 P', 'result2—1.45P'), when a session was concluded (e.g., 'end session 1.46P_12_27_07'), etc. Any sort of chronological information associated with a search session, which may include time information associated with annotations, ratings, etc. may be indicated The search session clarification info field 6360 may include information of any or all interaction between a guide(s) and a user(s) which may have been used to clarify a request. For example, information from a previous communication, or information from a real-time chat session, or location information, etc. which may clarify a request may be indicated in the search session clarification info. In at least one embodiment, information associated with an interactive chat session between a user and a guide(s) may be indicated in the search session clarification info field 6360.

Information indicated in a search session record(s) may be included in a 'wiki' associated with a guide(s) and/or a categorization. For example, a search session(s) associated with a highly ranked guide(s) associated with a categorization might be used to determine any or all of a search space associated with a categorization, or information in a search session record or compilation of records might be used to modify parameters associated with an automated search of information associated with a categorization, etc.

Figure 64:
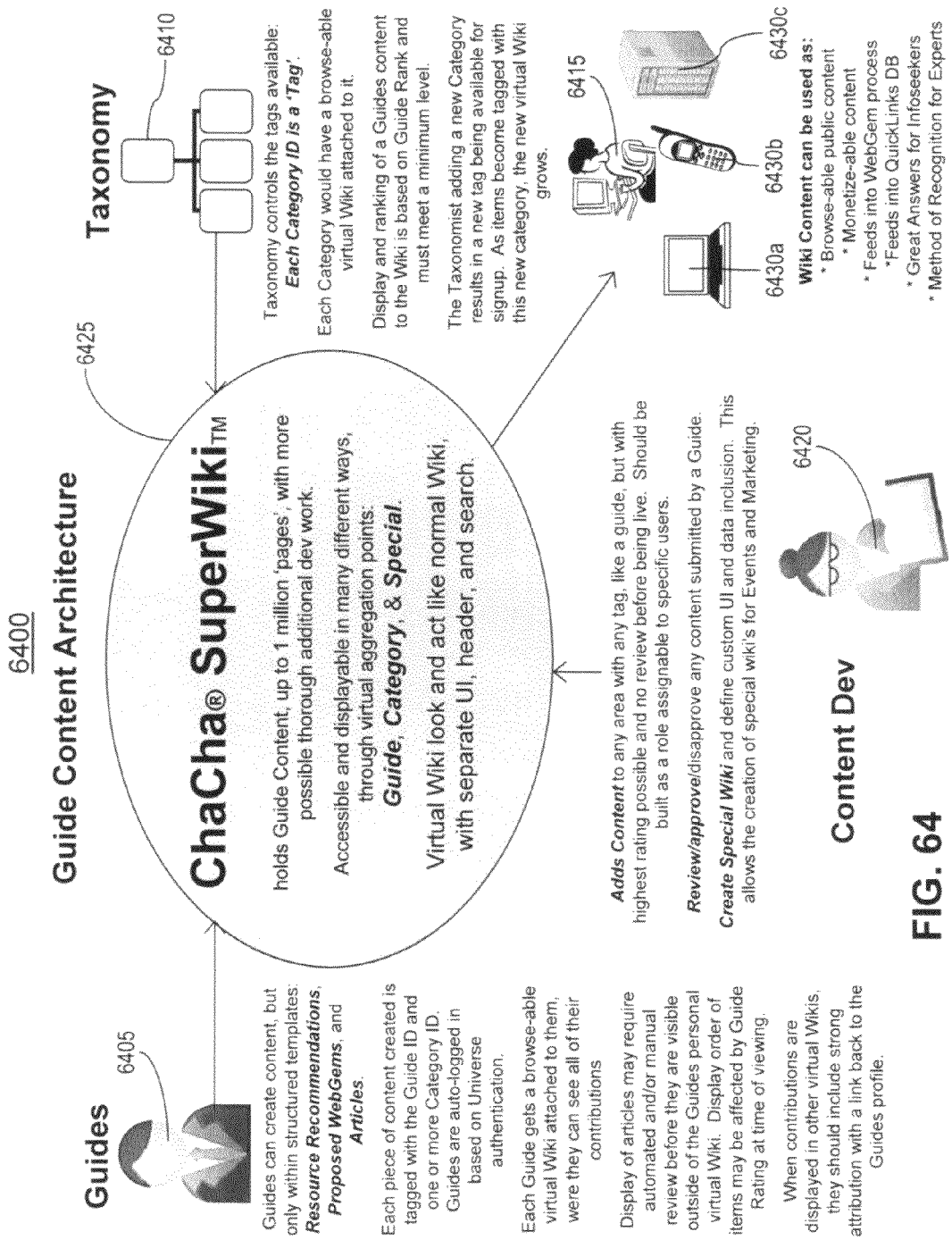
FIG. 64 illustrates a diagram of an exemplary operation of a system embodiment.

A diagram 6400 of a guide wiki system is illustrated in FIG. 64. The guide wiki 6425 may be included in whole or in part in the database 5020 (FIG. 50) and/or any elements of the system 5000. The guide wiki or ChaCha® SuperWiki™ 6425 may be created and edited in various ways as described further herein. Any or all guides such as the guide 6405 may contribute information to the wiki via for example, a guide home page or other content creation process and/or system which may allow a guide to associate content with any or all elements or nodes or categorizations indicated in the taxonomy 6410. While the taxonomy is illustrated as a hierarchical structure, no limitation is implied thereby. Any sort of data structure might be used to assist in indexing content within the guide wiki 6425. Content of the wiki may be edited and/or created by a system administrator(s) such as the administrator 6420, who may have various editing privileges as determined by the operators of the system 5000 (FIG. 50). Content indicated in the guide wiki 6425 may be presented to users such as the user 6415 via any systems associated with a user such as the systems 6430a, 6430b, and 6430c. While only a single guide, administrator, and user are illustrated in FIG. 64, it is envisioned that any number of users, guides, administrators and systems might be utilized. Any user(s), guide(s), or administrator(s) may have different access rights to content indicated in the guide wiki 6425.

Content which may support a search activity may be provided under various conditions. As illustrated in the search session record 6300 and the process 5500, guidance, tools and resources may be provided at any time. Support information may be customized based on information available relevant to a task. For example if a searcher is performing a vetting task the support provided may be appropriate to that task, while the infrastructure associated with a search task may be customized to a category, location, profile, etc. The flexibility of the dynamic generation of the interface tools associated with indexed content and tools enables a better experience. An interface for providing search resources to a guide is illustrated below for the purposes of illustration, but no limitation is implied thereby. The system and method may be used to generate user interfaces and toolsets which may be appropriate to any search task by any person.

If content and/or other information which may be associated with a category(ies), keyword(s), profile(s), etc. may be identified and/or reviewed, it may be useful for one or more judgment criteria to be provided. An exemplary list of judgment criteria 7100 which may be associated with a categorization or other item(s) is illustrated in FIG. 70A-70D. The judgment criteria 7100a-7100d may be developed using various methods. A system administrator(s) and/or other person(s) may explicitly and/or implicitly define selection criteria. Selection criteria may be determined at least in part based on automated and/or human assisted processing.

Using the example illustrated in FIGS. 70A-70D, criteria for selection of resources are described. Such criteria may be associated with a category(ies), profile(s), etc. and may be presented using any elements of the system 5000 (FIG. 50). For example, the judgment criteria documents depicted in FIG. 70A-70D may be associated with a node or categorization. A person reviewing materials associated with the category may be able to access the judgment criteria document via a user interface provided to persons selecting and/or associated with the category. While a specific example of selection criteria for resources associated with a category are illustrated and explained, any sort of criteria may be defined. Criteria or other forms of media may be associated with a keyword, a search result(s), content, etc. which may assist with rating and/or ranking of any number and/or type(s) of item(s).

Content may be dynamically generated. For example, a wiki might be created based on information associated with multiple nodes or categorizations indicated in the taxonomy 6410, which might be searched using a search tool which is defined based on any or all information indicated in the database 5020 (FIG. 50). Content and views of a wiki may be dynamically generated based on any information indicated in the database 5020, which may be used to create a virtual wiki. For example, a wiki including content provided by guides associated with multiple categories which may be searched by a CSE might be provided to a guide responding to a request which is associated with the categories.

As further described herein below a GUI(s), view(s), and the functionality(ies) and/or information presented therein may be created and/or modified based on criteria such as guide and/or user rating(s), profile(s), geographic information, affiliations, system conditions such as available guide(s), resource(s), a bid(s), or other information which is indicated in the database 5020 (FIG. 50). For example, a view(s) and/or GUI's may be generated based on a number of guides, a skill level(s) of a guide(s), inventory and/or pricing of advertisement(s) and/or other content, resource availability (e.g., an activity may be presented to a guide(s) depending on availability of a resource system(s)), etc. Views and/or content of a wiki and/or GUI may be modified based on information of a device(s) associated with a user(s) and/or guide(s). For example, content of a GUI and/or a wiki may be different if a user device which submitted a request has limited display capabilities, or runs particular software such as an operating system (OS) or application. For example, information of text-based resources might be selected if a user is requesting a response using a simple telephone handset, or information which is compatible with a handset application, operating system and/or display and/or other interface capabilities might be included in a wiki and/or GUI based on information associated with a request. While a few examples of criteria for selection of interface element(s), view(s), resource(s), content, etc. have been used for the purposes of illustration, no limitation is implied thereby, any information available to the system 5000 may be used to determine criteria for selection of information to be included in a virtual wiki.

Exemplary HTML 6500 for defining a custom search engine using the Google® CSE methodology is illustrated in FIG. 65. While the example of using HTML to define a search tool within the framework defined by the Google® CSE is used for the purposes of illustration, other equivalent technologies may be used within the scope and spirit of the embodiments herein, as are well known in the art.

The header information 6502 describes the version and encoding of the file. The "GoogleCustomizations" statement 6504 specifies the type of information indicated in the file and that the CSE definition begins from that statement. The CSE parametric definition statement 6506 defines relevant parameters for the CSE, using the example in FIG. 65, the 'volunteers=no' indicates that only the owner of the CSE may edit the definitions of the CSE. The "title" statement 6508 defines a title associated with the CSE (i.e., 'IndianapolisLocalSearch'), which may be displayed to a user(s) of the CSE. The description statement 6510 defines a description associated with the CSE. The Context statement 6512 denotes the start of the definition of context information such as for example Facets and labels which may be utilized in the operation of the CSE tool. The /Context statement 6522 defines the end of the context information.

The LookAndFeel statement 6524 may be used to redefine the appearance of the CSE when results are presented to the user, for example a logo or other customized appearance features may be defined. The SubscribedLinks statement 6526 may allow a user to define one or more links which may be used by the CSE during a search process. The Adsense statement 6528 may change the operation of advertisements within the presentation of the search results provided by the CSE. The EnterpriseAccount statement 6530 indicates the nature of the user and billing information. The Facet statement 6514 defines an element of the operation of the CSE, of which any number may exist. The FacetItem statement 6548 starts the definition of a facet item. The Label statement 6552 defines a label with the name "Indianapolis_hotels" (i.e., name="indianapolis_hotels") which may be a label associated with a search result(s) which might be increased in ranking when the facet 'IndianapolisHotels' is activated. The Rewrite statement 6556 may define one or more keywords which may be appended to a user query when a search is performed responsive to activation of the 'IndianapolisHotels' facet. The/Label statement 6554 defines the end of the label definition of the label "indianapolis_hotels". The Title statement 6560 defines a Title associated with the facet item. The/FacetItem statement 6550 indicates the end of the definition of the facet item. The/Facet statement 6516 defines the end of facet definitions for the CSE. While a single facet item is defined in the example in FIG. 65, any number of facet items might be defined in a CSE customization file.

The BackgroundLabels statement 6518 denotes the beginning of the definition of one or more background labels associate with a CSE. The 'background labels' may define a type of modification to the search strategy which is associated with a text fragment designated by the Label statement. Background labels may be used to affect the ranking of search results as will be further described herein below with respect to FIG. 66. The Label statement 6534 defines the name "boost_highest" to be associated with the parameters 'mode="BOOST"weight="1". This may indicate that a result produced by a URL associated with the label "boost_highest" may have its ranking increased by the maximum level allowed by the CSE. The Label statement 6536 defines the name "boost_high" to be associated with the parameters 'mode="BOOST"weight="0.85999999". This may indicate that a result produced by a URL associated with the label "boost_high" may have its ranking increased by the 86% of the maximum level allowed by the CSE. The Label statement 6538 defines the name "boost_med" to be associated with the parameters 'mode="BOOST"weight="0.75999999". This may indicate that a result produced by a URL associated with the label "boost_med" may have its ranking increased by the 76% of the maximum level allowed by the CSE. The Label statement 6542 defines the name "boost_low" to be associated with the parameters 'mode="BOOST"weight= "0.25999999". This may indicate that a result produced by a URL associated with the label "boost_low" may have its ranking increased by the 26% of the maximum level allowed by the CSE. The Label statement 6544 defines the name "negative_boost" to be associated with the parameters 'mode="BOOST"weight="−0.45999999". This may indicate that a result produced by a URL associated with the label "negative_boost" may have its ranking decreased by the 46% of the maximum level allowed by the CSE. The Label statement 6540 defines the name "_cse_heu_1 oztoew" to be associated with the parameters 'mode="FILTER". This may indicate that a result produced by a URL associated with the label "_cse_heu_1oztoew" may be exclusively selected, (i.e., if a result(s) is found associated with a URL associated with the label "_cse_heu_1 oztoew" it will be returned regardless of the ranking of other results). The Label statement 6546 defines the name "_cse_exclude_heu_1oztoew" to be associated with the parameters 'mode="EXCLUDE"'. This may indicate that a result produced by a URL associated with the label "_cse_exclude_heu_1oztoew" may be excluded, (i.e., if a result(s) is found associated with a URL associated with the label "_cse_exclude_heu_1 oztoew" it will be excluded regardless of the ranking of the results). The/CustomSeachEngine statement 6562 defines the end of the CSE definitions. The/GoogleCustomizations statement 6564 defines the end of the GoogleCustomizations definitions.

Exemplary HTML 6600 for defining a custom search engine using the Google® CSE methodology is illustrated in FIG. 66. While the example of using HTML to define a search tool within the framework defined by the Google® CSE, other equivalent technologies may be used within the scope and spirit of the embodiments herein, as are well known in the art. The HTML in FIG. 66 defines a search space and associates search parameters defined in the HTML 6500 illustrated in FIG. 16.

The header information 6602 describes the version and encoding of the file. The GoogleCustomizations statement 6604 defines the start of the customizations. The Annotations statement 6606 identifies the start of a list of annotations associated with a custom search engine, and/or other tools.

The Annotation statement 6608 identifies the URL "indyrestaurant.compendiumsoftware.com/blog/dine-with-me*" as the subject of the annotation and "score="1" as the ranking (i.e., the top rated result). The Label statement 6612 associates the label name "_cse_heu_1oztoew" which was defined in the HTML 6500 (FIG. 65) with the URL "indyrestaurant.compendiumsoftware.com/blog/dine-with-me*", which may cause the parameter 'mode="FILTER" to be associated with the URL "indyrestaurant.compendiumsoftware.com/blog/dine-with-me*" when being processed by a CSE tool. The/Annotation statement 6610 denotes the end of the annotation of the URL "indyrestaurant.compendiumsoftware.com/blog/dine-with-me*".

The Annotation statement 6614 identifies the URL "indianapolis.citysearch.com/profile/3935232/franklin_in/jim_o_brien_realty. html" as the subject of the annotation. The Label statement 6618 associates the label name "_cse_exclude_heu_1 oztoew" which was defined in the HTML 6500 (FIG. 65) with the URL "indianapolis.citysearch .com/profile/3935232/franklin_in/jim_o_brien_realty.html", which may cause the parameter mode="ELIMINATE" to be associated with the URL "indianapolis.citysearch .com/profile/3935232/franklin_in/jim_o_brien_realty. html" when being processed by a CSE tool. The/Annotation statement 6616 denotes the end of the annotation of the URL "indianapolis.citysearch.com/profile/3935232/franklin_in/jim_o_brien_realty.html".

The Annotation statement 6620 identifies the URL <www.indianapolis.com/> as the subject of the annotation. The Label statement 6624 associates the label name "_cse_heu_1 oztoew" which was defined in the HTML 6500 (FIG. 65) with the URL "www.indianapolis.com/", which may cause the parameter mode="FILTER" to be associated with the URL <"www.indianapolis.com/"> when being processed by a CSE tool. The /Annotation statement 6622 denotes the end of the annotation of the URL <"www.indianapolis.com/">.

The Annotation statement 6626 identifies the URL "indianapolis.citysearch.com/profile/3932254/noblesville_in/tom_james_realty. html" as the subject of the annotation. The Label statement 6630 associates the label name "negative_boost" which was defined in the HTML 6500 (FIG. 65) with the URL "indianapolis.citysearch .com/profile/3932254/noblesville_in/tom_james_realty. html", which may cause the parameter mode="FILTER" to be associated with the URL "indianapolis.citysearch .com/profile/3932254/noblesville_in/tom_james_realty. html" when being processed by a CSE tool. The/Annotation statement 6628 denotes the end of the annotation of the URL "indianapolis.citysearch .com/profile/3932254/noblesville_in/tom_james_realty. html".

The Annotation statement 6632 identifies the URL "www.colts.org/*" as the subject of the annotation. The Label statement 6636 associates the label name "boost_high" which was defined in the HTML 6500 (FIG. 65) with the URL "www.colts.org/*", which may cause the parameter mode= "FILTER" to be associated with the URL "www.colts.org/*" when being processed by a CSE tool. The/Annotation statement 6634 denotes the end of the annotation of the URL <www.colts.org/*>.

The Annotation statement 6638 identifies the URL "indianapolis.diningguide.com/*" as the subject of the annotation. The Label statement 6642 associates the label name "boost_low" which was defined in the HTML 6500 (FIG. 65) with the URL "indianapolis.diningguide.com/*", which may cause the parameter mode="FILTER" to be associated with the URL "indianapolis.diningguide.com/*" when being processed by a CSE tool. The/Annotation statement 6640 denotes the end of the annotation of the URL "indianapolis.diningguide.com/*" The/Annotations statement 6644 indicates the end of the annotations in the HTML 6600. The/GoogleCustomizations statement 6646 indicates the end of the customizations.

While a static example and a few URLs and types of parametric adjustments have been used in the examples illustrated in FIG. 65 and FIG. 66 for the purposes of illustration, it is envisioned that annotations and parametric information might be generated dynamically and/or programmatically in order to continuously modify and update a search process and/or a search space which might be associated with one or more nodes of an index such as a taxonomy. Using such techniques, guides may provide content, resources, judgment and other forms of information which may be utilized to assist a guide(s), a user(s) and/or the system 5000 in selecting a result(s), a resource(s), an advertisement(s), a profile(s), a guide(s) and/or other item(s).

A custom search engine functionality may be used in order to narrow a search space and increase the importance of information associated with a category(ies), which may improve the probability that a search result provided by a keyword search using the CSE will be relevant to the category(ies), which may assist a person in finding a result more rapidly when a request has been associated with the category. Multiple CSE's which are associated with different topics and different search spaces may be provided, as described further herein.

Figure 67:
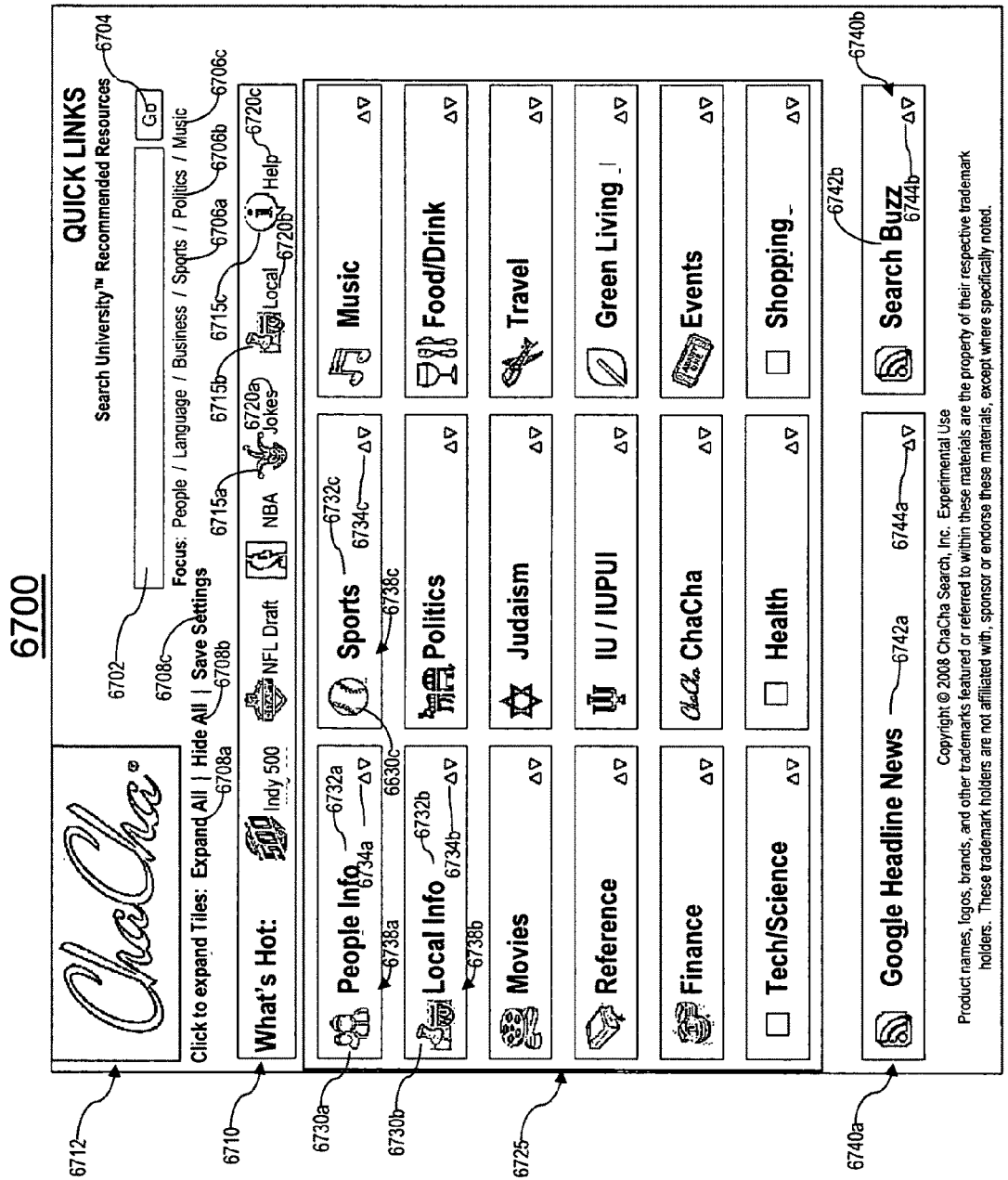
FIG. 67 depicts a GUI presenting information of resources.

As illustrated in FIG. 67, an exemplary GUI 6700 is provided for obtaining a search result. The GUI 6700 may be presented responsive to an action(s) by a person(s). The GUI 6700 may include search a query box 6702, a search activation button 6704, search vertical controls 6706, presentation controls 6708, selected topics window 6710, selected topic icons 6715, selected topics selection controls 6720, advertising window 6712, taxonomy topics window 6725, taxonomy topic icons 6730, taxonomy topic selection controls 6732, taxonomy topic view controls 6734, taxonomy topic window 6738, information feed windows 6740, information feed content indicators 6742, and information feed viewing controls 6744. The GUI 6700 may be used to obtain information regarding an actions selected, and/or may be used to provide information. For example, the GUI 6700 may be provided to a guide responsive to activation of a control by a guide, to a user if a user elects to conduct an information search, or to system administrators, advertisers and/or other persons. The GUI 6700 may be presented on any suitable device(s) of the system 5000 (FIG. 50).

The search query box 6702 may indicate information associated with a request. For example, the query box 6702 may be used to enter text and/or other information which may be utilized by one or more resources. The search activation button 6704 may be used to initiate a search. The search vertical controls 6706, which may be defined by information such as the HTML 6500 (FIG. 65) and/or 6600 (FIG. 66) may be used to indicate that a search is to be performed based on information associated with a search vertical. Using the example illustrated in FIG. 67, the 'Sports' search vertical control 6706a may be used to indicate that a search is be performed utilizing a search functionality and/or resources and/or annotations associated with sports. Likewise, the 'Politics' search vertical control 6706b may be used to indicate that a search is be performed utilizing a search functionality and/or resources and/or annotations associated with politics, and the 'Music' search vertical control 6706c may be used to indicate that a search is be performed utilizing a search functionality and/or resources and/or annotations associated with music. Any number of search vertical controls 6706 may be provided in the GUI 6700.

The presentation controls 6708 may be used to modify the presentation of information in the GUI 6700. Using the example illustrated in FIG. 67, the 'Expand all' presentation control 6708a may cause a GUI such as the GUI 6900 illustrated in FIG. 68 associated with all taxonomy topic windows 6738 indicated in the taxonomy topics window 6725 and/or information feed windows 6740 to be presented. Similarly, the 'Hide all' presentation control 6708b may cause any GUIs such as the GUI 6800 (FIG. 67A) associated with any taxonomy topic windows 6738 and/or information feed windows 6740 to be hidden from view. The 'Save Settings' presentation control 6708c may cause the current settings of hiding and/or displaying information in the GUI 6700 to be stored. Any number of presentation controls 6708 may be included in the GUI 6700.

The selected topics window 6710 may include information of selected topics which may be linked with one or more resources. Topics and/or resources presented may be determined based on any information indicated in the database 5020 (FIG. 50). For example, categorizations associated with a guide which may have received a high level of search queries, and/or categorizations which may have received a high level of new information associations, and/or categorizations selected based on a guide history and/or user history or other information associated with a request may be presented in the selected topics window 6710. A selected topics icons 6715 may include a visual indicator of a category within an index indicated in the database 5020 (FIG. 50). A visual indicator may include any type of information such as picture, number, etc. In at least one embodiment, an icon which may be associated with a trademark, logo or other similar information may be presented. Using the example illustrated in FIG. 67, the 'joker' selected topics icon 6715a may indicate resources associated with jokes, the 'push-pin' selected topics icon 6715b may indicate resources associated with location specific information such as maps, etc. and the 'info' selected topics icon 6715c may indicate resources associated with instructions for using the GUI 6700. A previously mentioned, assistance information associated with a category may be provided based on a category associated with a request. A selected topics icon 6715 may be activated by for example 'clicking on' the icon, or other equivalent actions. Activation of a selected topics icon 6715 may cause a GUI associated with the selected topics icon 6715 to be presented. The selected topics selection controls 6720 may include a textual and/or numeric indicator of a category or node within an index indicated in the database 5020 (FIG. 50). A textual and/or numeric indicator may include any type of information such as text, a number, etc. In at least one embodiment, text or other information which may be associated with a node indicated in an index may be presented. For example, information of a keyboard 'short-cut', or a description, or any other sort of indicator may be provided. Using the example illustrated in FIG. 67, the 'Jokes' selected topics selection control 6720a may indicate resources associated with jokes, the 'Local' selected topics selection control 6720b may indicate resources associated with location specific information such as maps, etc. and the 'Help' selected topics selection control 6720c may indicate resources associated with instructions for using the GUI 6700. A selected topics selection control 6720 may be activated by for example 'clicking on' the text, or other equivalent actions. Activation of a selected topics selection control 6720 may cause a GUI associated with the selected topics selection control 6720 to be presented. Any number of selected topics icons 6715 and/or selected topics selection controls 6720 may be provided in the GUI 6700.

The advertising window 6712 may include content such as sponsored content or advertisements, or any other type of information. Any number of advertising windows 6712 may be included in the GUI 6712. Information presented in the advertising window 6712 may be selected based on any information indicated in the database 5020 (FIG. 50). In at least one embodiment, information indicated in the advertising window 6712 may be selected based on a category and/or other information associated with a request.

The taxonomy topics window 6725 includes information of one or more nodes indicated in an index indicated in the database 5020 (FIG. 50). Content of the taxonomy topics window 6725 may be determined based on various factors. For example, top-level nodes such as a node(s) associated with a general topic may be presented, and/or information of a node(s) associated with a request(s), or information of a node(s) associated with a guide(s) and/or a user(s) may be presented. The taxonomy topic icons 6730 may include a visual indicator of a category or node within an index indicated in the database 5020 (FIG. 50). A visual indicator may include any type of information such as picture, number, etc. In at least one embodiment, an icon which may be associated with a trademark, logo or other similar information may be presented. Using the example illustrated in FIG. 67, the 'people' taxonomy topics icon 6730a may indicate resources associated with people, the 'push-pin' taxonomy topics icon 6730b may indicate resources associated with location specific information such as maps, etc. and the 'baseball' taxonomy topics icon 6730c may indicate resources associated with sports. A taxonomy topics icon 6730 may be activated by for example 'clicking on' the icon, or other equivalent actions. Activation of a taxonomy topics icon 6730 may cause a GUI associated with the taxonomy topics icon 6730 to be presented. The taxonomy topics selection controls 6732 may include a textual and/or numeric indicator of a category or node within an index indicated in the database 5020 (FIG.

50). A textual and/or numeric indicator may include any type of information such as text, a number, etc. In at least one embodiment, text or other information which may be associated with a node indicated in a data structure may be presented. For example, information of a keyboard 'short-cut', or a description, or any other sort of indicator may be provided. Using the example illustrated in FIG. 67, the 'People Info' taxonomy topics selection control 6732a may indicate resources associated with people, the 'Local Info' taxonomy topics selection control 6732b may indicate resources associated with location specific information such as maps, etc. and the 'Sports' taxonomy topics selection control 6732c may indicate resources associated with instructions for using the GUI 6700. A taxonomy topics selection control 6732 may be activated by for example 'clicking on' the text, or other equivalent actions. Activation of a taxonomy topics selection control 6732 may cause a GUI associated with the taxonomy topics selection control 6732 to be presented.

The taxonomy topics viewing controls 6734 may be used to reveal and/or hide a GUI such as the GUI 6800 (FIG. 67A) associated with a taxonomy topic which may be indicated in a taxonomy topic window 6738. Using the example illustrated in FIG. 67, the taxonomy topic viewing controls 6734a may include arrows which expand and hide a GUI associated with the topic 'People Info' indicated in the taxonomy topic window 6738a. Similarly, the taxonomy topic viewing controls 6734b may include arrows which expand and hide a GUI associated with the topic 'Local Info' indicated in the taxonomy topic window 6738b, and the taxonomy topic viewing controls 6734c may include arrows which expand and hide a GUI such as the GUI 6800 (FIG. 67A) associated with the topic 'Sports' indicated in the taxonomy topic window 6738c. Any number of taxonomy topics icons 6715 and/or taxonomy topics selection controls 6732, taxonomy topics viewing controls and taxonomy topic windows 6738 may be provided in the GUI 6700.

The information feed windows 6740 may include information feed content indicators 6742, and information feed viewing controls 6744. For example, the information feed window 6740a includes the 'Google Headline News' RSS information feed content indicator 6742a, and the 'arrow' information feed viewing controls 6744a, which may cause a GUI such as the GUI 7000 illustrated in FIG. 69 associated with a resource indicated in the database 5020 (FIG. 50) to be provided. Similarly the information feed window 6740b includes the 'Search Buzz' RSS information feed content indicator 6742b, and the 'arrow' information feed viewing controls 6744b, which may cause a GUI associated with the resource 'Search Buzz' to be provided.

Figure 67A:
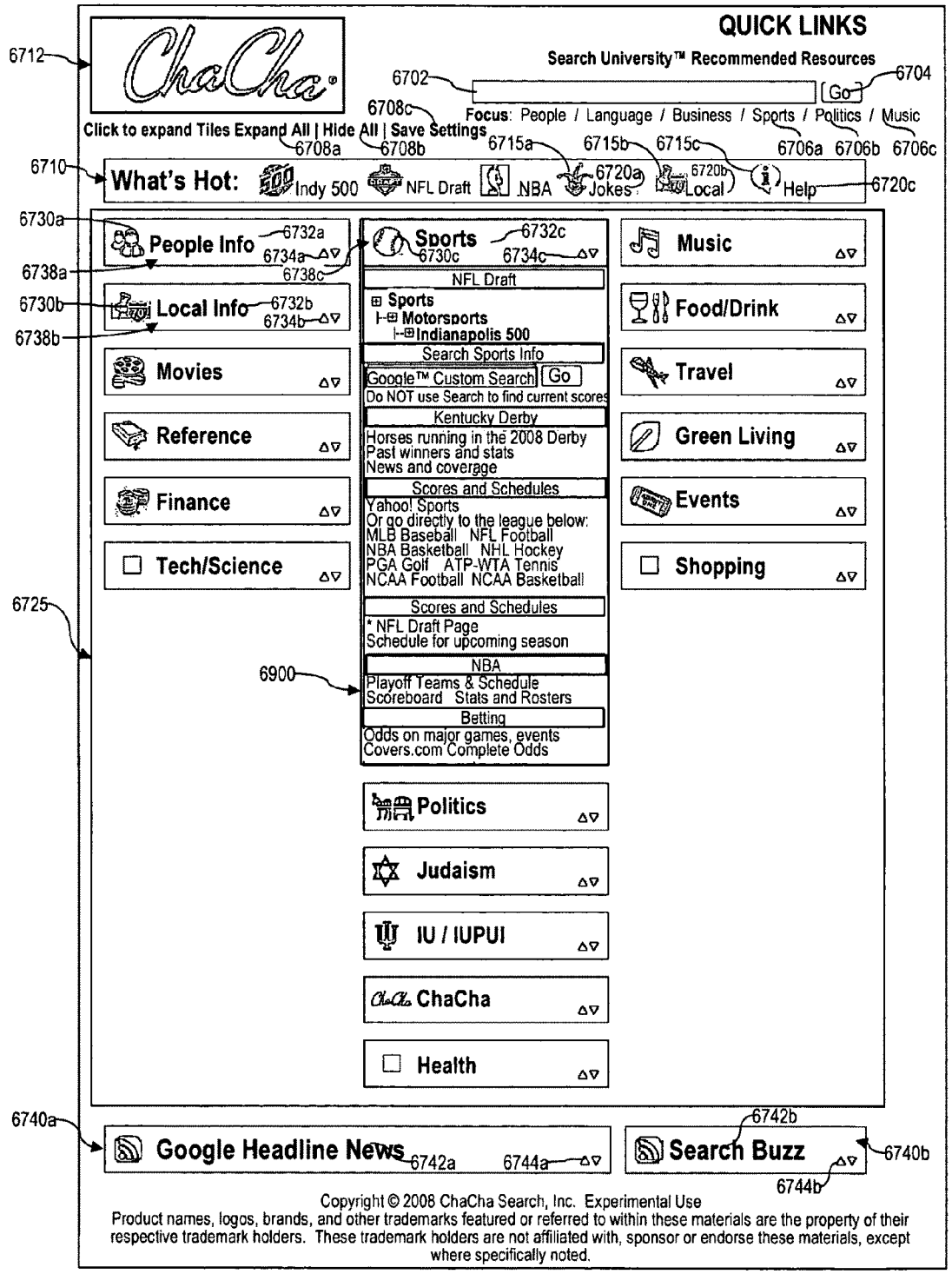
FIG. 67A depicts a GUI presenting information associated with a category.

As illustrated in FIG. 67A, a GUI 6800, which includes the GUI 6900, may be presented when the 'down' arrow of the taxonomy topic viewing control 6734c in the taxonomy topic window 6738c is activated.

Figure 68:
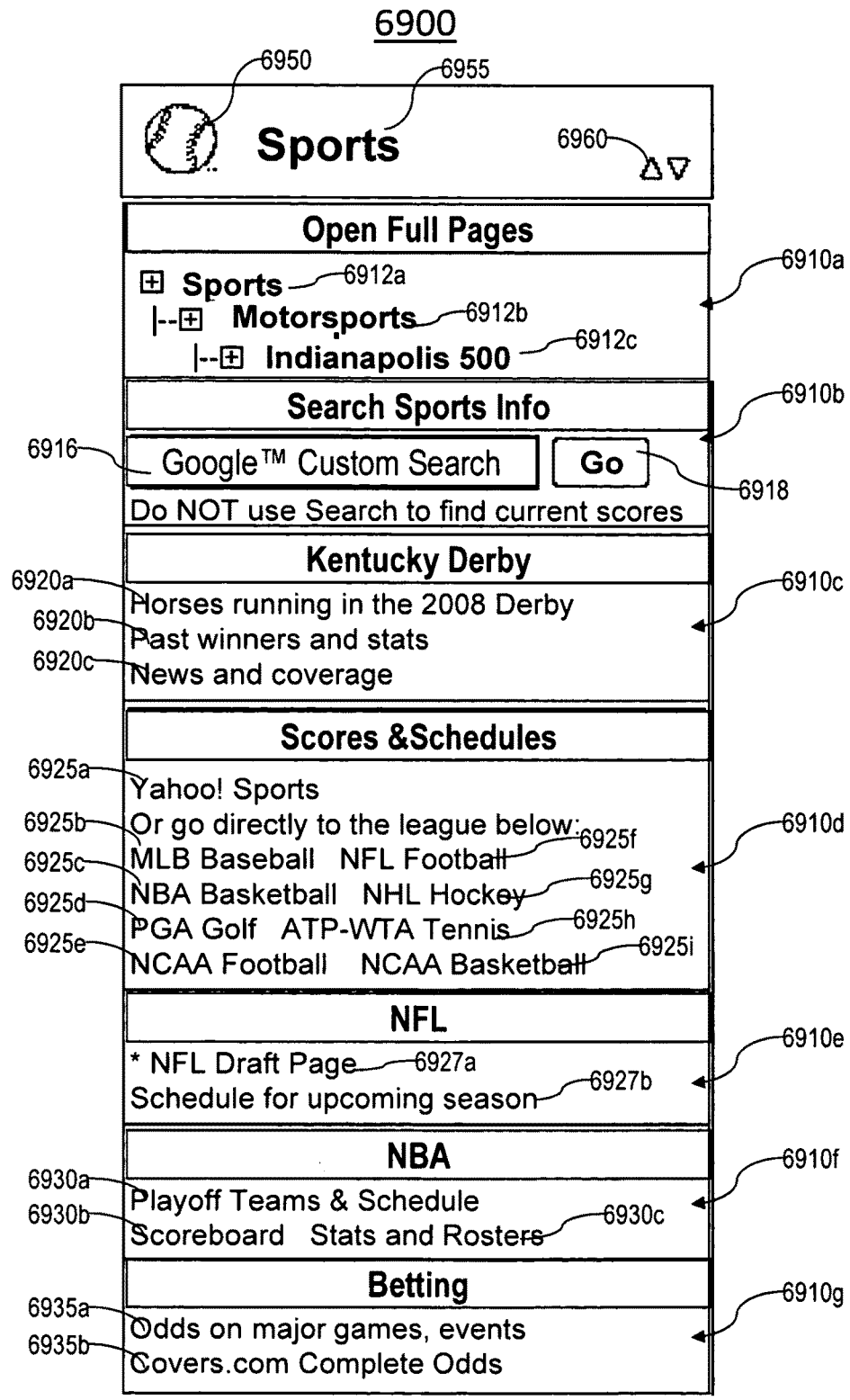
FIG. 68 depicts a GUI presenting information associated with a category.

The GUI 6900 illustrated in FIG. 68 may be associated with any node of an index indicated in the database 5020 (FIG. 50). The GUI 6900 may be presented as part of another GUI as illustrated in FIG. 67A, and/or as a 'stand alone' web page as illustrated in FIG. 68. The GUI 6900 may include topic indicator icon 6950, topic selection indicator 6955, topic viewing controls 6960, resource information windows 6910, taxonomy information indicators 6912, custom search query box 6916, custom search action control 6918, organic search topic resource indicators 6920, sponsored search topic resource indicators 6925, advertising information indicators 6927, affiliate search topic resource indicators 6930, and affiliated sponsored search topic indicators 6935.

The topic indicator icon 6950 may include a visual indicator of a category or node within an index indicated in the database 5020 (FIG. 50). A visual indicator may include any type of information such as picture, number, etc. In at least one embodiment, an icon which may be associated with a trademark, logo or other similar information may be presented. A topic icon 6950 may be activated by for example 'clicking on' the icon, or other equivalent actions. Activation of a topic icon 6950 may cause a GUI associated with the taxonomy topics icon 6950 to be presented. The topic selection indicator 6955 may include a textual and/or numeric indicator of a category or node within an index indicated in the database 5020 (FIG. 50). A textual and/or numeric indicator may include any type of information such as text, a number, etc. In at least one embodiment, text or other information which may be associated with a node indicated in a data structure may be presented. For example, information of a keyboard 'short-cut', or a description, or any other sort of indicator may be provided. A topic selection control 6955 may be activated by for example 'clicking on' the text, or other equivalent actions. Activation of a topic selection control 6955 may cause a GUI associated with the topic selection control 6955 to be presented. The topic viewing controls 6960 may be used to reveal and/or hide a GUI such as the GUI 6900 associated with a node which may be indicated in a topic indicator icon 6950 and/or a topic selection control 6955. The resource information windows 6910 may include information and controls which may be used to take actions regarding information which may be associated with one or more nodes within an index.

The resource information window 6910b includes a custom search query box 6916 and an action button 6918. The custom search query box 6916 may indicate information associated with a request. For example, the custom search query box 6916 may be used to enter text and/or other information which may be utilized by one or more resources. The custom search action control 6918 may be used to initiate a search, which may be based on information indicated in the GUI 6900.

The resource information window 6910a includes taxonomy information indicators 6912. The taxonomy information indicators 6912 may be used to select and/or display information associated with a taxonomy or index. The taxonomy information indicator 6912a may indicate a node associated with 'Sports' which may be a general topic within an index. Activation of the taxonomy information indicator 6912a may cause information associated with an index to be presented. For example, if the '+' in the taxonomy information indicator 6912a is activated, information of other generalized nodes within an index may be provided in the resource information window 6910a, which may allow display of information associated with a node to be displayed by activating an indicator associated with the node. The taxonomy information indicator 6912b may indicate a node associated with 'Sports>Motorsports' which may be a more specific topic within an index. Activation of the taxonomy information indicator 6912b may cause information associated with an index to be presented. For example, if the '+' in the taxonomy information indicator 6912b is activated, information of other nodes within an index may be provided in the resource information window 6910a, which may allow display of information associated with a node to be displayed by activating an indicator associated with the node. For example, other nodes associated with 'Sports' such as 'Sports>Football' and/or 'Sports>Golf' might be provided. The taxonomy information indicator 6912c may indicate a node associated with 'Sports>Motorsports>Indianapolis 500' which may be a more specific topic within an index. Activation of the taxonomy information indicator 6912c may cause information associated with an index to be presented. For example, if the '+' in the taxonomy information indicator 6912c is activated, information of other nodes within an index may be provided in the resource information window 6910a, which may allow display of information associated with a node to be displayed by activating an indicator associated with the node. For example, other nodes associated with 'Sports>Motorsports' such as 'Sports>Motorsports> Daytona500' and/or 'Sports>Motorsports>Brickyards400' might be provided. Other information regarding a node may be provided in the GUI 6900 responsive to activation of a taxonomy information indicator 6912. For example, activation of a taxonomy information indicator 6912 may cause the topic indicator icon 6950 and/or the topic selection control 6955 to be modified.

The resource information window 6910c includes organic search topic resource indicators 6920. The organic search topic resource indicators 6920 may indicate information selected based on criteria which may exclude any compensation information for a guide and/or the providers of the search system 5030 (FIG. 50). The organic search indicator 6920a may indicate information of a resource used most frequently by users in locating information regarding 'horses running in the 2008 Derby'. The organic resource indicator 6920b may indicate information of a resource associated with historical information of 'past winners and stats'. The organic resource indicator 6920c may indicate information of 'news and coverage'. Activation of an organic search topic resource indicator may for example cause a webpage(s) and/or other information associated with a resource to be presented. Any criteria may be applied to select resources which may be indicated in an organic search topic resource indicator 6920. Any number of organic search topic resource indicators may be presented in the GUI 6900. An order of presentation of organic resource indicators 6920 may be based on a ranking and/or rating of a resource(s).

The resource information window 6910d includes sponsored search topic resource indicators 6925. The sponsored search topic resource indicators 6925a-6925i may indicate information selected based on criteria which may include compensation information for a guide and/or the providers of the search system 5030 (FIG. 50). For example, the 'Yahoo Sports' sponsored search indicator 6925a may indicate information of a resource associated with a resource used most frequently by users which may provide advertising revenue based on activity(ies) associated with the search system 5030 (FIG. 50). The 'MLB baseball' sponsored resource indicator 6925b may indicate information of a resource associated Major League Baseball, which may be presented in an order based at least in part on advertising revenue. The 'NFL Football' sponsored resource indicator 6925c may indicate information of a resource associated with NFL football, which may be presented in an order based at least in part on advertising revenue, bids, etc. Activation of a sponsored search topic resource indicator 6925 may for example cause a webpage(s) and/or other information associated with a resource to be presented. Any criteria may be applied to select resources which may be indicated in a sponsored search topic resource indicator 6910. Any number of sponsored search topic resource indicators 6925 may be presented in the GUI 6900.

The resource information window 6910e includes advertising information indicators 6927. The advertising information indicators 6927 may indicate information of a product(s) and/or service(s) selected based on criteria which may include any compensation information for a guide(s) and/or the providers of the search system 5030 (FIG. 50). The advertising information indicators may be used to provide advertising and/or other content. The 'NFL Draft page' advertising information indicator 6927a may indicate information of a product and/or service, which may be presented in an order based at least in part on advertising revenue. The 'schedule for the upcoming season' advertising information indicators 6927b may indicate information of a resource associated with for example tickets and/or schedule information, which may be presented in an order based at least in part on advertising revenue, bids, etc. Activation of an advertising information indicator 6927 may for example cause a webpage(s) and/or other information associated with a resource to be presented. Any criteria may be applied to select resources which may be indicated in an advertising information indicator 6927. Any number of advertising information indicators 6927 may be presented in the GUI 6900.

The resource information window 6910f includes affiliate search topic resource indicators 6930. The affiliate search topic resource indicators 6930 may indicate information of a product(s) and/or service(s) selected based on criteria which may include an affiliation and/or other relationship between a provider of a resource(s) and the providers of the search system 5030 (FIG. 50). The affiliate search topic resource indicators 6930 may be used to provide access to a resource and/or other content. The 'Playoff Teams & Schedule' affiliate search topic resource indicator 6930a may indicate information of a resource(s), which may be presented in an order based at least in part on an affiliation. The 'scoreboard' affiliate search topic resource indicator 6930b may indicate information of a resource associated with for example current and/or historical game scores, which may be presented in an order based at least in part on affiliation, popularity, etc. The 'Stats and Rosters' affiliate search topic resource indicator 6930c, may indicate information regarding statistical and personnel information. Activation of an affiliate search topic resource indicator 6930 may for example cause a webpage(s) and/or other information associated with a resource to be presented. Any criteria may be applied to select resources which may be indicated in an affiliate search topic resource indicator 6930. Any number of affiliate search topic resource indicators 6930 may be presented in the GUI 6900.

The resource information window 6910g includes affiliated sponsored search topic indicators 6935. The affiliated sponsored search topic indicators 6935 may indicate information of a product(s) and/or service(s) selected based on criteria which may include advertising revenue and an affiliation and/or other relationship between a provider of a resource(s) and the providers of the search system 5030 (FIG. 50). The affiliated sponsored search topic indicators 6935 may be used to provide access to a resource and/or other content. The 'Odds on major games and events' affiliated sponsored search topic indicator 6935a may indicate information of a resources, which may be presented in an order based at least in part on an affiliation(s) and/or advertising information. The 'covers.com Complete Odds' affiliated sponsored search topic indicator 6935b may indicate information of a resource associated with for example wagering information, which may be presented in an order based at least in part on affiliation, advertising, popularity, etc. Activation of an affiliated sponsored search topic indicator 6935 may for example cause a webpage(s) and/or other information associated with a resource to be presented. Any criteria may be applied to select resources which may be indicated in an affiliated sponsored search topic indicator 6935. Any number of affiliated sponsored search topic indicators 6935 may be presented in the GUI 6900.

Figure 69:
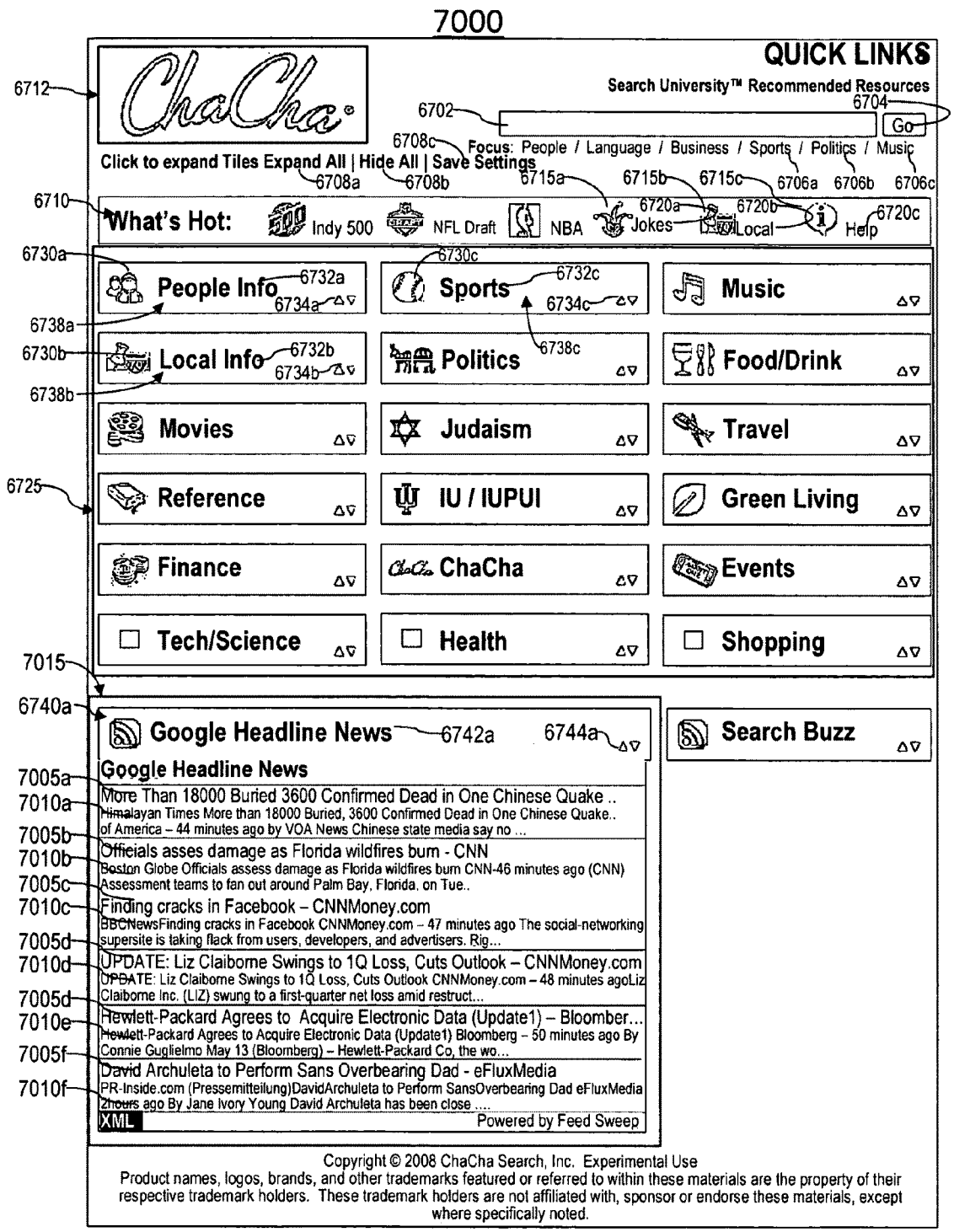
FIG. 69 depicts a GUI presenting information related to an index.

As illustrated in FIG. 69, the GUI 7000, which includes the GUI 7015 may be presented if the 'arrow' information feed viewing control 6744a of the information feed window 6740a is activated. The GUI 7015 may be presented as an element of a GUI such as the GUI 7000 and/or may be presented as a 'stand-alone' GUI. The GUI 7015 may include information feed resource selection indicators 7005a-7005f, and information feed resource summary information indicators 7010a-7010f. The information feed resource selection indicators 7005 and/or the information feed summary information indicators 7010 may be presented in an order based on information utilized by a provider of the information feed resource associated with the information feed content indicator 6742a. Using the example illustrated in FIG. 69, the 'More than 18000 buried' information feed resource selection indicators 7005a may provide access to content and/or other information associated with a first news story, and the 'Himalayan Times' information feed summary information indicator 7010a may present summary information regarding the first news story. Likewise, the 'Officials assess damage' information feed resource selection indicators 7005b may provide access to content and/or other information associated with a second news story, and the 'Boston Globe' information feed summary information indicator 7010b may present summary information regarding the second news story. Any type of information feed services and/or information may be provided in the GUI 7015.

The GUI's 6700, 6800, 6900, and 7000 may be utilized to track activities. For example, activation of an element(s) of a GUI may be used to determine usage of items indicated in a GUI, which may be used to determine compensation, ratings, etc. Features of a GUI or other interface, such as voice xML, IVR, touch screen, keypad interface, or other interface(s) known in the art may be generated in order to provide a system for tracking activity which may be associated with information indicated in the database 5020 (FIG. 50). As previously noted, while the database 5020 is illustrated as a single element of the system 5000, any storage media available to any element(s) of the system 5000 may be a part of the database 5020.

A system is disclosed whereby a wiki and/or other content may be associated with a taxonomy or index. A guide(s) may be registered and may be associated with one or more nodes or categorizations indicated in an index. A guide(s) may associate various types of information with the index based on the association of the guide(s) with the index. The system may associate information, which may include search tools, resources, and/or other media with the index. The information in the wiki and the search tool(s) may be continuously modified in order to provide information responsive to a request. Information in a wiki may be expanded by a search tool, which may search and rank resources from one or more search spaces which may be outside a search space originally defined. Rankings and ratings of the information associated with the index may be continuously modified based on the actions of a guide(s), a user(s) and/or system administrators.

Automated and/or human-assisted processes may be applied in order to optimize relevance of result(s), advertisement(s), resource(s), and/or guide(s) selected to respond to a request. GUIs which may be utilized to obtain information and provide information are disclosed. GUIs may be created, presented and/or modified based on information indicated in a database which may include information of a guide(s), a user(s), a resource(s), an advertisement(s), a categorization(s), a keyword(s), a profile(s), an index(es), a wiki(s), a request(s), a rating(s) and/or other information. A 'virtual wiki' may be provided which may be utilized by a user(s), a guide(s), a resource(s), an advertiser(s), a system administrator(s), an affiliate(s), etc. in order to manage content, compensation, activities, selection, etc.

The present invention may be implemented using a program stored, for example, in a computer-readable storage medium such as a CD-ROM, etc., or using one or more specialized terminals, devices or systems that is enabled to execute operation(s) described herein. That is, all or part of the operations disclosed herein may be implemented using hardware or software. The present invention may be recorded on a computer readable storage medium for causing a computer to execute operations disclosed herein. The computer readable storage medium includes any technology enabled to store information including data, programs, etc., such as but not limited to a floppy disk, a CD-ROM, a CD-R/W, a DVD, a memory card, etc.

The many features and advantages of the claimed invention are apparent from the detailed specification and thus, it is intended by the appended claims to cover all such features and advantages of the claimed invention that fall within the true spirit and scope of the invention. Further, since numerous modifications and changes will readily occur to those skilled in the art, it is not desired to limit the invention to the exact construction and operation illustrated and described for the disclosed embodiments, and accordingly all suitable modifications and equivalents may be resorted to, falling within the scope of the claimed invention. It will further be understood that the phrase "at least one of A, B and C" may be used herein as an alternative expression that means "one or more of A, B and C."

What is claimed is:

1. A computer implemented method for improving resource utilization, comprising:
    receiving from a source a request comprising media including at least one of audio, video, text and an image;
    creating, by a processor, a task based on the request and a conversion selected for the request;
    selecting a resource based on a ranking of the resource for the conversion;
    providing the task to the resource when a human assistant activates an indicator of the resource;
    obtaining a response from the resource comprising metadata regarding the media;
    determining whether a review of the response by a person is required based on a predetermined criterion;
    delivering an answer to the source of the request based on the response when determining that the review is not required;
    providing, to the human assistant, information of the task and the response when determining that the review of the response by the person is required;
    delivering the answer to the source of the request based on the response and the review when determining that the review of the response is required;
    presenting information based on the review to one or more resources which perform the conversion; and
    updating the ranking of the resource for the conversion based on the answer being generated, wherein the updated ranking is used for the selecting of the resource for future requests.

2. The method of claim 1, further comprising:
    providing information of the task to the human assistant based on information of a user associated with the source.

3. The method of claim 1, further comprising:
modifying a result based on the response and the review; and
providing the result.

4. The method of claim 1, wherein the review is performed by the person selected based on geographic, demographic, personality or affiliation information associated with a query and the response.

5. The method of claim 1, wherein the resource is an automated system and the task is converting text associated with the request from a first language to a second language.

6. The method of claim 1, wherein the determining is based on at least one of a confidence factor determined for the response, a statistical sampling pattern associated with the task, a rating of the resource based on a previous task, the ranking of the resource, a qualification of the human assistant and the source.

7. The method of claim 1, wherein the determining is based on a priority of the task associated with the human assistant.

8. The method of claim 1, wherein the determining includes determining a ranking of tasks available to the human assistant based on a rating of the resource for the conversion.

9. A system, comprising:
a search service device receiving from a source a query comprising media including at least one of audio, video, text and an image, creating a task based on the query and a conversion selected for the query, selecting a resource based on a ranking of the resource for the conversion, providing the task to the resource when a human assistant activates an indicator of the resource, obtaining a response from the resource comprising metadata regarding the media, determining whether a review of the response by a person is required based on a predetermined criterion, delivering an answer to the source of the query based on the response when determining that the review is not required, providing, to the human assistant, information of the task and the response when determining that the review of the response by the person is required, delivering the answer to the source of the query based on the response and the review when determining that the review of the response is required, presenting information based on the review to one or more resources which perform the conversion; and updating the ranking of the resource for the conversion based on the answer being generated, wherein the updated ranking is used for the selecting of the resource for future requests;
a resource device receiving information of the query when determining that the resource is available to perform the task, and providing the response to the task; and
a guide device providing the review of the response when determining that the review is required.

10. The system of claim 9, further comprising:
a user device submitting the query and receiving the answer wherein the query includes audio information and the response includes text information.

11. The system of claim 9, wherein the review is performed subsequent to the response being provided to a user submitting the query.

12. A non-transitory computer readable medium storing therein a program for causing a computer to execute an operation including optimizing usage of providers, comprising:
receiving from a source a query comprising media including at least one of audio, video, text and an image;
generating a request based on the query and a conversion selected for the query;
selecting a provider based on a ranking of the provider for the conversion;
transmitting the request to the provider when a human assistant activates an indicator of the provider;
obtaining a response from the provider comprising metadata regarding the media;
determining whether a review of the response by a person is required based on a predetermined criterion;
delivering an answer to the source of the query based on the response when determining that the review is not required;
transmitting information of the request and the response of the provider to a worker when determining that the review of the response is required;
delivering the answer to the source of the query based on the response and the review when determining that the review of the response is required;
presenting information based on the review to one or more providers which perform the conversion; and
updating the ranking of the provider for the conversion based on the answer being generated, wherein the updated ranking is used for the selecting of the provider for future queries.

13. The computer readable medium of claim 12, wherein the operation further comprises:
delivering an identifier of a user to the provider;
modifying a behavior of the provider and the criterion of the determining based on the identifier; and
providing the answer to the user.

14. The computer readable medium of claim 12, wherein the provider is an automated system which performs music recognition.

15. The computer readable medium of claim 13, wherein the provider is selected based on a ranking of the provider for a first media type associated with a source device originating the query and a second media type determined by a destination device.

16. The computer readable medium of claim 12, wherein the operation further comprises:
selecting a reviewer based on a media type included in the query;
selecting a converter based on the media type included in the query;
associating, by the converter, the media type included in the query with the metadata;
editing, by the reviewer, the metadata based on the query;
evaluating, by the converter, an edit of the reviewer;
obtaining a rating of the response; and
ranking the reviewer and the converter based on the rating of the response, the editing, and the evaluating of the edit.

17. The computer readable medium of claim 12, wherein the operation further comprises:
determining a first identifier of a user based on the response;
recording the identifier of the user in association with a device of the user;
providing a second identifier associated with the user and at least a portion of the query to a resource;
obtaining an output from the resource; and
rating the resource based on the response and the output.

18. The computer readable medium of claim 12, wherein the operation further comprises;
evaluating, by a resource, the response of the provider; and
ranking the provider based on the evaluating and the resource.

19. The computer readable medium of claim 12, wherein the provider performs at least one of text to speech conversion, speech to text conversion, and image recognition.

20. A computer implemented method, comprising:
generating, using a processor, a response for a query from a user wherein the query comprises media including at least one of audio, video, text and an image;
directing a task based on the query to a resource when a human assistant activates an indicator of the resource;
creating the task based on the query and a conversion selected for the query;
obtaining a result of the task from the resource wherein the result comprises metadata regarding the media;
determining whether the result is to be reviewed by a person based on a rating of the resource for the task;
delivering an answer to a source of the query based on the result when determining that the review is not required;
determining whether the result is to be reviewed by the person when the result meets a criterion based on geographic, demographic, affiliation, or personality information of the user;
providing, to a human searcher, information of the task and the result when determining that a review of the result by the person is required;
delivering the answer to the source of the query based on the result and the review when determining that the review of the response is required;
presenting information based on the review to one or more resources which perform the conversion; and
updating the rating of the resource for the conversion based on the answer being generated, wherein the updated rating is used for the selecting of the resource for future queries.

21. The method of claim 20, wherein the query is reviewed by the human searcher prior to said generating of the response and the determining is based on a history of queries associated with the user.

22. The method of claim 20, wherein the review of the query includes adapting the query by the human searcher to a conversion process associated with the resource prior to said generating of the response.

23. The method of claim 20, wherein said resource is selected by at least one other human searcher based on a ranking of the resource for the task.

24. The method of claim 20, wherein the response is obtained from information complied by other human searchers.

* * * * *